US012054506B2

(12) United States Patent
Graham et al.

(10) Patent No.: US 12,054,506 B2
(45) Date of Patent: Aug. 6, 2024

(54) REDUCING AGENTS AND USES THEREOF

(71) Applicant: Singular Genomics Systems, Inc., La Jolla, CA (US)

(72) Inventors: Ronald Graham, Carlsbad, CA (US); Zachary Terranova, San Diego, CA (US)

(73) Assignee: Singular Genomics Systems, Inc., San Diego, CA (US)

( * ) Notice: Subject to any disclaimer, the term of this patent is extended or adjusted under 35 U.S.C. 154(b) by 90 days.

(21) Appl. No.: 17/698,283

(22) Filed: Mar. 18, 2022

(65) Prior Publication Data

US 2022/0315614 A1 Oct. 6, 2022

Related U.S. Application Data

(60) Provisional application No. 63/163,394, filed on Mar. 19, 2021.

(51) Int. Cl.
*C07F 9/6521* (2006.01)

(52) U.S. Cl.
CPC .................................. *C07F 9/6521* (2013.01)

(58) Field of Classification Search
CPC ...................................................... C07F 9/6521
See application file for complete search history.

(56) References Cited

U.S. PATENT DOCUMENTS

| | | | |
|---|---|---|---|
| 3,213,093 A * | 10/1965 | Papp et al. |
| 6,664,079 B2 | 12/2003 | Ju et al. |
| 10,036,011 B2 | 7/2018 | Andruzzi |
| 10,738,072 B1 | 8/2020 | Graham et al. |
| 2020/0131484 A1 | 4/2020 | Golynskiy et al. |
| 2020/0181587 A1 | 6/2020 | Klausing et al. |

FOREIGN PATENT DOCUMENTS

| | | |
|---|---|---|
| WO | WO-2018/148723 A1 | 8/2018 |
| WO | WO-2020/056044 A1 | 3/2020 |

OTHER PUBLICATIONS

Rogachevskaya et al., New ashless antiwear additives for lubricating oils. Chemistry and Technology Fuels Oils, 15, pp. 601-603 (1979). (Year: 1979).*

Rösler et al., Angewandte Chemie, International Edition (2015), 54(50), pp. 15046-15050 and the Supplemental Information document. (Year: 2015).*

PubChem CID 44515505, National Center for Biotechnology Information. PubChem Compound Summary for CID 44515505, (4,6-Dichloro-1,3,5-triazin-2-yl)-diphenylphosphane. https://pubchem.ncbi.nlm.nih.gov/compound/44515505. Accessed Sep. 19, 2023, create date Dec. 22, 2009. (Year: 2009).*

Hayashi et al., European Journal of Organic Chemistry (2009), (29), pp. 4956-4962. (Year: 2009).*

Bentley, D. R. et al. (2008) "Accurate whole human genome sequencing using reversible terminator chemistry," *Nature* 456(7218): 53-59.

Bergen, K. et al. (2013) "Structures of KOD and 9 N DNA polymerases complexed with primer template duplex," *ChemBioChem* 14(9): 1058-1062.

Binauld, S. et al. (2013) "Acid-degradable polymers for drug delivery: a decade of innovation," *Chemical communications* 49(21): 2082-2102.

Buonomo, J. A. et al. (2017) "Chemoselective reduction of phosphine oxides by 1, 3-Diphenyl-Disiloxane." Chemistry—A European Journal 23(58): 14434-14438.

Demchuk, O. M. et al. (2018) "A clean and simple method for deprotection of phosphines from borane complexes," *Pure and Applied Chemistry* 90(1): 49-62.

Fuller, C. W. et al. (2016) "Real-time single-molecule electronic DNA sequencing by synthesis using polymer-tagged nucleotides on a nanopore array," *PNAS USA* 113(19): 5233-5238.

Guo, J. et al. (2008) "Four-color DNA sequencing with 3'-O-modified nucleotide reversible terminators and chemically cleavable fluorescent dideoxynucleotides," *PNAS USA* 105(27): 9145-9150.

Lloyd-Jones, G. C. et al. (2015) "Mechanism of phosphine borane deprotection with amines: the effects of phosphine, solvent and amine on rate and efficiency," *Chemistry—A European Journal* 21(14): 5423-5428.

Hutter, D. et al. (2010) "Labeled nucleoside triphosphates with reversibly terminating aminoalkoxyl groups," *Nucleosides, Nucleotides and Nucleic Acids* 29(11-12): 879-895.

Ju, J. et al. (2006) "Four-color DNA sequencing by synthesis using cleavable fluorescent nucleotide reversible terminators." *PNAS USA* 103(52): 19635-19640.

Kantner, T. et al. (2016) "Characterization of reactions between water-soluble trialkylphosphines and thiol alkylating reagents: Implications for protein-conjugation reactions." *Bioconjugate Chemistry* 27(10): 2400-2406.

Kantner, T. et al. (2017) "In situ quenching of trialkylphosphine reducing agents using water-soluble PEG-azides improves maleimide conjugation to proteins." *ACS omega* 2(9): 5785-5791.

Kumar, S. et al. (2012) "PEG-Labeled Nucleotides and Nanopore Detection for Single Molecule DNASequencing by Synthesis." *Scientific reports* 2(1):684. pp. 1-8.

Lee, Y-J. et al. (2016) "Phospha-Michael Addition as a New Click Reaction for Protein Functionalization." *ChemBioChem* 17(6): 456-461.

(Continued)

*Primary Examiner* — Laura L Stockton

(74) *Attorney, Agent, or Firm* — Mintz, Levin, Cohn, Ferris, Glovsky, Popeo, P.C.; Zachary L. Terranova

(57) ABSTRACT

Disclosed herein, inter alia, are novel reducing agents having the general formula

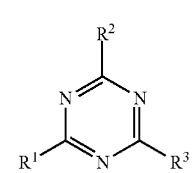

and methods of use thereof.

22 Claims, 2 Drawing Sheets

(56) References Cited

OTHER PUBLICATIONS

Musina, E. I. et al. (2019) "Phosphines: preparation, reactivity and applications," *Organophosphorus Chemistry* 48:1-63.
Rathod, K. M. et al. (2013) "Synthesis and antimicrobial activity of azo compounds containing m-cresol moiety." *Chemical Science Transactions* 2(1): 25-28.
Shenoi, R. A. et al. (2012) "Branched multifunctional polyether polyketals: variation of ketal group structure enables unprecedented control over polymer degradation in solution and within cells." *J American Chemical Society* 134(36): 14945-14957.
Southworth, M. W. et al. (1996) "Cloning of thermostable DNA polymerases from hyperthermophilic marine Archaea with emphasis on *Thermococcus* sp. 9 degrees N-7 and mutations affecting 3'-5'exonuclease activity." PNAS USA *Sciences* 93(11): 5281-5285.
Sowa, S. et al. (Apr. 23, 2021) "Reduction of tertiary phosphine oxides to phosphine-boranes using Ti (Oi—Pr) 4/BH3-THF." *Tetrahedron* 86: 132057.
Wu, J. et al. (2007) "3'-O-modified nucleotides as reversible terminators for pyrosequencing." PNAS USA 104(42): 16462-16467.

* cited by examiner

REDUCING AGENTS AND USES THEREOF

CROSS-REFERENCES TO RELATED APPLICATIONS

This application claims the benefit of U.S. Provisional Application No. 63/163,394, filed Mar. 19, 2021, which is incorporated herein by reference in its entirety and for all purposes.

BACKGROUND

Sequencing by synthesis (SBS) of nucleic acids ideally requires the controlled (i.e. one at a time), yet rapid, incorporation of the correct complementary nucleotide opposite the oligonucleotide being sequenced. This is typically performed, for example, using nucleotides bearing a 3' reversible terminator which allows for successive nucleotides to be incorporated into a polynucleotide chain in a sequential and controlled manner. Following detection, the removal of the reversible terminator leaves a free 3' hydroxyl group for addition of the next nucleotide. These nucleotides may also contain a label that is linked to the nucleotide via a cleavable linker. The reversible terminators and cleavable linkers include a moiety (e.g., an azido or disulfide moiety) that cleaves in the presence of a reducing agent, such as dithiothreitol (DTT), cysteamine, triphenylphosphine, tris(hydroxymethyl)phosphine (THP), tris(hydroxypropyl)phosphine (THPP), 1,3,5-triaza-7-phosphaadamantane (PTA), or tris-(2-carboxyethyl)phosphine (TCEP). Modified nucleotides are highly sensitive to residual reducing agents. Such reducing agents can remain in the reaction vessel, prematurely cleaving the reversible terminator and/or label from additional nucleotides. Without a reversible terminator present on the nucleotide, an additional nucleotide is capable of being incorporated and detected, resulting in dephasing from surrounding amplicons in the cluster. This asynchronization event results in lower quality individual base calls and less accurate sequencing reads. The solutions and methods described herein results in faster SBS cycle times, lower out-of-phase values, and permit longer sequencing read lengths.

BRIEF SUMMARY

In an aspect is provided a cyclic reducing agent. In embodiments, the cyclic reducing agents are water soluble, and due to their unique structure (e.g., polymeric structure), are capable of being easily removed from the reaction vessel.

In an aspect is provided a compound having the formula:

(III)

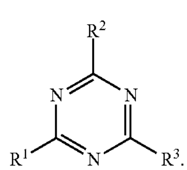

$R^1$ is $—W^1\text{-}L^1\text{-}R^4$. $R^2$ is halogen or $—W^2\text{-}L^2\text{-}R^5$. $R^3$ is halogen or $—W^3\text{-}L^3\text{-}R^6$. $W^1$, $W^2$, and $W^3$ are each independently a bond, —O—, —S—, or —NH—. $L^1$, $L^2$, and $L^3$ are each independently a bond, substituted or unsubstituted alkylene, substituted or unsubstituted heteroalkylene, substituted or unsubstituted arylene, or substituted or unsubstituted heteroarylene. $R^4$ is

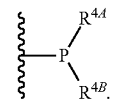

$R^5$ is hydrogen, bioconjugate moiety, —OH, $—NH_2$, —COOH, $—CONH_2$, —SH, $—SO_3H$, $—SO_4H$, $—SO_2NH_2$, or

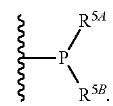

$R^6$ is hydrogen, bioconjugate moiety, —OH, $—NH_2$, —COOH, $—CONH_2$, —SH, $—SO_3H$, $—SO_4H$, $—SO_2NH_2$, or

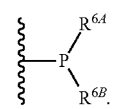

$R^{4A}$, $R^{4B}$, $R^{5A}$, $R^{5B}$, $R^{6A}$, and $R^{6B}$ are each independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl.

In an aspect is provided a method of sequencing a nucleic acid, the method including: (i) incorporating in series with a nucleic acid polymerase, (e.g., within a reaction vessel), one of four different labeled nucleotide analogues into a primer to create an extension strand, wherein the primer is hybridized to the nucleic acid and wherein each of the four different labeled nucleotide analogues include a unique detectable label linked by a cleavable linker; (ii) detecting the unique detectable label of each incorporated nucleotide analogue, so as to thereby identify each incorporated nucleotide analogue in the extension strand; and (iii) contacting the incorporated nucleotide analogues with a compound as described herein, including embodiments, to remove the detectable label; thereby sequencing the nucleic acid.

In an aspect is provided a method of incorporating a plurality of nucleotide analogues into a primer hybridized to a single stranded polynucleotide, the method including: (i) incorporating with a nucleic acid polymerase a nucleotide analogue into a primer to create an extension strand, wherein the nucleotide analogue includes a reversible terminator; (ii) contacting the nucleotide analogue with a compound as described herein, including embodiments, to remove the reversible terminator; repeating steps (i) and (ii) to incorporate a plurality of nucleotide analogues into a primer hybridized to a single stranded polynucleotide.

DETAILED DESCRIPTION

Figure 1:
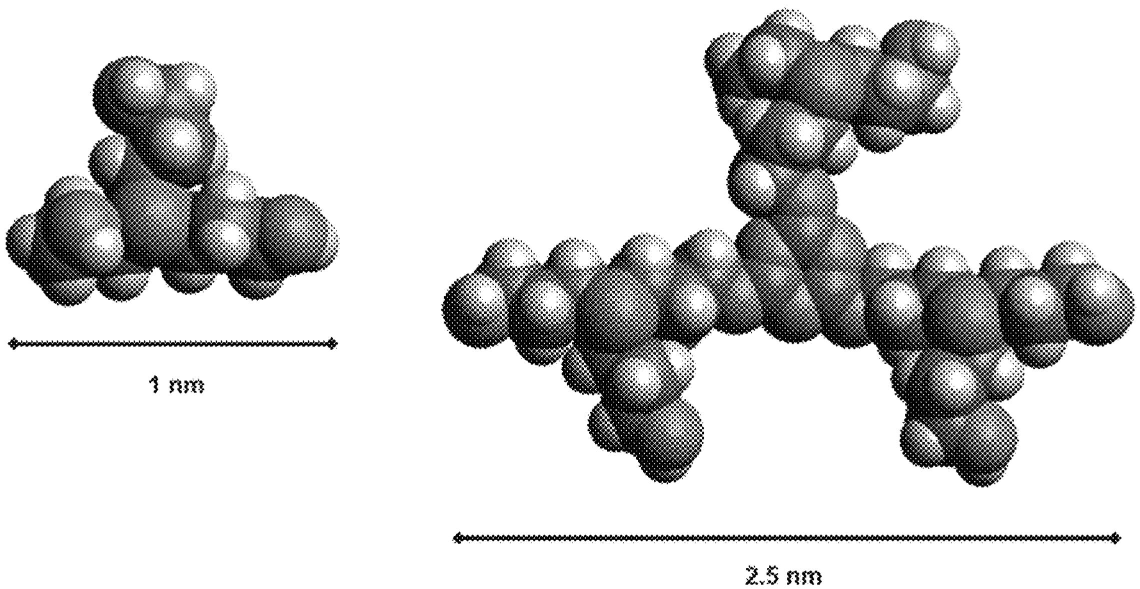
FIG. 1 is a VDW molecular representation of an optimized geometry of a THPP molecule (left) and a reducing agent (3CYNA) as described herein (right). The geometry optimizations highlight the size differential of the two compounds, wherein the compounds as described herein are at least twice as large as a single molecule of tris(hydroxypropyl)phosphine (THPP).

The aspects and embodiments described herein relate to novel reducing agents having a central ring and pendant arm(s) capable of reducing (i.e., donates electron(s) to an electron recipient) in a redox chemical reaction.

I. Definitions

All patents, patent applications, articles and publications mentioned herein, both supra and infra, are hereby expressly incorporated herein by reference in their entireties.

Unless defined otherwise herein, all technical and scientific terms used herein have the same meaning as commonly understood by one of ordinary skill in the art to which this disclosure belongs. Various scientific dictionaries that include the terms included herein are well known and available to those in the art. Although any methods and materials similar or equivalent to those described herein find use in the practice or testing of the disclosure, some preferred methods and materials are described. Accordingly, the terms defined immediately below are more fully described by reference to the specification as a whole. It is to be understood that this disclosure is not limited to the particular methodology, protocols, and reagents described, as these may vary, depending upon the context in which they are used by those of skill in the art. The following definitions are provided to facilitate understanding of certain terms used frequently herein and are not meant to limit the scope of the present disclosure.

The abbreviations used herein have their conventional meaning within the chemical and biological arts. The chemical structures and formulae set forth herein are constructed according to the standard rules of chemical valency known in the chemical arts.

Where substituent groups are specified by their conventional chemical formulae, written from left to right, they equally encompass the chemically identical substituents that would result from writing the structure from right to left, e.g., —$CH_2O$— is equivalent to —$OCH_2$—.

The term "alkyl," by itself or as part of another substituent, means, unless otherwise stated, a straight (i.e., unbranched) or branched carbon chain (or carbon), or combination thereof, which may be fully saturated, mono- or polyunsaturated and can include mono-, di- and multivalent radicals. The alkyl may include a designated number of carbons (e.g., $C_1$-$C_{10}$ means one to ten carbons). In embodiments, the alkyl is fully saturated. In embodiments, the alkyl is monounsaturated. In embodiments, the alkyl is polyunsaturated. Alkyl is an uncyclized chain. Examples of saturated hydrocarbon radicals include, but are not limited to, groups such as methyl, ethyl, n-propyl, isopropyl, n-butyl, t-butyl, isobutyl, sec-butyl, methyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. An alkoxy is an alkyl attached to the remainder of the molecule via an oxygen linker (—O—). An alkyl moiety may be an alkenyl moiety. An alkyl moiety may be an alkynyl moiety. An alkyl moiety may be fully saturated. An alkenyl may include more than one double bond and/or one or more triple bonds in addition to the one or more double bonds. An alkynyl may include more than one triple bond and/or one or more double bonds in addition to the one or more triple bonds. An alkenyl includes one or more double bonds. An alkynyl includes one or more triple bonds.

The term "alkylene," by itself or as part of another substituent, means, unless otherwise stated, a divalent radical derived from an alkyl, as exemplified, but not limited by, —$CH_2CH_2CH_2CH_2$—. Typically, an alkyl (or alkylene) group will have from 1 to 24 carbon atoms, with those groups having 10 or fewer carbon atoms being preferred herein. A "lower alkyl" or "lower alkylene" is a shorter chain alkyl or alkylene group, generally having eight or fewer carbon atoms. The term "alkenylene," by itself or as part of another substituent, means, unless otherwise stated, a divalent radical derived from an alkene. The term "alkynylene" by itself or as part of another substituent, means, unless otherwise stated, a divalent radical derived from an alkyne. The term "alkynylene" by itself or as part of another substituent, means, unless otherwise stated, a divalent radical derived from an alkyne. In embodiments, the alkylene is fully saturated. In embodiments, the alkylene is monounsaturated. In embodiments, the alkylene is polyunsaturated. An alkenylene includes one or more double bonds. An alkynylene includes one or more triple bonds.

The term "heteroalkyl," by itself or in combination with another term, means, unless otherwise stated, a stable straight or branched chain, or combinations thereof, including at least one carbon atom and at least one heteroatom (e.g., O, N, P, Si, and S), and wherein the nitrogen and sulfur atoms may optionally be oxidized, and the nitrogen heteroatom may optionally be quaternized. The heteroatom(s) (e.g., O, N, S, Si, or P) may be placed at any interior position of the heteroalkyl group or at the position at which the alkyl group is attached to the remainder of the molecule. Heteroalkyl is an uncyclized chain. Examples include, but are not limited to: —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—S—$CH_2$, —S(O)—$CH_3$, —$CH_2$—$CH_2$—S$(O)_2$—$CH_3$, —CH═CH—O—$CH_3$, —Si$(CH_3)_3$, —$CH_2$—CH═N—$OCH_3$, —CH═CH—N($CH_3$)—$CH_3$, —O—$CH_3$, —O—$CH_2$—$CH_3$, and —CN. Up to two or three heteroatoms may be consecutive, such as, for example, —$CH_2$—NH—$OCH_3$ and —$CH_2$—O—Si$(CH_3)_3$. A heteroalkyl moiety may include one heteroatom (e.g., O, N, S, Si, or P). A heteroalkyl moiety may include two optionally different heteroatoms (e.g., O, N, S, Si, or P). A heteroalkyl moiety may include three optionally different heteroatoms (e.g., O, N, S, Si, or P). A heteroalkyl moiety may include four optionally different heteroatoms (e.g., O, N, S, Si, or P). A heteroalkyl moiety may include five optionally different heteroatoms (e.g., O, N, S, Si, or P). A heteroalkyl moiety may include up to 8 optionally different heteroatoms (e.g., O, N, S, Si, or P). The term "heteroalkenyl," by itself or in combination with another term, means, unless otherwise stated, a heteroalkyl including at least one double bond. A heteroalkenyl may optionally include more than one double bond and/or one or more triple bonds in additional to the one or more double bonds. The term "heteroalkynyl," by itself or in combination with another term, means, unless otherwise stated, a heteroalkyl including at least one triple bond. A heteroalkynyl may optionally include more than one triple bond and/or one or more double bonds in additional to the one or more triple bonds. In embodiments, the heteroalkyl is fully saturated. In embodiments, the heteroalkyl is monounsaturated. In embodiments, the heteroalkyl is polyunsaturated.

Similarly, the term "heteroalkylene," by itself or as part of another substituent, means, unless otherwise stated, a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —$C(O)_2R'$— represents both —$C(O)_2R'$— and —$R'C(O)_2$—. As described above, heteroalkyl groups, as used herein, include those groups that are attached to the remainder of the molecule through a heteroatom, such as —C(O)R', —C(O)NR', —NR'R", —OR', —SR', and/or —$SO_2R'$. Where "heteroalkyl" is recited, followed by recitations of specific heteroalkyl groups, such as —NR'R" or the like, it will be understood that the terms heteroalkyl and —NR'R" are not redundant or mutually exclusive. Rather, the specific heteroalkyl groups are recited to add clarity. Thus, the term "heteroalkyl" should not be interpreted herein as excluding specific heteroalkyl groups, such as —NR'R" or the like. The term "heteroalkenylene," by itself or as part of another substituent, means, unless otherwise stated, a divalent radical derived from a heteroalkene. The term "heteroalkynylene" by itself or as part of another substituent, means, unless otherwise stated, a divalent radical derived from a heteroalkyne. In embodiments, the heteroalkylene is fully saturated. In embodiments, the heteroalkylene is monounsaturated. In embodiments, the heteroalkylene is polyunsaturated. A heteroalkenylene includes one or more double bonds. A heteroalkynylene includes one or more triple bonds.

The terms "cycloalkyl" and "heterocycloalkyl," by themselves or in combination with other terms, mean, unless otherwise stated, cyclic versions of "alkyl" and "heteroalkyl," respectively. Cycloalkyl and heterocycloalkyl are not aromatic. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent, means a divalent radical derived from a cycloalkyl and heterocycloalkyl, respectively. In embodiments, the cycloalkyl is fully saturated. In embodiments, the cycloalkyl is monounsaturated. In embodiments, the cycloalkyl is polyunsaturated. In embodiments, the heterocycloalkyl is fully saturated. In embodiments, the heterocycloalkyl is monounsaturated. In embodiments, the heterocycloalkyl is polyunsaturated.

In embodiments, the term "cycloalkyl" means a monocyclic, bicyclic, or a multicyclic cycloalkyl ring system. In embodiments, monocyclic ring systems are cyclic hydrocarbon groups containing from 3 to 8 carbon atoms, where such groups can be saturated or unsaturated, but not aromatic. In embodiments, cycloalkyl groups are fully saturated. In embodiments, a bicyclic or multicyclic cycloalkyl ring system refers to multiple rings fused together or multiple spirocyclic rings wherein at least one of the fused or spirocyclic rings is a cycloalkyl ring and wherein the multiple rings are attached to the parent molecular moiety through any carbon atom contained within a cycloalkyl ring of the multiple rings.

In embodiments, a cycloalkyl is a cycloalkenyl. The term "cycloalkenyl" is used in accordance with its plain ordinary meaning. In embodiments, a cycloalkenyl is a monocyclic, bicyclic, or a multicyclic cycloalkenyl ring system. In embodiments, a bicyclic or multicyclic cycloalkenyl ring system refers to multiple rings fused together or multiple spirocyclic rings wherein at least one of the fused or spirocyclic rings is a cycloalkenyl ring and wherein the multiple rings are attached to the parent molecular moiety through any carbon atom contained within a cycloalkenyl ring of the multiple rings.

In embodiments, the term "heterocycloalkyl" means a monocyclic, bicyclic, or a multicyclic heterocycloalkyl ring system. In embodiments, heterocycloalkyl groups are fully saturated. In embodiments, a bicyclic or multicyclic heterocycloalkyl ring system refers to multiple rings fused together or multiple spirocyclic rings wherein at least one of the fused or spirocyclic rings is a heterocycloalkyl ring and wherein the multiple rings are attached to the parent molecular moiety through any atom contained within a heterocycloalkyl ring of the multiple rings.

In embodiments, the term "cycloalkyl" means a monocyclic, bicyclic, or a multicyclic cycloalkyl ring system. In embodiments, monocyclic ring systems are cyclic hydrocarbon groups containing from 3 to 8 carbon atoms, where such groups can be saturated or unsaturated, but not aromatic. In embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Bicyclic cycloalkyl ring systems are bridged monocyclic rings or fused bicyclic rings. In embodiments, bridged monocyclic rings contain a monocyclic cycloalkyl ring where two non adjacent carbon atoms of the monocyclic ring are linked by an alkylene bridge of between one and three additional carbon atoms (i.e., a bridging group of the form $(CH_2)_w$, where w is 1, 2, or 3). Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane. In embodiments, fused bicyclic cycloalkyl ring systems contain a monocyclic cycloalkyl ring fused to either a monocyclic cycloalkyl, a monocyclic cycloalkenyl, or a monocyclic heterocyclyl. In embodiments, the bridged or fused bicyclic cycloalkyl is attached to the parent molecular moiety through any carbon atom contained within the monocyclic cycloalkyl ring. In embodiments, cycloalkyl groups are optionally substituted with one or two groups which are independently oxo or thia. In embodiments, the fused bicyclic cycloalkyl is a 5 or 6 membered monocyclic cycloalkyl ring fused to either a 5 or 6 membered monocyclic cycloalkyl, a 5 or 6 membered monocyclic cycloalkenyl, or a 5 or 6 membered monocyclic heterocyclyl, wherein the fused bicyclic cycloalkyl is optionally substituted by one or two groups which are independently oxo or thia. In embodiments, multicyclic cycloalkyl ring systems are a monocyclic cycloalkyl ring (base ring) fused to either (i) one ring system selected from the group consisting of a bicyclic cycloalkyl, a bicyclic cycloalkenyl, and a bicyclic heterocyclyl; or (ii) two other ring systems independently selected from the group consisting of a monocyclic or bicyclic cycloalkyl, a monocyclic or bicyclic cycloalkenyl, and a monocyclic or bicyclic heterocyclyl. In embodiments, the multicyclic cycloalkyl is attached to the parent molecular moiety through any carbon atom contained within the base ring. In embodiments, multicyclic cycloalkyl ring systems are a monocyclic cycloalkyl ring (base ring) fused to either (i) one ring system selected from the group consisting of a bicyclic cycloalkyl, a bicyclic cycloalkenyl, and a bicyclic heterocyclyl; or (ii) two other ring systems independently selected from the group consisting of a monocyclic cycloalkyl, a monocyclic cycloalkenyl, and a monocyclic heterocyclyl.

In embodiments, a cycloalkyl is a cycloalkenyl. The term "cycloalkenyl" is used in accordance with its plain ordinary meaning. In embodiments, a cycloalkenyl is a monocyclic, bicyclic, or a multicyclic cycloalkenyl ring system. In embodiments, monocyclic cycloalkenyl ring systems are cyclic hydrocarbon groups containing from 3 to 8 carbon atoms, where such groups are unsaturated (i.e., containing at least one annular carbon carbon double bond), but not aromatic. Examples of monocyclic cycloalkenyl ring systems include cyclopentenyl and cyclohexenyl. In embodiments, bicyclic cycloalkenyl rings are bridged monocyclic rings or a fused bicyclic rings. In embodiments, bridged monocyclic rings contain a monocyclic cycloalkenyl ring where two non adjacent carbon atoms of the monocyclic ring are linked by an alkylene bridge of between one and three additional carbon atoms (i.e., a bridging group of the form $(CH_2)_w$, where w is 1, 2, or 3). Representative examples of bicyclic cycloalkenyls include, but are not limited to, norbornenyl and bicyclo[2.2.2]oct 2 enyl. In embodiments, fused bicyclic cycloalkenyl ring systems contain a monocyclic cycloalkenyl ring fused to either a monocyclic cycloalkyl, a monocyclic cycloalkenyl, or a monocyclic heterocyclyl. In embodiments, the bridged or fused bicyclic cycloalkenyl is attached to the parent molecular moiety through any carbon atom contained within the monocyclic cycloalkenyl ring. In embodiments, cycloalkenyl groups are optionally substituted with one or two groups which are independently oxo or thia. In embodiments, multicyclic cycloalkenyl rings contain a monocyclic cycloalkenyl ring (base ring) fused to either (i) one ring system selected from the group consisting of a bicyclic cycloalkyl, a bicyclic cycloalkenyl, and a bicyclic heterocyclyl; or (ii) two ring systems independently selected from the group consisting of a monocyclic or bicyclic cycloalkyl, a monocyclic or bicyclic cycloalkenyl, and a monocyclic or bicyclic heterocyclyl. In embodiments, the multicyclic cycloalkenyl is attached to the parent molecular moiety through any carbon atom contained within the base ring. In embodiments, multicyclic cycloalkenyl rings contain a monocyclic cycloalkenyl ring (base ring) fused to either (i) one ring system selected from the group consisting of a bicyclic cycloalkyl, a bicyclic cycloalkenyl, and a bicyclic heterocyclyl; or (ii) two ring systems independently selected from the group consisting of a monocyclic cycloalkyl, a monocyclic cycloalkenyl, and a monocyclic heterocyclyl.

In embodiments, a heterocycloalkyl is a heterocyclyl. The term "heterocyclyl" as used herein, means a monocyclic, bicyclic, or multicyclic heterocycle. The heterocyclyl monocyclic heterocycle is a 3, 4, 5, 6 or 7 membered ring containing at least one heteroatom independently selected from the group consisting of O, N, and S where the ring is saturated or unsaturated, but not aromatic. The 3 or 4 membered ring contains one heteroatom selected from the group consisting of O, N and S. The 5 membered ring can contain zero or one double bond and one, two or three heteroatoms selected from the group consisting of O, N and S. The 6 or 7 membered ring contains zero, one or two double bonds and one, two or three heteroatoms selected from the group consisting of O, N and S. The heterocyclyl monocyclic heterocycle is connected to the parent molecular moiety through any carbon atom or any nitrogen atom contained within the heterocyclyl monocyclic heterocycle. Representative examples of heterocyclyl monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The heterocyclyl bicyclic heterocycle is a monocyclic heterocycle fused to either a monocyclic cycloalkyl, a monocyclic cycloalkenyl, or a monocyclic heterocycle. The heterocyclyl bicyclic heterocycle is connected to the parent molecular moiety through any carbon atom or any nitrogen atom contained within the monocyclic heterocycle portion of the bicyclic ring system. Representative examples of bicyclic heterocyclyls include, but are not limited to, 2,3-dihydrobenzofuran-2-yl, 2,3-dihydrobenzofuran-3-yl, indolin-1-yl, indolin-2-yl, indolin-3-yl, 2,3-dihydrobenzothien-2-yl, decahydroquinolinyl, decahydroisoquinolinyl, octahydro-1H-indolyl, and octahydrobenzofuranyl. In embodiments, heterocyclyl groups are optionally substituted with one or two groups which are independently oxo or thia. In certain embodiments, the bicyclic heterocyclyl is a 5 or 6 membered monocyclic heterocyclyl ring fused to a 5 or 6 membered monocyclic cycloalkyl, a 5 or 6 membered monocyclic cycloalkenyl, or a 5 or 6 membered monocyclic heterocyclyl, wherein the bicyclic heterocyclyl is optionally substituted by one or two groups which are independently oxo or thia. Multicyclic heterocyclyl ring systems are a monocyclic heterocyclyl ring (base ring) fused to either (i) one ring system selected from the group consisting of a bicyclic cycloalkyl, a bicyclic cycloalkenyl, and a bicyclic heterocyclyl; or (ii) two other ring systems independently selected from the group consisting of a monocyclic or bicyclic cycloalkyl, a monocyclic or bicyclic cycloalkenyl, and a monocyclic or bicyclic heterocyclyl. The multicyclic heterocyclyl is attached to the parent molecular moiety through any carbon atom or nitrogen atom contained within the base ring. In embodiments, multicyclic heterocyclyl ring systems are a monocyclic heterocyclyl ring (base ring) fused to either (i) one ring system selected from the group consisting of a bicyclic cycloalkyl, a bicyclic cycloalkenyl, and a bicyclic heterocyclyl; or (ii) two other ring systems independently selected from the group consisting of a monocyclic cycloalkyl, a monocyclic cycloalkenyl, and a monocyclic heterocyclyl.

The terms "halo" or "halogen," by themselves or as part of another substituent, mean, unless otherwise stated, a fluorine, chlorine, bromine, or iodine atom. Additionally, terms such as "haloalkyl" are meant to include monohaloalkyl and polyhaloalkyl. For example, the term "halo($C_1$-$C_4$)alkyl" includes, but is not limited to, fluoromethyl, difluoromethyl, trifluoromethyl, 2,2,2-trifluoroethyl, 4-chlorobutyl, 3-bromopropyl, and the like.

The term "acyl" means, unless otherwise stated, —C(O)R where R is a substituted or unsubstituted alkyl, substituted or unsubstituted cycloalkyl, substituted or unsubstituted heteroalkyl, substituted or unsubstituted heterocycloalkyl, substituted or unsubstituted aryl, or substituted or unsubstituted heteroaryl.

The term "aryl" means, unless otherwise stated, a polyunsaturated, aromatic, hydrocarbon substituent, which can be a single ring or multiple rings (preferably from 1 to 3 rings) that are fused together (i.e., a fused ring aryl) or linked covalently. A fused ring aryl refers to multiple rings fused together wherein at least one of the fused rings is an aryl ring. In embodiments, a fused ring aryl refers to multiple rings fused together wherein at least one of the fused rings is an aryl ring and wherein the multiple rings are attached to the parent molecular moiety through any carbon atom contained within an aryl ring of the multiple rings. The term "heteroaryl" refers to aryl groups (or rings) that contain at least one heteroatom such as N, O, or S, wherein the nitrogen and sulfur atoms are optionally oxidized, and the nitrogen atom(s) are optionally quaternized. Thus, the term "heteroaryl" includes fused ring heteroaryl groups (i.e., multiple rings fused together wherein at least one of the fused rings is a heteroaromatic ring). In embodiments, the term "heteroaryl" includes fused ring heteroaryl groups (i.e., multiple rings fused together wherein at least one of the fused rings is a heteroaromatic ring and wherein the multiple rings are attached to the parent molecular moiety through any atom contained within a heteroaromatic ring of the multiple rings). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, naphthyl, pyrrolyl, pyrazolyl, pyridazinyl, triazinyl, pyrimidinyl, imidazolyl, pyrazinyl, purinyl, oxazolyl, isoxazolyl, thiazolyl, furyl, thienyl, pyridyl, pyrimidyl, benzothiazolyl, benzoxazoyl benzimidazolyl, benzofuran, isobenzofuranyl, indolyl, isoindolyl, benzothiophenyl, isoquinolyl, quinoxalinyl, quinolyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent, mean a divalent radical derived from an aryl and heteroaryl, respectively. A heteroaryl group substituent may be —O— bonded to a ring heteroatom nitrogen.

Spirocyclic rings are two or more rings wherein adjacent rings are attached through a single atom. The individual rings within spirocyclic rings may be identical or different. Individual rings in spirocyclic rings may be substituted or unsubstituted and may have different substituents from other individual rings within a set of spirocyclic rings. Possible substituents for individual rings within spirocyclic rings are the possible substituents for the same ring when not part of spirocyclic rings (e.g., substituents for cycloalkyl or heterocycloalkyl rings). Spirocyclic rings may be substituted or unsubstituted cycloalkyl, substituted or unsubstituted cycloalkylene, substituted or unsubstituted heterocycloalkyl or substituted or unsubstituted heterocycloalkylene and individual rings within a spirocyclic ring group may be any of the immediately previous list, including having all rings of one type (e.g., all rings being substituted heterocycloalkylene wherein each ring may be the same or different substituted heterocycloalkylene). When referring to a spirocyclic ring system, heterocyclic spirocyclic rings means a spirocyclic rings wherein at least one ring is a heterocyclic ring and wherein each ring may be a different ring. When referring to a spirocyclic ring system, substituted spirocyclic rings means that at least one ring is substituted and each substituent may optionally be different.

The symbol "〰" denotes the point of attachment of a chemical moiety to the remainder of a molecule or chemical formula. The term "oxo," as used herein, means an oxygen that is double bonded to a carbon atom.

The term "alkylarylene" as an arylene moiety covalently bonded to an alkylene moiety (also referred to herein as an alkylene linker). In embodiments, the alkylarylene group has the formula:

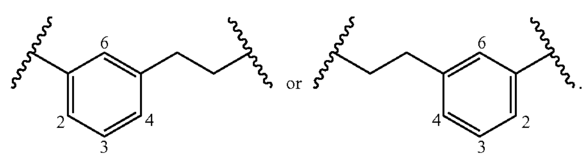 [SMILES: *CCc1cccc(*)c1 ; *CCc1cccc(*)c1]

An alkylarylene moiety may be substituted (e.g., with a substituent group) on the alkylene moiety or the arylene linker (e.g., at carbons 2, 3, 4, or 6) with halogen, oxo, $—N_3$, $—CF_3$, $—CCl_3$, $—CBr_3$, $—CI_3$, —CN, —CHO, —OH, $—NH_2$, —COOH, $—CONH_2$, $—NO_2$, —SH, $—SO_2CH_3$, $—SO_3H$, $—OSO_3H$, $—SO_2NH_2$, $—NHNH_2$, $—ONH_2$, $—NHC(O)NHNH_2$, substituted or unsubstituted $C_1$-$C_5$ alkyl or substituted or unsubstituted 2 to 5 membered heteroalkyl). In embodiments, the alkylarylene is unsubstituted.

Each of the above terms (e.g., "alkyl," "heteroalkyl," "cycloalkyl," "heterocycloalkyl," "aryl," and "heteroaryl") includes both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to, —OR', =O, =NR', =N—OR', —NR'R", —SR', halogen, —SiR'R"R"', —OC(O)R', —C(O)R', $—CO_2R'$, —CONR'R", —OC(O)NR'R", —NR"C(O)R', —NR'—C(O)NR"R"', $—NR"C(O)_2R'$, —NR—C(NR'R"R"')=NR"", —NR—C(NR'R")=NR"', —S(O)R', $—S(O)_2R'$, $—S(O)_2NR'R"$, $—NRSO_2R'$, —NR'NR"R"', —ONR'R", —NR'C(O)NR"NR"'R"", —CN, $—NO_2$, $—NR'SO_2R"$, —NR'C(O)R", —NR'C(O)—OR", —NR'OR", in a number ranging from zero to (2m'+1), where m' is the total number of carbon atoms in such radical. R, R', R", R"', and R"" each preferably independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted heteroaryl, substituted or unsubstituted alkyl, alkoxy, or thioalkoxy groups, or arylalkyl groups. When a compound described herein includes more than one R group, for example, each of the R groups is independently selected as are each R', R", R"', and R"" group when more than one of these groups is present. When R' and R" are attached to the same nitrogen atom, they can be combined with the nitrogen atom to form a 4-, 5-, 6-, or 7-membered ring. For example, —NR'R" includes, but is not limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —C(O)$CH_3$, —C(O)$CF_3$, —C(O)$CH_2OCH_3$, and the like).

Similar to the substituents described for the alkyl radical, substituents for the aryl and heteroaryl groups are varied and are selected from, for example: —OR', —NR'R", —SR', halogen, —SiR'R"R"', —OC(O)R', —C(O)R', —$CO_2$R', —CONR'R", —OC(O)NR'R", —NR"C(O)R', —NR'—C(O)NR"R"', —NR"C$(O)_2$R', —NR—C(NR'R"R"')═NR"", —NR—C(NR'R")═NR"', —S(O)R', —$S(O)_2$R', —$S(O)_2$NR'R", —$NRSO_2$R', —NR'NR"R"', —ONR'R", —NR'C(O)NR"NR"'R"", —CN, —$NO_2$, —R', —$N_3$, —CH$(Ph)_2$, fluoro($C_1$-$C_4$)alkoxy, and fluoro($C_1$-$C_4$)alkyl, —NR'$SO_2$R", —NR'C(O)R", —NR'C(O)—OR", —NR'OR", in a number ranging from zero to the total number of open valences on the aromatic ring system; and where R', R", R"', and R"" are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl. When a compound described herein includes more than one R group, for example, each of the R groups is independently selected as are each R', R", R"', and R"" groups when more than one of these groups is present.

Substituents for rings (e.g., cycloalkyl, heterocycloalkyl, aryl, heteroaryl, cycloalkylene, heterocycloalkylene, arylene, or heteroarylene) may be depicted as substituents on the ring rather than on a specific atom of a ring (commonly referred to as a floating substituent). In such a case, the substituent may be attached to any of the ring atoms (obeying the rules of chemical valency) and in the case of fused rings or spirocyclic rings, a substituent depicted as associated with one member of the fused rings or spirocyclic rings (a floating substituent on a single ring), may be a substituent on any of the fused rings or spirocyclic rings (a floating substituent on multiple rings). When a substituent is attached to a ring, but not a specific atom (a floating substituent), and a subscript for the substituent is an integer greater than one, the multiple substituents may be on the same atom, same ring, different atoms, different fused rings, different spirocyclic rings, and each substituent may optionally be different. Where a point of attachment of a ring to the remainder of a molecule is not limited to a single atom (a floating substituent), the attachment point may be any atom of the ring and in the case of a fused ring or spirocyclic ring, any atom of any of the fused rings or spirocyclic rings while obeying the rules of chemical valency. Where a ring, fused rings, or spirocyclic rings contain one or more ring heteroatoms and the ring, fused rings, or spirocyclic rings are shown with one more floating substituents (including, but not limited to, points of attachment to the remainder of the molecule), the floating substituents may be bonded to the heteroatoms. Where the ring heteroatoms are shown bound to one or more hydrogens (e.g., a ring nitrogen with two bonds to ring atoms and a third bond to a hydrogen) in the structure or formula with the floating substituent, when the heteroatom is bonded to the floating substituent, the substituent will be understood to replace the hydrogen, while obeying the rules of chemical valency.

Two or more substituents may optionally be joined to form aryl, heteroaryl, cycloalkyl, or heterocycloalkyl groups. Such so-called ring-forming substituents are typically, though not necessarily, found attached to a cyclic base structure. In one embodiment, the ring-forming substituents are attached to adjacent members of the base structure. For example, two ring-forming substituents attached to adjacent members of a cyclic base structure create a fused ring structure. In another embodiment, the ring-forming substituents are attached to a single member of the base structure. For example, two ring-forming substituents attached to a single member of a cyclic base structure create a spirocyclic structure. In yet another embodiment, the ring-forming substituents are attached to non-adjacent members of the base structure.

Two of the substituents on adjacent atoms of the aryl or heteroaryl ring may optionally form a ring of the formula -T-C(O)—$(CRR')_q$—U—, wherein T and U are independently —NR—, —O—, —CRR'—, or a single bond, and q is an integer from 0 to 3. Alternatively, two of the substituents on adjacent atoms of the aryl or heteroaryl ring may optionally be replaced with a substituent of the formula -A-$(CH_2)_r$—B—, wherein A and B are independently —CRR'—, —O—, —NR—, —S—, —S(O)—, —$S(O)_2$—, —$S(O)_2$NR'—, or a single bond, and r is an integer from 1 to 4. One of the single bonds of the new ring so formed may optionally be replaced with a double bond. Alternatively, two of the substituents on adjacent atoms of the aryl or heteroaryl ring may optionally be replaced with a substituent of the formula —$(CRR')_s$—X'— $(C"R"R"')_d$—, where s and d are independently integers from 0 to 3, and X' is —O—, —S—, —S(O)—, —$S(O)_2$—, or —$S(O)_2$NR'—. The substituents R, R', R", and R"' are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl.

As used herein, the terms "heteroatom" or "ring heteroatom" are meant to include oxygen (O), nitrogen (N), sulfur (S), phosphorus (P), and silicon (Si).

A "substituent group," as used herein, means a group selected from the following moieties:

(A) oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl), and (B) alkyl (e.g., $C_1$-$C_8$ alkyl, $C_1$-$C_6$ alkyl, or $C_1$-$C_4$ alkyl), heteroalkyl (e.g., 2 to 8 membered heteroalkyl, 2 to 6 membered heteroalkyl, or 2 to 4 membered heteroalkyl), cycloalkyl (e.g., $C_3$-$C_8$ cycloalkyl, $C_3$-$C_6$ cycloalkyl, or $C_5$-$C_6$ cycloalkyl), heterocycloalkyl (e.g., 3 to 8 membered heterocycloalkyl, 3 to 6 membered heterocycloalkyl, or 5 to 6 membered heterocycloalkyl), aryl (e.g., $C_6$-$C_{10}$ aryl, $C_{10}$ aryl, or phenyl), heteroaryl (e.g., 5 to 10 membered heteroaryl, 5 to 9 membered heteroaryl, or 5 to 6 membered heteroaryl), substituted with at least one substituent selected from:
   - (i) oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —$OCl_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl), and
   - (ii) alkyl (e.g., $C_1$-$C_8$ alkyl, $C_1$-$C_6$ alkyl, or $C_1$-$C_4$ alkyl), heteroalkyl (e.g., 2 to 8 membered heteroalkyl, 2 to 6 membered heteroalkyl, or 2 to 4 membered heteroalkyl), cycloalkyl (e.g., $C_3$-$C_8$ cycloalkyl, $C_3$-$C_6$ cycloalkyl, or $C_5$-$C_6$ cycloalkyl), heterocycloalkyl (e.g., 3 to 8 membered heterocycloalkyl, 3 to 6 membered heterocycloalkyl, or 5 to 6 membered heterocycloalkyl), aryl (e.g., $C_6$-$C_{10}$ aryl, $C_{10}$ aryl, or phenyl), heteroaryl (e.g., 5 to 10 membered heteroaryl, 5 to 9 membered heteroaryl, or 5 to 6 membered heteroaryl), substituted with at least one substituent selected from:
      - (a) oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —$OCl_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl), and
      - (b) alkyl (e.g., $C_1$-$C_8$ alkyl, $C_1$-$C_6$ alkyl, or $C_1$-$C_4$ alkyl), heteroalkyl (e.g., 2 to 8 membered heteroalkyl, 2 to 6 membered heteroalkyl, or 2 to 4 membered heteroalkyl), cycloalkyl (e.g., $C_3$-$C_8$ cycloalkyl, $C_3$-$C_6$ cycloalkyl, or $C_5$-$C_6$ cycloalkyl), heterocycloalkyl (e.g., 3 to 8 membered heterocycloalkyl, 3 to 6 membered heterocycloalkyl, or 5 to 6 membered heterocycloalkyl), aryl (e.g., $C_6$-$C_{10}$ aryl, $C_{10}$ aryl, or phenyl), heteroaryl (e.g., 5 to 10 membered heteroaryl, 5 to 9 membered heteroaryl, or 5 to 6 membered heteroaryl), substituted with at least one substituent selected from: oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —$OCl_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl).

A "size-limited substituent" or "size-limited substituent group," as used herein, means a group selected from all of the substituents described above for a "substituent group," wherein each substituted or unsubstituted alkyl is a substituted or unsubstituted $C_1$-$C_{20}$ alkyl, each substituted or unsubstituted heteroalkyl is a substituted or unsubstituted 2 to 20 membered heteroalkyl, each substituted or unsubstituted cycloalkyl is a substituted or unsubstituted $C_3$-$C_8$ cycloalkyl, each substituted or unsubstituted heterocycloalkyl is a substituted or unsubstituted 3 to 8 membered heterocycloalkyl, each substituted or unsubstituted aryl is a substituted or unsubstituted $C_6$-$C_{10}$ aryl, and each substituted or unsubstituted heteroaryl is a substituted or unsubstituted 5 to 10 membered heteroaryl.

A "lower substituent" or "lower substituent group," as used herein, means a group selected from all of the substituents described above for a "substituent group," wherein each substituted or unsubstituted alkyl is a substituted or unsubstituted $C_1$-$C_8$ alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted phenyl, and each substituted or unsubstituted heteroaryl is a substituted or unsubstituted 5 to 6 membered heteroaryl.

In some embodiments, each substituted group described in the compounds herein is substituted with at least one substituent group. More specifically, in some embodiments, each substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene described in the compounds herein are substituted with at least one substituent group. In other embodiments, at least one or all of these groups are substituted with at least one size-limited substituent group. In other embodiments, at least one or all of these groups are substituted with at least one lower substituent group.

In other embodiments of the compounds herein, each substituted or unsubstituted alkyl may be a substituted or unsubstituted $C_1$-$C_{20}$ alkyl, each substituted or unsubstituted heteroalkyl is a substituted or unsubstituted 2 to 20 membered heteroalkyl, each substituted or unsubstituted cycloalkyl is a substituted or unsubstituted $C_3$-$C_8$ cycloalkyl, each substituted or unsubstituted heterocycloalkyl is a substituted or unsubstituted 3 to 8 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 10 membered heteroaryl. In some embodiments of the compounds herein, each substituted or unsubstituted alkylene is a substituted or unsubstituted $C_1$-$C_{20}$ alkylene, each substituted or unsubstituted heteroalkylene is a substituted or unsubstituted 2 to 20 membered heteroalkylene, each substituted or unsubstituted cycloalkylene is a substituted or unsubstituted $C_3$-$C_8$ cycloalkylene, each substituted or unsubstituted heterocycloalkylene is a substituted or unsubstituted 3 to 8 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 10 membered heteroarylene.

In some embodiments, each substituted or unsubstituted alkyl is a substituted or unsubstituted $C_1$-$C_8$ alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted phenyl, and/or each substituted or unsubstituted heteroaryl is a substituted or unsubstituted 5 to 6 membered heteroaryl. In some embodiments, each substituted or unsubstituted alkylene is a substituted or unsubstituted $C_1$-$C_8$ alkylene, each substituted or unsubstituted heteroalkylene is a substituted or unsubstituted 2 to 8 membered heteroalkylene, each substituted or unsubstituted cycloalkylene is a substituted or unsubstituted $C_3$-$C_7$ cycloalkylene, each substituted or unsubstituted heterocycloalkylene is a substituted or unsubstituted 3 to 7 membered heterocycloalkylene, each substituted or unsubstituted arylene is a substituted or unsubstituted phenylene, and/or each substituted or unsubstituted heteroarylene is a substituted or unsubstituted 5 to 6 membered heteroarylene. In some embodiments, the compound (e.g., nucleotide analogue) is a chemical species set forth in the Examples section, claims, embodiments, figures, or tables below.

In embodiments, a substituted or unsubstituted moiety (e.g., substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted alkylene, substituted or unsubstituted heteroalkylene, substituted or unsubstituted cycloalkylene, substituted or unsubstituted heterocycloalkylene, substituted or unsubstituted arylene, and/or substituted or unsubstituted heteroarylene) is unsubstituted (e.g., is an unsubstituted alkyl, unsubstituted heteroalkyl, unsubstituted cycloalkyl, unsubstituted heterocycloalkyl, unsubstituted aryl, unsubstituted heteroaryl, unsubstituted alkylene, unsubstituted heteroalkylene, unsubstituted cycloalkylene, unsubstituted heterocycloalkylene, unsubstituted arylene, and/or unsubstituted heteroarylene, respectively). In embodiments, a substituted or unsubstituted moiety (e.g., substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted alkylene, substituted or unsubstituted heteroalkylene, substituted or unsubstituted cycloalkylene, substituted or unsubstituted heterocycloalkylene, substituted or unsubstituted arylene, and/or substituted or unsubstituted heteroarylene) is substituted (e.g., is a substituted alkyl, substituted heteroalkyl, substituted cycloalkyl, substituted heterocycloalkyl, substituted aryl, substituted heteroaryl, substituted alkyl ene, substituted heteroalkylene, substituted cycloalkylene, substituted heterocycloalkylene, substituted arylene, and/or substituted heteroarylene, respectively).

In embodiments, a substituted moiety (e.g., substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene) is substituted with at least one substituent group, wherein if the substituted moiety is substituted with a plurality of substituent groups, each substituent group may optionally be different. In embodiments, if the substituted moiety is substituted with a plurality of substituent groups, each substituent group is different.

In embodiments, a substituted moiety (e.g., substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene) is substituted with at least one size-limited substituent group, wherein if the substituted moiety is substituted with a plurality of size-limited substituent groups, each size-limited substituent group may optionally be different. In embodiments, if the substituted moiety is substituted with a plurality of size-limited substituent groups, each size-limited substituent group is different.

In embodiments, a substituted moiety (e.g., substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene) is substituted with at least one lower substituent group, wherein if the substituted moiety is substituted with a plurality of lower substituent groups, each lower substituent group may optionally be different. In embodiments, if the substituted moiety is substituted with a plurality of lower substituent groups, each lower substituent group is different.

In embodiments, a substituted moiety (e.g., substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene) is substituted with at least one substituent group, size-limited substituent group, or lower substituent group; wherein if the substituted moiety is substituted with a plurality of groups selected from substituent groups, size-limited substituent groups, and lower substituent groups; each substituent group, size-limited substituent group, and/or lower substituent group may optionally be different. In embodiments, if the substituted moiety is substituted with a plurality of groups selected from substituent groups, size-limited substituent groups, and lower substituent groups; each substituent group, size-limited substituent group, and/or lower substituent group is different.

Certain compounds of the present disclosure possess asymmetric carbon atoms (optical or chiral centers) or double bonds; the enantiomers, racemates, diastereomers, tautomers, geometric isomers, stereoisomeric forms that may be defined, in terms of absolute stereochemistry, as (R)- or (S)- or, as (D)- or (L)- for amino acids, and individual isomers are encompassed within the scope of the present disclosure. The compounds of the present disclosure do not include those that are known in art to be too unstable to synthesize and/or isolate. The present disclosure is meant to include compounds in racemic and optically pure forms. Optically active (R)- and (S)-, or (D)- and (L)-isomers may be prepared using chiral synthons or chiral reagents, or resolved using conventional techniques. When the compounds described herein contain olefinic bonds or other centers of geometric asymmetry, and unless specified otherwise, it is intended that the compounds include both E and Z geometric isomers.

As used herein, the term "isomers" refers to compounds having the same number and kind of atoms, and hence the same molecular weight, but differing in respect to the structural arrangement or configuration of the atoms.

The term "tautomer," as used herein, refers to one of two or more structural isomers which exist in equilibrium and which are readily converted from one isomeric form to another.

It will be apparent to one skilled in the art that certain compounds of this disclosure may exist in tautomeric forms, all such tautomeric forms of the compounds being within the scope of the disclosure.

Unless otherwise stated, structures depicted herein are also meant to include all stereochemical forms of the structure; i.e., the R and S configurations for each asymmetric center. Therefore, single stereochemical isomers as well as enantiomeric and diastereomeric mixtures of the present compounds are within the scope of the disclosure.

Unless otherwise stated, structures depicted herein are also meant to include compounds which differ only in the presence of one or more isotopically enriched atoms. For example, compounds having the present structures except for the replacement of a hydrogen by a deuterium or tritium, or the replacement of a carbon by $^{13}C$- or $^{14}C$-enriched carbon are within the scope of this disclosure.

The compounds of the present disclosure may also contain unnatural proportions of atomic isotopes at one or more of the atoms that constitute such compounds. For example, the compounds may be radiolabeled with radioactive isotopes, such as for example tritium ($^{3}H$), iodine-125 ($^{125}I$) or carbon-14 ($^{14}C$). All isotopic variations of the compounds of the present disclosure, whether radioactive or not, are encompassed within the scope of the present disclosure.

It should be noted that throughout the application that alternatives are written in Markush groups, for example, each amino acid position that contains more than one possible amino acid. It is specifically contemplated that each member of the Markush group should be considered separately, thereby comprising another embodiment, and the Markush group is not to be read as a single unit.

"Analog," "analogue" or "derivative" is used in accordance with its plain ordinary meaning within Chemistry and Biology and refers to a chemical compound that is structurally similar to another compound (i.e., a so-called "reference" compound) but differs in composition, e.g., in the replacement of one atom by an atom of a different element, or in the presence of a particular functional group, or the replacement of one functional group by another functional group, or the absolute stereochemistry of one or more chiral centers of the reference compound. Accordingly, an analog is a compound that is similar or comparable in function and appearance but not in structure or origin to a reference compound.

The terms "a" or "an," as used in herein means one or more. In addition, the phrase "substituted with a[n]," as used herein, means the specified group may be substituted with one or more of any or all of the named substituents. For example, where a group, such as an alkyl or heteroaryl group, is "substituted with an unsubstituted $C_1$-$C_{20}$ alkyl, or unsubstituted 2 to 20 membered heteroalkyl," the group may contain one or more unsubstituted $C_1$-$C_{20}$ alkyls, and/or one or more unsubstituted 2 to 20 membered heteroalkyls.

Moreover, where a moiety is substituted with an R substituent, the group may be referred to as "R-substituted." Where a moiety is R-substituted, the moiety is substituted with at least one R substituent and each R substituent is optionally different. Where a particular R group is present in the description of a chemical genus (such as Formula (I)), a Roman alphabetic symbol may be used to distinguish each appearance of that particular R group. For example, where multiple $R^{13}$ substituents are present, each $R^{13}$ substituent may be distinguished as $R^{13A}$, $R^{13B}$, $R^{13C}$, $R^{13D}$, etc., wherein each of $R^{13A}$, $R^{13B}$, $R^{13C}$, $R^{13D}$, etc. is defined within the scope of the definition of $R^{13}$ and optionally differently.

A "detectable agent," "detectable compound," "detectable label," or "detectable moiety" is a substance (e.g., element), molecule, or composition detectable by spectroscopic, photochemical, biochemical, immunochemical, chemical, magnetic resonance imaging, or other physical means. For example, detectable agents include $^{18}F$, $^{32}P$, $^{33}P$, $^{45}Ti$, $^{47}Se$, $^{52}Fe$, $^{59}Fe$, $^{62}Cu$, $^{64}Cu$, $^{67}Cu$, $^{67}Ga$, $^{68}Ga$, $^{77}As$, $^{86}Y$, $^{90}Y$, $^{89}Sr$, $^{89}Zr$, $^{94}Tc$, $^{94}Tc$, $^{99m}Tc$, $^{99}Mo$, $^{105}Pd$, $^{105}Rb$, $^{111}Ag$, $^{111}In$, $^{123}I$, $^{124}I$, $^{125}I$, $^{131}I$, $^{142}Pr$, $^{143}Pr$, $^{149}Pm$, $^{153}Sm$, $^{154\text{-}1581}Gd$, $^{161}Tb$, $^{166}Dy$, $^{166}Ho$, $^{169}Er$, $^{175}Lu$, $^{177}Lu$, $^{186}Re$, $^{188}Re$, $^{189}Re$, $^{194}Ir$, $^{198}Au$, $^{199}Au$, $^{211}At$, $^{211}Pb$, $^{212}Bi$, $^{212}Pb$, $^{213}Bi$, $^{223}Ra$, $^{225}Ac$, Cr, V, Mn, Fe, Co, Ni, Cu, La, Ce, Pr, Nd, Pm, Sm, Eu, Gd, Tb, Dy, Ho, Er, Tm, Yb, Lu, $^{32}P$, fluorophore (e.g., fluorescent dyes), modified oligonucleotides (e.g., moieties described in PCT/US2015/022063, which is incorporated herein by reference), electron-dense reagents, enzymes (e.g., as commonly used in an ELISA), biotin, digoxigenin, paramagnetic molecules, paramagnetic nanoparticles, ultrasmall superparamagnetic iron oxide ("USPIO") nanoparticles, USPIO nanoparticle aggregates, superparamagnetic iron oxide ("SPIO") nanoparticles, SPIO nanoparticle aggregates, monochrystalline iron oxide nanoparticles, monochrystalline iron oxide, nanoparticle contrast agents, liposomes or other delivery vehicles containing Gadolinium chelate ("Gd-chelate") molecules, Gadolinium, radioisotopes, radionuclides (e.g., carbon-11, nitrogen-13, oxygen-15, fluorine-18, rubidium-82), fluorodeoxyglucose (e.g., fluorine-18 labeled), any gamma ray emitting radionuclides, positron-emitting radionuclide, radiolabeled glucose, radiolabeled water, radiolabeled ammonia, biocolloids, microbubbles (e.g., including microbubble shells including albumin, galactose, lipid, and/or polymers; microbubble gas core including air, heavy gas(es), perfluorcarbon, nitrogen, octafluoropropane, perflexane lipid microsphere, perflutren, etc.), iodinated contrast agents (e.g., iohexol, iodixanol, ioversol, iopamidol, ioxilan, iopromide, diatrizoate, metrizoate, ioxaglate), barium sulfate, thorium dioxide, gold, gold nanoparticles, gold nanoparticle aggregates, fluorophores, two-photon fluorophores, or haptens and proteins or other entities which can be made detectable, e.g., by incorporating a radiolabel into a peptide or antibody specifically reactive with a target peptide. In embodiments, a detectable moiety is a moiety (e.g., monovalent form) of a detectable agent.

The terms "fluorophore" or "fluorescent agent" or "fluorescent dye" are used interchangeably and refer to a substance, compound, agent (e.g., a detectable agent), or composition (e.g., compound) that can absorb light at one or more wavelenghs and re-emit light at one or more longer wavelengths, relative to the one or more wavelengths of absorbed light. Examples of fluorophores that may be included in the compounds and compositions described herein include fluorescent proteins, xanthene derivatives (e.g., fluorescein, rhodamine, Oregon green, eosin, or Texas red), cyanine and derivatives (e.g., cyanine, indocarbocyanine, oxacarbocyanine, thiacarbocyanine, or merocyanine), napththalene derivatives (e.g., dansyl or prodan derivatives), coumarin and derivatives, oxadiazole derivatives (e.g., pyridyloxazole, nitrobenzoxadiazole or benzoxadiazole), anthracene derivatives (e.g., anthraquinones, DRAQ5, DRAQ7, or CyTRAK Orange), pyrene derivatives (e.g., cascade blue and derivatives), oxazine derivatives (e.g., Nile red, Nile blue, cresyl violet, or oxazine 170), acridine derivatives (e.g., proflavin, acridine orange, acridine yellow), arylmethine derivatives (e.g., auramine, crystal violet, or malachite green), tetrapyrrole derivatives (e.g., porphin, phthalocyanine, bilirubin), CF Dye™ DRAQ™ CyTRAK™, BODIPY™, Alexa Fluor™, DyLight Fluor™, Atto™, Tracy™, FluoProbes™, Abberior Dyes™ DY™ dyes, MegaStokes Dyes™, Sulfo Cy™, Seta™ dyes, SeTau™ dyes, Square Dyes™, Quasar™ dyes, Cal Fluor™ dyes, SureLight Dyes™, PerCP™ Phycobilisomes™ APC™ APCXL™ RPE™ and/or BPE™. A fluorescent moiety is a radical of a fluorescent agent. The emission from the fluorophores can be detected by any number of methods, including but not limited to, fluorescence spectroscopy, fluorescence microscopy, fluorimeters, fluorescent plate readers, infrared scanner analysis, laser scanning confocal microscopy, automated confocal nanoscanning, laser spectrophotometers, fluorescent-activated cell sorters (FACS), image-based analyzers and fluorescent scanners (e.g., gel/membrane scanners). In embodiments, the fluorophore is an aromatic (e.g., polyaromatic) moiety having a conjugated π-electron system. In embodiments, the fluorophore is a fluorescent dye moiety, that is, a monovalent fluorophore.

Radioactive substances (e.g., radioisotopes) that may be used as imaging and/or labeling agents in accordance with the embodiments of the disclosure include, but are not limited to, $^{18}F$, $^{32}P$, $^{33}P$, $^{45}Ti$, $^{47}Sc$, $^{52}Fe$, $^{59}Fe$, $^{62}Cu$, $^{64}Cu$, $^{67}Cu$, $^{67}Ga$, $^{68}Ga$, $^{77}As$, $^{86}Y$, $^{90}Y$, $^{89}Sr$, $^{89}Zr$, $^{94}Tc$, $^{94}Tc$, $^{99m}Tc$, $^{99}Mo$, $^{105}Pd$, $^{105}Rh$, $^{111}Ag$, $^{111}In$, $^{123}I$, $^{124}I$, $^{125}I$, $^{131}I$, $^{142}Pr$, $^{143}Pr$, $^{149}Pm$, $^{153}Sm$, $^{154-1581}Gd$, $^{161}Tb$, $^{166}Dy$, $^{166}Ho$, $^{169}Er$, $^{175}Lu$, $^{177}Lu$, $^{186}Re$, $^{188}Re$, $^{189}Re$, $^{194}Ir$, $^{198}Au$, $^{199}Au$, $^{211}At$, $^{211}Pb$, $^{212}Bi$, $^{212}Pb$, $^{213}Bi$, $^{223}Ra$ and $^{225}Ac$. Paramagnetic ions that may be used as additional imaging agents in accordance with the embodiments of the disclosure include, but are not limited to, ions of transition and lanthanide metals (e.g., metals having atomic numbers of 21-29, 42, 43, 44, or 57-71). These metals include ions of Cr, V, Mn, Fe, Co, Ni, Cu, La, Ce, Pr, Nd, Pm, Sm, Eu, Gd, Tb, Dy, Ho, Er, Tm, Yb and Lu.

Examples of detectable agents include imaging agents, including fluorescent and luminescent substances, molecules, or compositions, including, but not limited to, a variety of organic or inorganic small molecules commonly referred to as "dyes," "labels," or "indicators." Examples include fluorescein, rhodamine, acridine dyes, Alexa dyes, and cyanine dyes. In embodiments, the detectable moiety is a fluorescent molecule (e.g., acridine dye, cyanine, dye, fluorine dye, oxazine dye, phenanthridine dye, or rhodamine dye). In embodiments, the detectable moiety is a fluorescent molecule (e.g., acridine dye, cyanine, dye, fluorine dye, oxazine dye, phenanthridine dye, or rhodamine dye). In embodiments, the detectable moiety is a fluorescent moiety or fluorescent dye moiety. In embodiments, the detectable moiety is a fluorescein isothiocyanate moiety, tetramethylrhodamine-5-(and 6)-isothiocyanate moiety, Cy2 moiety, Cy3 moiety, Cy5 moiety, Cy7 moiety, 4',6-diamidino-2-phenylindole moiety, Hoechst 33258 moiety, Hoechst 33342 moiety, Hoechst 34580 moiety, propidium-iodide moiety, or acridine orange moiety. In embodiments, the detectable moiety is a Indo-1, Ca saturated moiety, Indo-1 Ca2+ moiety, Cascade Blue BSA pH 7.0 moiety, Cascade Blue moiety, LysoTracker Blue moiety, Alexa 405 moiety, LysoSensor Blue pH 5.0 moiety, LysoSensor Blue moiety, DyLight 405 moiety, DyLight 350 moiety, BFP (Blue Fluorescent Protein) moiety, Alexa 350 moiety, 7-Amino-4-methylcoumarin pH 7.0 moiety, Amino Coumarin moiety, AMCA conjugate moiety, Coumarin moiety, 7-Hydroxy-4-methylcoumarin moiety, 7-Hydroxy-4-methylcoumarin pH 9.0 moiety, 6,8-Difluoro-7-hydroxy-4-methylcoumarin pH 9.0 moiety, Hoechst 33342 moiety, Pacific Blue moiety, Hoechst 33258 moiety, Hoechst 33258-DNA moiety, Pacific Blue antibody conjugate pH 8.0 moiety, PO-PRO-1 moiety, PO-PRO-1-DNA moiety, POPO-1 moiety, POPO-1-DNA moiety, DAPI-DNA moiety, DAPI moiety, Marina Blue moiety, SYTOX Blue-DNA moiety, CFP (Cyan Fluorescent Protein) moiety, eCFP (Enhanced Cyan Fluorescent Protein) moiety, 1-Anilinonaphthalene-8-sulfonic acid (1,8-ANS) moiety, Indo-1, Ca free moiety, 1,8-ANS (1-Anilinonaphthalene-8-sulfonic acid) moiety, BO-PRO-1-DNA moiety, BOPRO-1 moiety, BOBO-1-DNA moiety, SYTO 45-DNA moiety, evoglow-Pp1 moiety, evoglow-Bs1 moiety, evoglow-Bs2 moiety, Auramine 0 moiety, DiO moiety, LysoSensor Green pH 5.0 moiety, Cy 2 moiety, LysoSensor Green moiety, Fura-2, high Ca moiety, Fura-2 Ca2+sup> moiety, SYTO 13-DNA moiety, YO-PRO-1-DNA moiety, YOYO-1-DNA moiety, eGFP (Enhanced Green Fluorescent Protein) moiety, LysoTracker Green moiety, GFP (S65T) moiety, BODIPY FL, MeOH moiety, Sapphire moiety, BODIPY FL conjugate moiety, MitoTracker Green moiety, MitoTracker Green FM, MeOH moiety, Fluorescein 0.1 M NaOH moiety, Calcein pH 9.0 moiety, Fluorescein pH 9.0 moiety, Calcein moiety, Fura-2, no Ca moiety, Fluo-4 moiety, FDA moiety, DTAF moiety, Fluorescein moiety, CFDA moiety, FITC moiety, Alexa Fluor 488 hydrazide-water moiety, DyLight 488 moiety, 5-FAM pH 9.0 moiety, Alexa 488 moiety, Rhodamine 110 moiety, Rhodamine 110 pH 7.0 moiety, Acridine Orange moiety, BCECF pH 5.5 moiety, PicoGreendsDNA quantitation reagent moiety, SYBR Green I moiety, Rhodaminen Green pH 7.0 moiety, CyQUANT GR-DNA moiety, NeuroTrace 500/525, green fluorescent Nissl stain-RNA moiety, DansylCadaverine moiety, Fluoro-Emerald moiety, Nissl moiety, Fluorescein dextran pH 8.0 moiety, Rhodamine Green moiety, 5-(and 6)-Carboxy-2',7'-dichlorofluorescein pH 9.0 moiety, DansylCadaverine, MeOH moiety, eYFP (Enhanced Yellow Fluorescent Protein) moiety, Oregon Green 488 moiety, Fluo-3 moiety, BCECF pH 9.0 moiety, SBFI-Na+ moiety, Fluo-3 Ca2+ moiety, Rhodamine 123 MeOH moiety, FlAsH moiety, Calcium Green-1 Ca2+ moiety, Magnesium Green moiety, DM-NERF pH 4.0 moiety, Calcium Green moiety, Citrine moiety, LysoSensor Yellow pH 9.0 moiety, TO-PRO-1-DNA moiety, Magnesium Green Mg2+ moiety, Sodium Green Na+ moiety, TOTO-1-DNA moiety, Oregon Green 514 moiety, Oregon Green 514 antibody conjugate pH 8.0 moiety, NBD-X moiety, DM-NERF pH 7.0 moiety, NBD-X, MeOH moiety, CI-NERF pH 6.0 moiety, Alexa 430 moiety, CI-NERF pH 2.5 moiety, Lucifer Yellow, CH moiety, LysoSensor Yellow pH 3.0 moiety, 6-TET, SE pH 9.0 moiety, Eosin antibody conjugate pH 8.0 moiety, Eosin moiety, 6-Carboxyrhodamine 6G pH 7.0 moiety, 6-Carboxyrhodamine 6G, hydrochloride moiety, Bodipy R6G SE moiety, BODIPY R6G MeOH moiety, 6 JOE moiety, Cascade Yellow moiety, mBanana moiety, Alexa 532 moiety, Erythrosin-5-isothiocyanate pH 9.0 moiety, 6-HEX, SE pH 9.0 moiety, mOrange moiety, mHoneydew moiety, Cy 3 moiety, Rhodamine B moiety, DiI moiety, 5-TAMRA-MeOH moiety, Alexa 555 moiety, DyLight 549 moiety, BODIPY TMR-X, SE moiety, BODIPY TMR-X MeOH moiety, PO-PRO-3-DNA moiety, PO-PRO-3 moiety, Rhodamine moiety, POPO-3 moiety, Alexa 546 moiety, Calcium Orange Ca2+ moiety, TRITC moiety, Calcium Orange moiety, Rhodaminephalloidin pH 7.0 moiety, MitoTracker Orange moiety, MitoTracker Orange MeOH moiety, Phycoerythrin moiety, Magnesium Orange moiety, R-Phycoerythrin pH 7.5 moiety, 5-TAMRA pH 7.0 moiety, 5-TAMRA moiety, Rhod-2 moiety, FM 1-43 moiety, Rhod-2 Ca2+ moiety, FM 1-43 lipid moiety, LOLO-1-DNA moiety, dTomato moiety, DsRed moiety, Dapoxyl (2-aminoethyl) sulfonamide moiety, Tetramethylrhodamine dextran pH 7.0 moiety, Fluor-Ruby moiety, Resorufin moiety, Resorufin pH 9.0 moiety, mTangerine moiety, LysoTracker Red moiety, Lissaminerhodamine moiety, Cy 3.5 moiety, Rhodamine Red-X antibody conjugate pH 8.0 moiety, Sulforhodamine 101 EtOH moiety, JC-1 pH 8.2 moiety, JC-1 moiety, mStrawberry moiety, MitoTracker Red moiety, MitoTracker Red, MeOH moiety, X-Rhod-1 Ca2+ moiety, Alexa 568 moiety, 5-ROX pH 7.0 moiety, 5-ROX (5-Carboxy-X-rhodamine, triethylammonium salt) moiety, BO-PRO-3-DNA moiety, BOPRO-3 moiety, BOBO-3-DNA moiety, Ethidium Bromide moiety, ReAsH moiety, Calcium Crimson moiety, Calcium Crimson Ca2+ moiety, mRFP moiety, mCherry moiety, HcRed moiety, DyLight 594 moiety, Ethidium homodimer-1-DNA moiety, Ethidiumhomodimer moiety, Propidium Iodide moiety, SYPRO Ruby moiety, Propidium Iodide-DNA moiety, Alexa 594 moiety, BODIPY TR-X, SE moiety, BODIPY TR-X, MeOH moiety, BODIPY TR-X phallacidin pH 7.0 moiety, Alexa Fluor 610 R-phycoerythrin streptavidin pH 7.2 moiety, YO-PRO-3-DNA moiety, Di-8 ANEPPS moiety, Di-8-ANEPPS-lipid moiety, YOYO-3-DNA moiety, Nile Red-lipid moiety, Nile Red moiety, DyLight 633 moiety, mPlum moiety, TO-PRO-3-DNA moiety, DDAO pH 9.0 moiety, Fura Red high Ca moiety, Allophycocyanin pH 7.5 moiety, APC (allophycocyanin) moiety, Nile Blue, EtOH moiety, TOTO-3-DNA moiety, Cy 5 moiety, BODIPY 650/665-X, MeOH moiety, Alexa Fluor 647 R-phycoerythrin streptavidin pH 7.2 moiety, DyLight 649 moiety, Alexa 647 moiety, Fura Red Ca2+ moiety, Atto 647 moiety, Fura Red, low Ca moiety, Carboxynaphthofluorescein pH 10.0 moiety, Alexa 660 moiety, Cy 5.5 moiety, Alexa 680 moiety, DyLight 680 moiety, Alexa 700 moiety, FM 4-64, 2% CHAPS moiety, or FM 4-64 moiety. In embodiments, the dectable moiety is a moiety of 1,1-Diethyl-4,4-carbocyanine iodide, 1,2-Diphenyl acetylene, 1,4-Diphenylbutadiene, 1,4-Diphenylbutadiyne, 1,6-Diphenylhexatriene, 1,6-Diphenylhexatriene, 1-anilinonaphthalene-8-sulfonic acid, 2,7-Dichlorofluorescein, 2,5-DIPHENYLOXAZOLE, 2-Di-1-ASP, 2-dodecylresorufin, 2-Methylbenzoxazole, 3,3-Diethylthiadicarbocyanine iodide, 4-Dimethyl amino-4-Nitrostilbene, 5(6)-Carboxyfluorescein, 5(6)-Carboxynaphtofluorescein, 5(6)-Carboxytetramethylrhodamine B, 5-(and 6)-carboxy-2',7'-dichlorofluorescein, 5-(and 6)-carboxy-2,7-dichlorofluorescein, 5-(N-hexadecanoyl)aminoeosin, 5-(N-hexadecanoyl)aminoeosin, 5-chloromethylfluorescein, 5-FAM, 5-ROX, 5-TAMRA, 5-TAMRA, 6,8-difluoro-7-hydroxy-4-methylcoumarin, 6,8-difluoro-7-hydroxy-4-methylcoumarin, 6-carboxyrhodamine 6G, 6-HEX, 6-JOE, 6-JOE, 6-TET, 7-aminoactinomycin D, 7-Benzylamino-4-Nitrobenz-2-Oxa-1,3-Diazole, 7-Methoxycoumarin-4-Acetic Acid, 8-Benzyloxy-5,7-diphenylquinoline, 8-Benzyloxy-5,7-diphenylquinoline, 9,10-Bis(Phenylethynyl) Anthracene, 9,10-Diphenylanthracene, 9-METHYLCARBAZOLE, (CS)2Ir($\mu$-Cl)$_2$Ir(CS)2, AAA, Acridine Orange, Acridine Orange, Acridine Yellow, Acridine Yellow, Adams Apple Red 680, Adirondack Green 520, Alexa Fluor 350, Alexa Fluor 405, Alexa Fluor 430, Alexa Fluor 430, Alexa Fluor 480, Alexa Fluor 488, Alexa Fluor 488, Alexa Fluor 488 hydrazide, Alexa Fluor 500, Alexa Fluor 514, Alexa Fluor 532, Alexa Fluor 546, Alexa Fluor 546, Alexa Fluor 555, Alexa Fluor 555, Alexa Fluor 568, Alexa Fluor 594, Alexa Fluor 594, Alexa Fluor 594, Alexa Fluor 610, Alexa Fluor 610-R-PE, Alexa Fluor 633, Alexa Fluor 635, Alexa Fluor 647, Alexa Fluor 647, Alexa Fluor 647-R-PE, Alexa Fluor 660, Alexa Fluor 680, Alexa Fluor 680-APC, Alexa Fluor 680-R-PE, Alexa Fluor 700, Alexa Fluor 750, Alexa Fluor 790, Allophycocyanin, AmCyan1, Aminomethylcoumarin, Amplex Gold (product), Amplex Red Reagent, Amplex UltraRed, Anthracene, APC, APC-Seta-750, AsRed2, ATTO 390, ATTO 425, ATTO 430LS, ATTO 465, ATTO 488, ATTO 490LS, ATTO 495, ATTO 514, ATTO 520, ATTO 532, ATTO 550, ATTO 565, ATTO 590, ATTO 594, ATTO 610, ATTO 620, ATTO 633, ATTO 635, ATTO 647, ATTO 647N, ATTO 655, ATTO 665, ATTO 680, ATTO 700, ATTO 725, ATTO 740, ATTO Oxa12, ATTO Rho3B, ATTO Rho6G, ATTO Rho11, ATTO Rho12, ATTO Rho13, ATTO Rho14, ATTO Rho101, ATTO Thio12, Auramine O, Azami Green, Azami Green monomeric, B-phycoerythrin, BCECF, BCECF, Bex1, Biphenyl, Birch Yellow 580, Blue-green algae, BO-PRO-1, BO-PRO-3, BOBO-1, BOBO-3, BODIPY 630 650-X, BODIPY 650/665-X, BODIPY FL, BODIPY FL, BODIPY R6G, BODIPY TMR-X, BODIPY TR-X, BODIPY TR-X Ph 7.0, BODIPY TR-X phallacidin, BODIPY-DiMe, BODIPY-Phenyl, BODIPY-TMSCC, C3-Indocyanine, C3-Indocyanine, C3-Oxacyanine, C3-Thiacyanine Dye (EtOH), C3-Thiacyanine Dye (PrOH), C5-Indocyanine, C5-Oxacyanine, C5-Thiacyanine, C7-Indocyanine, C7-Oxacyanine, C545T, C-Phycocyanin, Calcein, Calcein red-orange, Calcium Crimson, Calcium Green-1, Calcium Orange, Calcofluor white 2MR, Carboxy SNARF-1 pH 6.0, Carboxy SNARF-1 pH 9.0, Carboxynaphthofluorescein, Cascade Blue, Cascade Yellow, Catskill Green 540, CBQCA, CellMask Orange, CellTrace BODIPY TR methyl ester, CellTrace calcein violet, CellTrace™ Far Red, CellTracker Blue, CellTracker Red CMTPX, CellTracker Violet BMQC, CF405M, CF405S, CF488A, CF543, CF555, CFP, CFSE, CF™ 350, CF™ 485, Chlorophyll A, Chlorophyll B, Chromeo 488, Chromeo 494, Chromeo 505, Chromeo 546, Chromeo 642, Citrine, Citrine, ClOH butoxy aza-BODIPY, ClOH C12 aza-BODIPY, CM-H2DCFDA, Coumarin 1, Coumarin 6, Coumarin 6, Coumarin 30, Coumarin 314, Coumarin 334, Coumarin 343, Coumarine 545T, Cresyl Violet Perchlorate, CryptoLight CF1, CryptoLight CF2, CryptoLight CF3, CryptoLight CF4, CryptoLight CF5, CryptoLight CF6, Crystal Violet, Cumarin153, Cy2, Cy3, Cy3, Cy3.5, Cy3B, Cy3B, Cy3Cy5 ET, Cy5, Cy5, Cy5.5, Cy7, Cyanine3 NHS ester, Cyanine5 carboxylic acid, Cyanine5 NHS ester, Cyclotella meneghiniana Kützing, CypHer5, CypHer5 pH 9.15, CyQUANT GR, CyTrak Orange, Dabcyl SE, DAF-FM, DAMC (Weiss), dansyl cadaverine, Dansyl Glycine (Dioxane), DAPI, DAPI, DAPI, DAPI, DAPI (DMSO), DAPI (H2O), Dapoxyl (2-aminoethyl)sulfonamide, DCI, DCM, DCM, DCM (acetonitrile), DCM (MeOH), DDAO, Deep Purple, di-8-ANEPPS, DiA, Dichlorotris(1,10-phenanthroline) ruthenium(II), DiClOH C12 aza-BODIPY, DiClOHbutoxy aza-BODIPY, DiD, DiI, DiIC18(3), DiO, DiR, Diversa Cyan-FP, Diversa Green-FP, DM-NERF pH 4.0, DOCI, Doxorubicin, DPP pH-Probe 590-7.5, DPP pH-Probe 590-9.0, DPP pH-Probe 590-11.0, DPP pH-Probe 590-11.0, Dragon Green, DRAQ5, DsRed, DsRed, DsRed, DsRed-Express, DsRed-Express2, DsRed-Express T1, dTomato, DY-350XL, DY-480, DY-480XL MegaStokes, DY-485, DY-485XL MegaStokes, DY-490, DY-490XL MegaStokes, DY-500, DY-500XL MegaStokes, DY-520, DY-520XL MegaStokes, DY-547, DY-549P1, DY-549P1, DY-554, DY-555, DY-557, DY-557, DY-590, DY-590, DY-615, DY-630, DY-631, DY-633, DY-635, DY-636, DY-647, DY-649P1, DY-649P1, DY-650, DY-651, DY-656, DY-673, DY-675, DY-676, DY-680, DY-681, DY-700, DY-701, DY-730, DY-731, DY-750, DY-751, DY-776, DY-782, Dye-28, Dye-33, Dye-45, Dye-304, Dye-1041, DyLight 488, DyLight 549, DyLight 594, DyLight 633, DyLight 649, DyLight 680, E2-Crimson, E2-Orange, E2-Red/Green, EBFP, ECF, ECFP, ECL Plus, eGFP, ELF 97, Emerald, Envy Green, Eosin, Eosin Y, epicocconone, EqFP611, Erythrosin-5-isothiocyanate, Ethidium bromide, ethidium homodimer-1, Ethyl Eosin, Ethyl Eosin, Ethyl Nile Blue A, Ethyl-p-Dimethylaminobenzoate, Ethyl-p-Dimethylaminobenzoate, Eu2O3 nanoparticles, Eu (Soini), Eu(tta) 3DEADIT, EvaGreen, EVOblue-30, EYFP, FAD, FITC, FITC, FlAsH (Adams), Flash Red EX, FlAsH-CCPGCC, FlAsH-CCXXCC, Fluo-3, Fluo-4, Fluo-5F, Fluorescein, Fluorescein 0.1 NaOH, Fluorescein-Dibase, fluoro-emerald, Fluorol 5G, FluoSpheres blue, FluoSpheres crimson, FluoSpheres dark red, FluoSpheres orange, FluoSpheres red, FluoSpheres yellow-green, FM4-64 in CTC, FM4-64 in SDS, FM 1-43, FM 4-64, Fort Orange 600, Fura Red, Fura Red Ca free, fura-2, Fura-2 Ca free, Gadodiamide, Gd-Dtpa-Bma, Gadodiamide, Gd-Dtpa-Bma, GelGreen™, GelRed™, H9-40, HcRedl, Hemo Red 720, HiLyte Fluor 488, HiLyte Fluor 555, HiLyte Fluor 647, HiLyte Fluor 680, HiLyte Fluor 750, HiLyte Plus 555, HiLyte Plus 647, HiLyte Plus 750, HmGFP, Hoechst 33258, Hoechst 33342, Hoechst-33258, Hoechst-33258, Hops Yellow 560, HPTS, HPTS, HPTS, HPTS, HPTS, indo-1, Indo-1 Ca free, Ir(Cn)2(acac), Ir(Cs)2(acac), IR-775 chloride, IR-806, Ir-OEP-CO-Cl, IRDye® 650 Alkyne, IRDye® 650 Azide, IRDye® 650 Carboxylate, IRDye® 650 DBCO, IRDye® 650 Maleimide, IRDye® 650 NHS Ester, IRDye® 680LT Carboxylate, IRDye® 680LT Maleimide, IRDye® 680LT NHS Ester, IRDye® 680RD Alkyne, IRDye® 680RD Azide, IRDye® 680RD Carboxylate, IRDye® 680RD DBCO, IRDye® 680RD Maleimide, IRDye® 680RD NHS Ester, IRDye® 700 phosphoramidite, IRDye® 700DX, IRDye® 700DX, IRDye® 700DX Carboxylate, IRDye® 700DX NHS Ester, IRDye® 750 Carboxylate, IRDye® 750 Maleimide, IRDye® 750 NHS Ester, IRDye® 800 phosphoramidite, IRDye® 800CW, IRDye® 800CW Alkyne, IRDye® 800CW Azide, IRDye® 800CW Carboxylate, IRDye® 800CW DBCO, IRDye® 800CW Maleimide, IRDye® 800CW NHS Ester, IRDye® 800RS, IRDye® 800RS Carboxylate, IRDye® 800RS NHS Ester, IRDye® QC-1 Carboxylate, IRDye® QC-1 NHS Ester, *Isochrysis galbana*—Parke, JC-1, JC-1, JOJO-1, Jonamac Red Evitag T2, Kaede Green, Kaede Red, kusabira orange, Lake Placid 490, LDS 751, Lissamine Rhodamine (Weiss), LOLO-1, lucifer yellow CH, Lucifer Yellow CH, lucifer yellow CH, Lucifer Yellow CH Dilitium salt, Lumio Green, Lumio Red, Lumogen F Orange, Lumogen Red F300, Lumogen Red F300, LysoSensor Blue DND-192, LysoSensor Green DND-153, LysoSensor Green DND-153, LysoSensor Yellow/Blue DND-160 pH 3, LysoSensor YellowBlue DND-160, LysoTracker Blue DND-22, LysoTracker Blue DND-22, LysoTracker Green DND-26, LysoTracker Red DND-99, LysoTracker Yellow HCK-123, Macoun Red Evitag T2, Macrolex Fluorescence Red G, Macrolex Fluorescence Yellow 10GN, Macrolex Fluorescence Yellow 10GN, Magnesium Green, Magnesium Octaethylporphyrin, Magnesium Orange, Magnesium Phthalocyanine, Magnesium Phthalocyanine, Magnesium Tetramesitylporphyrin, Magnesium Tetraphenylporphyrin, malachite green isothiocyanate, Maple Red-Orange 620, Marina Blue, mBanana, mBBr, mCherry, Merocyanine 540, Methyl green, Methyl green, Methyl green, Methylene Blue, Methylene Blue, mHoneyDew, MitoTracker Deep Red 633, MitoTracker Green FM, MitoTracker Orange CMTMRos, MitoTracker Red CMXRos, monobromobimane, Monochlorobimane, Monoraphidium, mOrange, mOrange2, mPlum, mRaspberry, mRFP, mRFP1, mRFP1.2 (Wang), mStrawberry (Shaner), mTangerine (Shaner), N,N-Bis(2,4,6-trimethylphenyl)-3,4:9,10-perylenebis(dicarboximide), NADH, Naphthalene, Naphthalene, Naphthofluorescein, Naphthofluorescein, NBD-X, NeuroTrace 500525, Nilblau perchlorate, nile blue, Nile Blue, Nile Blue (EtOH), nile red, Nile Red, Nile Red, Nile red, Nileblue A, NIR1, NIR2, NIR3, NIR4, NIR820, Octaethylporphyrin, OH butoxy aza-BODIPY, OHC12 aza-BODIPY, Orange Fluorescent Protein, Oregon Green 488, Oregon Green 488 DHPE, Oregon Green 514, Oxazin1, Oxazin 750, Oxazine 1, Oxazine 170, P4-3, P-Quaterphenyl, P-Terphenyl, PA-GFP (post-activation), PA-GFP (pre-activation), Pacific Orange, Palladium (II) meso-tetraphenyl-tetrabenzoporphyrin, PdOEPK, PdTFPP, PerCP-Cy5.5, Perylene, Perylene, Perylene bisimide pH-Probe 550-5.0, Perylene bisimide pH-Probe 550-5.5, Perylene bisimide pH-Probe 550-6.5, Perylene Green pH-Probe 720-5.5, Perylene Green Tag pH-Probe 720-6.0, Perylene Orange pH-Probe 550-2.0, Perylene Orange Tag 550, Perylene Red pH-Probe 600-5.5, Perylenediimid, Perylne Green pH-Probe 740-5.5, Phenol, Phenylalanine, pHrodo, succinimidyl ester, Phthalocyanine, PicoGreen dsDNA quantitation reagent, Pinacyanol-Iodide, Piroxicam, Platinum(II) tetraphenyltetrabenzoporphyrin, Plum Purple, PO-PRO-1, PO-PRO-3, POPO-1, POPO-3, POPOP, Porphin, PPO, Proflavin, PromoFluor-350, PromoFluor-405, PromoFluor-415, PromoFluor-488, PromoFluor-488 Premium, PromoFluor-488LSS, PromoFluor-500LSS, PromoFluor-505, PromoFluor-510LSS, PromoFluor-514LSS, PromoFluor-520LSS, PromoFluor-532, PromoFluor-546, PromoFluor-555, PromoFluor-590, PromoFluor-610, PromoFluor-633, PromoFluor-647, PromoFluor-670, PromoFluor-680, PromoFluor-700, PromoFluor-750, PromoFluor-770, PromoFluor-780, PromoFluor-840, propidium iodide, Protoporphyrin IX, PTIR475/UF, PTIR545/UF, PtOEP, PtOEPK, PtTFPP, Pyrene, QD525, QD565, QD585, QD605, QD655, QD705, QD800, QD903, QD PbS 950, QDot 525, QDot 545, QDot 565, Qdot 585, Qdot 605, Qdot 625, Qdot 655, Qdot 705, Qdot 800, QpyMe2, QSY 7, QSY 7, QSY 9, QSY 21, QSY 35, quinine, Quinine Sulfate, Quinine sulfate, R-phycoerythrin, R-phycoerythrin, ReAsH-CCPGCC, ReAsH-CCXXCC, Red Beads (Weiss), Redmond Red, Resorufin, resorufin, rhod-2, Rhodamin 700 perchlorate, rhodamine, Rhodamine 6G, Rhodamine 6G, Rhodamine 101, rhodamine 110, Rhodamine 123, rhodamine 123, Rhodamine B, Rhodamine B, Rhodamine Green, Rhodamine pH-Probe 585-7.0, Rhodamine pH-Probe 585-7.5, Rhodamine phalloidin, Rhodamine Red-X, Rhodamine Red-X, Rhodamine Tag pH-Probe 585-7.0, Rhodol Green, Riboflavin, Rose Bengal, Sapphire, SBFI, SBFI Zero Na, *Scenedesmus* sp., SensiLight PBXL-1, SensiLight PBXL-3, Seta 633-NHS, Seta-633-NHS, SeTau-380-NHS, SeTau-647-NHS, Snake-Eye Red 900, SNIR1, SNIR2, SNIR3, SNIR4, Sodium Green, Solophenyl flavine 7GFE 500, Spectrum Aqua, Spectrum Blue, Spectrum FRed, Spectrum Gold, Spectrum Green, Spectrum Orange, Spectrum Red, Squarylium dye III, Stains All, Stilben derivate, Stilbene, Styryl8 perchlorate, Sulfo-Cyanine3 carboxylic acid, Sulfo-Cyanine3 carboxylic acid, Sulfo-Cyanine3 NHS ester, Sulfo-Cyanine5 carboxylic acid, Sulforhodamine 101, sulforhodamine 101, Sulforhodamine B, Sulforhodamine G, Suncoast Yellow, SuperGlo BFP, SuperGlo GFP, Surf Green EX, SYBR Gold nucleic acid gel stain, SYBR Green I, SYPRO Ruby, SYTO 9, SYTO 11, SYTO 13, SYTO 16, SYTO 17, SYTO 45, SYTO 59, SYTO 60, SYTO 61, SYTO 62, SYTO 82, SYTO RNASelect, SYTO RNASelect, SYTOX Blue, SYTOX Green, SYTOX Orange, SYTOX Red, T-Sapphire, Tb (Soini), tCO, tdTomato, Terrylen, Terrylendiimid, testdye, Tetra-t-Butylazaporphine, Tetra-t-Butylnaphthalocyanine, Tetracen, Tetrakis(o-Aminophenyl)Porphyrin, Tetramesitylporphyrin, Tetramethylrhodamine, tetramethylrhodamine, Tetraphenylporphyrin, Tetraphenylporphyrin, Texas Red, Texas Red DHPE, Texas Red-X, ThiolTracker Violet, Thionin acetate, TMRE, TO-PRO-1, TO-PRO-3, Toluene, Topaz (Tsien1998), TOTO-1, TOTO-3, Tris(2,2-Bipyridyl)Ruthenium(II) chloride, Tris(4,4-diphenyl-2,2-bipyridine) ruthenium(II) chloride, Tris(4,7-diphenyl-1,10-phenanthroline) ruthenium(II) TMS, TRITC (Weiss), TRITC Dextran (Weiss), Tryptophan, Tyrosine, Vex1, Vybrant DyeCycle Green stain, Vybrant DyeCycle Orange stain, Vybrant DyeCycle Violet stain, WEGFP (post-activation), WellRED D2, WellRED D3, WellRED D4, WtGFP, WtGFP (Tsien1998), X-rhod-1, Yakima Yellow, YFP, YO-PRO-1, YO-PRO-3, YOYO-1, YoYo-1, YoYo-1 dsDNA, YoYo-1 ssDNA, YOYO-3, Zinc Octaethylporphyrin, Zinc Phthalocyanine, Zinc Tetramesitylporphyrin, Zinc Tetraphenylporphyrin, ZsGreen1, or ZsYellow1. In embodiments, $R^{500}$ is a monovalent moiety of a compound described within this paragraph.

In embodiments, the detectable moiety is a moiety of a derivative of one of the detectable moieties described immediately above, wherein the derivative differs from one of the detectable moieties immediately above by a modification resulting from the conjugation of the detectable moiety to a compound described herein.

In embodiments, the detectable label is a fluorescent dye. In embodiments, the detectable label is a fluorescent dye capable of exchanging energy with another fluorescent dye (e.g., fluorescence resonance energy transfer (FRET) chromophores).

The term "cyanine" or "cyanine moiety" as described herein refers to a detectable moiety containing two nitrogen groups separated by a polymethine chain. In embodiments, the cyanine moiety has 3 methine structures (i.e., cyanine 3 or Cy3). In embodiments, the cyanine moiety has 5 methine structures (i.e., cyanine 5 or Cy5). In embodiments, the cyanine moiety has 7 methine structures (i.e., cyanine 7 or Cy7).

Descriptions of compounds (e.g., nucleotide analogues) of the present disclosure are limited by principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, and several known physiological conditions. For example, a heterocycloalkyl or heteroaryl is attached to the remainder of the molecule via a ring heteroatom in compliance with principles of chemical bonding known to those skilled in the art thereby avoiding inherently unstable compounds.

The term "pharmaceutically acceptable salts" is meant to include salts of the active compounds that are prepared with relatively nontoxic acids or bases, depending on the particular substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of pharmaceutically acceptable base addition salts include sodium, potassium, calcium, ammonium, organic amino, or magnesium salt, or a similar salt. When compounds of the present invention contain relatively basic functionalities, acid addition salts can be obtained by contacting the neutral form of such compounds with a sufficient amount of the desired acid, either neat or in a suitable inert solvent. Examples of pharmaceutically acceptable acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from relatively nontoxic organic acids like acetic, propionic, isobutyric, maleic, malonic, benzoic, succinic, suberic, fumaric, lactic, mandelic, phthalic, benzenesulfonic, p-tolylsulfonic, citric, tartaric, oxalic, methanesulfonic, and the like. Also included are salts of amino acids such as arginate and the like, and salts of organic acids like glucuronic or galactunoric acids and the like (see, for example, Berge et al., "Pharmaceutical Salts", *Journal of Pharmaceutical Science,* 1977, 66, 1-19). Certain specific compounds of the present invention contain both basic and acidic functionalities that allow the compounds to be converted into either base or acid addition salts.

As used herein, the term "salt" refers to acid or base salts of the compounds described herein. Thus, the compounds of the present invention may exist as salts, such as with pharmaceutically acceptable acids. The present invention includes such salts. Non-limiting examples of such salts include hydrochlorides, hydrobromides, phosphates, sulfates, methanesulfonates, nitrates, maleates, acetates, citrates, fumarates, proprionates, tartrates (e.g., (+)-tartrates, (−)-tartrates, or mixtures thereof including racemic mixtures), succinates, benzoates, and salts with amino acids such as glutamic acid, and quaternary ammonium salts (e.g., methyl iodide, ethyl iodide, and the like). These salts may be prepared by methods known to those skilled in the art. Illustrative examples of acceptable salts are mineral acid (hydrochloric acid, hydrobromic acid, phosphoric acid, and the like) salts, organic acid (acetic acid, propionic acid, glutamic acid, citric acid and the like) salts, quaternary ammonium (methyl iodide, ethyl iodide, and the like) salts. In embodiments, compounds may be presented with a positive charge, and it is understood an appropriate counter-ion (e.g., chloride ion, fluoride ion, or acetate ion) may also be present, though not explicitly shown. Likewise, for compounds having a negative charge (e.g.,

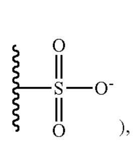

it is understood an appropriate counter-ion (e.g., a proton, sodium ion, potassium ion, or ammonium ion) may also be present, though not explicitly shown. The protonation state of the compound (e.g., a compound described herein) depends on the local environment (i.e., the pH of the environment), therefore, in embodiments, the compound may be described as having a moiety in a protonated state (e.g.,

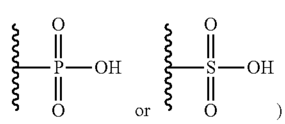

or an ionic state (e.g.,

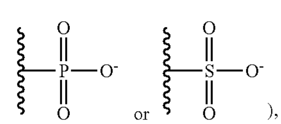

and it is understood these are interchangeable. In embodiments, the counter-ion is represented by the symbol M (e.g., $M^+$ or $M^-$).

The neutral forms of the compounds are preferably regenerated by contacting the salt with a base or acid and isolating the parent compound in the conventional manner. The parent form of the compound may differ from the various salt forms in certain physical properties, such as solubility in polar solvents.

Certain compounds of the present invention can exist in unsolvated forms as well as solvated forms, including hydrated forms. In general, the solvated forms are equivalent to unsolvated forms and are encompassed within the scope of the present invention. Certain compounds of the present invention may exist in multiple crystalline or amorphous forms. In general, all physical forms are equivalent for the uses contemplated by the present invention and are intended to be within the scope of the present invention.

The terms "polypeptide," "peptide" and "protein" are used interchangeably herein to refer to a polymer of amino acid residues, wherein the polymer may optionally be conjugated to a moiety that does not consist of amino acids. The terms apply to amino acid polymers in which one or more amino acid residue is an artificial chemical mimetic of a corresponding naturally occurring amino acid, as well as to naturally occurring amino acid polymers and non-naturally occurring amino acid polymer.

A polypeptide, or a cell is "recombinant" when it is artificial or engineered, or derived from or contains an artificial or engineered protein or nucleic acid (e.g., non-natural or not wild type). For example, a polynucleotide that is inserted into a vector or any other heterologous location, e.g., in a genome of a recombinant organism, such that it is not associated with nucleotide sequences that normally flank the polynucleotide as it is found in nature is a recombinant polynucleotide. A protein expressed in vitro or in vivo from a recombinant polynucleotide is an example of a recombinant polypeptide. Likewise, a polynucleotide sequence that does not appear in nature, for example a variant of a naturally occurring gene, is recombinant.

"Hybridize" shall mean the annealing of one single-stranded nucleic acid (such as a primer) to another nucleic acid based on the well-understood principle of sequence complementarity. In an embodiment the other nucleic acid is a single-stranded nucleic acid. The propensity for hybridization between nucleic acids depends on the temperature and ionic strength of their milieu, the length of the nucleic acids and the degree of complementarity. The effect of these parameters on hybridization is described in, for example, Sambrook J., Fritsch E. F., Maniatis T., Molecular cloning: a laboratory manual, Cold Spring Harbor Laboratory Press, New York (1989). As used herein, hybridization of a primer, or of a DNA extension product, respectively, is extendable by creation of a phosphodiester bond with an available nucleotide or nucleotide analogue capable of forming a phosphodiester bond, therewith.

"Contacting" is used in accordance with its plain ordinary meaning and refers to the process of allowing at least two distinct species (e.g., chemical compounds including biomolecules or cells) to become sufficiently proximal to react, interact or physically touch. It should be appreciated, however, that the resulting reaction product can be produced directly from a reaction between the added reagents or from an intermediate from one or more of the added reagents that can be produced in the reaction mixture. The term "contacting" may include allowing two species to react, interact, or physically touch, wherein the two species may be a compound as described herein and a protein or enzyme. In some embodiments, contacting includes allowing a compound described herein to interact with a protein or enzyme that is involved in a signaling pathway.

The term "streptavidin" refers to a tetrameric protein (including homologs, isoforms, and functional fragments thereof) capable of binding biotin. The term includes any recombinant or naturally-occurring form of streptavidin variants thereof that maintain streptavidin activity (e.g., within at least 30%, 40%, 50%, 60%, 70%, 80%, 90%, 95%, or 100% activity compared to wildtype streptavidin).

The term "expression" includes any step involved in the production of the polypeptide including, but not limited to, transcription, post-transcriptional modification, translation, post-translational modification, and secretion. Expression can be detected using conventional techniques for detecting protein (e.g., ELISA, Western blotting, flow cytometry, immunofluorescence, immunohistochemistry, etc.).

An "effective amount" is an amount sufficient for a compound to accomplish a stated purpose relative to the absence of the compound (e.g., achieve the effect for which it is administered, treat a disease, reduce enzyme activity, increase enzyme activity, reduce a signaling pathway, or reduce one or more symptoms of a disease or condition). An "activity decreasing amount," as used herein, refers to an amount of antagonist required to decrease the activity of an enzyme relative to the absence of the antagonist. A "function disrupting amount," as used herein, refers to the amount of antagonist required to disrupt the function of an enzyme or protein relative to the absence of the antagonist.

"Control" or "control experiment" is used in accordance with its plain ordinary meaning and refers to an experiment in which the subjects or reagents of the experiment are treated as in a parallel experiment except for omission of a procedure, reagent, or variable of the experiment. In some instances, the control is used as a standard of comparison in evaluating experimental effects. In some embodiments, a control is the measurement of the activity of a protein in the absence of a compound as described herein (including embodiments and examples).

The term "modulate" is used in accordance with its plain ordinary meaning and refers to the act of changing or varying one or more properties. "Modulation" refers to the process of changing or varying one or more properties. For example, as applied to the effects of a modulator on a target protein, to modulate means to change by increasing or decreasing a property or function of the target molecule or the amount of the target molecule.

"Nucleic acid" refers to nucleotides (e.g., deoxyribonucleotides or ribonucleotides) and polymers thereof in either single-, double- or multiple-stranded form, or complements thereof; or nucleosides (e.g., deoxyribonucleosides or ribonucleosides). In embodiments, "nucleic acid" does not include nucleosides. The terms "polynucleotide," "oligonucleotide," "oligo" or the like refer, in the usual and customary sense, to a linear sequence of nucleotides. Oligonucleotides are typically from about 5, 6, 7, 8, 9, 10, 12, 15, 25, 30, 40, 50 or more nucleotides in length, up to about 100 nucleotides in length. Nucleic acids and polynucleotides are polymers of any length, including longer lengths, e.g., 200, 300, 500, 1000, 2000, 3000, 5000, 7000, 10,000, etc. In certain embodiments, the nucleic acids herein contain phosphodiester bonds. In other embodiments, nucleic acid analogs are included that may have alternate backbones, comprising, e.g., phosphoramidate, phosphorothioate, phosphorodithioate, or O-methylphosphoroamidite linkages (see, Eckstein, Oligonucleotides and Analogues: A Practical Approach, Oxford University Press); and peptide nucleic acid backbones and linkages. Other analog nucleic acids include those with positive backbones; non-ionic backbones, and non-ribose backbones, including those described in U.S. Pat. Nos. 5,235,033 and 5,034,506, and Chapters 6 and 7, ASC Symposium Series 580, *Carbohydrate Modifications in Antisense Research*, Sanghui & Cook, eds. Nucleic acids containing one or more carbocyclic sugars are also included within one definition of nucleic acids. Modifications of the ribose-phosphate backbone may be done for a variety of reasons, e.g., to increase the stability and half-life of such molecules in physiological environments or as probes on a biochip. Mixtures of naturally occurring nucleic acids and analogs can be made; alternatively, mixtures of different nucleic acid analogs, and mixtures of naturally occurring nucleic acids and analogs may be made. A residue of a nucleic acid, as referred to herein, is a monomer of the nucleic acid (e.g., a nucleotide). The term "nucleoside" refers, in the usual and customary sense, to a glycosylamine including a nucleobase and a five-carbon sugar (ribose or deoxyribose). Non limiting examples, of nucleosides include, cytidine, uridine, adenosine, guanosine, thymidine and inosine. Nucleosides may be modified at the base and/or the sugar. The term "nucleotide" refers, in the usual and customary sense, to a single unit of a polynucleotide, i.e., a monomer. Nucleotides can be ribonucleotides, deoxyribonucleotides, or modified versions thereof. Examples of polynucleotides contemplated herein include single and double stranded DNA, single and double stranded RNA, and hybrid molecules having mixtures of single and double stranded DNA and RNA. Examples of nucleic acid, e.g., polynucleotides contemplated herein include any types of RNA, e.g., mRNA, siRNA, miRNA, and guide RNA and any types of DNA, genomic DNA, plasmid DNA, and minicircle DNA, and any fragments thereof. The term "duplex" in the context of polynucleotides refers, in the usual and customary sense, to double strandedness. Nucleic acids can be linear or branched. For example, nucleic acids can be a linear chain of nucleotides or the nucleic acids can be branched, e.g., such that the nucleic acids comprise one or more arms or branches of nucleotides. Optionally, the branched nucleic acids are repetitively branched to form higher ordered structures such as dendrimers and the like.

"Nucleotide," as used herein, refers to a nucleoside-5'-phosphate (e.g., polyphosphate) compound, or a structural analog thereof, which can be incorporated (e.g., partially incorporated as a nucleoside-5'-monophosphate or derivative thereof) by a nucleic acid polymerase to extend a growing nucleic acid chain (such as a primer). Nucleotides may comprise bases such as adenine (A), cytosine (C), guanine (G), thymine (T), uracil (U), or analogues thereof, and may comprise 1, 2, 3, 4, 5, 6, 7, 8, or more phosphates in the phosphate group. Nucleotides may be modified at one or more of the base, sugar, or phosphate group. A nucleotide may have a label or tag attached (a "labeled nucleotide" or "tagged nucleotide"). In an embodiment, the nucleotide is a deoxyribonucleotide. In another embodiment, the nucleotide is a ribonucleotide. In embodiments, nucleotides comprise 3 phosphate groups (e.g., a triphosphate group).

The terms also encompass nucleic acids containing known nucleotide analogs or modified backbone residues or linkages, which are synthetic, naturally occurring, and non-naturally occurring, which have similar binding properties as the reference nucleic acid, and which are metabolized in a manner similar to the reference nucleotides. Examples of such analogs include, without limitation, phosphodiester derivatives including, e.g., phosphoramidate, phosphorodiamidate, phosphorothioate (also known as phosphorothioate having double bonded sulfur replacing oxygen in the phosphate), phosphorodithioate, phosphonocarboxylic acids, phosphonocarboxylates, phosphonoacetic acid, phosphonoformic acid, methyl phosphonate, boron phosphonate, or O-methylphosphoroamidite linkages (see, Eckstein, Oligonucleotides and Analogues: A Practical Approach, Oxford University Press) as well as modifications to the nucleotide bases such as in 5-methyl cytidine or pseudouridine; and peptide nucleic acid backbones and linkages. Other analog nucleic acids include those with positive backbones; non-ionic backbones, modified sugars, and non-ribose backbones (e.g., phosphorodiamidate morpholino oligos or locked nucleic acids (LNA) as known in the art), including those described in U.S. Pat. Nos. 5,235,033 and 5,034,506, and Chapters 6 and 7, ASC Symposium Series 580, Carbohydrate Modifications in Antisense Research, Sanghui & Cook, eds. Nucleic acids containing one or more carbocyclic sugars are also included within one definition of nucleic acids. Modifications of the ribose-phosphate backbone may be done for a variety of reasons, e.g., to increase the stability and half-life of such molecules in physiological environments or as probes on a biochip. Mixtures of naturally occurring nucleic acids and analogs can be made; alternatively, mixtures of different nucleic acid analogs, and mixtures of naturally occurring nucleic acids and analogs may be made. In embodiments, the internucleotide linkages in DNA are phosphodiester, phosphodiester derivatives, or a combination of both.

In embodiments, "nucleotide analogue," "nucleotide analog," or "nucleotide derivative" shall mean an analogue of adenine (A), cytosine (C), guanine (G), thymine (T), or uracil (U) (that is, an analogue or derivative of a nucleotide comprising the base A, G, C, T or U), comprising a phosphate group, which may be recognized by DNA or RNA polymerase (whichever is applicable) and may be incorporated into a strand of DNA or RNA (whichever is appropriate). Examples of nucleotide analogues include, without limitation, 7-deaza-adenine, 7-deaza-guanine, the analogues of deoxynucleotides shown herein, analogues in which a label is attached through a cleavable linker to the 5-position of cytosine or thymine or to the 7-position of deaza-adenine or deaza-guanine, and analogues in which a small chemical moiety is used to cap the —OH group at the 3'-position of deoxyribose. Nucleotide analogues and DNA polymerase-based DNA sequencing are also described in U.S. Pat. No. 6,664,079, which is incorporated herein by reference in its entirety for all purposes.

A "nucleoside" is structurally similar to a nucleotide, but is missing the phosphate moieties. An example of a nucleoside analogue would be one in which the label is linked to the base and there is no phosphate group attached to the sugar molecule. "Nucleoside," as used herein, refers to a glycosyl compound consisting of a nucleobase and a 5-membered ring sugar (e.g., either ribose or deoxyribose). Nucleosides may comprise bases such as adenine (A), cytosine (C), guanine (G), thymine (T), uracil (U), or analogues thereof. Nucleosides may be modified at the base and/or and the sugar. In an embodiment, the nucleoside is a deoxyribonucleoside. In another embodiment, the nucleoside is a ribonucleoside.

A particular nucleic acid sequence also encompasses "splice variants." Similarly, a particular protein encoded by a nucleic acid encompasses any protein encoded by a splice variant of that nucleic acid. "Splice variants," as the name suggests, are products of alternative splicing of a gene. After transcription, an initial nucleic acid transcript may be spliced such that different (alternate) nucleic acid splice products encode different polypeptides. Mechanisms for the production of splice variants vary, but include alternate splicing of exons. Alternate polypeptides derived from the same nucleic acid by read-through transcription are also encompassed by this definition. Any products of a splicing reaction, including recombinant forms of the splice products, are included in this definition. An example of potassium channel splice variants is discussed in Leicher, et al., *J. Biol. Chem.* 273(52):35095-35101 (1998).

Nucleic acid is "operably linked" when it is placed into a functional relationship with another nucleic acid sequence. For example, DNA for a presequence or secretory leader is operably linked to DNA for a polypeptide if it is expressed as a preprotein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, "operably linked" means that the DNA sequences being linked are near each other, and, in the case of a secretory leader, contiguous and in reading phase. However, enhancers do not have to be contiguous. Linking is accomplished by ligation at convenient restriction sites. If such sites do not exist, the synthetic oligonucleotide adaptors or linkers are used in accordance with conventional practice.

As used herein, the term "bioconjugate reactive moiety" and "bioconjugate reactive group" refers to a moiety or group capable of forming a bioconjugate (e.g., covalent linker) as a result of the association between atoms or molecules of bioconjugate reactive groups. The association can be direct or indirect. For example, a conjugate between a first bioconjugate reactive group (e.g., —$NH_2$, —COOH, —N-hydroxysuccinimide, or -maleimide) and a second bioconjugate reactive group (e.g., sulfhydryl, sulfur-containing amino acid, amine, amine sidechain containing amino acid, or carboxylate) provided herein can be direct, e.g., by covalent bond or linker (e.g., a first linker of second linker), or indirect, e.g., by non-covalent bond (e.g., electrostatic interactions (e.g., ionic bond, hydrogen bond, halogen bond), van der Waals interactions (e.g., dipole-dipole, dipole-induced dipole, London dispersion), ring stacking (pi effects), hydrophobic interactions and the like). In embodiments, bioconjugates or bioconjugate linkers are formed using bioconjugate chemistry (i.e., the association of two bioconjugate reactive groups) including, but are not limited to nucleophilic substitutions (e.g., reactions of amines and alcohols with acyl halides, active esters), electrophilic substitutions (e.g., enamine reactions) and additions to carbon-carbon and carbon-heteroatom multiple bonds (e.g., Michael reaction, Diels-Alder addition). These and other useful reactions are discussed in, for example, March, ADVANCED ORGANIC CHEMISTRY, 3rd Ed., John Wiley & Sons, New York, 1985; Hermanson, BIOCONJUGATE TECHNIQUES, Academic Press, San Diego, 1996; and Feeney et al., MODIFICATION OF PROTEINS; Advances in Chemistry Series, Vol. 198, American Chemical Society, Washington, D.C., 1982. In embodiments, the first bioconjugate reactive group (e.g., maleimide moiety) is covalently attached to the second bioconjugate reactive group (e.g., a sulfhydryl). In embodiments, the first bioconjugate reactive group (e.g., haloacetyl moiety) is covalently attached to the second bioconjugate reactive group (e.g., a sulfhydryl). In embodiments, the first bioconjugate reactive group (e.g., pyridyl moiety) is covalently attached to the second bioconjugate reactive group (e.g., a sulfhydryl). In embodiments, the first bioconjugate reactive group (e.g., —N-hydroxysuccinimide moiety) is covalently attached to the second bioconjugate reactive group (e.g., an amine). In embodiments, the first bioconjugate reactive group (e.g., maleimide moiety) is covalently attached to the second bioconjugate reactive group (e.g., a sulfhydryl). In embodiments, the first bioconjugate reactive group (e.g., -sulfo-N-hydroxysuccinimide moiety) is covalently attached to the second bioconjugate reactive group (e.g., an amine).

Useful bioconjugate reactive groups used for bioconjugate chemistries herein include, for example: (a) carboxyl groups and various derivatives thereof including, but not limited to, N-hydroxysuccinimide esters, N-hydroxybenzotriazole esters, acid halides, acyl imidazoles, thioesters, p-nitrophenyl esters, alkyl, alkenyl, alkynyl and aromatic esters; (b) hydroxyl groups which can be converted to esters, ethers, aldehydes, etc.; (c) haloalkyl groups wherein the halide can be later displaced with a nucleophilic group such as, for example, an amine, a carboxylate anion, thiol anion, carbanion, or an alkoxide ion, thereby resulting in the covalent attachment of a new group at the site of the halogen atom; (d) dienophile groups which are capable of participating in Diels-Alder reactions such as, for example, maleimido or maleimide groups; (e) aldehyde or ketone groups such that subsequent derivatization is possible via formation of carbonyl derivatives such as, for example, imines, hydrazones, semicarbazones or oximes, or via such mechanisms as Grignard addition or alkyllithium addition; (f) sulfonyl halide groups for subsequent reaction with amines, for example, to form sulfonamides; (g) thiol groups, which can be converted to disulfides, reacted with acyl halides, or bonded to metals such as gold, or react with maleimides; (h) amine or sulfhydryl groups (e.g., present in cysteine), which can be, for example, acylated, alkylated or oxidized; (i) alkenes, which can undergo, for example, cycloadditions, acylation, Michael addition, etc.; (j) epoxides, which can react with, for example, amines and hydroxyl compounds; (k) phosphoramidites and other standard functional groups useful in nucleic acid synthesis; (1) metal silicon oxide bonding; (m) metal bonding to reactive phosphorus groups (e.g., phosphines) to form, for example, phosphate diester bonds; (n) azides coupled to alkynes using copper catalyzed cycloaddition click chemistry; (o) biotin conjugate can react with avidin or streptavidin to form a avidin-biotin complex or streptavidin-biotin complex.

The term "monophosphate" is used in accordance with its ordinary meaning in the arts and refers to a moiety having the formula:

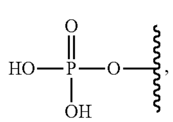

or ionized forms thereof. The term "polyphosphate" refers to at least two phosphate groups, having the formula:

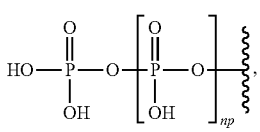

or ionized forms thereof, wherein np is an integer of 1 or greater. In embodiments, np is an integer from 1 to 5. In embodiments, np is an integer from 1 to 2. In embodiments, np is 2. The term "diphosphate" is used in accordance with its ordinary meaning in the arts and refers to a moiety having the formula:

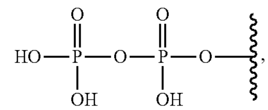 [SMILES: *OP(=O)(O)OP(=O)(O)O]

or ionized forms thereof. The term "triphosphate" is used in accordance with its ordinary meaning in the arts and refers to a moiety having the formula:

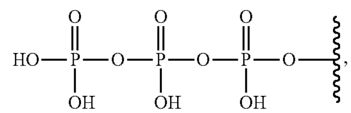 [SMILES: *OP(=O)(O)OP(=O)(O)OP(=O)(O)O]

or ionized forms thereof. In embodiments, a polyphosphate is a diphosphate. In embodiments, a polyphosphate is a triphosphate.

The term "nucleobase" or "base" as used herein refers to a purine or pyrimidine compound, or a derivative thereof, that may be a constituent of nucleic acid (i.e., DNA or RNA, or a derivative thereof). In embodiments, the nucleobase is a divalent purine or pyrimidine, or derivative thereof. In embodiments, the nucleobase is a monovalent purine or pyrimidine, or derivative thereof. In embodiments, the base is a derivative of a naturally occurring DNA or RNA base (e.g., a base analogue). In embodiments, the base is a hybridizing base. In embodiments, the base hybridizes to a complementary base. In embodiments, the base is capable of forming at least one hydrogen bond with a complementary base (e.g., adenine hydrogen bonds with thymine, adenine hydrogen bonds with uracil, guanine pairs with cytosine). Non-limiting examples of a base includes cytosine or a derivative thereof (e.g., cytosine analogue), guanine or a derivative thereof (e.g., guanine analogue), adenine or a derivative thereof (e.g., adenine analogue), thymine or a derivative thereof (e.g., thymine analogue), uracil or a derivative thereof (e.g., uracil analogue), hypoxanthine or a derivative thereof (e.g., hypoxanthine analogue), xanthine or a derivative thereof (e.g., xanthine analogue), 7-methylguanine or a derivative thereof (e.g., 7-methylguanine analogue), deaza-adenine or a derivative thereof (e.g., deaza-adenine analogue), deaza-guanine or a derivative thereof (e.g., deaza-guanine), deaza-hypoxanthine or a derivative thereof, 5,6-dihydrouracil or a derivative thereof (e.g., 5,6-dihydrouracil analogue), 5-methylcytosine or a derivative thereof (e.g., 5-methylcytosine analogue), or 5-hydroxymethylcytosine or a derivative thereof (e.g., 5-hydroxymethylcytosine analogue) moieties. In embodiments, the base is adenine, guanine, uracil, cytosine, thymine, hypoxanthine, xanthine, theobromine, caffeine, uric acid, or isoguanine, which may be optionally substituted or modified. In embodiments, the base is adenine, guanine, hypoxanthine, xanthine, theobromine, caffeine, uric acid, or isoguanine, which may be optionally substituted or modified.

The term "non-covalent linker" is used in accordance with its ordinary meaning and refers to a divalent moiety which includes at least two molecules that are not covalently linked to each other but are capable of interacting with each other via a non-covalent bond (e.g., electrostatic interactions (e.g., ionic bond, hydrogen bond, halogen bond) or van der Waals interactions (e.g., dipole-dipole, dipole-induced dipole, London dispersion). In embodiments, the non-covalent linker is the result of two molecules that are not covalently linked to each other that interact with each other via a non-covalent bond.

The term "anchor moiety" as used herein refers to a chemical moiety capable of interacting (e.g., covalently or non-covalently) with a second, optionally different, chemical moiety (e.g., complementary anchor moiety binder). In embodiments, the anchor moiety is a bioconjugate reactive group capable of interacting (e.g., covalently) with a complementary bioconjugate reactive group (e.g., complementary anchor moiety reactive group, complementary anchor moiety binder). In embodiments, an anchor moiety is a click chemistry reactant moiety. In embodiments, the anchor moiety (an "affinity anchor moiety") is capable of non-covalently interacting with a second chemical moiety (e.g., complementary affinity anchor moiety binder). Non-limiting examples of an anchor moiety include biotin, azide, trans-cyclooctene (TCO) (Blackman, M. L., et al., *J. Am. Chem. Soc.,* 2008, 130, 13518-13519; Debets, M. F., et al. *Org. Biomol. Chem.,* 2013, 11, 6439-6455) and phenyl boric acid (PBA) (Bergseid M., et al., *BioTechniques,* 2000, 29, 1126-1133). In embodiments, an affinity anchor moiety (e.g., biotin moiety) interacts non-covalently with a complementary affinity anchor moiety binder (e.g., streptavidin moiety). In embodiments, an anchor moiety (e.g., azide moiety, trans-cyclooctene (TCO) moiety, phenyl boric acid (PBA) moiety) covalently binds a complementary anchor moiety binder (e.g., dibenzocyclooctyne (DBCO) moiety (Jewett J. C. and Bertozzi C. R. *J. Am. Chem. Soc.,* 2010, 132, 3688-3690), tetrazine (TZ) moiety, salicylhydroxamic acid (SHA) moiety).

The term "cleavable linker" or "cleavable moiety" as used herein refers to a divalent or monovalent, respectively, moiety which is capable of being separated (e.g., detached, split, disconnected, hydrolyzed, a stable bond within the moiety is broken) into distinct entities. In embodiments, a cleavable linker is cleavable (e.g., specifically cleavable) in response to external stimuli (e.g., enzymes, nucleophilic/basic reagents, reducing agents, photo-irradiation, electrophilic/acidic reagents, organometallic and metal reagents, or oxidizing reagents). In embodiments, a cleavable linker is a self-immolative linker, a trivalent linker, or a linker capable of dendritic amplification of signal, or a self-immolative dendrimer containing linker (e.g., all as described in US 2007/0009980, US 2006/0003383, and US 2009/0047699, which are incorporated by reference in their entirety for any purpose). A chemically cleavable linker refers to a linker which is capable of being split in response to the presence of a chemical (e.g., acid, base, oxidizing agent, reducing agent, Pd(O), tris-(2-carboxyethyl)phosphine, dilute nitrous acid, fluoride, tris(3-hydroxypropyl)phosphine), sodium dithionite ($Na_2S_2O_4$), hydrazine ($N_2H_4$)). A chemically cleavable linker is non-enzymatically cleavable. In embodiments, the cleavable linker is cleaved by contacting the cleavable linker with a cleaving agent. In embodiments, the cleaving agent is sodium dithionite ($Na_2S_2O_4$), weak acid, hydrazine ($N_2H_4$), Pd(O), or light-irradiation (e.g., ultraviolet radiation). The term "self-immolative" referring to a linker is used in accordance with its well understood meaning in Chemistry and Biology as used in US 2007/0009980, US 2006/0003383, and US 2009/0047699, which are incorporated by reference in their entirety for any purpose. In embodiments "self-immolative" referring to a linker refers to a linker that is capable of additional cleavage following initial cleavage by an external stimuli. The term dendrimer is used in accordance with its well understood meaning in Chemistry. In embodiments, the term "self-immolative dendrimer" is used as described in US 2007/0009980, US 2006/0003383, and US 2009/0047699, which are incorporated by reference in their entirety for any purpose and in embodiments refers to a dendrimer that is capable of releasing all of its tail units through a self-immolative fragmentation following initial cleavage by an external stimulus.

A "photocleavable linker" (e.g., including or consisting of an o-nitrobenzyl group) refers to a linker which is capable of being split in response to photo-irradiation (e.g., ultraviolet radiation). An acid-cleavable linker refers to a linker which is capable of being split in response to a change in the pH (e.g., increased acidity). A base-cleavable linker refers to a linker which is capable of being split in response to a change in the pH (e.g., decreased acidity). An oxidant-cleavable linker refers to a linker which is capable of being split in response to the presence of an oxidizing agent. A reductant-cleavable linker refers to a linker which is capable of being split in response to the presence of a reducing agent (e.g., tris(3-hydroxypropyl)phosphine). In embodiments, the cleavable linker is a dialkylketal linker (Binaulda S., et al., *Chem. Commun.,* 2013, 49, 2082-2102; Shenoi R. A., et al., *J. Am. Chem. Soc.,* 2012, 134, 14945-14957), an azo linker (Rathod, K. M., et al., *Chem. Sci. Tran.,* 2013, 2, 25-28; Leriche G., et al., *Eur. J. Org. Chem.,* 2010, 23, 4360-64), an allyl linker, a cyanoethyl linker, a 1-(4,4-dimethyl-2,6-dioxocyclohex-1-ylidene)ethyl linker, or a nitrobenzyl linker.

The term "orthogonally cleavable linker" or "orthogonal cleavable linker" as used herein refer to a cleavable linker that is cleaved by a first cleaving agent (e.g., enzyme, nucleophilic/basic reagent, reducing agent, photo-irradiation, electrophilic/acidic reagent, organometallic and metal reagent, oxidizing reagent) in a mixture of two or more different cleaving agents and is not cleaved by any other different cleaving agent in the mixture of two or more cleaving agents. For example, two different cleavable linkers are both orthogonal cleavable linkers when a mixture of the two different cleavable linkers are reacted with two different cleaving agents and each cleavable linker is cleaved by only one of the cleaving agents and not the other cleaving agent and the agent that cleaves each cleavable linker is different. In embodiments, an orthogonally is a cleavable linker that following cleavage the two separated entities (e.g., fluorescent dye, bioconjugate reactive group) do not further react and form a new orthogonally cleavable linker.

The term "orthogonal detectable label" or "orthogonal detectable moiety" as used herein refer to a detectable label (e.g., fluorescent dye or detectable dye) that is capable of being detected and identified (e.g., by use of a detection means (e.g., emission wavelength, physical characteristic measurement)) in a mixture or a panel (collection of separate samples) of two or more different detectable labels. For example, two different detectable labels that are fluorescent dyes are both orthogonal detectable labels when a panel of the two different fluorescent dyes is subjected to a wavelength of light that is absorbed by one fluorescent dye but not the other and results in emission of light from the fluorescent dye that absorbed the light but not the other fluorescent dye. Orthogonal detectable labels may be separately identified by different absorbance or emission intensities of the orthogonal detectable labels compared to each other and not only be the absolute presence of absence of a signal. An example of a set of four orthogonal detectable labels is the set of Rox-Labeled Tetrazine, Alexa488-Labeled SHA, Cy5-Labeled Streptavidin, and R6G-Labeled Dibenzocyclooctyne.

As used herein, the terms "reversible blocking groups" and "reversible terminators" are used in accordance with their plain and ordinary meanings and refer to a blocking moiety located, for example, at the 3' position of the nucleotide and may be a chemically cleavable moiety such as an allyl group, an azidomethyl group or a methoxymethyl group, or may be an enzymatically cleavable group such as a phosphate ester. Non-limiting examples of nucleotide blocking moieties are described in applications WO 2004/018497, U.S. Pat. Nos. 7,057,026, 7,541,444, WO 96/07669, U.S. Pat. Nos. 5,763,594, 5,808,045, 5,872,244 and 6,232,465 the contents of which are incorporated herein by reference in their entirety. The nucleotides may be labelled or unlabeled. They may be modified with reversible terminators useful in methods provided herein and may be 3'-O-blocked reversible or 3'-unblocked reversible terminators. In nucleotides with 3'-O-blocked reversible terminators, the blocking group —OR [reversible terminating (capping) group] is linked to the oxygen atom of the 3'-OH of the pentose, while the label is linked to the base, which acts as a reporter and can be cleaved. The 3'-O-blocked reversible terminators are known in the art, and may be, for instance, a 3'-$ONH_2$ reversible terminator, a 3'-O-allyl reversible terminator, or a 3'-O-azidomethyl reversible terminator. In embodiments, the reversible terminator moiety is

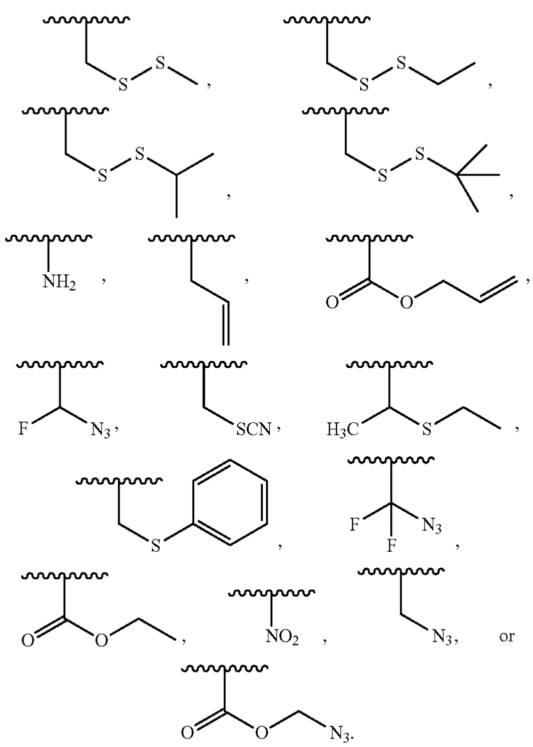

In embodiments, the reversible terminator moiety is

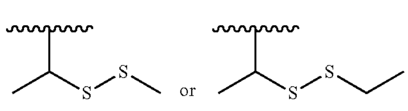

as described in U.S. Pat. No. 10,738,072, which is incorporated herein by reference for all purposes. For example, a nucleotide including a reversible terminator moiety may be represented by the formula:

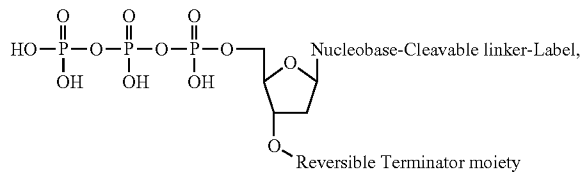

where the nucleobase is adenine or adenine analogue, thymine or thymine analogue, guanine or guanine analogue, or cytosine or cytosine analogue.

The term "polymer" refers to a molecule including repeating subunits (e.g., polymerized monomers). For example, polymeric molecules may be based upon polyethylene glycol (PEG), tetraethylene glycol (TEG), polyvinylpyrrolidone (PVP), poly(xylene), or poly(p-xylylene). The term "polymerizable monomer" is used in accordance with its meaning in the art of polymer chemistry and refers to a compound that may covalently bind chemically to other monomer molecules (such as other polymerizable monomers that are the same or different) to form a polymer.

The term "polymerase-compatible moiety" as used herein refers a moiety which does not interfere with the function of a polymerase (e.g., DNA polymerase, modified DNA polymerase) in incorporating the nucleotide to which the polymerase-compatible moiety is attached to the 3' end of the newly formed nucleotide strand. The polymerase-compatible moiety does, however, interfere with the polymerase function by preventing the addition of another nucleotide to the 3' oxygen of the nucleotide to which the polymerase-compatible moiety is attached. Methods for determining the function of a polymerase contemplated herein are described in B. Rosenblum et al. (Nucleic Acids Res. 1997 Nov. 15; 25(22): 4500-4504); and Z. Zhu et al. (Nucleic Acids Res. 1994 Aug. 25; 22(16): 3418-3422), which are incorporated by reference herein in their entirety for all purposes. In embodiments, the polymerase-compatible moiety does not decrease the function of a polymerase relative to the absence of the polymerase-compatible moiety. In embodiments, the polymerase-compatible moiety does not negatively affect DNA polymerase recognition. In embodiments, the polymerase-compatible moiety does not negatively affect (e.g., limit) the read length of the DNA polymerase. Additional examples of a polymerase-compatible moiety may be found in U.S. Pat. No. 6,664,079, Ju J. et al. (2006) *Proc Natl Acad Sci USA* 103(52):19635-19640; Ruparel H. et al. (2005) *Proc Natl Acad Sci USA* 102(17):5932-5937; Wu J. et al. (2007) *Proc Natl Acad Sci USA* 104(104):16462-16467; Guo J. et al. (2008) *Proc Natl Acad Sci USA* 105(27): 9145-9150 Bentley D. R. et al. (2008) *Nature* 456(7218): 53-59; or Hutter D. et al. (2010) *Nucleosides Nucleotides & Nucleic Acids* 29:879-895, which are incorporated herein by reference in their entirety for all purposes. In embodiments, a polymerase-compatible moiety includes hydrogen, —$N_3$, —CN, or halogen. In embodiments, a polymerase-compatible moiety is a moiety on a nucleotide, nucleobase, nucleoside, or nucleic acid that does not interfere with the function of a polymerase (e.g., DNA polymerase, modified DNA polymerase).

The term "DNA polymerase" and "nucleic acid polymerase" are used in accordance with their plain ordinary meaning and refer to enzymes capable of synthesizing nucleic acid molecules from nucleotides (e.g., deoxyribonucleotides). Typically, a DNA polymerase adds nucleotides to the 3'-end of a DNA strand, one nucleotide at a time. In embodiments, the DNA polymerase is a Pol I DNA polymerase, Pol II DNA polymerase, Pol III DNA polymerase, Pol IV DNA polymerase, Pol V DNA polymerase, Pol β DNA polymerase, Pol μ DNA polymerase, Pol λ DNA polymerase, Pol σ DNA polymerase, Pol α DNA polymerase, Pol δ DNA polymerase, Pol ε DNA polymerase, Pol η DNA polymerase, Pol τ DNA polymerase, Pol κ DNA polymerase, Pol ζ DNA polymerase, Pol γ DNA polymerase, Pol θ DNA polymerase, Pol DNA polymerase, or a thermophilic nucleic acid polymerase (e.g., Taq polymerase, Therminator γ, 9° N polymerase (exo-), Therminator II, Therminator III, or Therminator IX).

The term "thermophilic nucleic acid polymerase" as used herein refers to a family of DNA polymerases (e.g., 9° N™) and mutants thereof derived from the DNA polymerase originally isolated from the hyperthermophilic archaea, *Thermococcus* sp. 9 degrees N-7, found in hydrothermal vents at that latitude (East Pacific Rise) (Southworth M W, et al. *PNAS.* 1996; 93(11):5281-5285). A thermophilic nucleic acid polymerase is a member of the family B DNA polymerases. Site-directed mutagenesis of the 3'-5' exo motif I (Asp-Ile-Glu) to Asp-Ile-Asp resulted in reduction of 3'-5' exonuclease activity to <1% of wild-type, while maintaining other properties of the polymerase including its high strand displacement activity. Subsequent mutagenesis of key amino acids results in an increased ability of the enzyme to incorporate dideoxynucleotides, ribonucleotides and acyclonucleotides; 3'-amino-dNTPs, 3'-azido-dNTPs and other 3'-modified nucleotides, or γ-phosphate labeled nucleotides. Typically these enzymes do not have 5'-3' exonuclease activity. Additional information about thermophilic nucleic acid polymerases may be found in (Southworth M. W., et al. *PNAS.* 1996; 93(11):5281-5285; Bergen K., et al. *ChemBioChem.* 2013; 14(9):1058-1062; Kumar S., et al. *Scientific Reports.* 2012; 2:684; Fuller C. W., et al. 2016; 113(19): 5233-5238; Guo J., et al. *Proceedings of the National Academy of Sciences of the United States of America.* 2008; 105(27):9145-9150), which are incorporated herein in their entirety for all purposes.

The term "primer," as used herein, is defined to be one or more nucleic acid fragments that specifically hybridize to a nucleic acid template. A primer can be of any length depending on the particular technique it will be used for. For example, PCR primers are generally between 10 and 40 nucleotides in length. The length and complexity of the nucleic acid fixed onto the nucleic acid template is not critical to the invention. One of skill can adjust these factors to provide optimum hybridization and signal production for a given hybridization procedure, and to provide the required resolution among different genes or genomic locations. The primer permits the addition of a nucleotide residue thereto, or oligonucleotide or polynucleotide synthesis therefrom, under suitable conditions well-known in the art. In an embodiment, the primer is a DNA primer, i.e., a primer consisting of, or largely consisting of, deoxyribonucleotide residues. The primers are designed to have a sequence that is the complement of a region of template/target DNA to which the primer hybridizes. The addition of a nucleotide residue to the 3' end of a primer by formation of a phosphodiester bond results in a DNA extension product. The addition of a nucleotide residue to the 3' end of the DNA extension product by formation of a phosphodiester bond results in a further DNA extension product. In another embodiment, the primer is an RNA primer.

"Primer" as used herein (a primer sequence) is a short, usually chemically synthesized oligonucleotide, of appropriate length, for example about 18-24 bases, sufficient to hybridize to a target nucleic acid (e.g., a single stranded nucleic acid) and permit the addition of a nucleotide residue thereto, or oligonucleotide or polynucleotide synthesis therefrom, under suitable conditions well-known in the art. In an embodiment, the primer is a DNA primer, i.e., a primer consisting of, or largely consisting of, deoxyribonucleotide residues. The primers are designed to have a sequence that is the complement of a region of template/target DNA to which the primer hybridizes. The addition of a nucleotide residue to the 3' end of a primer by formation of a phosphodiester bond results in a DNA extension product. The addition of a nucleotide residue to the 3' end of the DNA extension product by formation of a phosphodiester bond results in a further DNA extension product. In another embodiment, the primer is an RNA primer.

"Polymerase," as used herein, refers to any natural or non-naturally occurring enzyme or other catalyst that is capable of catalyzing a polymerization reaction, such as the polymerization of nucleotide monomers to form a nucleic acid polymer. Exemplary types of polymerases that may be used in the compositions and methods of the present disclosure include the nucleic acid polymerases such as DNA polymerase, DNA- or RNA-dependent RNA polymerase, and reverse transcriptase. In some cases, the DNA polymerase is 9° N polymerase or a variant thereof, *E. Coli* DNA polymerase I, Bacteriophage T4 DNA polymerase, Sequenase, Taq DNA polymerase, DNA polymerase from *Bacillus stearothermophilus*, Bst 2.0 DNA polymerase, 9° N polymerase, 9° N polymerase (exo-)A485L/Y409V, Phi29 DNA Polymerase (φ29 DNA Polymerase), T7 DNA polymerase, DNA polymerase II, DNA polymerase III holoenzyme, DNA polymerase IV, DNA polymerase V, VentR DNA polymerase, Therminator™ II DNA Polymerase, Therminator™ III DNA Polymerase, or Therminator™ IX DNA Polymerase. In embodiments, the polymerase is a protein polymerase.

The phrase "stringent hybridization conditions" refers to conditions under which a primer will hybridize to its target subsequence, typically in a complex mixture of nucleic acids, but to no other sequences. Stringent conditions are sequence-dependent and will be different in different circumstances. Longer sequences hybridize specifically at higher temperatures. An extensive guide to the hybridization of nucleic acids is found in Tijssen, *Techniques in Biochemistry and Molecular Biology—Hybridization with Nucleic Probes*, "Overview of principles of hybridization and the strategy of nucleic acid assays" (1993). Generally, stringent conditions are selected to be about 5-10° C. lower than the thermal melting point ($T_m$) for the specific sequence at a defined ionic strength pH. The $T_m$ is the temperature (under defined ionic strength, pH, and nucleic concentration) at which 50% of the probes complementary to the target hybridize to the target sequence at equilibrium (as the target sequences are present in excess, at $T_m$, 50% of the probes are occupied at equilibrium). Stringent conditions may also be achieved with the addition of destabilizing agents such as formamide. For selective or specific hybridization, a positive signal is at least two times background, preferably 10 times background hybridization. Exemplary stringent hybridization conditions can be as following: 50% formamide, 5×SSC, and 1% SDS, incubating at 42° C., or, 5×SSC, 1% SDS, incubating at 65° C., with wash in 0.2×SSC, and 0.1% SDS at 65° C.

"Solid substrate" shall mean any suitable medium present in the solid phase to which a nucleic acid or an agent may be affixed. Non-limiting examples include chips, beads and columns. The solid substrate can be non-porous or porous. Exemplary solid substrates include, but are not limited to, glass and modified or functionalized glass, plastics (including acrylics, polystyrene and copolymers of styrene and other materials, polypropylene, polyethylene, polybutylene, polyurethanes, Teflon™, cyclic olefins, polyimides, etc.), nylon, ceramics, resins, Zeonor, silica or silica-based materials including silicon and modified silicon, carbon, metals, inorganic glasses, optical fiber bundles, and polymers. In embodiments, the solid substrate for have at least one surface located within a flow cell. The solid substrate, or regions thereof, can be substantially flat. The solid substrate can have surface features such as wells, pits, channels, ridges, raised regions, pegs, posts or the like. The term solid substrate is encompassing of a substrate (e.g., a flow cell) having a surface comprising a polymer coating covalently attached thereto. In embodiments, the solid substrate is a flow cell. The term "flow cell" as used herein refers to a chamber including a solid surface across which one or more fluid reagents can be flowed. Examples of flow cells and related fluidic systems and detection platforms that can be readily used in the methods of the present disclosure are described, for example, in Bentley et al., Nature 456:53-59 (2008).

Nucleic acids that do not hybridize to each other under stringent conditions are still substantially identical if the polypeptides which they encode are substantially identical. This occurs, for example, when a copy of a nucleic acid is created using the maximum codon degeneracy permitted by the genetic code. In such cases, the nucleic acids typically hybridize under moderately stringent hybridization conditions. Exemplary "moderately stringent hybridization conditions" include a hybridization in a buffer of 40% formamide, 1 M NaCl, 1% SDS at 37° C., and a wash in 1×SSC at 45° C. A positive hybridization is at least twice background. Those of ordinary skill will readily recognize that alternative hybridization and wash conditions can be utilized to provide conditions of similar stringency. Additional guidelines for determining hybridization parameters are provided in numerous references, e.g., *Current Protocols in Molecular Biology*, ed. Ausubel, et al., supra.

Where a range of values is provided herein, it is understood that each intervening value, to the tenth of the unit (if appropriate) of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

While various embodiments of the invention are shown and described herein, it will be understood by those skilled in the art that such embodiments are provided by way of example only. Numerous variations, changes, and substitutes may occur to those skilled in the art without departing from the invention. It should be understood that various alternatives to the embodiments of the invention described herein may be employed.

As used herein, and unless stated otherwise, each of the following terms shall be used in accordance with their plain and ordinary meaning, for example: A indicates the presence of Adenine; C indicates the presence of Cytosine; DNA is Deoxyribonucleic acid; G indicates the presence of Guanine; RNA is Ribonucleic acid; T indicates the presence of Thymine; and U indicates the presence of Uracil. In embodiments, each of the following terms shall have the definition set forth below A—Adenine; C—Cytosine; DNA—Deoxyribonucleic acid; G—Guanine; RNA—Ribonucleic acid; T—Thymine; and U—Uracil.

The term "reaction vessel" is used in accordance with its ordinary meaning in chemistry or chemical engineering, and refers to a container having an inner volume in which a reaction takes place. In embodiments, the reaction vessel may be designed to provide suitable reaction conditions such as reaction volume, reaction temperature or pressure, and stirring or agitation, which may be adjusted to ensure that the reaction proceeds with a desired, sufficient or highest efficiency for producing a product from the chemical reaction. In embodiments, the reaction vessel is a container for liquid, gas or solid. In embodiments, the reaction vessel may include an inlet, an outlet, a reservoir and the like. In embodiments, the reaction vessel is connected to a pump (e.g., vacuum pump), a controller (e.g., CPU), or a monitoring device (e.g., UV detector or spectrophotometer).

A person of ordinary skill in the art will understand when a variable (e.g., moiety or linker) of a compound or of a compound genus (e.g., a genus described herein) is described by a name or formula of a standalone compound with all valencies filled, the unfilled valence(s) of the variable will be dictated by the context in which the variable is used. For example, when a variable of a compound as described herein is connected (e.g., bonded) to the remainder of the compound through a single bond, that variable is understood to represent a monovalent form (i.e., capable of forming a single bond due to an unfilled valence) of a standalone compound (e.g., if the variable is named "methane" in an embodiment but the variable is known to be attached by a single bond to the remainder of the compound, a person of ordinary skill in the art would understand that the variable is actually a monovalent form of methane, i.e., methyl or $—CH_3$). Likewise, for a linker variable (e.g., $L^1$, $L^2$, or $L^3$ as described herein), a person of ordinary skill in the art will understand that the variable is the divalent form of a standalone compound (e.g., if the variable is assigned to "PEG" or "polyethylene glycol" in an embodiment but the variable is connected by two separate bonds to the remainder of the compound, a person of ordinary skill in the art would understand that the variable is a divalent (i.e., capable of forming two bonds through two unfilled valences) form of PEG instead of the standalone compound PEG).

As used herein, the term "kit" refers to any delivery system for delivering materials. In the context of reaction assays, such delivery systems include systems that allow for the storage, transport, or delivery of reaction reagents (e.g., oligonucleotides, enzymes, etc. in the appropriate containers) and/or supporting materials (e.g., packaging, buffers, written instructions for performing a method, etc.) from one location to another. For example, kits include one or more enclosures (e.g., boxes) containing the relevant reaction reagents and/or supporting materials. As used herein, the term "fragmented kit" refers to a delivery system comprising two or more separate containers that each contain a subportion of the total kit components. The containers may be delivered to the intended recipient together or separately. For example, a first container may contain an enzyme for use in an assay, while a second container contains oligonucleotides. In contrast, a "combined kit" refers to a delivery system containing all of the components of a reaction assay in a single container (e.g., in a single box housing each of the desired components). The term "kit" includes both fragmented and combined kits. In embodiments, the kit includes, without limitation, nucleic acid primers, probes, adapters, enzymes, and the like, and are each packaged in a container, such as, without limitation, a vial, tube or bottle, in a package suitable for commercial distribution, such as, without limitation, a box, a sealed pouch, a blister pack and a carton. The package typically contains a label or packaging insert indicating the uses of the packaged materials. As used herein, "packaging materials" includes any article used in the packaging for distribution of reagents in a kit, including without limitation containers, vials, tubes, bottles, pouches, blister packaging, labels, tags, instruction sheets and package inserts.

As used herein, the terms "sequencing", "sequence determination", and "determining a nucleotide sequence", are used in accordance with their ordinary meaning in the art, and refer to determination of partial as well as full sequence information of the nucleic acid being sequenced, and particular physical processes for generating such sequence information. That is, the term includes sequence comparisons, fingerprinting, and like levels of information about a target nucleic acid, as well as the express identification and ordering of nucleotides in a target nucleic acid. The term also includes the determination of the identification, ordering, and locations of one, two, or three of the four types of nucleotides within a target nucleic acid.

As used herein, the term "extension" or "elongation" is used in accordance with its plain and ordinary meanings and refer to synthesis by a polymerase of a new polynucleotide strand complementary to a template strand by adding free nucleotides (e.g., dNTPs) from a reaction mixture that are complementary to the template in the 5'-to-3' direction. Extension includes condensing the 5'-phosphate group of the dNTPs with the 3'-hydroxy group at the end of the nascent (elongating) polynucleotide strand.

As used herein, the term "sequencing read" is used in accordance with its plain and ordinary meaning and refers to an inferred sequence of nucleotide bases (or nucleotide base probabilities) corresponding to all or part of a single polynucleotide fragment. A sequencing read may include 10, 20, 30, 40, 50, 60, 70, 80, 90, 100, 150, 200, 250, or more nucleotide bases. In embodiments, a sequencing read includes reading a barcode sequence and a template nucleotide sequence. In embodiments, a sequencing read includes reading a template nucleotide sequence. In embodiments, a sequencing read includes reading a barcode and not a template nucleotide sequence.

A "reducing agent" or "reductant" refers to a compound that loses electrons and is oxidized in a chemical reaction. A reducing agent is typically in a lower possible oxidation states, and is referred to as an electron donor. A reducing agent is oxidized following contact with an oxidant, because it loses electrons in the redox reaction. In contrast, an "oxidizing agent" or "oxidant" is a compound that gains electrons and is reduced in a chemical reaction. Also referred to as an electron acceptor, the oxidizing agent is typically in a higher oxidation states because it will gain electrons and be reduced.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

II. Compositions & Kits

In an aspect is provided a compound having the formula:

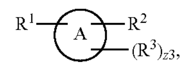

wherein Ring A is a cycloalkyl, heterocycloalkyl, aryl, or heteroaryl. $R^1$, $R^2$, $R^3$, and z3 are as described herein, including in embodiments.

In an aspect is provided a compound having the formula:

(I)

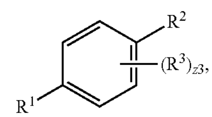

(II)

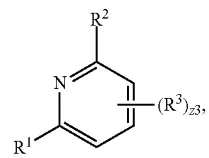

(III)

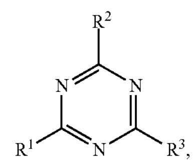

(IV)

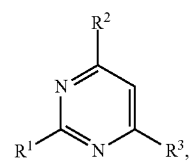

or (V)

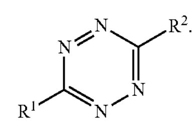

In embodiments, the compound has the formula (III)

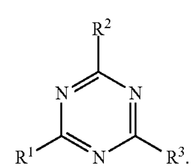

$R^1$ is —$W^1$-$L^1$-$R^4$. $R^2$ is halogen or —$W^2$-$L^2$-$R^5$. $R^3$ is halogen or —$W^3$-$L^3$-$R^6$. $W^1$, $W^2$, and $W^3$ are each independently a bond, —O—, —S—, or —NH—. $L^1$, $L^2$, and $L^3$ are each independently a bond, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene. $R^4$ is —OH, —$NH_2$, —COOH, —$CONH_2$, —SH, —$SO_3H$, —$SO_4H$, —$SO_2NH_2$, or

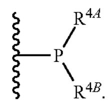

$R^5$ is hydrogen, a bioconjugate moiety, —OH, —$NH_2$, —COOH, —$CONH_2$, —SH, —$SO_3H$, —$SO_4H$, —$SO_2NH_2$, or

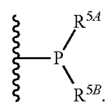

$R^6$ is hydrogen, a bioconjugate moiety, —OH, $NH_2$, —COOH, —$CONH_2$, —SH, —$SO_3H$, —$SO_4H$, —$SO_2NH_2$, or

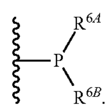

$R^{4A}$, $R^{4B}$, $R^{5A}$, $R^{5B}$, $R^{6A}$, and $R^{6B}$ are each independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl. The symbol z3 is an integer from 0 to 4. In embodiments, z3 is 1.

In embodiments, Ring A is an aryl or heteroaryl. In embodiments, Ring A is

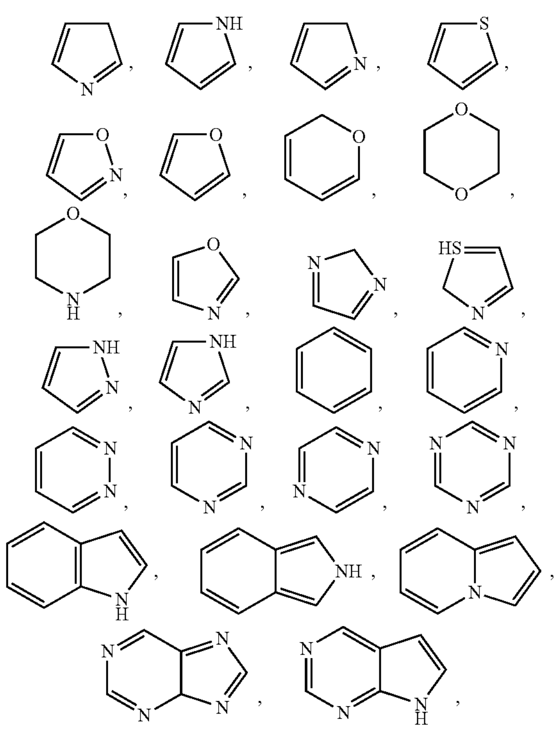

-continued

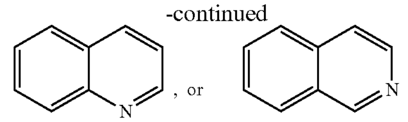

In embodiments, Ring A is optionally further substituted with a substituent group (e.g., oxo) in addition to being substituted with $R^1$, $R^2$, and $R^3$, are as described herein. In embodiments, Ring A has the formula:

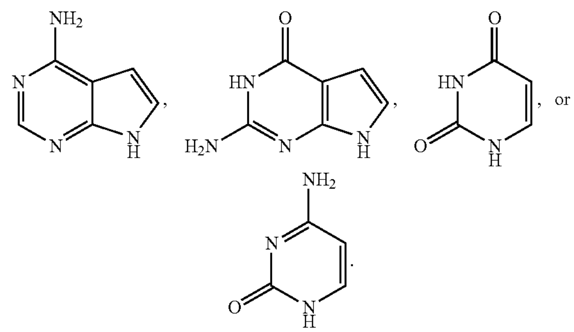

In embodiments, the compound has the formula (Ia)

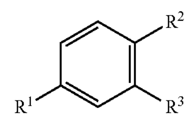

or (Ib)

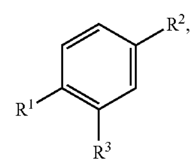

wherein $R^1$, $R^2$, and $R^3$, are as described herein. In embodiments, the compound has the formula

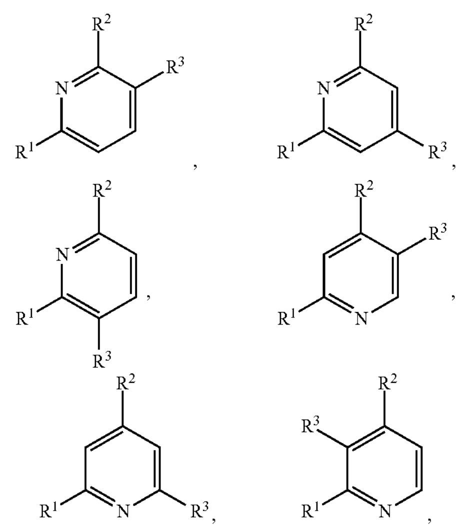

-continued

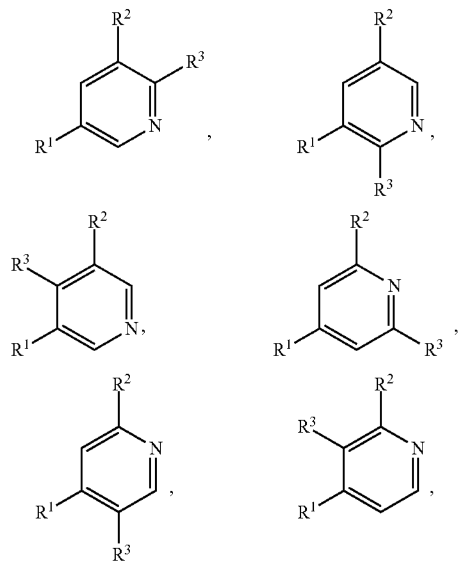

wherein $R^1$, $R^2$, and $R^3$, are as described herein. In embodiments, the compound has the formula (III)

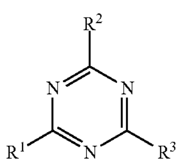

or (IV)

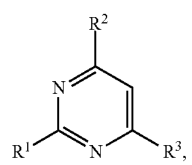

wherein $R^1$, $R^2$, and $R^3$, are as described herein. In embodiments, the compound has the formula (III)

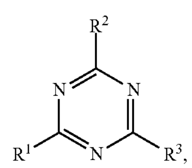

wherein $R^1$, $R^2$, and $R^3$, are as described herein. In embodiments, the compound has the formula:

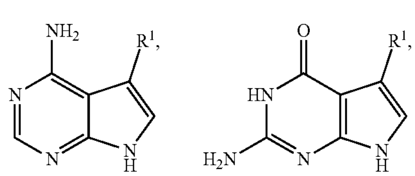

-continued

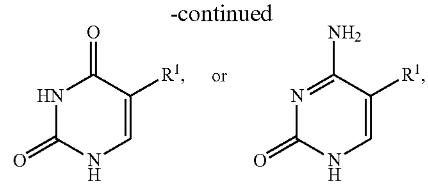

wherein $R^1$ is as described herein. In embodiments, the compound has the formula:

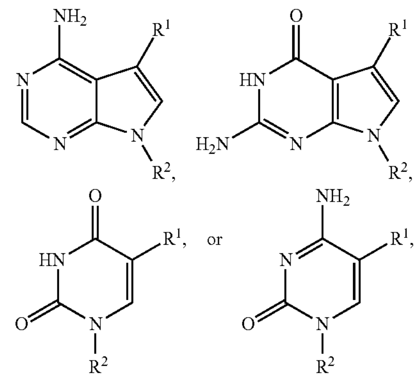

wherein $R^1$ and $R^2$ are as described herein.

In embodiments, $W^1$, $W^2$, and $W^3$ are each —O—. In embodiments, $W^1$, $W^2$, and $W^3$ are each —S—. In embodiments, $W^1$, $W^2$, and $W^3$ are each —NH—. In embodiments, $W^2$ and $W^3$ are each a bond. In embodiments, $W^1$ is —O—. In embodiments, $W^1$ is —S—. In embodiments, $W^1$ is —NH—. In embodiments, $W^1$ is a bond. In embodiments, $W^2$ is —O—. In embodiments, $W^2$ is —S—. In embodiments, $W^2$ is —NH—. In embodiments, $W^2$ is a bond. In embodiments, $W^3$ is —O—. In embodiments, $W^3$ is —S—. In embodiments, $W^3$ is —NH—. In embodiments, $W^3$ is a bond.

In embodiments, $L^1$, $L^2$, and $L^3$ are each independently substituted or unsubstituted alkylene, or substituted or unsubstituted heteroalkylene. In embodiments, $L^1$, $L^2$, and $L^3$ are each independently unsubstituted alkylene. In embodiments, $L^1$, $L^2$, and $L^3$ are each independently unsubstituted $C_1$ to $C_8$ alkylene. In embodiments, $L^1$, $L^2$, and $L^3$ are each independently unsubstituted $C_1$ to $C_4$ alkylene.

In embodiments, $L^1$ is $R^{1A}$-substituted or unsubstituted alkylene (e.g., $C_1$-$C_{20}$, $C_{10}$-$C_{20}$, $C_1$-$C_8$, $C_1$-$C_6$, or $C_1$-$C_4$), or $R^{1A}$-substituted or unsubstituted heteroalkylene (e.g., 2 to 20, 8 to 20, 2 to 10, 2 to 8, 2 to 6, or 2 to 4 membered). In embodiments, $L^1$ is substituted or unsubstituted alkylene (e.g., $C_1$-$C_{20}$, $C_{10}$-$C_{20}$, $C_1$-$C_8$, $C_1$-$C_6$, or $C_1$-$C_4$), substituted or unsubstituted heteroalkylene (e.g., 2 to 20, 8 to 20, 2 to 10, 2 to 8, 2 to 6, or 2 to 4 membered), or substituted or unsubstituted alkenylene (e.g., $C_2$-$C_6$ alkenylene or $C_2$-$C_4$ alkenylene).

In embodiments, $L^1$ is unsubstituted $C_1$-$C_6$ or $C_1$-$C_4$ alkylene. In embodiments, $L^1$ is unsubstituted $C_1$-$C_4$ alkylene. In embodiments, $L^1$ is unsubstituted $C_1$-$C_6$ alkylene. In embodiments, $L^1$ is unsubstituted methylene. In embodiments, $L^1$ is unsubstituted $C_2$ alkylene. In embodiments, $L^1$ is unsubstituted $C_3$ alkylene. In embodiments, $L^1$ is unsubstituted $C_4$ alkylene. In embodiments, $L^1$ is unsubstituted $C_5$ alkylene. In embodiments, $L^1$ is unsubstituted $C_6$ alkylene. In embodiments, $L^1$ is $R^{1A}$-substituted $C_1$-$C_6$ or $C_1$-$C_4$ alkylene. In embodiments, $L^1$ is $R^{1A}$-substituted $C_1$-$C_4$ alkylene. In embodiments, $L^1$ is $R^{1A}$-substituted $C_1$-$C_6$ alkylene. In embodiments, $L^1$ is $R^{1A}$-substituted methylene. In embodiments, $L^1$ is $R^{1A}$-substituted $C_2$ alkylene. In embodiments, $L^1$ is $R^{1A}$-substituted $C_3$ alkylene. In embodiments, $L^1$ is $R^{1A}$-substituted $C_4$ alkylene. In embodiments, $L^1$ is $R^{1A}$-substituted $C_5$ alkylene. In embodiments, $L^1$ is $R^{1A}$-substituted $C_6$ alkylene. In embodiments, $L^1$ is $R^{1A}$-substituted 2 to 10 membered heteroalkylene. In embodiments, $L^1$ is $R^{1A}$-substituted 2 to 8 membered heteroalkylene. In embodiments, $L^1$ is $R^{1A}$-substituted 2 to 6 membered heteroalkylene. In embodiments, $L^1$ is $R^{1A}$-substituted 2 to 4 membered heteroalkylene. In embodiments, $L^1$ is an unsubstituted 2 to 10 membered heteroalkylene. In embodiments, $L^1$ is an unsubstituted 2 to 8 membered heteroalkylene. In embodiments, $L^1$ is an unsubstituted 2 to 6 membered heteroalkylene. In embodiments, $L^1$ is an unsubstituted 2 to 4 membered heteroalkylene. In embodiments, $L^1$ is unsubstituted $C_2$-$C_6$ alkenylene or $C_2$-$C_4$ alkenylene. In embodiments, $L^1$ is unsubstituted $C_2$ alkenylene. In embodiments, $L^1$ is unsubstituted $C_3$ alkenylene. In embodiments, $L^1$ is unsubstituted $C_4$ alkenylene. In embodiments, $L^1$ is unsubstituted $C_5$ alkenylene. In embodiments, $L^1$ is unsubstituted $C_6$ alkenylene. In embodiments, $L^1$ is $R^{1A}$-substituted $C_2$-$C_6$ or $C_2$-$C_4$ alkenylene. In embodiments, $L^1$ is $R^{1A}$-substituted $C_2$-$C_4$ alkenylene. In embodiments, $L^1$ is $R^{1A}$-substituted $C_2$-$C_6$ alkenylene. In embodiments, $L^1$ is $R^{1A}$-substituted $C_2$ alkenylene. In embodiments, $L^1$ is $R^{1A}$-substituted $C_3$ alkenylene. In embodiments, $L^1$ is $R^{1A}$-substituted $C_4$ alkenylene. In embodiments, $L^1$ is $R^{1A}$-substituted $C_5$ alkenylene. In embodiments, $L^1$ is $R^{1A}$-substituted $C_6$ alkenylene. In embodiments, $L^1$ is $R^{1A}$-substituted 2 to 10 membered heteroalkenylene. In embodiments, $L^1$ is $R^{1A}$-substituted 2 to 8 membered heteroalkenylene. In embodiments, $L^1$ is $R^{1A}$-substituted 2 to 6 membered heteroalkenylene. In embodiments, $L^1$ is $R^{1A}$-substituted 2 to 4 membered heteroalkenylene. In embodiments, $L^1$ is an unsubstituted 2 to 10 membered heteroalkenylene. In embodiments, $L^1$ is an unsubstituted 2 to 8 membered heteroalkenylene. In embodiments, $L^1$ is an unsubstituted 2 to 6 membered heteroalkenylene. In embodiments, $L^1$ is an unsubstituted 2 to 4 membered heteroalkenylene.

$R^{1A}$ is independently oxo, halogen, —$CCl_3$, —$CBr_3$, —$CF_3$, —$CI_3$, —$CHCl_2$, —$CHBr_2$, —$CHF_2$, —$CH_2Cl$, —$CH_2Br$, —$CH_2I$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, —$SF_5$, —$NH_3^+$, —$SO_3^-$, —$OPO_3H^-$, —SCN, —$ONO_2$, unsubstituted alkyl (e.g., $C_1$-$C_{20}$, $C_{10}$-$C_{20}$, $C_1$-$C_8$, $C_1$-$C_6$, or $C_1$-$C_4$), unsubstituted heteroalkyl (e.g., 2 to 20, 8 to 20, 2 to 10, 2 to 8, 2 to 6, or 2 to 4 membered), unsubstituted cycloalkyl (e.g., $C_3$-$C_8$, $C_3$-$C_6$, or $C_5$-$C_6$), unsubstituted heterocycloalkyl (e.g., 3 to 8, 3 to 6, or 5 to 6 membered), unsubstituted aryl (e.g., $C_6$-$C_{10}$, $C_{10}$, or phenyl), or unsubstituted heteroaryl (e.g., 5 to 10, 5 to 9, or 5 to 6 membered).

In embodiments, $L^1$ is $R^{1A}$-substituted or unsubstituted alkylene, $R^{1A}$-substituted or unsubstituted heteroalkylene, $R^{1A}$-substituted or unsubstituted cycloalkylene, $R^{1A}$-substituted or unsubstituted heterocycloalkylene, $R^{1A}$-substituted or unsubstituted arylene, or $R^{1A}$-substituted or unsubstituted heteroarylene. In embodiments, $L^1$ is $R^{1A}$-substituted or unsubstituted alkylene, or $R^{1A}$-substituted or unsubstituted heteroalkylene. In embodiments, $L^1$ is unsubstituted alkylene, or unsubstituted heteroalkylene. In embodiments, $R^1$ is

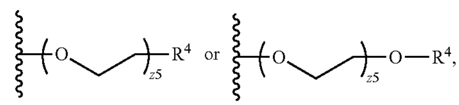

wherein $R^4$ is as described herein, and z5 is an integer from 1 to 20. In embodiments, $R^1$ is

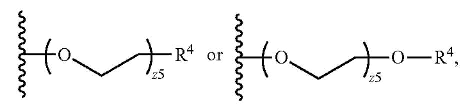

wherein $R^4$ is as described herein, and z5 is an integer from 1 to 20. In embodiments, z5 is 1, 2, 3, 4, 5, 6, 7, or 8.

In embodiments, $L^2$ is $R^{2A}$-substituted or unsubstituted alkylene (e.g., $C_1$-$C_{20}$, $C_{10}$-$C_{20}$, $C_1$-$C_8$, $C_1$-$C_6$, or $C_1$-$C_4$), or $R^{2A}$-substituted or unsubstituted heteroalkylene (e.g., 2 to 20, 8 to 20, 2 to 10, 2 to 8, 2 to 6, or 2 to 4 membered). In embodiments, $L^2$ is substituted or unsubstituted alkylene (e.g., $C_1$-$C_{20}$, $C_{10}$-$C_{20}$, $C_1$-$C_8$, $C_1$-$C_6$, or $C_1$-$C_4$), substituted or unsubstituted heteroalkylene (e.g., 2 to 20, 8 to 20, 2 to 10, 2 to 8, 2 to 6, or 2 to 4 membered), or substituted or unsubstituted alkenylene (e.g., $C_2$-$C_6$ alkenylene or $C_2$-$C_4$ alkenylene).

In embodiments, $L^2$ is unsubstituted $C_1$-$C_6$ or $C_1$-$C_4$ alkylene. In embodiments, $L^2$ is unsubstituted $C_1$-$C_4$ alkylene. In embodiments, $L^2$ is unsubstituted $C_1$-$C_6$ alkylene. In embodiments, $L^2$ is unsubstituted methylene. In embodiments, $L^2$ is unsubstituted $C_2$ alkylene. In embodiments, $L^2$ is unsubstituted $C_3$ alkylene. In embodiments, $L^2$ is unsubstituted $C_4$ alkylene. In embodiments, $L^2$ is unsubstituted $C_5$ alkylene. In embodiments, $L^2$ is unsubstituted $C_6$ alkylene. In embodiments, $L^2$ is $R^{2A}$-substituted $C_1$-$C_6$ or $C_1$-$C_4$ alkylene. In embodiments, $L^2$ is $R^{2A}$-substituted $C_1$-$C_4$ alkylene. In embodiments, $L^2$ is $R^{2A}$-substituted $C_1$-$C_6$ alkylene. In embodiments, $L^2$ is $R^{2A}$-substituted methylene. In embodiments, $L^2$ is $R^{2A}$-substituted $C_2$ alkylene. In embodiments, $L^2$ is $R^{2A}$-substituted $C_3$ alkylene. In embodiments, $L^2$ is $R^{2A}$-substituted $C_4$ alkylene. In embodiments, $L^2$ is $R^{2A}$-substituted $C_5$ alkylene. In embodiments, $L^2$ is $R^{2A}$-substituted $C_6$ alkylene. In embodiments, $L^2$ is $R^{2A}$-substituted 2 to 10 membered heteroalkylene. In embodiments, $L^2$ is $R^{2A}$-substituted 2 to 8 membered heteroalkylene. In embodiments, $L^2$ is $R^{2A}$-substituted 2 to 6 membered heteroalkylene. In embodiments, $L^2$ is $R^{2A}$-substituted 2 to 4 membered heteroalkylene. In embodiments, $L^2$ is an unsubstituted 2 to 10 membered heteroalkylene. In embodiments, $L^2$ is an unsubstituted 2 to 8 membered heteroalkylene. In embodiments, $L^2$ is an unsubstituted 2 to 6 membered heteroalkylene. In embodiments, $L^2$ is an unsubstituted 2 to 4 membered heteroalkylene. In embodiments, $L^2$ is unsubstituted $C_2$-$C_6$ alkenylene or $C_2$-$C_4$ alkenylene. In embodiments, $L^2$ is unsubstituted $C_2$ alkenylene. In embodiments, $L^2$ is unsubstituted $C_3$ alkenylene. In embodiments, $L^2$ is unsubstituted $C_4$ alkenylene. In embodiments, $L^2$ is unsubstituted $C_5$ alkenylene. In embodiments, $L^2$ is unsubstituted $C_6$ alkenylene. In embodiments, $L^2$ is $R^{2A}$-substituted $C_2$-$C_6$ or $C_2$-$C_4$ alkenylene. In embodiments, $L^2$ is $R^{2A}$-substituted $C_2$-$C_4$ alkenylene. In embodiments, $L^2$ is $R^{2A}$-substituted $C_2$-$C_6$ alkenylene. In embodiments, $L^2$ is $R^{2A}$-substituted $C_2$ alkenylene. In embodiments, $L^2$ is $R^{2A}$-substituted $C_3$ alkenylene. In embodiments, $L^2$ is $R^{2A}$-substituted $C_4$ alkenylene. In embodiments, $L^2$ is $R^{2A}$-substituted $C_5$ alkenylene. In embodiments, $L^2$ is $R^{2A}$-substituted $C_6$ alkenylene. In embodiments, $L^2$ is $R^{2A}$-substituted 2 to 10 membered heteroalkenylene. In embodiments, $L^2$ is $R^{2A}$-substituted 2 to 8 membered heteroalkenylene. In embodiments, $L^2$ is $R^{2A}$-substituted 2 to 6 membered heteroalkenylene. In embodiments, $L^2$ is $R^{2A}$-substituted 2 to 4 membered heteroalkenylene. In embodiments, $L^2$ is an unsubstituted 2 to 10 membered heteroalkenylene. In embodiments, $L^2$ is an unsubstituted 2 to 8 membered heteroalkenylene. In embodiments, $L^2$ is an unsubstituted 2 to 6 membered heteroalkenylene. In embodiments, $L^2$ is an unsubstituted 2 to 4 membered heteroalkenylene.

$R^{2A}$ is independently oxo, halogen, —$CCl_3$, —$CBr_3$, —$CF_3$, —$CI_3$, —$CHCl_2$, —$CHBr_2$, —$CHF_2$, —$CH_2Cl$, —$CH_2Br$, —$CH_2I$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —$NHC(O)NHNH_2$, —$NHC(O)NH_2$, —$NHSO_2H$, —NHC(O)H, —NHC(O)OH, —NHOH, —$OCCl_3$, —$OCBr_3$, —$OCl_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, —$SF_5$, —$NH_3^+$, —$SO_3^-$, —$OPO_3H^-$, —SCN, —$ONO_2$, unsubstituted alkyl (e.g., $C_1$-$C_{20}$, $C_{10}$-$C_{20}$, $C_1$-$C_8$, $C_1$-$C_6$, or $C_1$-$C_4$), unsubstituted heteroalkyl (e.g., 2 to 20, 8 to 20, 2 to 10, 2 to 8, 2 to 6, or 2 to 4 membered), unsubstituted cycloalkyl (e.g., $C_3$-$C_8$, $C_3$-$C_6$, or $C_5$-$C_6$), unsubstituted heterocycloalkyl (e.g., 3 to 8, 3 to 6, or 5 to 6 membered), unsubstituted arylene (e.g., $C_6$-$C_{10}$, $C_{10}$, or phenyl), or unsubstituted heteroaryl (e.g., 5 to 10, 5 to 9, or 5 to 6 membered).

In embodiments, $L^2$ is $R^{2A}$-substituted or unsubstituted alkylene, $R^{2A}$-substituted or unsubstituted heteroalkylene, $R^{2A}$-substituted or unsubstituted cycloalkylene, $R^{2A}$-substituted or unsubstituted heterocycloalkylene, $R^{2A}$-substituted or unsubstituted arylene, or $R^{2A}$-substituted or unsubstituted heteroarylene. In embodiments, $L^2$ is $R^{2A}$-substituted or unsubstituted alkylene, or $R^{2A}$-substituted or unsubstituted heteroalkylene. In embodiments, $L^2$ is unsubstituted alkylene, or unsubstituted heteroalkylene. In embodiments, -$L^2$-$R^5$ is

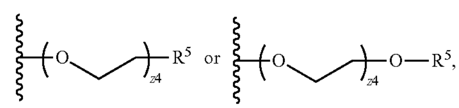

wherein $R^5$ is as described herein, and z4 is an integer from 1 to 20. In embodiments, -$L^2$-$R^5$ is

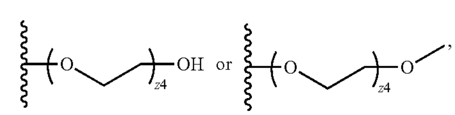

wherein z4 is an integer from 1 to 20. In embodiments, -$L^2$-$R^5$ is

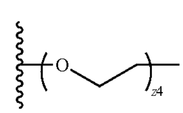

wherein z4 is an integer from 1 to 20. In embodiments, —$W^2$-$L^2$-$R^5$ is

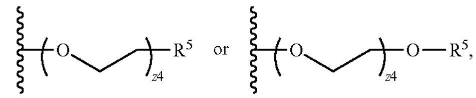

wherein $R^5$ is as described herein, and z4 is an integer from 1 to 20. In embodiments, —$W^2$-$L^2$-$R^5$ is

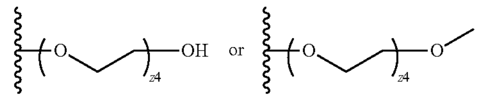

wherein z4 is an integer from 1 to 20. In embodiments, —$W^2$-$L^2$-$R^5$ is

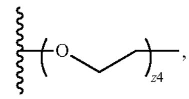

wherein z4 is an integer from 1 to 20. In embodiments, z4 is 1, 2, 3, 4, 5, 6, 7, or 8.

In embodiments, $L^3$ is $R^{3A}$-substituted or unsubstituted alkylene (e.g., $C_1$-$C_{20}$, $C_{10}$-$C_{20}$, $C_1$-$C_8$, $C_1$-$C_6$, or $C_1$-$C_4$), or $R^{3A}$-substituted or unsubstituted heteroalkylene (e.g., 2 to 20, 8 to 20, 2 to 10, 2 to 8, 2 to 6, or 2 to 4 membered). In embodiments, $L^3$ is substituted or unsubstituted alkylene (e.g., $C_1$-$C_{20}$, $C_{10}$-$C_{20}$, $C_1$-$C_8$, $C_1$-$C_6$, or $C_1$-$C_4$), substituted or unsubstituted heteroalkylene (e.g., 2 to 20, 8 to 20, 2 to 10, 2 to 8, 2 to 6, or 2 to 4 membered), or substituted or unsubstituted alkenylene (e.g., $C_2$-$C_6$ alkenylene or $C_2$-$C_4$ alkenylene).

In embodiments, $L^3$ is unsubstituted $C_1$-$C_6$ or $C_1$-$C_4$ alkylene. In embodiments, $L^3$ is unsubstituted $C_1$-$C_4$ alkylene. In embodiments, $L^3$ is unsubstituted $C_1$-$C_6$ alkylene. In embodiments, $L^3$ is unsubstituted methylene. In embodiments, $L^3$ is unsubstituted $C_2$ alkylene. In embodiments, $L^3$ is unsubstituted $C_3$ alkylene. In embodiments, $L^3$ is unsubstituted $C_4$ alkylene. In embodiments, $L^3$ is unsubstituted $C_5$ alkylene. In embodiments, $L^3$ is unsubstituted $C_6$ alkylene. In embodiments, $L^3$ is $R^{3A}$-substituted $C_1$-$C_6$ or $C_1$-$C_4$ alkylene. In embodiments, $L^3$ is $R^{3A}$-substituted $C_1$-$C_4$ alkylene. In embodiments, $L^3$ is $R^{3A}$-substituted $C_1$-$C_6$ alkylene. In embodiments, $L^3$ is $R^{3A}$-substituted methylene. In embodiments, $L^3$ is $R^{3A}$-substituted $C_2$ alkylene. In embodiments, $L^3$ is $R^{3A}$-substituted $C_3$ alkylene. In embodiments, $L^3$ is $R^{3A}$-substituted $C_4$ alkylene. In embodiments, $L^3$ is $R^{3A}$-substituted $C_5$ alkylene. In embodiments, $L^3$ is $R^{3A}$-substituted $C_6$ alkylene. In embodiments, $L^3$ is $R^{3A}$-substituted 2 to 10 membered heteroalkylene. In embodiments, $L^3$ is $R^{3A}$-substituted 2 to 8 membered heteroalkylene. In embodiments, $L^3$ is $R^{3A}$-substituted 2 to 6 membered heteroalkylene. In embodiments, $L^3$ is $R^{3A}$-substituted 2 to 4 membered heteroalkylene. In embodiments, $L^3$ is an unsubstituted 2 to 10 membered heteroalkylene. In embodiments, $L^3$ is an unsubstituted 2 to 8 membered heteroalkylene. In embodiments, $L^3$ is an unsubstituted 2 to 6 membered heteroalkylene. In embodiments, $L^3$ is an unsubstituted 2 to 4 membered heteroalkylene. In embodiments, $L^3$ is unsubstituted $C_2$-$C_6$ alkenylene or $C_2$-$C_4$ alkenylene. In embodiments, $L^3$ is unsubstituted $C_2$ alkenylene. In embodiments, $L^3$ is unsubstituted $C_3$ alkenylene. In embodiments, $L^3$ is unsubstituted $C_4$ alkenylene. In embodiments, $L^3$ is unsubstituted $C_5$ alkenylene. In embodiments, $L^3$ is unsubstituted $C_6$ alkenylene. In embodiments, $L^3$ is $R^{3A}$-substituted $C_2$-$C_6$ or $C_2$-$C_4$ alkenylene. In embodiments, $L^3$ is $R^{3A}$-substituted $C_2$-$C_4$ alkenylene. In embodiments, $L^3$ is $R^{3A}$-substituted $C_2$-$C_6$ alkenylene. In embodiments, $L^3$ is $R^{3A}$-substituted $C_2$ alkenylene. In embodiments, $L^3$ is $R^{3A}$-substituted $C_3$ alkenylene. In embodiments, $L^3$ is $R^{3A}$-substituted $C_4$ alkenylene. In embodiments, $L^3$ is $R^{3A}$-substituted $C_5$ alkenylene. In embodiments, $L^3$ is $R^{3A}$-substituted $C_6$ alkenylene. In embodiments, $L^3$ is $R^{3A}$-substituted 2 to 10 membered heteroalkenylene. In embodiments, $L^3$ is $R^{3A}$-substituted 2 to 8 membered heteroalkenylene. In embodiments, $L^3$ is $R^{3A}$-substituted 2 to 6 membered heteroalkenylene. In embodiments, $L^3$ is $R^{3A}$-substituted 2 to 4 membered heteroalkenylene. In embodiments, $L^3$ is an unsubstituted 2 to 10 membered heteroalkenylene. In embodiments, $L^3$ is an unsubstituted 2 to 8 membered heteroalkenylene. In embodiments, $L^3$ is an unsubstituted 2 to 6 membered heteroalkenylene. In embodiments, $L^3$ is an unsubstituted 2 to 4 membered heteroalkenylene.

$R^{3A}$ is independently oxo, halogen, —$CCl_3$, —$CBr_3$, —$CF_3$, —$CI_3$, —$CHCl_2$, —$CHBr_2$, —$CHF_2$, —$CH_2Cl$, —$CH_2Br$, —$CH_2I$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, —$SF_5$, —$NH_3^+$, —$SO_3^-$, —$OPO_3H^-$, —SCN, —$ONO_2$, unsubstituted alkyl (e.g., $C_1$-$C_{20}$, $C_{10}$-$C_{20}$, $C_1$-$C_8$, $C_1$-$C_6$, or $C_1$-$C_4$), unsubstituted heteroalkyl (e.g., 2 to 20, 8 to 20, 2 to 10, 2 to 8, 2 to 6, or 2 to 4 membered), unsubstituted cycloalkyl (e.g., $C_3$-$C_8$, $C_3$-$C_6$, or $C_5$-$C_6$), unsubstituted heterocycloalkyl (e.g., 3 to 8, 3 to 6, or 5 to 6 membered), unsubstituted aryl (e.g., $C_6$-$C_{10}$, $C_{10}$, or phenyl), or unsubstituted heteroaryl (e.g., 5 to 10, 5 to 9, or 5 to 6 membered).

In embodiments, $L^3$ is $R^{3A}$-substituted or unsubstituted alkylene, $R^{3A}$-substituted or unsubstituted heteroalkylene, $R^{3A}$-substituted or unsubstituted cycloalkylene, $R^{3A}$-substituted or unsubstituted heterocycloalkylene, $R^{3A}$-substituted or unsubstituted arylene, or $R^{3A}$-substituted or unsubstituted heteroarylene. In embodiments, $L^3$ is $R^{3A}$-substituted or unsubstituted alkylene, or $R^{3A}$-substituted or unsubstituted heteroalkylene. In embodiments, $L^3$ is unsubstituted alkylene, or unsubstituted heteroalkylene. In embodiments, $R^3$ is

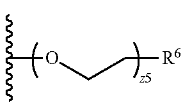
or
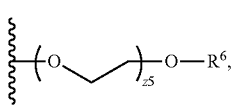

wherein $R^6$ is as described herein, and z5 is an integer from 1 to 20. In embodiments, $R^3$ is

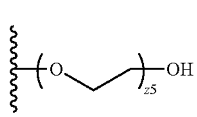
or
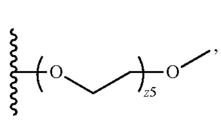

wherein z5 is an integer from 1 to 20. In embodiments, $R^3$ is

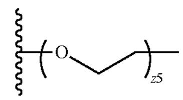

wherein z5 is an integer from 1 to 20. In embodiments, —$W^3$-$L^3$-$R^6$ is

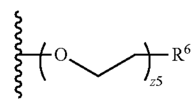
or
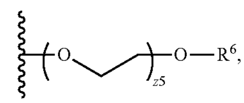

wherein $R^6$ is as described herein, and z5 is an integer from 1 to 20. In embodiments, —$W^3$-$L^3$-$R^6$ is

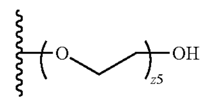
or
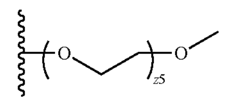

wherein z5 is an integer from 1 to 20. In embodiments, $W^3$-$L^3$-$R^6$ is

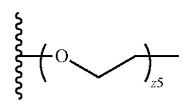

wherein z5 is an integer from 1 to 20. In embodiments, z5 is 1, 2, 3, 4, 5, 6, 7, or 8.

In embodiments, $R^4$ is

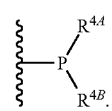

$R^{4A}$ and $R^{4B}$ are independently substituted or unsubstituted alkyl (e.g., $C_1$-$C_{20}$, $C_{10}$-$C_{20}$, $C_1$-$C_8$, $C_1$-$C_6$, or $C_1$-$C_4$), substituted or unsubstituted heteroalkyl (e.g., 2 to 20, 8 to 20, 2 to 10, 2 to 8, 2 to 6, or 2 to 4 membered), substituted or unsubstituted cycloalkyl (e.g., $C_3$-$C_8$, $C_3$-$C_6$, or $C_5$-$C_6$), substituted or unsubstituted heterocycloalkyl (e.g., 3 to 8, 3 to 6, or 5 to 6 membered), substituted or unsubstituted aryl (e.g., $C_6$-$C_{10}$, $C_{10}$, or phenyl), or substituted or unsubstituted heteroaryl (e.g., 5 to 10, 5 to 9, or 5 to 6 membered). In embodiments, $R^{4A}$ is $R^7$-substituted or unsubstituted alkyl, $R^7$-substituted or unsubstituted heteroalkyl, $R^7$-substituted or unsubstituted cycloalkyl, $R^7$-substituted or unsubstituted heterocycloalkyl, $R^7$-substituted or unsubstituted aryl, or $R^7$-substituted or unsubstituted heteroaryl. $R^7$ is independently oxo, halogen, —$CF_3$, —$CCl_3$, —$CI_3$, —$CBr_3$, —$CHF_2$, —$CHCl_2$, —$CHI_2$, —$CHBr_2$, —$CH_2F$, —$CH_2Cl$, —$CH_2I$, —$CH_2Br$, —$OCH_2F$, —$OCH_2Cl$, —$OCH_2I$, —$OCH_2Br$, —$OCHF_2$, —$OCHCl_2$, —$OCHI_2$, —$OCHBr_2$, —$OCF_3$, —$OCCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC═(O)$NHNH_2$, —NHC═(O)$NH_2$, —$NHSO_2H$, —NHC═(O)H, —NHC(O)OH, —NHOH, —$PO_4H$, —$PO_3H$, —$N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{10}$ or phenyl), or unsubstituted heteroaryl (e.g., 5 to 10 membered, 5 to 9 membered, or 5 to 6 membered). In embodiments, $R^7$ is independently —$PO_3H$, —$PO_4H$, —$SO_2NH_2$, —$SO_3H$, or —$SO_4H$. In embodiments, $R^7$ is independently —$SO_3H$. In embodiments, $R^7$ is independently —$PO_3H$. In embodiments, $R^7$ is independently —$SO_2NH_2$. In embodiments, $R^7$ is independently —$SO_4H$. In embodiments, $R^7$ is independently —$PO_4H$. In embodiments, $R^7$ is independently —$NH_2$. In embodiments, $R^7$ is independently —COOH. In embodiments, $R^7$ is independently —OH.

In embodiments, $R^{4A}$ is substituted or unsubstituted $C_1$-$C_6$ alkyl. In embodiments, $R^{4A}$ is substituted or unsubstituted $C_1$-$C_6$ alkyl. In embodiments, $R^{4A}$ is substituted or unsubstituted $C_1$ alkyl. In embodiments, $R^{4A}$ is substituted or unsubstituted $C_2$ alkyl. In embodiments, $R^{4A}$ is substituted or unsubstituted $C_3$ alkyl. In embodiments, $R^{4A}$ is substituted or unsubstituted $C_4$ alkyl. In embodiments, $R^{4A}$ is substituted or unsubstituted $C_5$ alkyl. In embodiments, $R^{4A}$ is substituted or unsubstituted $C_6$ alkyl. In embodiments, $R^{4A}$ is substituted $C_1$ alkyl. In embodiments, $R^{4A}$ is substituted C2 alkyl. In embodiments, $R^{4A}$ is substituted $C_3$ alkyl. In embodiments, $R^{4A}$ is substituted $C_4$ alkyl. In embodiments, $R^{4A}$ is substituted $C_5$ alkyl. In embodiments, $R^{4A}$ is substituted $C_6$ alkyl. In embodiments, $R^{4A}$ is unsubstituted $C_1$ alkyl. In embodiments, $R^{4A}$ is unsubstituted $C_2$ alkyl. In embodiments, $R^{4A}$ is unsubstituted $C_3$ alkyl. In embodiments, $R^{4A}$ is unsubstituted $C_4$ alkyl. In embodiments, $R^{4A}$ is unsubstituted $C_5$ alkyl. In embodiments, $R^{4A}$ is unsubstituted $C_6$ alkyl.

In embodiments, $R^{4B}$ is $R^8$-substituted or unsubstituted alkyl, $R^8$-substituted or unsubstituted heteroalkyl, $R^8$-substituted or unsubstituted cycloalkyl, $R^8$-substituted or unsubstituted heterocycloalkyl, $R^8$-substituted or unsubstituted aryl, or $R^8$-substituted or unsubstituted heteroaryl. $R^8$ is independently oxo, halogen, —$CF_3$, —$CCl_3$, —$CI_3$, —$CBr_3$, —$CHF_2$, —$CHCl_2$, —$CHI_2$, —$CHBr_2$, —$CH_2F$, —$CH_2Cl$, —$CH_2I$, —$CH_2Br$, —$OCH_2F$, —$OCH_2Cl$, —$OCH_2I$, —$OCH_2Br$, —$OCHF_2$, —$OCHCl_2$, —$OCHI_2$, —$OCHBr_2$, —$OCF_3$, —$OCCl_3$, —$OCl_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC═(O)$NHNH_2$, —NHC═(O)$NH_2$, —$NHSO_2H$, —NHC═(O)H, —NHC(O)OH, —NHOH, —$PO_4H$, —$PO_3H$, —$N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{10}$ or phenyl), or unsubstituted heteroaryl (e.g., 5 to 10 membered, 5 to 9 membered, or 5 to 6 membered). In embodiments, $R^8$ is independently —$PO_3H$, —$PO_4H$, —$SO_2NH_2$, —$SO_3H$, or —$SO_4H$. In embodiments, $R^8$ is independently —$SO_3H$. In embodiments, $R^8$ is independently —$PO_3H$. In embodiments, $R^8$ is independently —$SO_2NH_2$. In embodiments, $R^8$ is independently —$SO_4H$. In embodiments, $R^8$ is independently —$PO_4H$. In embodiments, $R^8$ is independently —$NH_2$. In embodiments, $R^8$ is independently —COOH. In embodiments, $R^8$ is independently —OH.

In embodiments, $R^{4B}$ is substituted or unsubstituted $C_1$-$C_6$ alkyl. In embodiments, $R^{4B}$ is substituted or unsubstituted $C_1$-$C_6$ alkyl. In embodiments, $R^{4B}$ is substituted or unsubstituted $C_1$ alkyl. In embodiments, $R^{4B}$ is substituted or unsubstituted $C_2$ alkyl. In embodiments, $R^{4B}$ is substituted or unsubstituted $C_3$ alkyl. In embodiments, $R^{4B}$ is substituted or unsubstituted $C_4$ alkyl. In embodiments, $R^{4B}$ is substituted or unsubstituted $C_5$ alkyl. In embodiments, $R^{4B}$ is substituted or unsubstituted $C_6$ alkyl. In embodiments, $R^{4B}$ is substituted $C_1$ alkyl. In embodiments, $R^{4B}$ is substituted $C_2$ alkyl. In embodiments, $R^{4B}$ is substituted $C_3$ alkyl. In embodiments, $R^{4B}$ is substituted $C_4$ alkyl. In embodiments, $R^{4B}$ is substituted $C_5$ alkyl. In embodiments, $R^{4B}$ is substituted $C_6$ alkyl. In embodiments, $R^{4B}$ is unsubstituted $C_1$ alkyl. In embodiments, $R^{4B}$ is unsubstituted $C_2$ alkyl. In embodiments, $R^{4B}$ is unsubstituted $C_3$ alkyl. In embodiments, $R^{4B}$ is unsubstituted $C_4$ alkyl. In embodiments, $R^{4B}$ is unsubstituted $C_5$ alkyl. In embodiments, $R^{4B}$ is unsubstituted $C_6$ alkyl.

In embodiments, $R^5$ is

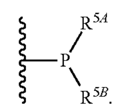

$R^{5A}$ and $R^{5B}$ are independently substituted or unsubstituted alkyl (e.g., $C_1$-$C_{20}$, $C_{10}$-$C_{20}$, $C_1$-$C_8$, $C_1$-$C_6$, or $C_1$-$C_4$), substituted or unsubstituted heteroalkyl (e.g., 2 to 20, 8 to 20, 2 to 10, 2 to 8, 2 to 6, or 2 to 4 membered), substituted or unsubstituted cycloalkyl (e.g., $C_3$-$C_8$, $C_3$-$C_6$, or $C_5$-$C_6$), substituted or unsubstituted heterocycloalkyl (e.g., 3 to 8, 3 to 6, or 5 to 6 membered), substituted or unsubstituted aryl (e.g., $C_6$-$C_{10}$, $C_{10}$, or phenyl), or substituted or unsubstituted heteroaryl (e.g., 5 to 10, 5 to 9, or 5 to 6 membered). In embodiments, $R^{5A}$ is $R^9$-substituted or unsubstituted alkyl, $R^9$-substituted or unsubstituted heteroalkyl, $R^9$-substituted or unsubstituted cycloalkyl, $R^9$-substituted or unsubstituted heterocycloalkyl, $R^9$-substituted or unsubstituted aryl, or $R^9$-substituted or unsubstituted heteroaryl. $R^9$ is independently oxo, halogen, —$CF_3$, —$CCl_3$, —$CI_3$, —$CBr_3$, —$CHF_2$, —$CHCl_2$, —$CHI_2$, —$CHBr_2$, —$CH_2F$, —$CH_2Cl$, —$CH_2I$, —$CH_2Br$, —$OCH_2F$, —$OCH_2Cl$, —$OCH_2I$, —$OCH_2Br$, —$OCHF_2$, —$OCHCl_2$, —$OCHI_2$, —$OCHBr_2$, —$OCF_3$, —$OCCl_3$, —$OCl_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC═(O)$NHNH_2$, —NHC═(O)$NH_2$, —$NHSO_2H$, —NHC═(O)H, —NHC(O)OH, —NHOH, —$PO_4H$, —$PO_3H$, —$N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{10}$ or phenyl), or unsubstituted heteroaryl (e.g., 5 to 10 membered, 5 to 9 membered, or 5 to 6 membered). In embodiments, $R^9$ is independently —$PO_3H$, —$PO_4H$, —$SO_2NH_2$, —$SO_3H$, or —$SO_4H$. In embodiments, $R^9$ is independently —$SO_3H$. In embodiments, $R^9$ is independently —$PO_3H$. In embodiments, $R^9$ is independently —$SO_2NH_2$. In embodiments, $R^9$ is independently —$SO_4H$. In embodiments, $R^9$ is independently —$PO_4H$. In embodiments, $R^9$ is independently —$NH_2$. In embodiments, $R^9$ is independently —COOH. In embodiments, $R^9$ is independently —OH.

In embodiments, $R^{5A}$ is substituted or unsubstituted $C_1$-$C_6$ alkyl. In embodiments, $R^{5A}$ is substituted or unsubstituted $C_1$-$C_6$ alkyl. In embodiments, $R^{5A}$ is substituted or unsubstituted $C_1$ alkyl. In embodiments, $R^{5A}$ is substituted or unsubstituted $C_2$ alkyl. In embodiments, $R^{5A}$ is substituted or unsubstituted $C_3$ alkyl. In embodiments, $R^{5A}$ is substituted or unsubstituted $C_4$ alkyl. In embodiments, $R^{5A}$ is substituted or unsubstituted $C_5$ alkyl. In embodiments, $R^{5A}$ is substituted or unsubstituted $C_6$ alkyl. In embodiments, $R^{5A}$ is substituted $C_1$ alkyl. In embodiments, $R^{5A}$ is substituted $C_2$ alkyl. In embodiments, $R^{5A}$ is substituted $C_3$ alkyl. In embodiments, $R^{5A}$ is substituted $C_4$ alkyl. In embodiments, $R^{5A}$ is substituted $C_5$ alkyl. In embodiments, $R^{5A}$ is substituted $C_6$ alkyl. In embodiments, $R^{5A}$ is unsubstituted $C_1$ alkyl. In embodiments, $R^{5A}$ is unsubstituted $C_2$ alkyl. In embodiments, $R^{5A}$ is unsubstituted $C_3$ alkyl. In embodiments, $R^{5A}$ is unsubstituted $C_4$ alkyl. In embodiments, $R^{5A}$ is unsubstituted $C_5$ alkyl. In embodiments, $R^{5A}$ is unsubstituted $C_6$ alkyl.

In embodiments, $R^{5B}$ is $R^{10}$-substituted or unsubstituted alkyl, $R^{10}$-substituted or unsubstituted heteroalkyl, $R^{10}$-substituted or unsubstituted cycloalkyl, $R^{10}$-substituted or unsubstituted heterocycloalkyl, $R^{10}$-substituted or unsubstituted aryl, or $R^{10}$-substituted or unsubstituted heteroaryl. $R^{5B}$ is independently oxo, halogen, —$CF_3$, —$CCl_3$, —$CI_3$, —$CBr_3$, —$CHF_2$, —$CHCl_2$, —$CHI_2$, —$CHBr_2$, —$CH_2F$, —$CH_2Cl$, —$CH_2I$, —$CH_2Br$, —$OCH_2F$, —$OCH_2Cl$, —$OCH_2I$, —$OCH_2Br$, —$OCHF_2$, —$OCHCl_2$, —$OCHBr_2$, —$OCF_3$, —$OCCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC═(O)$NHNH_2$, —NHC═(O)$NH_2$, —$NHSO_2H$, —NHC═(O)H, —NHC(O)OH, —NHOH, —$PO_4H$, —$PO_3H$, —$N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{10}$ or phenyl), or unsubstituted heteroaryl (e.g., 5 to 10 membered, 5 to 9 membered, or 5 to 6 membered). In embodiments, $R^{10}$ is independently —$PO_3H$, —$PO_4H$, —$SO_2NH_2$, —$SO_3H$, or —$SO_4H$. In embodiments, $R^{10}$ is independently —$SO_3H$. In embodiments, $R^{10}$ is independently —$PO_3H$. In embodiments, $R^{10}$ is independently —$SO_2NH_2$. In embodiments, $R^{10}$ is independently —$SO_4H$. In embodiments, $R^{10}$ is independently —$NH_2$. In embodiments, $R^{10}$ is independently —COOH. In embodiments, $R^{10}$ is independently —OH.

In embodiments, $R^{5B}$ is substituted or unsubstituted $C_1$-$C_6$ alkyl. In embodiments, $R^{5B}$ is substituted or unsubstituted $C_1$-$C_6$ alkyl. In embodiments, $R^{5B}$ is substituted or unsubstituted $C_1$ alkyl. In embodiments, $R^{5B}$ is substituted or unsubstituted $C_2$ alkyl. In embodiments, $R^{5B}$ is substituted or unsubstituted $C_3$ alkyl. In embodiments, $R^{5B}$ is substituted or unsubstituted $C_4$ alkyl. In embodiments, $R^{5B}$ is substituted or unsubstituted $C_5$ alkyl. In embodiments, $R^{5B}$ is substituted or unsubstituted $C_6$ alkyl. In embodiments, $R^{5B}$ is substituted $C_1$ alkyl. In embodiments, $R^{5B}$ is substituted $C_2$ alkyl. In embodiments, $R^{5B}$ is substituted $C_3$ alkyl. In embodiments, $R^{5B}$ is substituted $C_4$ alkyl. In embodiments, $R^{5B}$ is substituted $C_5$ alkyl. In embodiments, $R^{5B}$ is substituted $C_6$ alkyl. In embodiments, $R^{5B}$ is unsubstituted $C_1$ alkyl. In embodiments, $R^{5B}$ is unsubstituted $C_2$ alkyl. In embodiments, $R^{5B}$ is unsubstituted $C_3$ alkyl. In embodiments, $R^{5B}$ is unsubstituted $C_4$ alkyl. In embodiments, $R^{5B}$ is unsubstituted $C_5$ alkyl. In embodiments, $R^{5B}$ is unsubstituted $C_6$ alkyl.

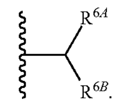

In embodiments, $R^6$ is $R^{6A}$ and $R^{6B}$ are independently substituted or unsubstituted alkyl (e.g., $C_1$-$C_{20}$, $C_{10}$-$C_{20}$, $C_1$-$C_8$, $C_1$-$C_6$, or $C_1$-$C_4$), substituted or unsubstituted heteroalkyl (e.g., 2 to 20, 8 to 20, 2 to 10, 2 to 8, 2 to 6, or 2 to 4 membered), substituted or unsubstituted cycloalkyl (e.g., $C_3$-$C_8$, $C_3$-$C_6$, or $C_5$-$C_6$), substituted or unsubstituted heterocycloalkyl (e.g., 3 to 8, 3 to 6, or 5 to 6 membered), substituted or unsubstituted aryl (e.g., $C_6$-$C_{10}$, $C_{10}$, or phenyl), or substituted or unsubstituted heteroaryl (e.g., 5 to 10, 5 to 9, or 5 to 6 membered). In embodiments, $R^{6A}$ is $R^{11}$ substituted or unsubstituted alkyl, $R^{11}$-substituted or unsubstituted heteroalkyl, $R^{11}$-substituted or unsubstituted cycloalkyl, $R^{11}$-substituted or unsubstituted heterocycloalkyl, $R^{11}$-substituted or unsubstituted aryl, or $R^{11}$-substituted or unsubstituted heteroaryl. $R^{11}$ is independently oxo, halogen, —$CF_3$, —$CCl_3$, —$CI_3$, —$CBr_3$, —$CHF_2$, —$CHCl_2$, —$CHI_2$, —$CHBr_2$, —$CH_2F$, —$CH_2Cl$, —$CH_2I$, —$CH_2Br$, —$OCH_2F$, —$OCH_2Cl$, —$OCH_2I$, —$OCH_2Br$, —$OCHF_2$, —$OCHCl_2$, —$OCHI_2$, —$OCHBr_2$, —$OCF_3$, —$OCCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC═(O)$NHNH_2$, —NHC═(O)$NH_2$, —$NHSO_2H$, —NHC═(O)H, —NHC(O)OH, —NHOH, —$PO_4H$, —$PO_3H$, —$N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{10}$ or phenyl), or unsubstituted heteroaryl (e.g., 5 to 10 membered, 5 to 9 membered, or 5 to 6 membered). In embodiments, $R^{11}$ is independently —$PO_3H$, —$PO_4H$, —$SO_2NH_2$, —$SO_3H$, or —$SO_4H$. In embodiments, is independently —$SO_3H$. In embodiments, $R^{11}$ is independently —$PO_3H$. In embodiments, $R^{11}$ is independently —$SO_2NH_2$. In embodiments, $R^{11}$ is independently —$SO_4H$. In embodiments, $R^{11}$ is independently —$PO_4H$. In embodiments, $R^{11}$ is independently —$NH_2$. In embodiments, $R^{11}$ is independently —COOH. In embodiments, $R^{11}$ is independently —OH.

In embodiments, $R^{6A}$ is substituted or unsubstituted $C_1$-$C_6$ alkyl. In embodiments, $R^{6A}$ is substituted or unsubstituted $C_1$-$C_6$ alkyl. In embodiments, $R^{6A}$ is substituted or unsubstituted $C_1$ alkyl. In embodiments, $R^{6A}$ is substituted or unsubstituted $C_2$ alkyl. In embodiments, $R^{6A}$ is substituted or unsubstituted $C_3$ alkyl. In embodiments, $R^{6A}$ is substituted or unsubstituted $C_4$ alkyl. In embodiments, $R^{6A}$ is substituted or unsubstituted $C_5$ alkyl. In embodiments, $R^{6A}$ is substituted or unsubstituted $C_6$ alkyl. In embodiments, $R^{6A}$ is substituted $C_1$ alkyl. In embodiments, $R^{6A}$ is substituted $C_2$ alkyl. In embodiments, $R^{6A}$ is substituted $C_3$ alkyl. In embodiments, $R^{6A}$ is substituted $C_4$ alkyl. In embodiments, $R^{6A}$ is substituted $C_5$ alkyl. In embodiments, $R^{6A}$ is substituted $C_6$ alkyl. In embodiments, $R^{6A}$ is unsubstituted $C_1$ alkyl. In embodiments, $R^{6A}$ is unsubstituted $C_2$ alkyl. In embodiments, $R^{6A}$ is unsubstituted $C_3$ alkyl. In embodiments, $R^{6A}$ is unsubstituted $C_4$ alkyl. In embodiments, $R^{6A}$ is unsubstituted $C_5$ alkyl. In embodiments, $R^{6A}$ is unsubstituted $C_6$ alkyl.

In embodiments, $R^{6B}$ is $R^{12}$-substituted or unsubstituted alkyl, $R^{12}$-substituted or unsubstituted heteroalkyl, $R^{12}$-substituted or unsubstituted cycloalkyl, $R^{12}$-substituted or unsubstituted heterocycloalkyl, $R^{12}$-substituted or unsubstituted aryl, or $R^{12}$-substituted or unsubstituted heteroaryl. $R^{12}$ is independently oxo, halogen, $—CF_3$, $—CCl_3$, $—CI_3$, $—CBr_3$, $—CHF_2$, $—CHCl_2$, $—CHI_2$, $—CHBr_2$, $—CH_2F$, $—CH_2Cl$, $—CH_2I$, $—CH_2Br$, $—OCH_2F$, $—OCH_2Cl$, $—OCH_2I$, $—OCH_2Br$, $—OCHF_2$, $—OCHCl_2$, $—OCHI_2$, $—OCHBr_2$, $—OCF_3$, $—OCCl_3$, $—OCI_3$, $—OCBr_3$, —CN, —OH, $—NH_2$, —COOH, $—CONH_2$, $—NO_2$, —SH, $—SO_3H$, $—SO_4H$, $—SO_2NH_2$, $—NHNH_2$, $—ONH_2$, $—NHC{=}(O)NHNH_2$, $—NHC{=}(O)NH_2$, $—NHSO_2H$, $—NHC{=}(O)H$, —NHC(O)OH, —NHOH, $—PO_4H$, $—PO_3H$, $—N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{10}$ or phenyl), or unsubstituted heteroaryl (e.g., 5 to 10 membered, 5 to 9 membered, or 5 to 6 membered). In embodiments, $R^{12}$ is independently $—PO_3H$, $—PO_4H$, $—SO_2NH_2$, $—SO_3H$, or $—SO_4H$. In embodiments, $R^{12}$ is independently $—SO_3H$. In embodiments, $R^{12}$ is independently $—PO_3H$. In embodiments, $R^{12}$ is independently $—SO_2NH_2$. In embodiments, $R^{12}$ is independently $—SO_4H$. In embodiments, $R^{12}$ is independently $—PO_4H$. In embodiments, $R^{12}$ is independently $—NH_2$. In embodiments, $R^{12}$ is independently —COOH. In embodiments, $R^{12}$ is independently —OH.

In embodiments, $R^{6B}$ is substituted or unsubstituted $C_1$-$C_6$ alkyl. In embodiments, $R^{6B}$ is substituted or unsubstituted $C_1$-$C_6$ alkyl. In embodiments, $R^{6B}$ is substituted or unsubstituted $C_1$ alkyl. In embodiments, $R^{6B}$ is substituted or unsubstituted $C_2$ alkyl. In embodiments, $R^{6B}$ is substituted or unsubstituted $C_3$ alkyl. In embodiments, $R^{6B}$ is substituted or unsubstituted $C_4$ alkyl. In embodiments, $R^{6B}$ is substituted or unsubstituted $C_5$ alkyl. In embodiments, $R^{6B}$ is substituted or unsubstituted $C_6$ alkyl. In embodiments, $R^{6B}$ is substituted $C_1$ alkyl. In embodiments, $R^{6B}$ is substituted $C_2$ alkyl. In embodiments, $R^{6B}$ is substituted $C_3$ alkyl. In embodiments, $R^{6B}$ is substituted $C_4$ alkyl. In embodiments, $R^{6B}$ is substituted $C_5$ alkyl. In embodiments, $R^{6B}$ is substituted $C_6$ alkyl. In embodiments, $R^{6B}$ is unsubstituted $C_1$ alkyl. In embodiments, $R^{6B}$ is unsubstituted $C_2$ alkyl. In embodiments, $R^{6B}$ is unsubstituted $C_3$ alkyl. In embodiments, $R^{6B}$ is unsubstituted $C_4$ alkyl. In embodiments, $R^{6B}$ is unsubstituted $C_5$ alkyl. In embodiments, $R^{6B}$ is unsubstituted $C_6$ alkyl.

In embodiments, $R^{4A}$ is hydroxy-substituted or unsubstituted $C_1$-$C_6$ alkyl. In embodiments, $R^{4A}$ is hydroxy-substituted or unsubstituted $C_1$-$C_6$ alkyl. In embodiments, $R^{4A}$ is hydroxy-substituted or unsubstituted $C_1$ alkyl. In embodiments, $R^{4A}$ is hydroxy-substituted or unsubstituted $C_2$ alkyl. In embodiments, $R^{4A}$ is hydroxy-substituted or unsubstituted $C_3$ alkyl. In embodiments, $R^{4A}$ is hydroxy-substituted or unsubstituted $C_4$ alkyl. In embodiments, $R^{4A}$ is hydroxy-substituted or unsubstituted $C_5$ alkyl. In embodiments, $R^{4A}$ is hydroxy-substituted or unsubstituted $C_6$ alkyl. In embodiments, $R^{4A}$ is hydroxy-substituted $C_1$ alkyl. In embodiments, $R^{4A}$ is hydroxy-substituted $C_2$ alkyl. In embodiments, $R^{4A}$ is hydroxy-substituted $C_3$ alkyl. In embodiments, $R^{4A}$ is hydroxy-substituted $C_4$ alkyl. In embodiments, $R^{4A}$ is hydroxy-substituted $C_5$ alkyl. In embodiments, $R^{4A}$ is hydroxy-substituted $C_6$ alkyl. In embodiments, $R^{4B}$ is hydroxy-substituted or unsubstituted $C_1$-$C_6$ alkyl. In embodiments, $R^{4B}$ is hydroxy-substituted or unsubstituted $C_1$-$C_6$ alkyl. In embodiments, $R^{4B}$ is hydroxy-substituted or unsubstituted $C_1$ alkyl. In embodiments, $R^{4B}$ is hydroxy-substituted or unsubstituted $C_2$ alkyl. In embodiments, $R^{4B}$ is hydroxy-substituted or unsubstituted $C_3$ alkyl. In embodiments, $R^{4B}$ is hydroxy-substituted or unsubstituted $C_4$ alkyl. In embodiments, $R^{4B}$ is hydroxy-substituted or unsubstituted $C_5$ alkyl. In embodiments, $R^{4B}$ is hydroxy-substituted or unsubstituted $C_6$ alkyl. In embodiments, $R^{4B}$ is hydroxy-substituted $C_1$ alkyl. In embodiments, $R^{4B}$ is hydroxy-substituted $C_2$ alkyl. In embodiments, $R^{4B}$ is hydroxy-substituted $C_3$ alkyl. In embodiments, $R^{4B}$ is hydroxy-substituted $C_4$ alkyl. In embodiments, $R^{4B}$ is hydroxy-substituted $C_5$ alkyl. In embodiments, $R^{4B}$ is hydroxy-substituted $C_6$ alkyl.

In embodiments, $R^{5A}$ is hydroxy-substituted or unsubstituted $C_1$-$C_6$ alkyl. In embodiments, $R^{5A}$ is hydroxy-substituted or unsubstituted $C_1$-$C_6$ alkyl. In embodiments, $R^{5A}$ is hydroxy-substituted or unsubstituted $C_1$ alkyl. In embodiments, $R^{5A}$ is hydroxy-substituted or unsubstituted $C_2$ alkyl. In embodiments, $R^{5A}$ is hydroxy-substituted or unsubstituted $C_3$ alkyl. In embodiments, $R^{5A}$ is hydroxy-substituted or unsubstituted $C_4$ alkyl. In embodiments, $R^{5A}$ is hydroxy-substituted or unsubstituted CS alkyl. In embodiments, $R^{5A}$ is hydroxy-substituted or unsubstituted $C_6$ alkyl. In embodiments, $R^{5A}$ is hydroxy-substituted $C_1$ alkyl. In embodiments, $R^{5A}$ is hydroxy-substituted $C_2$ alkyl. In embodiments, $R^{5A}$ is hydroxy-substituted $C_3$ alkyl. In embodiments, $R^{5A}$ is hydroxy-substituted $C_4$ alkyl. In embodiments, $R^{5A}$ is hydroxy-substituted CS alkyl. In embodiments, $R^{5A}$ is hydroxy-substituted $C_6$ alkyl. In embodiments, $R^{5B}$ is hydroxy-substituted or unsubstituted $C_1$-$C_6$ alkyl. In embodiments, $R^{5B}$ is hydroxy-substituted or unsubstituted $C_1$-$C_6$ alkyl. In embodiments, $R^{5B}$ is hydroxy-substituted or unsubstituted $C_1$ alkyl. In embodiments, $R^{5B}$ is hydroxy-substituted or unsubstituted $C_2$ alkyl. In embodiments, $R^{5B}$ is hydroxy-substituted or unsubstituted $C_3$ alkyl. In embodiments, $R^{5B}$ is hydroxy-substituted or unsubstituted $C_4$ alkyl. In embodiments, $R^{5B}$ is hydroxy-substituted or unsubstituted CS alkyl. In embodiments, $R^{5B}$ is hydroxy-substituted or unsubstituted $C_6$ alkyl. In embodiments, $R^{5B}$ is hydroxy-substituted $C_1$ alkyl. In embodiments, $R^{5B}$ is hydroxy-substituted $C_2$ alkyl. In embodiments, $R^{5B}$ is hydroxy-substituted $C_3$ alkyl. In embodiments, $R^{5B}$ is hydroxy-substituted $C_4$ alkyl. In embodiments, $R^{5B}$ is hydroxy-substituted CS alkyl. In embodiments, $R^{5B}$ is hydroxy-substituted $C_6$ alkyl.

In embodiments, $R^{6A}$ is hydroxy-substituted or unsubstituted $C_1$-$C_6$ alkyl. In embodiments, $R^{6A}$ is hydroxy-substituted or unsubstituted $C_1$-$C_6$ alkyl. In embodiments, $R^{6A}$ is hydroxy-substituted or unsubstituted $C_1$ alkyl. In embodiments, $R^{6A}$ is hydroxy-substituted or unsubstituted $C_2$ alkyl. In embodiments, $R^{6A}$ is hydroxy-substituted or unsubstituted $C_3$ alkyl. In embodiments, $R^{6A}$ is hydroxy-substituted or unsubstituted $C_4$ alkyl. In embodiments, $R^{6A}$ is hydroxy-substituted or unsubstituted CS alkyl. In embodiments, $R^{6A}$ is hydroxy-substituted or unsubstituted $C_6$ alkyl. In embodiments, $R^{6A}$ is hydroxy-substituted $C_1$ alkyl. In embodiments, $R^{6A}$ is hydroxy-substituted $C_2$ alkyl. In embodiments, $R^{6A}$ is hydroxy-substituted $C_3$ alkyl. In embodiments, $R^{6A}$ is hydroxy-substituted $C_4$ alkyl. In embodiments, $R^{6A}$ is hydroxy-substituted CS alkyl. In embodiments, $R^{6A}$ is hydroxy-substituted $C_6$ alkyl. In embodiments, $R^{6B}$ is hydroxy-substituted or unsubstituted $C_1$-$C_6$ alkyl. In embodiments, $R^{6B}$ is hydroxy-substituted or unsubstituted $C_1$-$C_6$ alkyl. In embodiments, $R^{6B}$ is hydroxy-substituted or unsubstituted $C_1$ alkyl. In embodiments, $R^{6B}$ is hydroxy-substituted or unsubstituted $C_2$ alkyl. In embodiments, $R^{6B}$ is hydroxy-substituted or unsubstituted $C_3$ alkyl. In embodiments, $R^{6B}$ is hydroxy-substituted or unsubstituted $C_4$ alkyl. In embodiments, $R^{6B}$ is hydroxy-substituted or unsubstituted CS alkyl. In embodiments, $R^{6B}$ is hydroxy-substituted or unsubstituted $C_6$ alkyl. In embodiments, $R^{6B}$ is hydroxy-substituted $C_1$ alkyl. In embodiments, $R^{6B}$ is hydroxy-substituted $C_2$ alkyl. In embodiments, $R^{6B}$ is hydroxy-substituted $C_3$ alkyl. In embodiments, $R^{6B}$ is hydroxy-substituted $C_4$ alkyl. In embodiments, $R^{6B}$ is hydroxy-substituted $C_5$ alkyl. In embodiments, $R^{6B}$ is hydroxy-substituted $C_6$ alkyl.

In embodiments, $R^4$ is

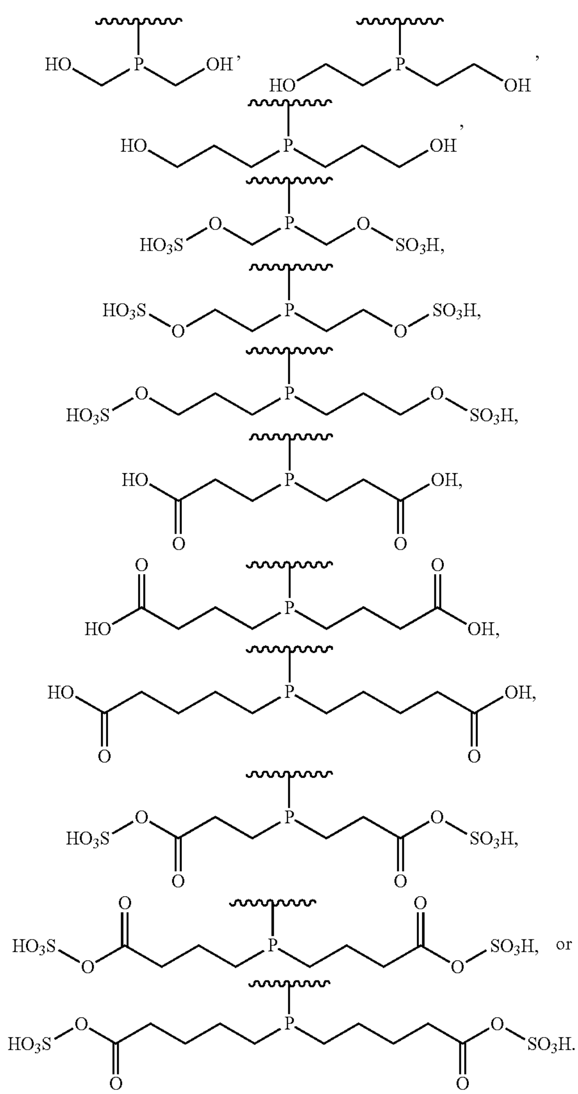

In embodiments, $R^4$ is

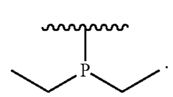 [SMILES: *P(CC)CC]

In embodiments, $R^5$ is hydrogen, —OH, —$NH_2$, —COOH, —$CONH_2$, —SH, —$SO_3H$, —$SO_4H$, —$SO_2NH_2$,

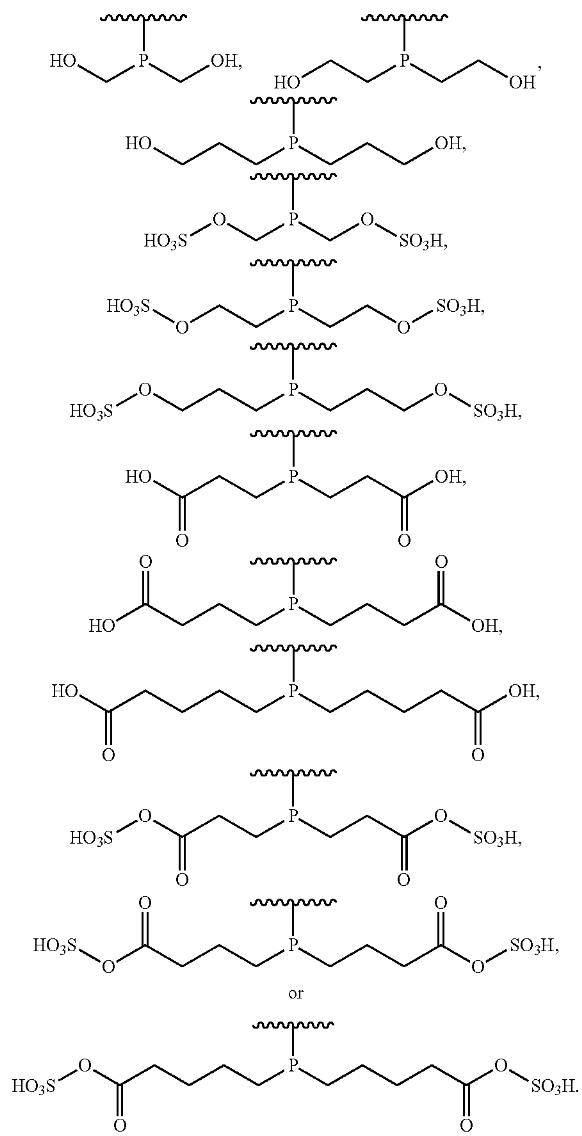

In embodiments, $R^5$ is not hydrogen.

In embodiments, $R^5$ is hydrogen, —OH, —COOH, —SH, —$SO_3H$, —$SO_4H$,

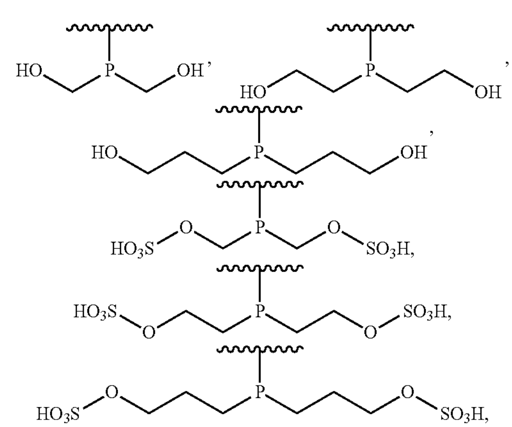

-continued
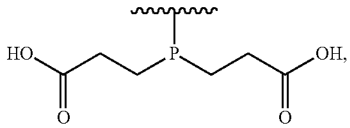
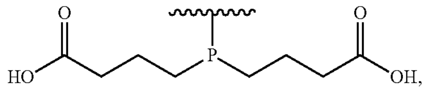
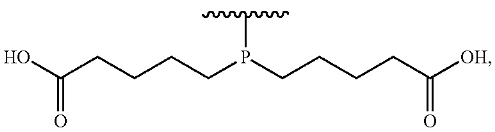
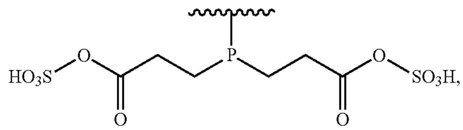
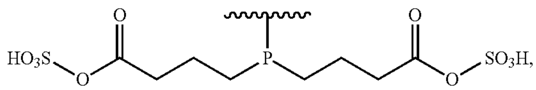
or
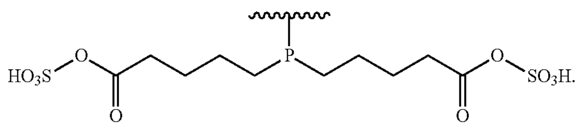
In embodiments, $R^5$ is
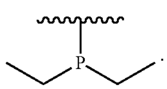 [SMILES: *P(CC)CC]
In embodiments, $R^6$ is hydrogen, —OH, —$NH_2$, —COOH, —$CONH_2$, —SH, —$SO_3H$, —$SO_4H$, —$SO_2NH_2$,
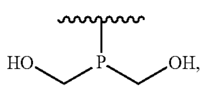
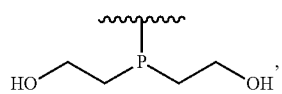
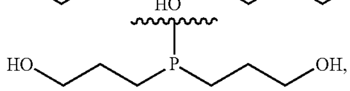
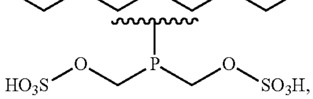
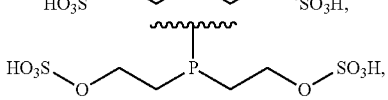
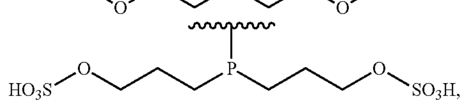
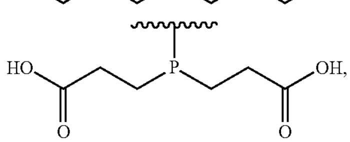
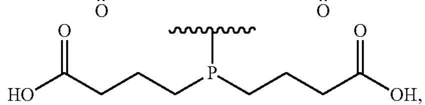
-continued
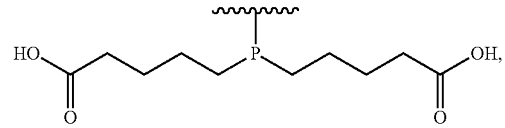
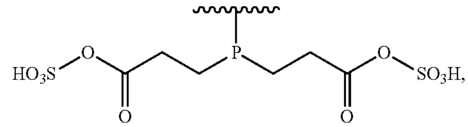
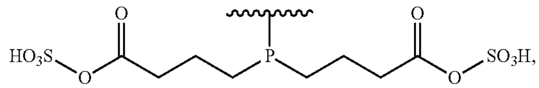
or
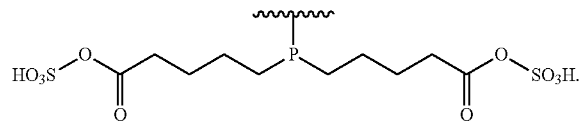
In embodiments, $R^6$ is not hydrogen.
In embodiments, $R^6$ is —OH, —COOH, —SH, —$SO_3H$, —$SO_4H$,
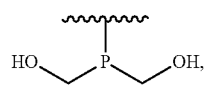
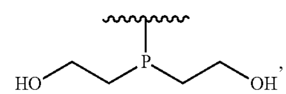
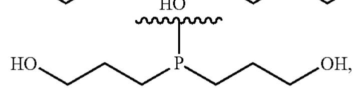
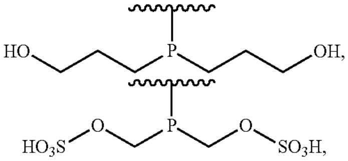
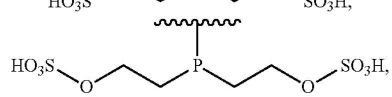
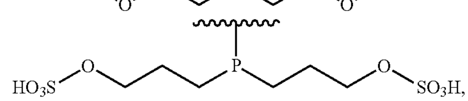
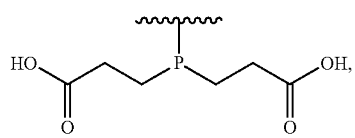
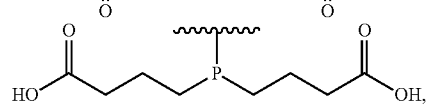
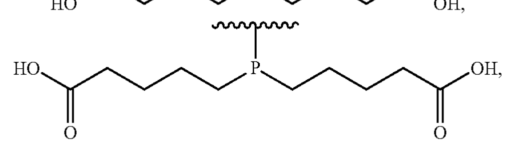
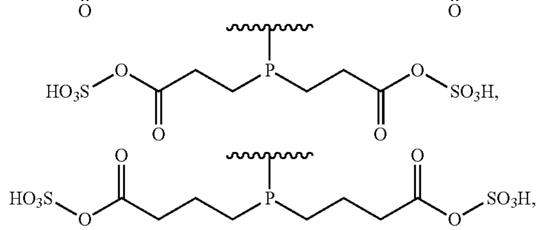
or -continued
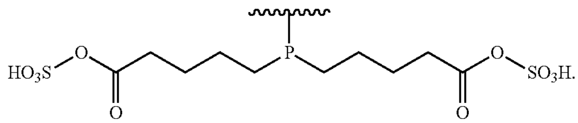
In embodiments, $R^6$ is
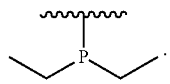
In embodiments, $R^1$ has the formula:
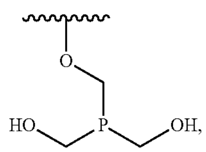
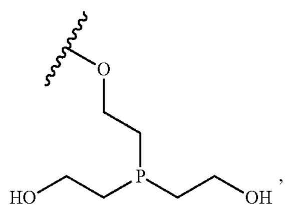
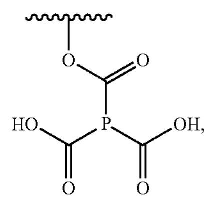
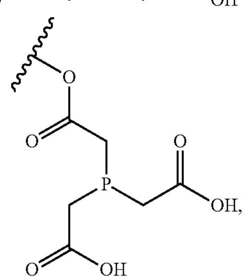
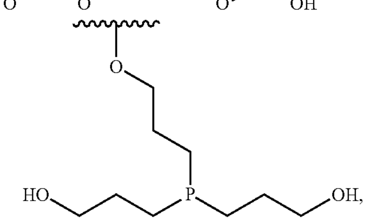
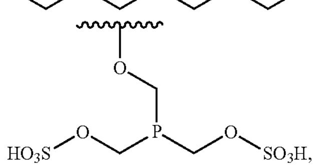
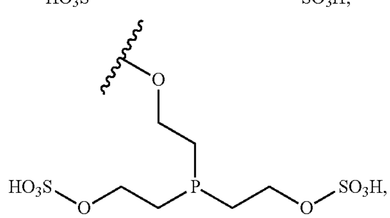
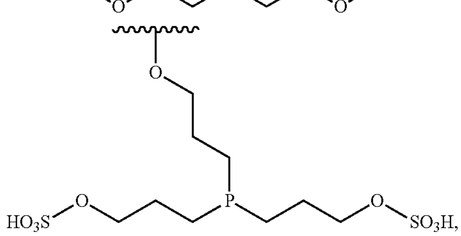
-continued
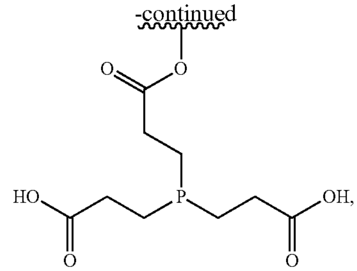
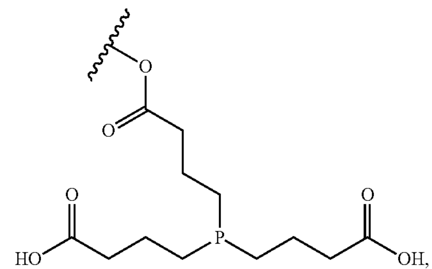
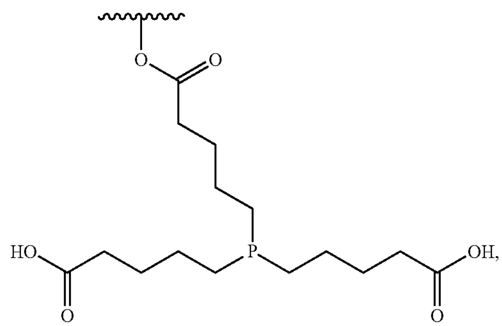
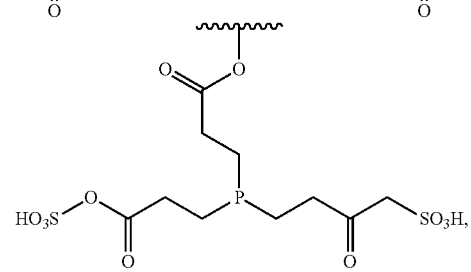
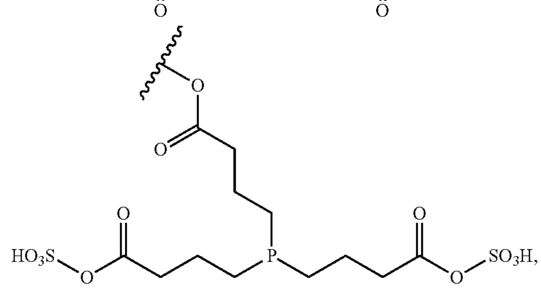
or
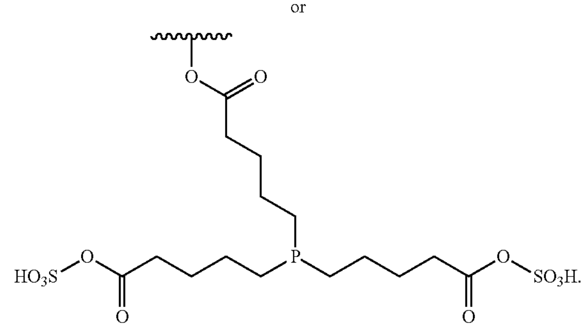

In embodiments, $R^1$ has the formula:

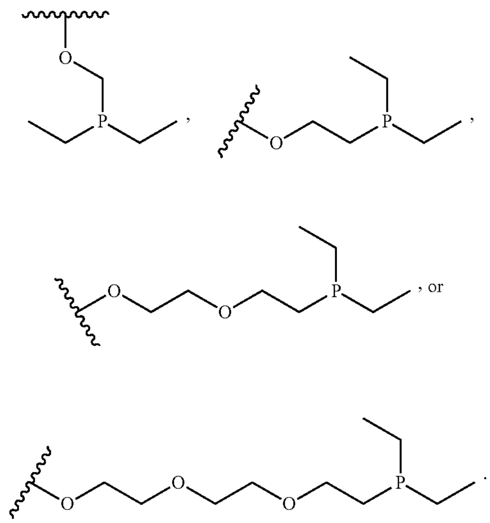

In embodiments, $R^2$ is halogen. In embodiments, $R^2$ is —Cl. In embodiments, $R^2$ is —F. In embodiments, —$W^2$-$L^2$-$R^5$ is unsubstituted —O—$C_1$-$C_{20}$ alkyl or —O—$C_1$-$C_{18}$ alkyl. In embodiments, —$W^2$-$L^2$-$R^5$ is unsubstituted —O—$C_1$-$C_{16}$ alkyl or —O—$C_1$-$C_{12}$ alkyl. In embodiments, —$W^2$-$L^2$-$R^5$ is unsubstituted —O—$C_1$-$C_{10}$ alkyl or —O—$C_1$-$C_8$ alkyl. In embodiments, —$W^2$-$L^2$-$R^5$ is unsubstituted —O—$C_1$-$C_6$ or —O—$C_1$-$C_4$ alkyl. In embodiments, —$W^2$-$L^2$-$R^5$ is unsubstituted —O—$C_1$-$C_4$ alkyl. In embodiments, —$W^2$-$L^2$-$R^5$ is unsubstituted —O—$C_1$-$C_6$ alkyl. In embodiments, —$W^2$-$L^2$-$R^5$ is unsubstituted —O-methyl. In embodiments, —$W^2$-$L^2$-$R^5$ is unsubstituted —O—$C_2$ alkyl. In embodiments, —$W^2$-$L^2$-$R^5$ is unsubstituted —O—$C_3$ alkyl. In embodiments, —$W^2$-$L^2$-$R^5$ is unsubstituted —O—$C_4$ alkyl. In embodiments, —$W^2$-$L^2$-$R^5$ is unsubstituted —O—$C_5$ alkyl. In embodiments, —$W^2$-$L^2$-$R^5$ is unsubstituted —O—$C_6$ alkyl. In embodiments, —$W^2$-$L^2$-$R^5$ is an unsubstituted 2 to 20 membered heteroalkyl. In embodiments, —$W^2$-$L^2$-$R^5$ is an unsubstituted 2 to 10 membered heteroalkyl. In embodiments, —$W^2$-$L^2$-$R^5$ is an unsubstituted 2 to 8 membered heteroalkyl. In embodiments, —$W^2$-$L^2$-$R^5$ is an unsubstituted 2 to 6 membered heteroalkyl. In embodiments, —$W^2$-$L^2$-$R^5$ is an unsubstituted 2 to 4 membered heteroalkyl.

In embodiments, $R^2$ is halogen or has the formula:

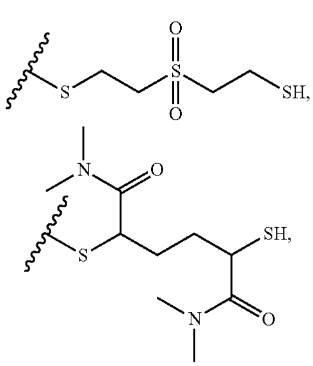

-continued

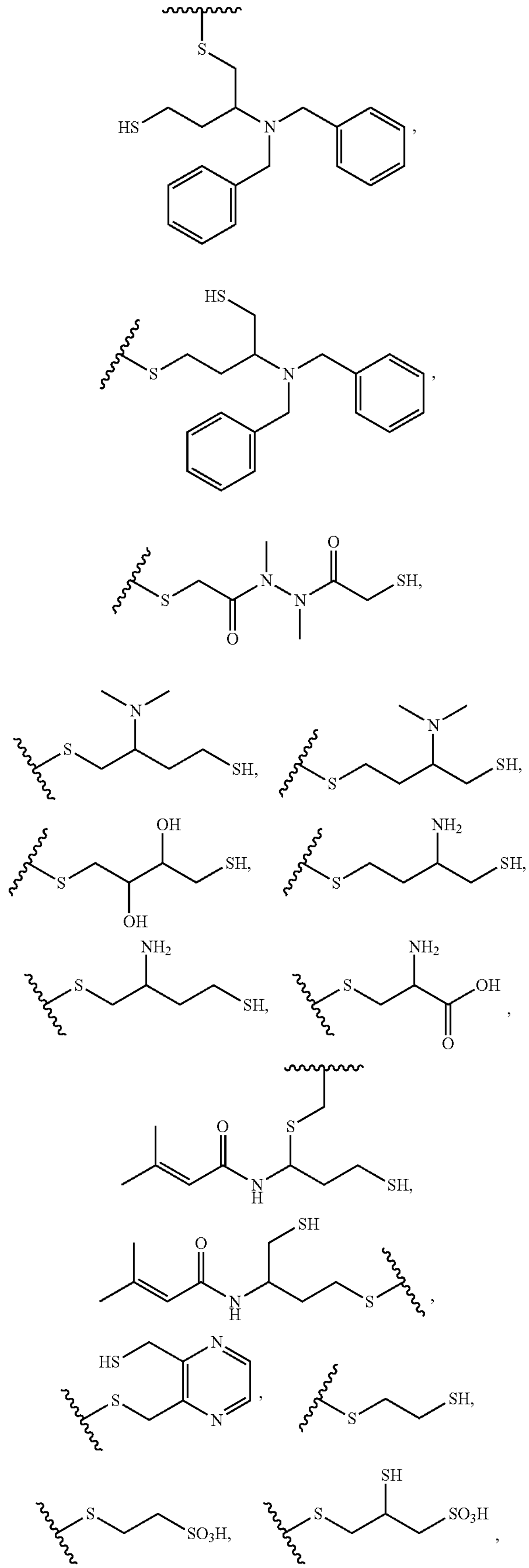

-continued
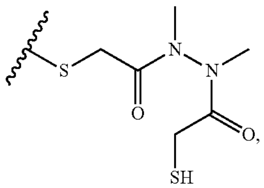
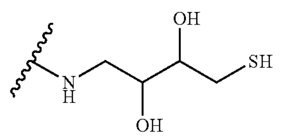
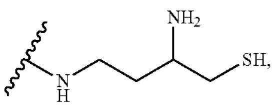
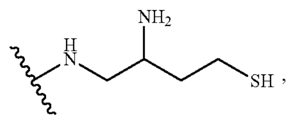
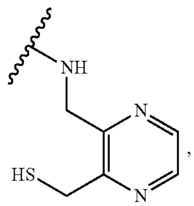
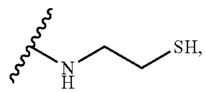
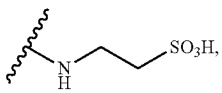
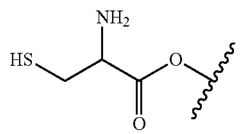
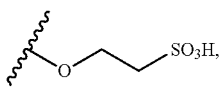
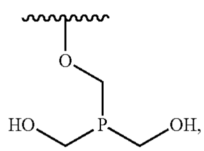
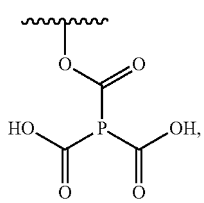
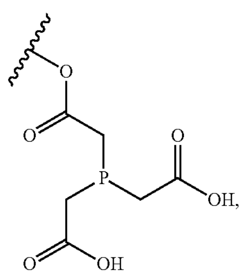
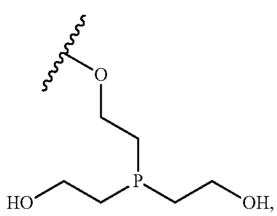
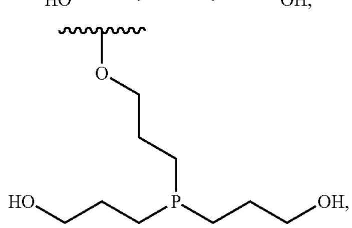
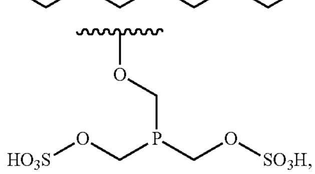
-continued
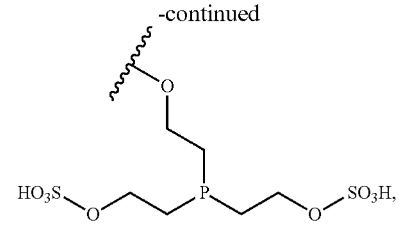
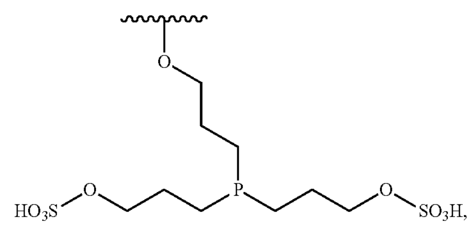
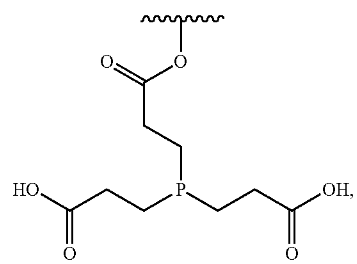
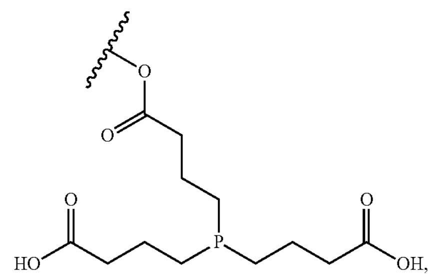
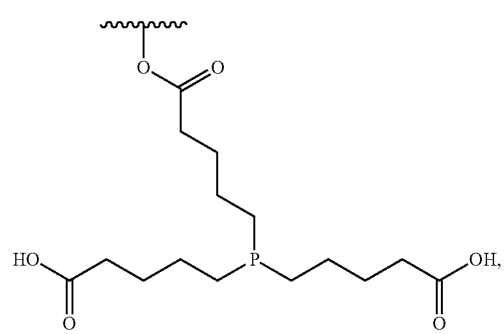
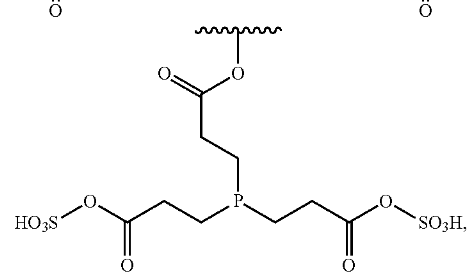

-continued
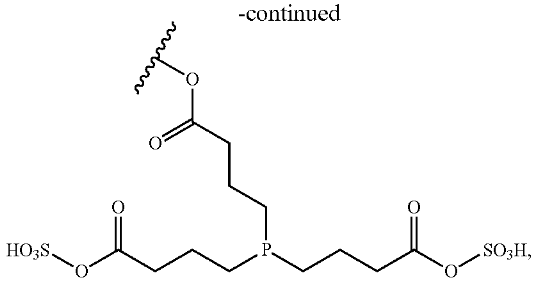
or
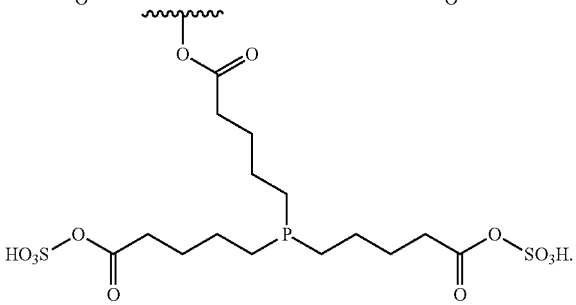
In embodiments, $R^2$ has the formula:
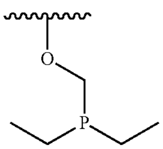
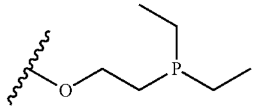
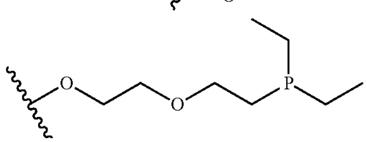
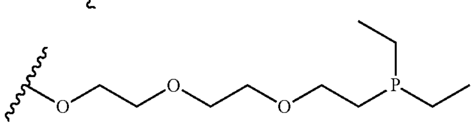
In embodiments, $R^2$ has the formula:
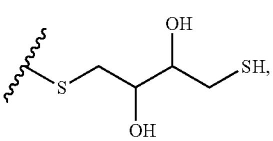
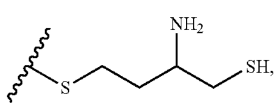
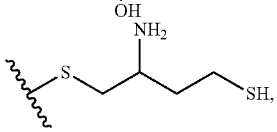
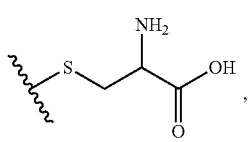
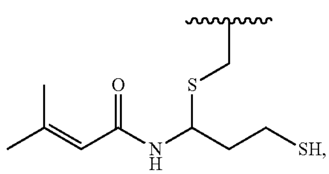
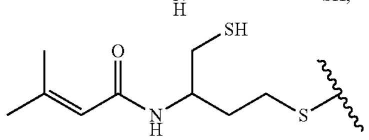
-continued
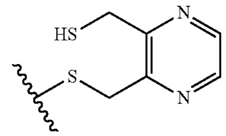
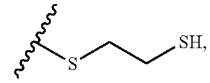
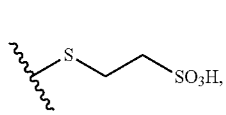
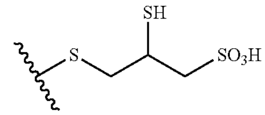
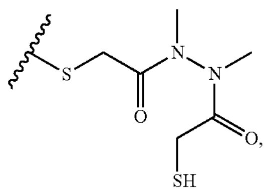
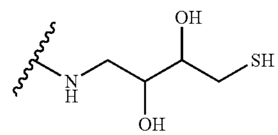
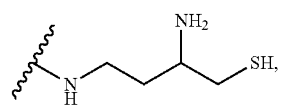
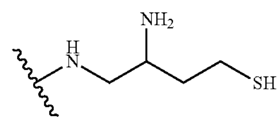
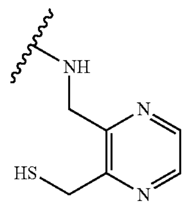
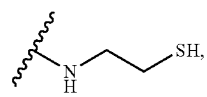
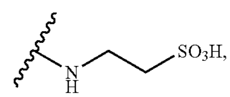
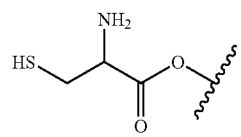
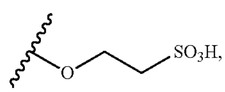
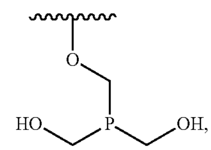
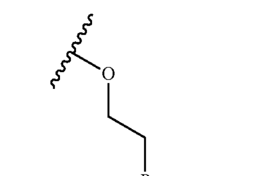
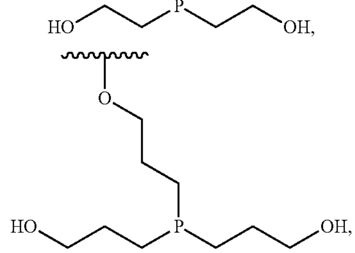
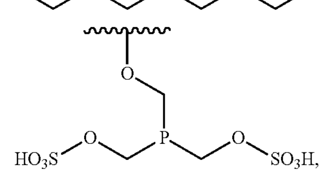

-continued
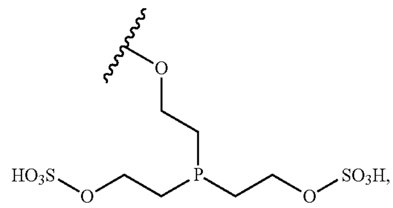
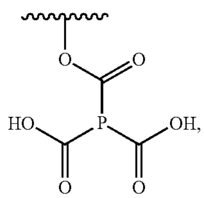
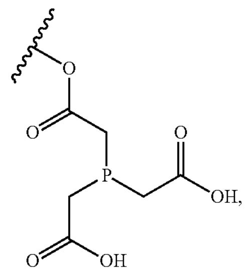
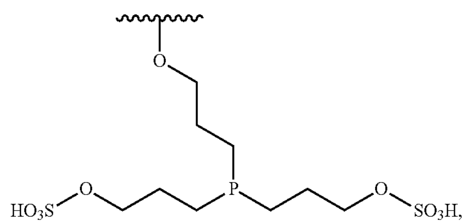
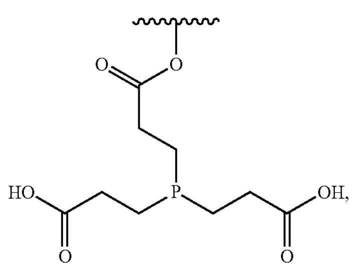
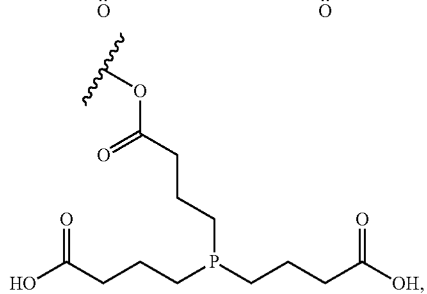
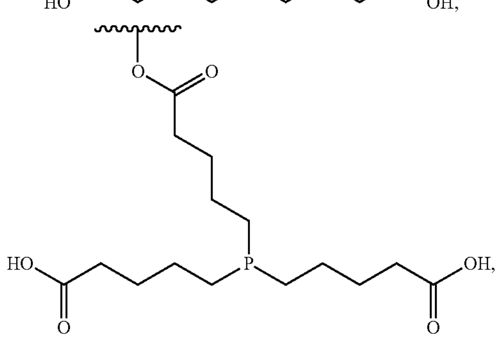
-continued
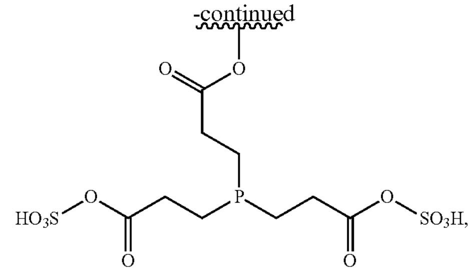
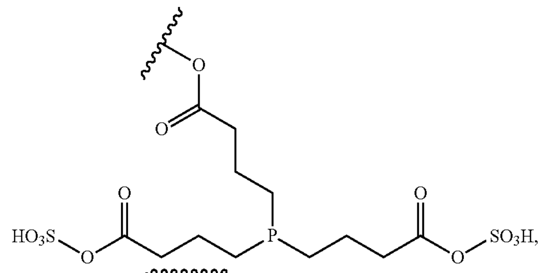
or
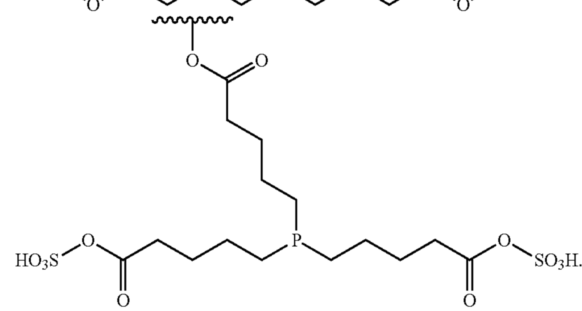
In embodiments, $R^2$ is halogen or has the formula:
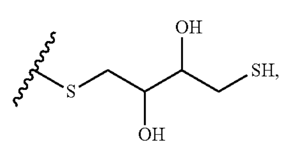
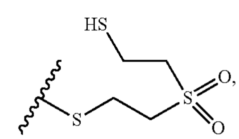
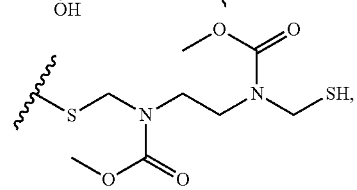
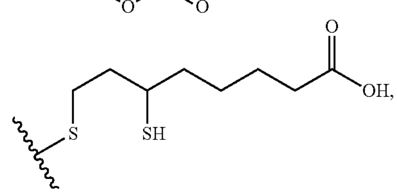
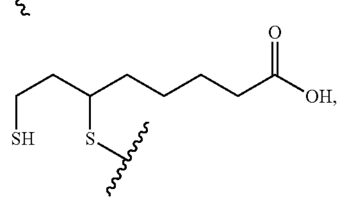
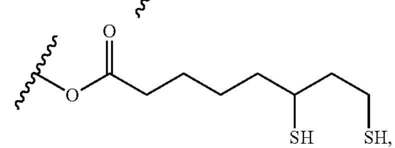

-continued

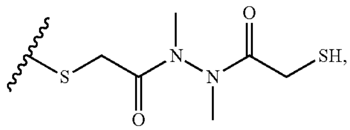

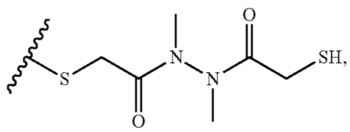

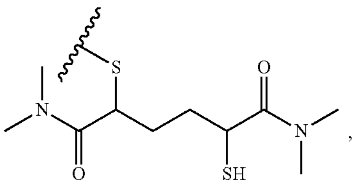

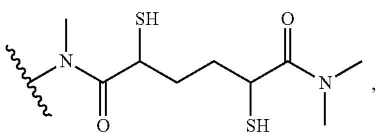

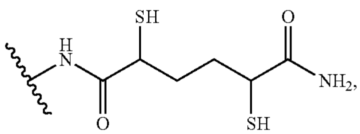

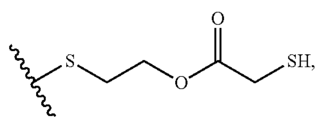

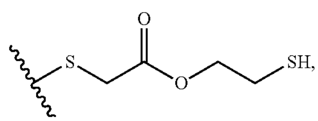

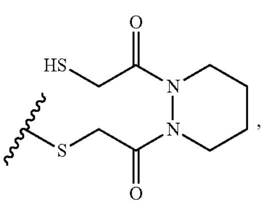

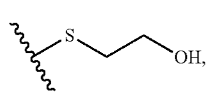

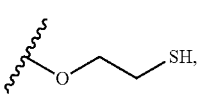

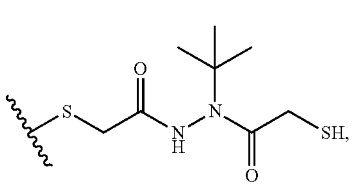

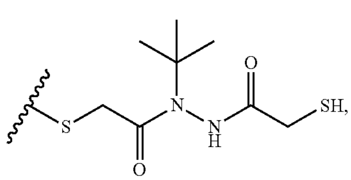

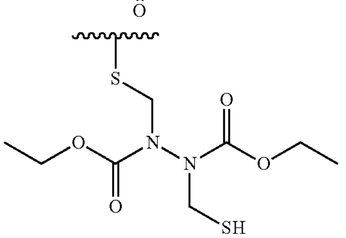

-continued

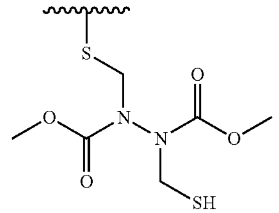

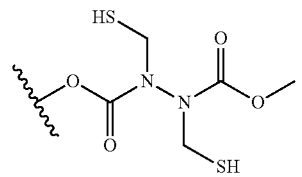

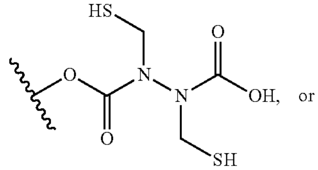

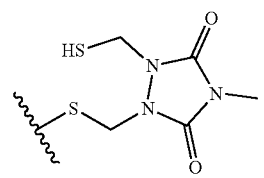

In embodiments, $R^3$ is halogen. In embodiments, $R^3$ is —Cl. In embodiments, $R^3$ is —F. In embodiments, —$W^3$-$L^3$-$R^6$ is unsubstituted —O—$C_1$-$C_{20}$ alkyl or —O—$C_1$-$C_{18}$ alkyl. In embodiments, —$W^3$-$L^3$-$R^6$ is unsubstituted —O—$C_1$-$C_{16}$ alkyl or —O—$C_1$-$C_{12}$ alkyl. In embodiments, —$W^3$-$L^3$-$R^6$ is unsubstituted —O—$C_1$-$C_{10}$ alkyl or —O—$C_1$-$C_8$ alkyl. In embodiments, —$W^3$-$L^3$-$R^6$ is unsubstituted —O—$C_1$-$C_6$ or —O—$C_1$-$C_4$ alkyl. In embodiments, —$W^3$-$L^3$-$R^6$ is unsubstituted —O—$C_1$-$C_4$ alkyl. In embodiments, —$W^3$-$L^3$-$R^6$ is unsubstituted —O—$C_1$-$C_6$ alkyl. In embodiments, —$W^3$-$L^3$-$R^6$ is unsubstituted —O-methyl. In embodiments, —$W^3$-$L^3$-$R^6$ is unsubstituted —O—$C_2$ alkyl. In embodiments, —$W^3$-$L^3$-$R^6$ is unsubstituted —O—$C_3$ alkyl. In embodiments, —$W^3$-$L^3$-$R^6$ is unsubstituted —O—$C_4$ alkyl. In embodiments, —$W^3$-$L^3$-$R^6$ is unsubstituted —O—$C_5$ alkyl. In embodiments, —$W^3$-$L^3$-$R^6$ is unsubstituted —O—$C_6$ alkyl. In embodiments, —$W^3$-$L^3$-$R^6$ is an unsubstituted 2 to 20 membered heteroalkyl. In embodiments, —$W^3$-$L^3$-$R^6$ is an unsubstituted 2 to 10 membered heteroalkyl. In embodiments, —$W^3$-$L^3$-$R^6$ is an unsubstituted 2 to 8 membered heteroalkyl. In embodiments, —$W^3$-$L^3$-$R^6$ is an unsubstituted 2 to 6 membered heteroalkyl. In embodiments, —$W^3$-$L^3$-$R^6$ is an unsubstituted 2 to 4 membered heteroalkyl.

In embodiments, $R^3$ is halogen or has the formula:

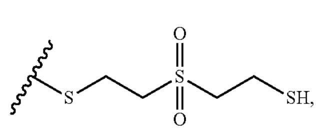

-continued
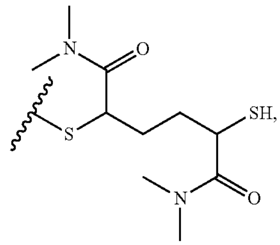
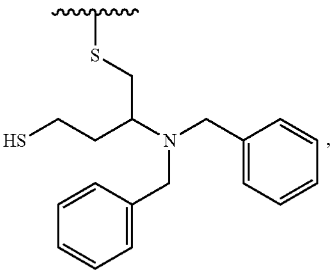
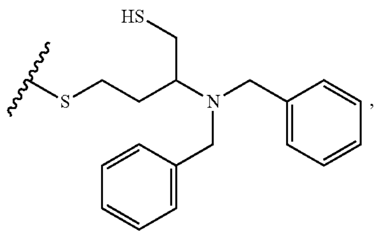
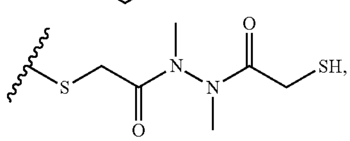
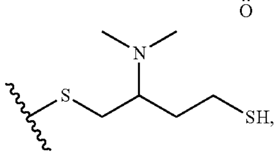
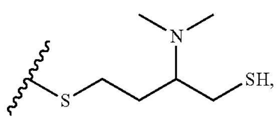
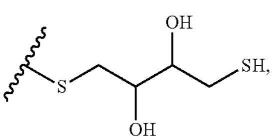
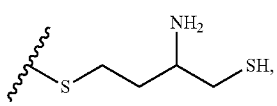
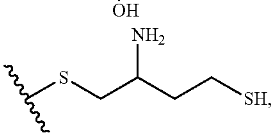
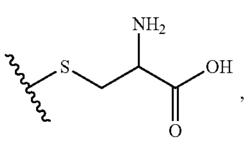
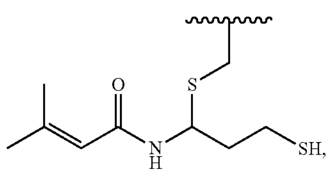
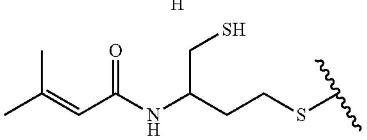
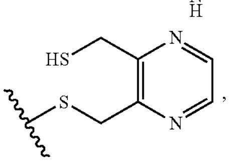
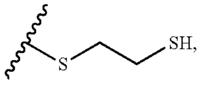
-continued
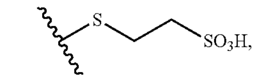
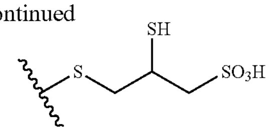
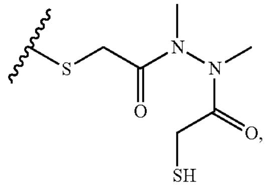
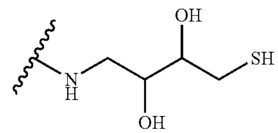
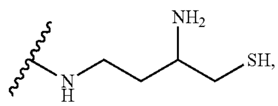
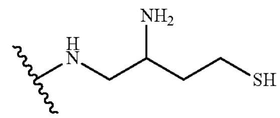
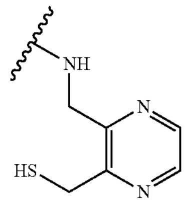
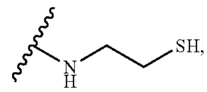
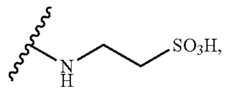
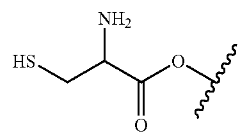
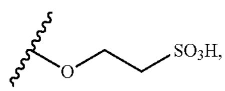
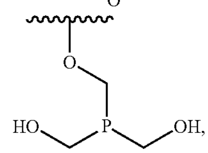
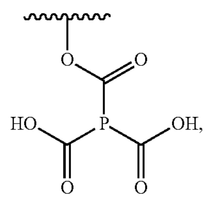
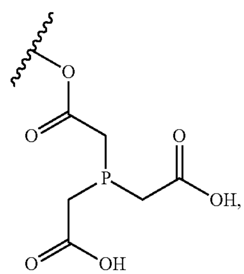
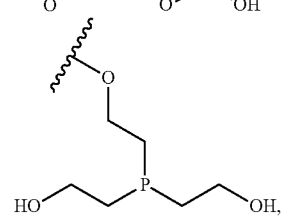
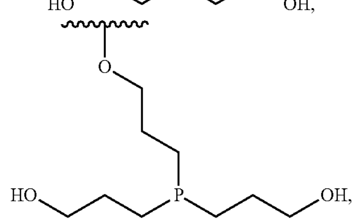
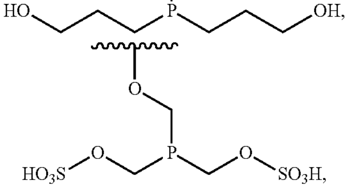

-continued
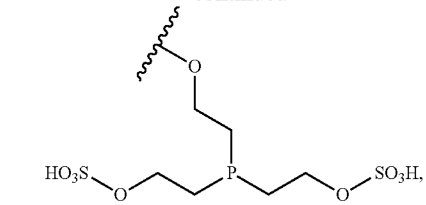
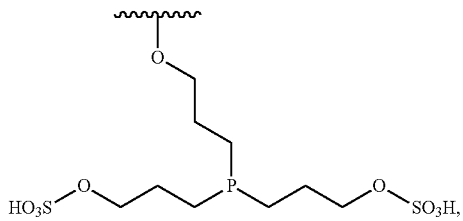
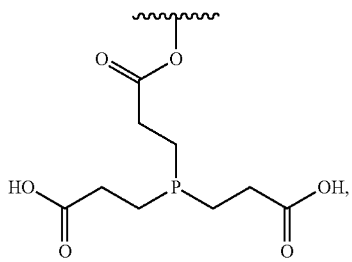
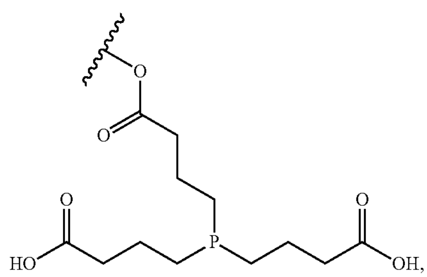
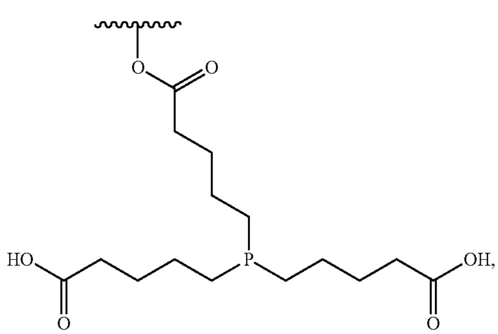
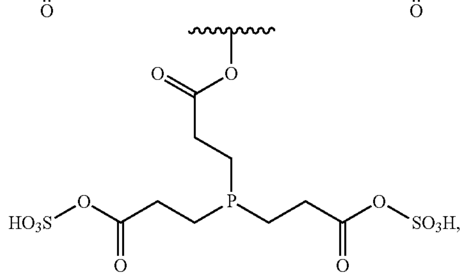
-continued
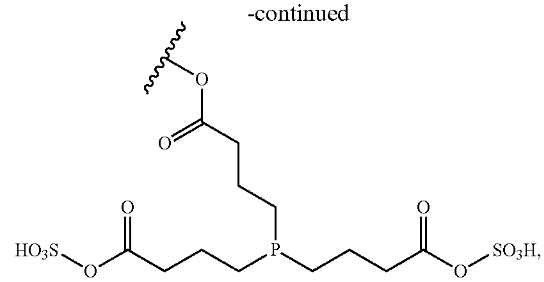
or
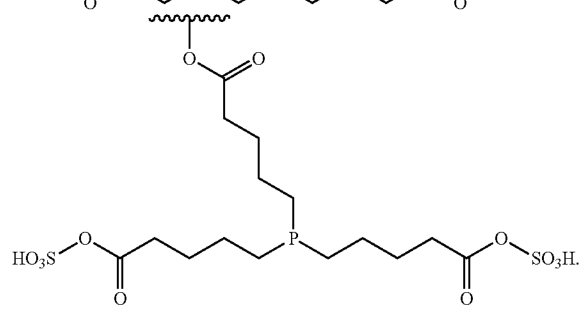
In embodiments, $R^3$ has the formula:
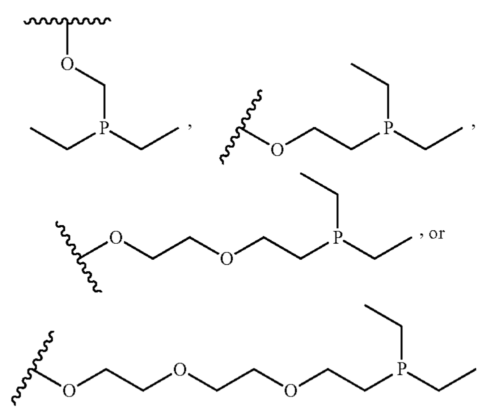
In embodiments, $R^3$ has the formula:
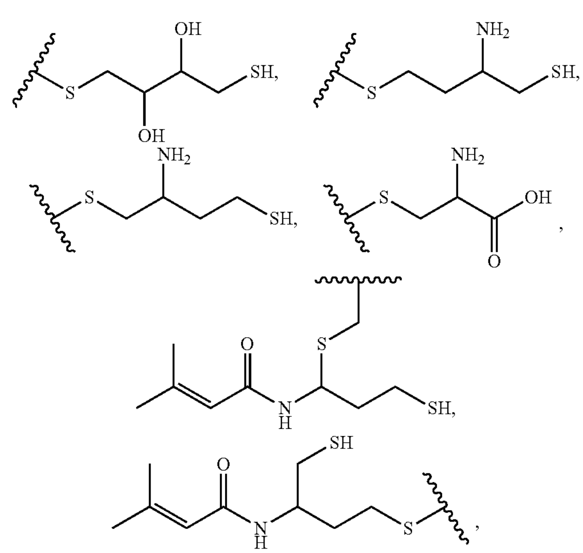

-continued
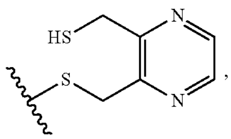
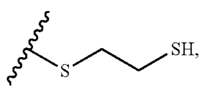
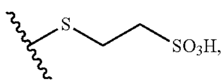
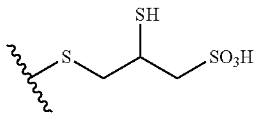
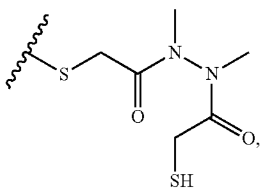
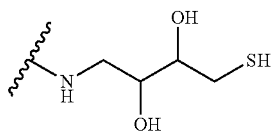
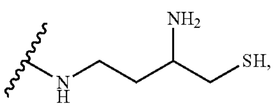
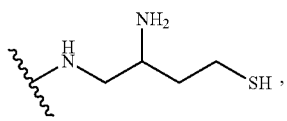
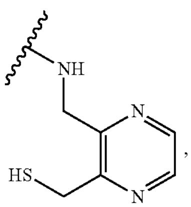
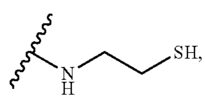
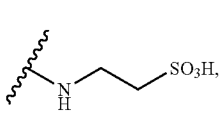
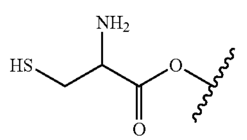
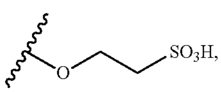
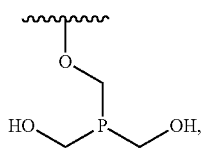
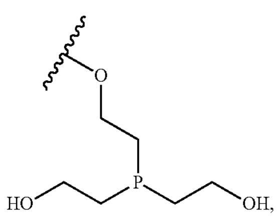
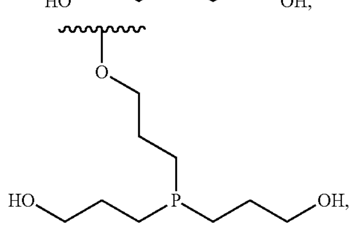
-continued
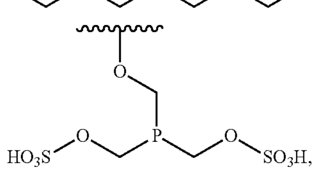
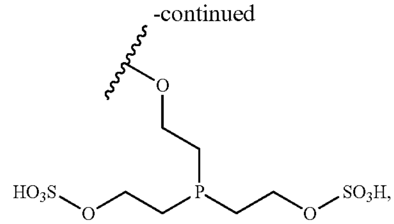
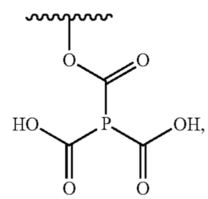
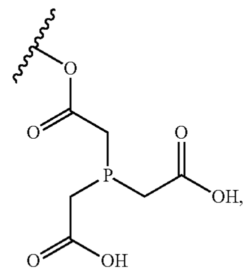
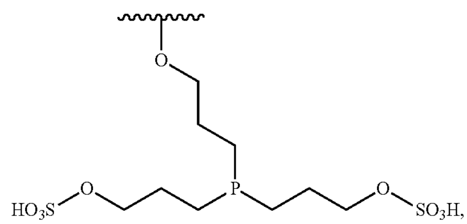
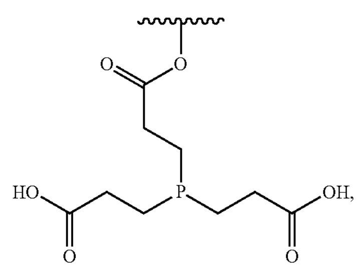
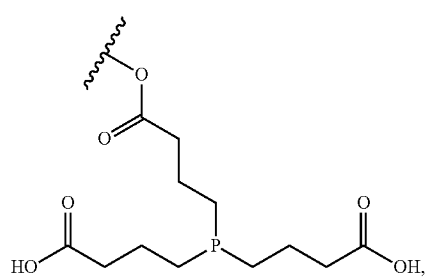
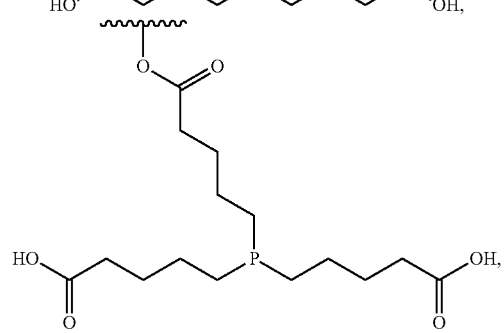

-continued
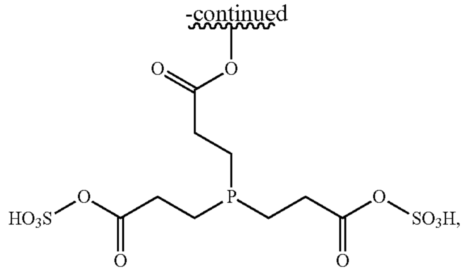
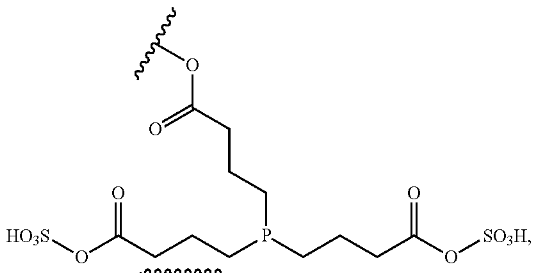
or
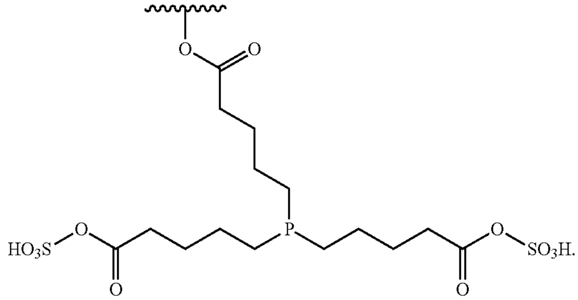
In embodiments, $R^3$ is halogen or has the formula:
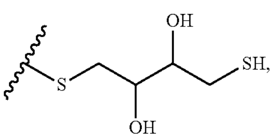
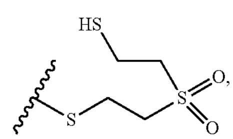
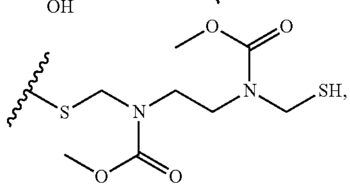
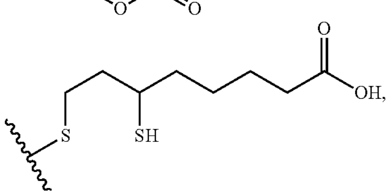
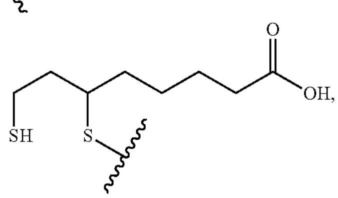
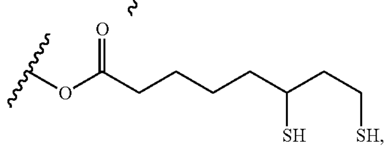
-continued
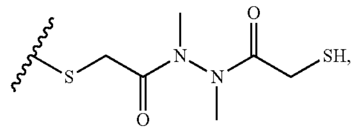
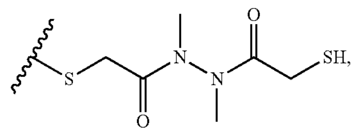
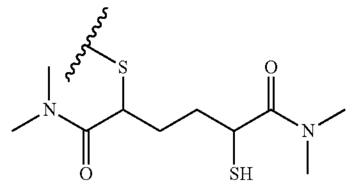
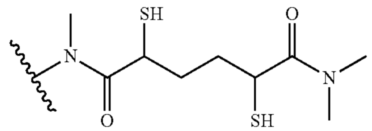
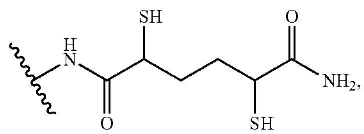
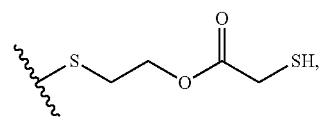
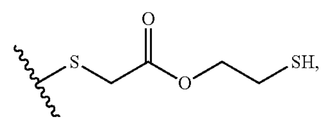
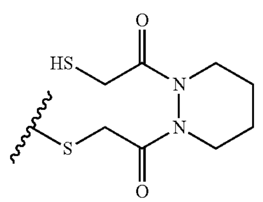
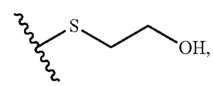
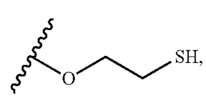
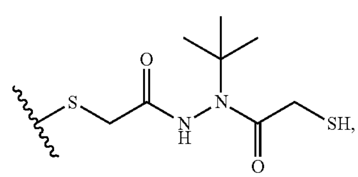
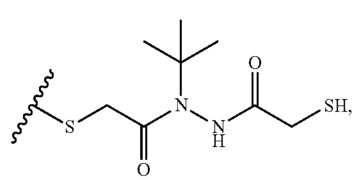
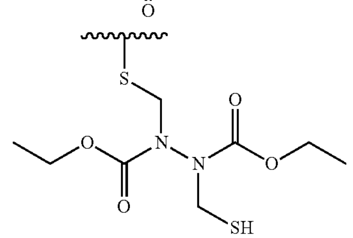

-continued
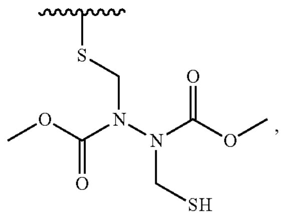
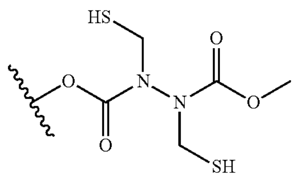
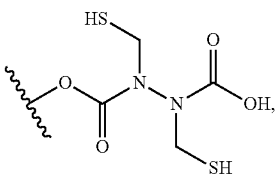
or
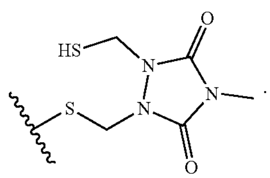
In embodiments, $R^2$ and $R^3$ are halogen, and $R^1$ is
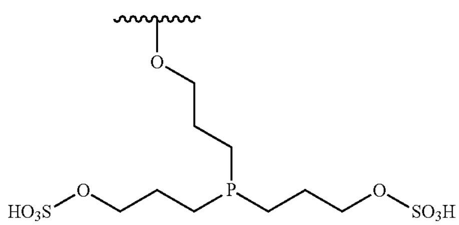
or
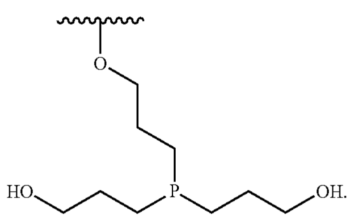
In embodiments, $R^1$, $R^2$, and $R^3$ are independently
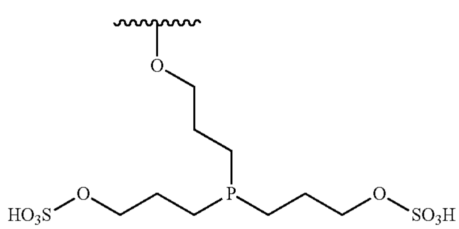
or
-continued
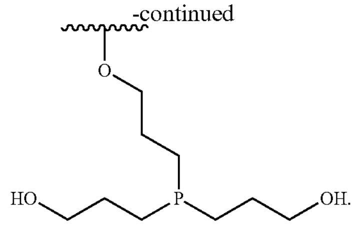
In embodiments, $R^1$, $R^2$, and $R^3$ are each
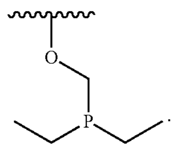 [SMILES: *OCP(CC)CC]
In embodiments, $R^1$, $R^2$, and $R^3$ are each
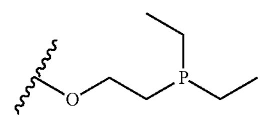
In embodiments, $R^1$, $R^2$, and $R^3$ are each
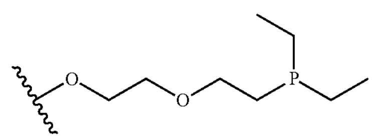
In embodiments, $R^1$, $R^2$, and $R^3$ are each
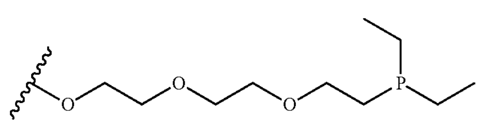
In embodiments, $R^2$ and $R^3$ are each
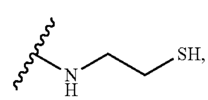 [SMILES: *NCCS]
and $R^1$ is
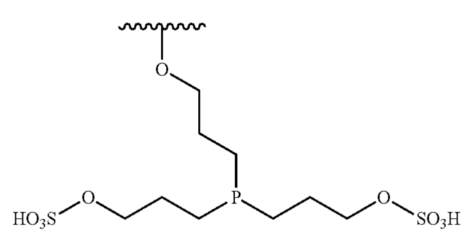
or -continued

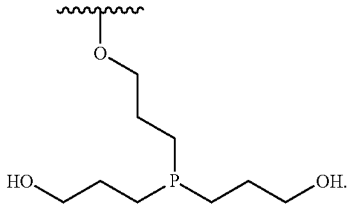

In embodiments, the compound is

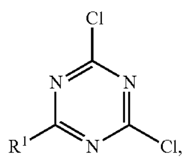

wherein $R^1$ is as described herein.

In an aspect is provided a polymerized reducing agent including polymerized units of two or more compounds of (I)

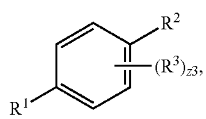

(II)

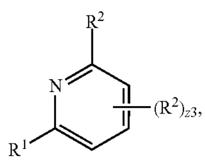

(III)

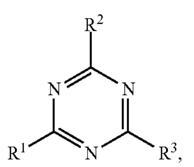

or (IV)

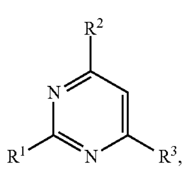

wherein $R^1$ is as described herein. $R^2$ is halogen, —$W^2$-$L^2$-$R^5$, or a linker connecting a compound of (I)

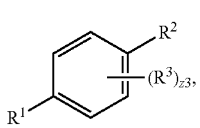

-continued (II)

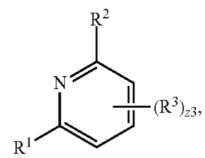

(III)

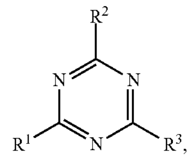

or (IV)

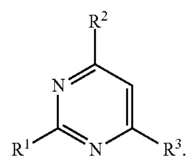

$R^3$ is halogen, —$W^3$-$L^3$-$R^6$, or a linker connecting a compound of (I)

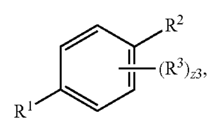

(II)

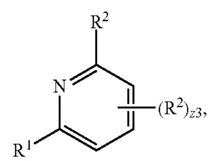

(III)

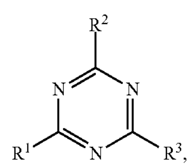

or (IV)

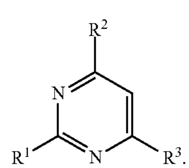

In embodiments, the polymerized reducing agent has the formula:

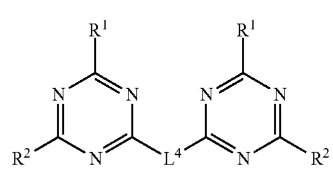

or

-continued

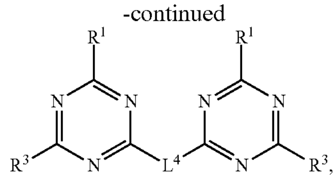

wherein $R^1$, $R^2$, and $R^3$ are as described herein, and $L^4$ is a covalent linker. In embodiments, the polymerized reducing agent forms a network of polymerized units (e.g., a mesh). In embodiments, the polymerized reducing agent forms a crosslinked polymer composition. In embodiments, $L^4$ includes one or more repeating subunits of divalent compounds as described herein. For example, repeating subunits of divalent compounds may have the formula

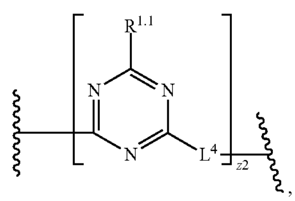

wherein $L^4$ is a covalent linker, and z2 is an integer from 2 to 100. $R^{1.1}$ is independently a substituent defined by $R^1$, or includes polymerized subunits having the formula

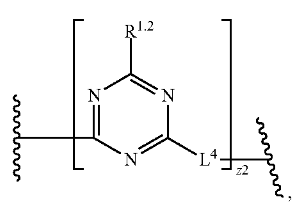

wherein $R^{1.2}$ is independently a substituent defined by $R^1$. In embodiments, $R^{1.1}$ is independently a substituent defined by $R^1$. In embodiments, $L^4$ includes PEG (e.g., having the formula

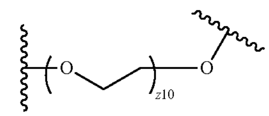

wherein z10 is an integer from 1 to 12). In embodiments, $R^{1.1}$ includes polymerized subunits having the formula

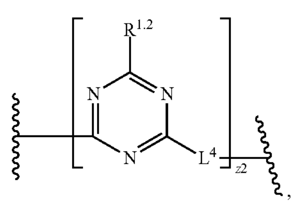

wherein $R^{1.2}$ is independently a substituent defined by $R^1$. In embodiments, the polymerized reducing agent has the formula:

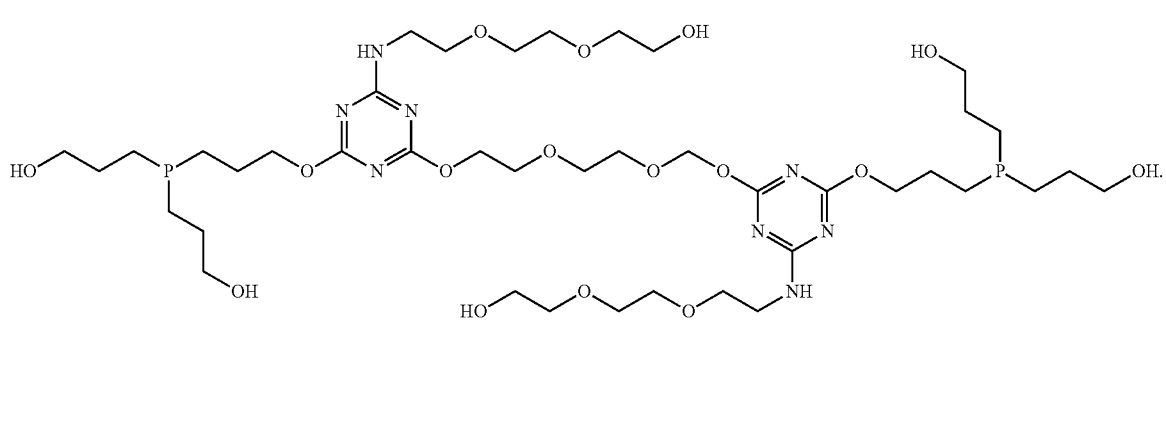 [SMILES: OCCCP(CCCO)CCCOc1nc(NCCOCCOCCO)nc(OCCOCCOCOc2nc(NCCOCCOCCO)nc(OCCCP(CCCO)CCCO)n2)n1]

In embodiments, the polymerized reducing agent has the formula:

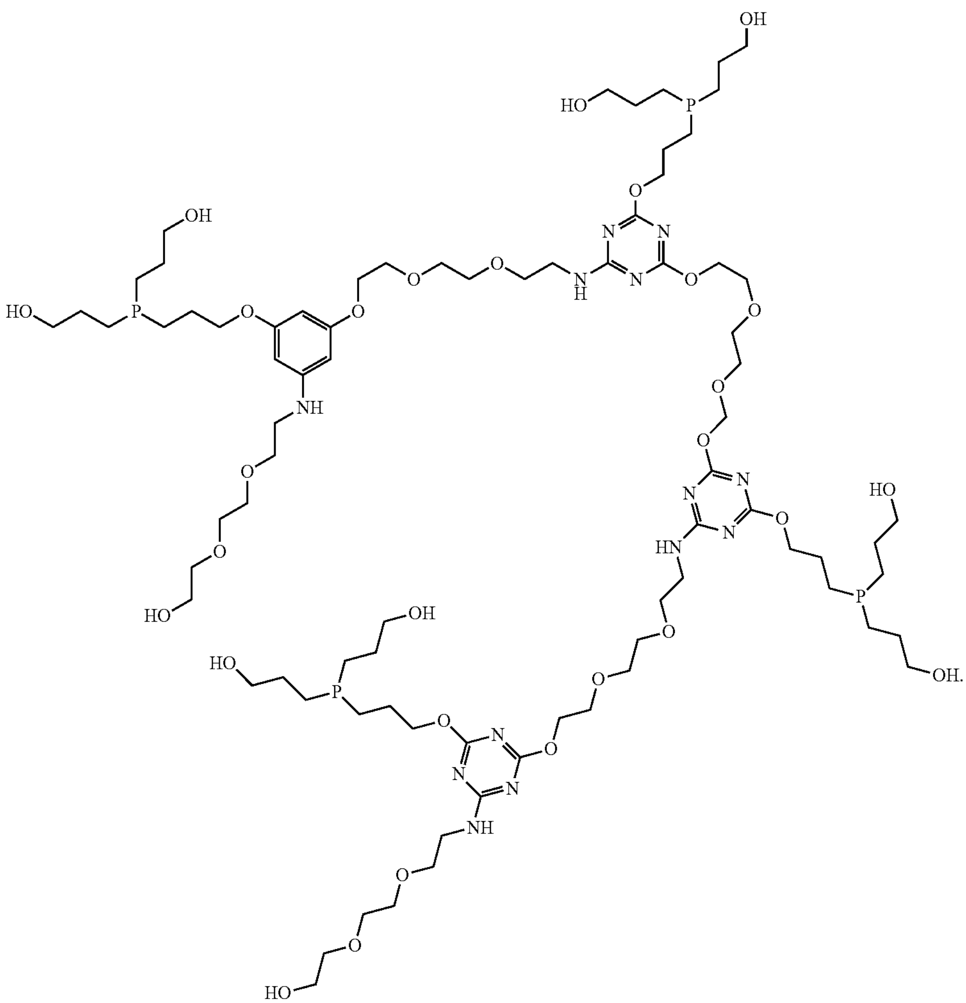 [SMILES: OCCCP(CCCO)CCCOc1cc(NCCOCCOCCO)cc(OCCOCCOCCNc2nc(OCCCP(CCCO)CCCO)nc(OCCOCCOCOc3nc(NCCOCCOCCOc4nc(NCCOCCOCCO)nc(OCCCP(CCCO)CCCO)n4)nc(OCCCP(CCCO)CCCO)n3)n2)c1]

In embodiments, the polymerized reducing agent includes polymerized subunits having the formula

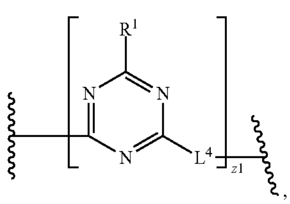

wherein $L^4$ is a covalent linker, and z1 is an integer from 1 to 100. In embodiments, $R^1$ is as described herein. In embodiments, $R^1$ is a polymerized substituent having the formula

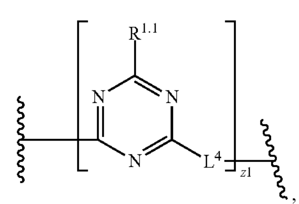

wherein $R^{1.1}$ is independently a substituent defined by $R^1$; and $L^4$, $R^2$, and z1 are as described herein.

In embodiments, the polymerized reducing agent includes polymerized substituents having the formula

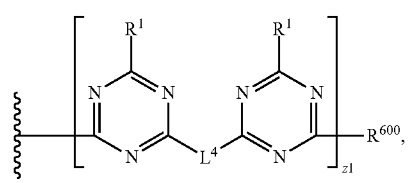

wherein $R^1$ is as described herein, $L^4$ is a covalent linker, and z1 is an integer from 1 to 100. In embodiments, z1 is 10. The "⌇" symbol represents attachment point(s) to the remainder of the polymerized reducing agent. The polymerized reducing agent ends in $R^{600}$. $R^{600}$ is independently hydrogen, —OH, $NH_2$, —COOH, —$CONH_2$, —SH, —$SO_3H$, —$SO_4H$, —$SO_2NH_2$, or

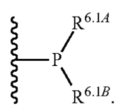

In embodiments, $R^{600}$ is any substituent defined by $R^6$. $R^{6.1A}$ and $R^{6.1B}$ are each independently substituted or unsubstituted alkyl (e.g., $C_1$-$C_{20}$, $C_{10}$-$C_{20}$, $C_1$-$C_8$, $C_1$-$C_6$, or $C_1$-$C_4$), substituted or unsubstituted heteroalkyl (e.g., 2 to 20, 8 to 20, 2 to 10, 2 to 8, 2 to 6, or 2 to 4 membered), substituted or unsubstituted cycloalkyl (e.g., $C_3$-$C_8$, $C_3$-$C_6$, or $C_5$-$C_6$), substituted or unsubstituted heterocycloalkyl (e.g., 3 to 8, 3 to 6, or 5 to 6 membered), substituted or unsubstituted aryl (e.g., $C_6$-$C_{10}$, $C_{10}$, or phenyl), or substituted or unsubstituted heteroaryl (e.g., 5 to 10, 5 to 9, or 5 to 6 membered). In embodiments, the polymerized reducing agent includes polymerized subunits having the formula

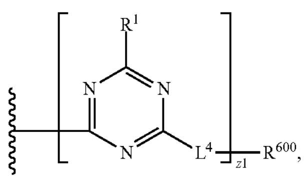

wherein $R^1$ and $R^{600}$ are as described herein, $L^4$ is a covalent linker, and z1 is an integer from 1 to 100.

In embodiments, $R^{6.1A}$ is $R^{11.1}$-substituted or unsubstituted alkyl, $R^{11.1}$-substituted or unsubstituted heteroalkyl, $R^{11.1}$-substituted or unsubstituted cycloalkyl, $R^{11.1}$-substituted or unsubstituted heterocycloalkyl, $R^{11.1}$-substituted or unsubstituted aryl, or $R^{11.1}$-substituted or unsubstituted heteroaryl. $R^{11.1}$ is independently oxo, halogen, —$CF_3$, —$CCl_3$, —$CI_3$, —$CBr_3$, —$CHF_2$, —$CHCl_2$, —$CHI_2$, —$CHBr_2$, —$CH_2F$, —$CH_2Cl$, —$CH_2I$, —$CH_2Br$, —$OCH_2F$, —$OCH_2Cl$, —$OCH_2I$, —$OCH_2Br$, —$OCHF_2$, —$OCHCl_2$, —$OCHI_2$, —$OCHBr_2$, —$OCF_3$, —$OCCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC═(O)$NHNH_2$, —NHC═(O)$NH_2$, —$NHSO_2H$, —NHC═(O)H, —NHC(O)OH, —NHOH, —$PO_4H$, —$PO_3H$, —$N_3$, unsubstituted alkyl (e.g., $C_1$-$C_8$, $C_1$-$C_6$, $C_1$-$C_4$, or $C_1$-$C_2$ unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{10}$ or phenyl), or unsubstituted heteroaryl (e.g., 5 to 10 membered, 5 to 9 membered, or 5 to 6 membered). In embodiments, $R^{11.1}$ is independently —$PO_3H$, —$PO_4H$, —$SO_2NH_2$, —$SO_3H$, or —$SO_4H$. In embodiments, $R^{11.1}$ is independently —$SO_3H$. In embodiments, $R^{11.1}$ is independently —$PO_3H$. In embodiments, $R^{11.1}$ is independently —$SO_2NH_2$. In embodiments, $R^{11.1}$ is independently —$SO_4H$. In embodiments, $R^{11.1}$ is independently —$PO_4H$. In embodiments, $R^{11.1}$ is independently —$NH_2$. In embodiments, $R^{11.1}$ is independently —COOH. In embodiments, $R^{11.1}$ is independently —OH.

In embodiments, $R^{6.1A}$ is substituted or unsubstituted $C_1$-$C_6$ alkyl. In embodiments, $R^{6.1A}$ is substituted or unsubstituted $C_1$-$C_6$ alkyl. In embodiments, $R^{6.1A}$ is substituted or unsubstituted $C_1$ alkyl. In embodiments, $R^{6.1A}$ is substituted or unsubstituted $C_2$ alkyl. In embodiments, $R^{6.1A}$ is substituted or unsubstituted $C_3$ alkyl. In embodiments, $R^{6.1A}$ is substituted or unsubstituted $C_4$ alkyl. In embodiments, $R^{6.1A}$ is substituted or unsubstituted $C_5$ alkyl. In embodiments, $R^{6.1A}$ is substituted or unsubstituted $C_6$ alkyl. In embodiments, $R^{6.1A}$ is substituted $C_1$ alkyl. In embodiments, $R^{6.1A}$ is substituted $C_2$ alkyl. In embodiments, $R^{6.1A}$ is substituted $C_3$ alkyl. In embodiments, $R^{6.1A}$ is substituted $C_4$ alkyl. In embodiments, $R^{6.1A}$ is substituted $C_5$ alkyl. In embodiments, $R^{6.1A}$ is substituted $C_6$ alkyl. In embodiments, $R^{6.1A}$ is unsubstituted $C_1$ alkyl. In embodiments, $R^{6.1A}$ is unsubstituted $C_2$ alkyl. In embodiments, $R^{6.1A}$ is unsubstituted $C_3$ alkyl. In embodiments, $R^{6.1A}$ is unsubstituted $C_4$ alkyl. In embodiments, $R^{6.1A}$ is unsubstituted $C_5$ alkyl. In embodiments, $R^{6.1A}$ is unsubstituted $C_6$ alkyl.

In embodiments, $R^{6.1B}$ is $R^{12.1}$-substituted or unsubstituted alkyl, $R^{12.1}$-substituted or unsubstituted heteroalkyl, $R^{12.1}$-substituted or unsubstituted cycloalkyl, $R^{12.1}$-substituted or unsubstituted heterocycloalkyl, $R^{12.1}$-substituted or unsubstituted aryl, or $R^{12.1}$-substituted or unsubstituted heteroaryl. $R^{12.1}$ is independently oxo, halogen, —$CF_3$, —$CCl_3$, —$CI_3$, —$CBr_3$, —$CHF_2$, —$CHCl_2$, —$CHI_2$, —$CHBr_2$, —$CH_2F$, —$CH_2Cl$, —$CH_2I$, —$CH_2Br$, —$OCH_2F$, —$OCH_2Cl$, —$OCH_2I$, —$OCH_2Br$, —$OCHF_2$, —$OCHCl_2$, —$OCHI_2$, —$OCHBr_2$, —$OCF_3$, —$OCCl_3$, —$OCI_3$, —$OCBr_3$, —CN, —OH, —$NH_2$, —COOH, —$CONH_2$, —$NO_2$, —SH, —$SO_3H$, —$SO_4H$, —$SO_2NH_2$, —$NHNH_2$, —$ONH_2$, —NHC═(O)$NHNH_2$, —NHC═(O)$NH_2$, —$NHSO_2H$, —NHC═(O)H, —NHC(O)OH, —NHOH, —$PO_4H$, —$PO_3H$, —$N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{10}$ or phenyl), or unsubstituted heteroaryl (e.g., 5 to 10 membered, 5 to 9 membered, or 5 to 6 membered). In embodiments, $R^{12.1}$ is independently —$PO_3H$, —$PO_4H$, —$SO_2NH_2$, —$SO_3H$, or —$SO_4H$. In embodiments, $R^{12.1}$ is independently —$SO_3H$. In embodiments, $R^{12.1}$ is independently —$PO_3H$. In embodiments, $R^{12.1}$ is independently —$SO_2NH_2$. In embodiments, $R^{12.1}$ is independently —$SO_4H$. In embodiments, $R^{12.1}$ is independently —$PO_4H$. In embodiments, $R^{12.1}$ is independently —$NH_2$. In embodiments, $R^{12.1}$ is independently —COOH. In embodiments, $R^{12.1}$ is independently —OH.

In embodiments, $R^{6.1B}$ is substituted or unsubstituted $C_1$-$C_6$ alkyl. In embodiments, $R^{6.1B}$ is substituted or unsubstituted $C_1$-$C_6$ alkyl. In embodiments, $R^{6.1B}$ is substituted or unsubstituted $C_1$ alkyl. In embodiments, $R^{6.1B}$ is substituted or unsubstituted $C_2$ alkyl. In embodiments, $R^{6.1B}$ is substituted or unsubstituted $C_3$ alkyl. In embodiments, $R^{6.1B}$ is substituted or unsubstituted $C_4$ alkyl. In embodiments, $R^{6.1B}$ is substituted or unsubstituted $C_5$ alkyl. In embodiments, $R^{6.1B}$ is substituted or unsubstituted $C_6$ alkyl. In embodiments, $R^{6.1B}$ is substituted $C_1$ alkyl. In embodiments, $R^{6.1B}$ is substituted $C_2$ alkyl. In embodiments, $R^{6.1B}$ is substituted $C_3$ alkyl. In embodiments, $R^{6.1B}$ is substituted $C_4$ alkyl. In embodiments, $R^{6.1B}$ is substituted $C_5$ alkyl. In embodiments, $R^{6.1B}$ is substituted $C_6$ alkyl. In embodiments, $R^{6.1B}$ is unsubstituted $C_1$ alkyl. In embodiments, $R^{6.1B}$ is unsubstituted $C_2$ alkyl. In embodiments, $R^{6.1B}$ is unsubstituted $C_3$ alkyl. In embodiments, $R^{6.1B}$ is unsubstituted $C_4$ alkyl. In embodiments, $R^{6.1B}$ is unsubstituted $C_5$ alkyl. In embodiments, $R^{6.1B}$ is unsubstituted $C_6$ alkyl.

In embodiments, $R^{600}$ is —OH. In embodiments, $R^{600}$ is

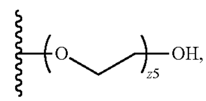

wherein z5 is an integer from 1 to 12. In embodiments, $R^{600}$ is halogen. In embodiments, $R^{600}$ is —Cl. In embodiments, $R^{600}$ is —F. In embodiments, $R^{600}$ is unsubstituted —O—$C_1$-$C_{20}$ alkyl or —O—$C_1$-$C_{18}$ alkyl. In embodiments, $R^{600}$ is unsubstituted —O—$C_1$-$C_{16}$ alkyl or —O—$C_1$-$C_{12}$ alkyl. In embodiments, $R^{600}$ is unsubstituted —O—$C_1$-$C_{10}$ alkyl or —O—$C_1$-$C_8$ alkyl. In embodiments, $R^{600}$ is unsubstituted —O—$C_1$-$C_6$ alkyl or —O—$C_1$-$C_4$ alkyl. In embodiments, $R^{600}$ is unsubstituted —O—$C_1$-$C_4$ alkyl. In embodiments, —$R^{600}$ is unsubstituted —O—$C_1$-$C_6$ alkyl. In embodiments, $R^{600}$ is unsubstituted —O— methyl. In embodiments, $R^{600}$ is unsubstituted —O—$C_2$ alkyl. In embodiments, $R^{600}$ is unsubstituted —O—$C_3$ alkyl. In embodiments, $R^{600}$ is unsubstituted —O—$C_4$ alkyl. In embodiments, $R^{600}$ is unsubstituted —O—$C_5$ alkyl. In embodiments, $R^{600}$ is unsubstituted —O—$C_6$ alkyl. In embodiments, $R^{600}$ is an unsubstituted 2 to 20 membered heteroalkyl. In embodiments, $R^{600}$ is an unsubstituted 2 to 10 membered heteroalkyl. In embodiments, $R^{600}$ is an unsubstituted 2 to 8 membered heteroalkyl. In embodiments, $R^{600}$ is an unsubstituted 2 to 6 membered heteroalkyl. In embodiments, $R^{600}$ is an unsubstituted 2 to 4 membered heteroalkyl. In embodiments, $R^{600}$ is halogen or has the formula:

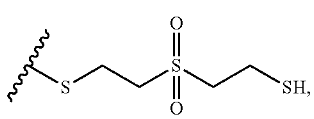

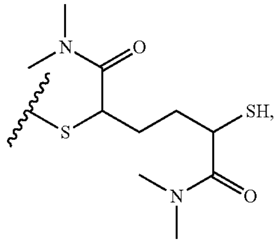

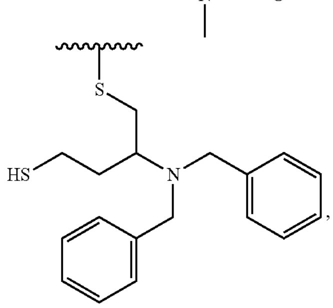

-continued

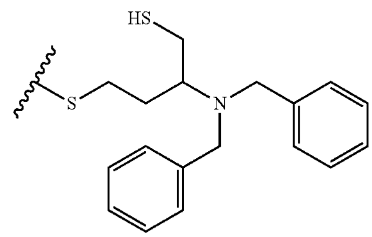

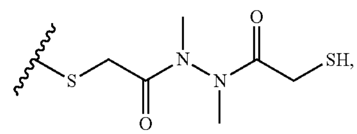

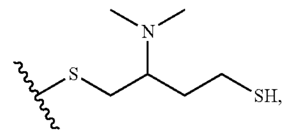

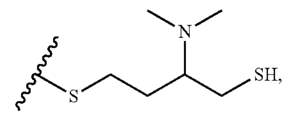

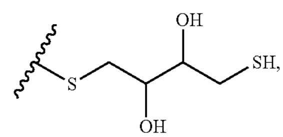

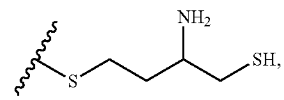

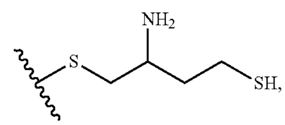

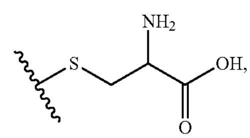

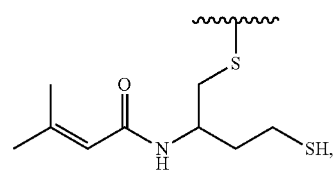

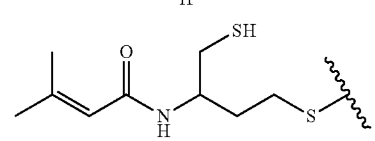

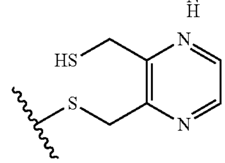

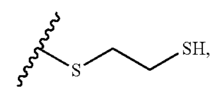

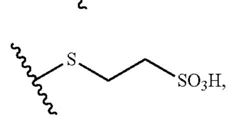

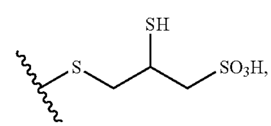

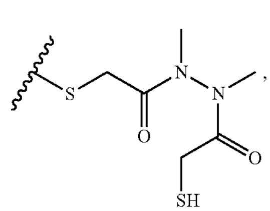

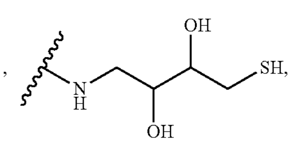

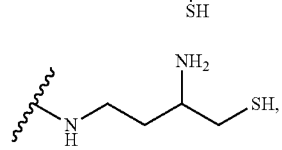

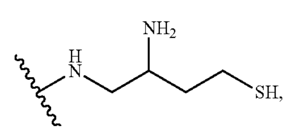

-continued
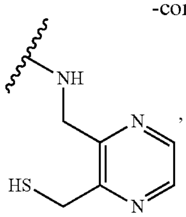
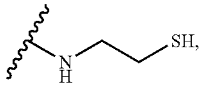
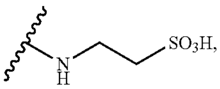
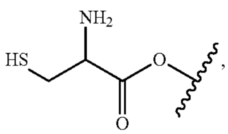
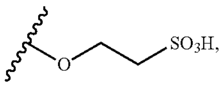
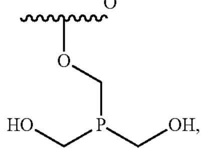
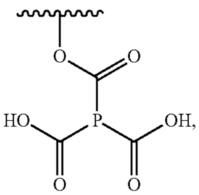
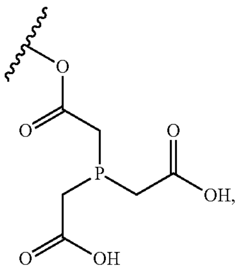
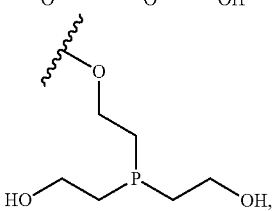
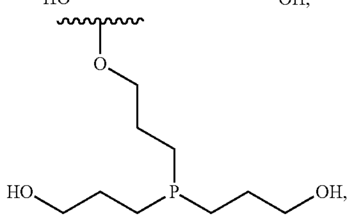
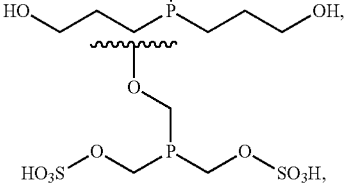
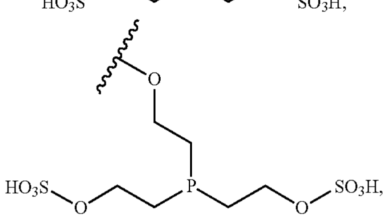
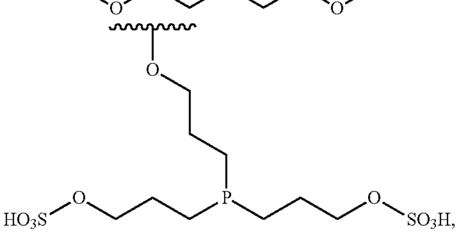
-continued
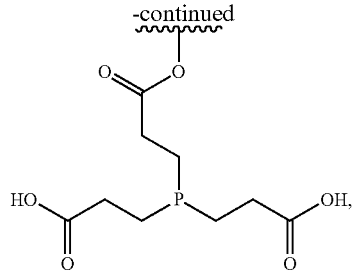
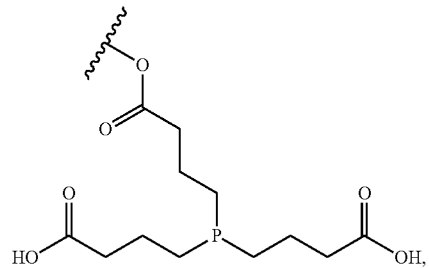
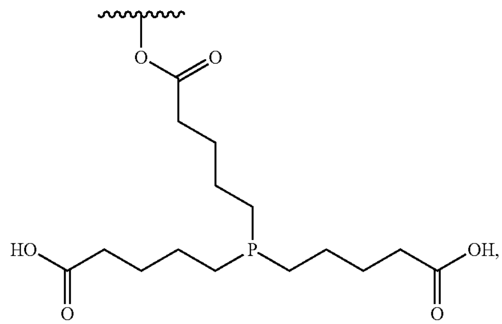
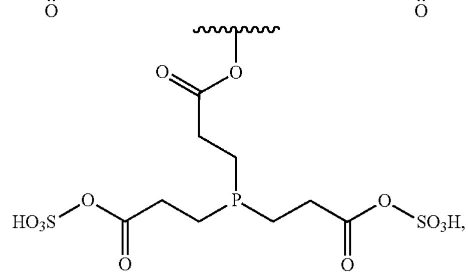
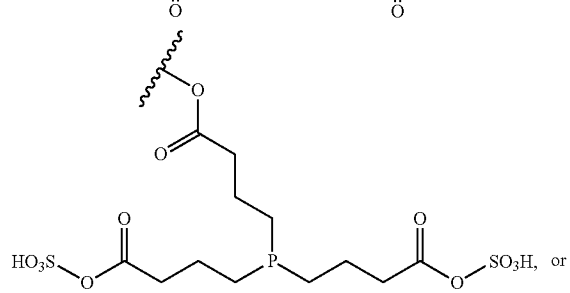
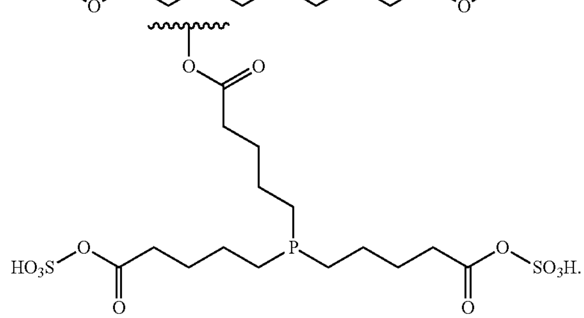

In embodiments, $R^{600}$ has the formula:
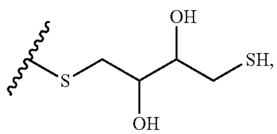
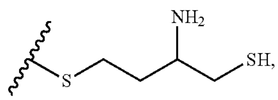
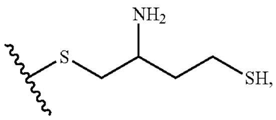
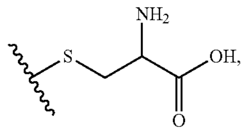
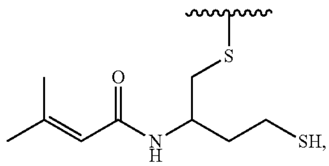
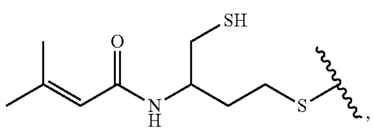
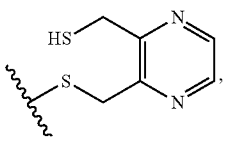
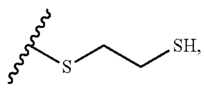
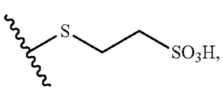
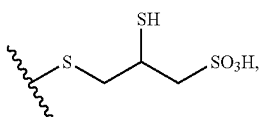
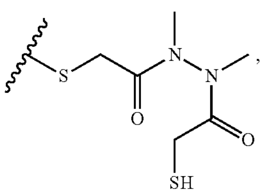
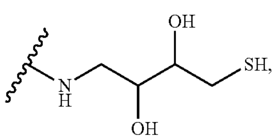
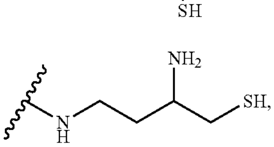
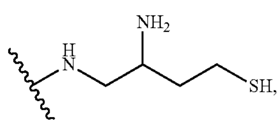
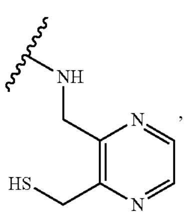
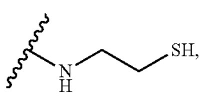
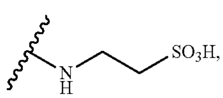
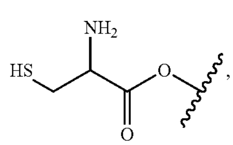
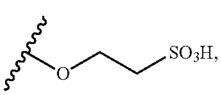
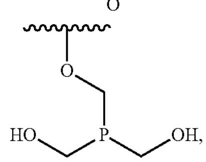
-continued
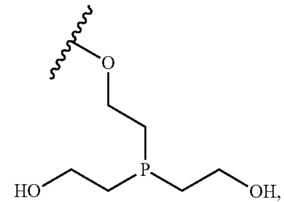
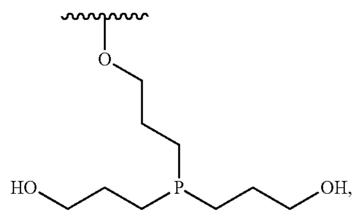
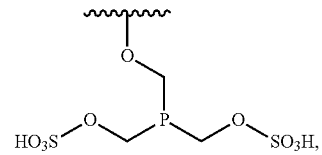
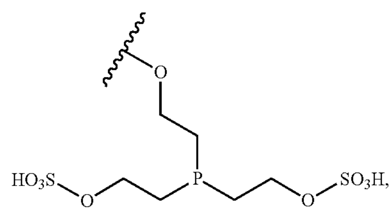
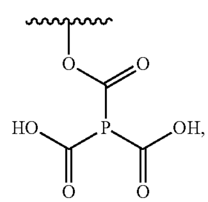
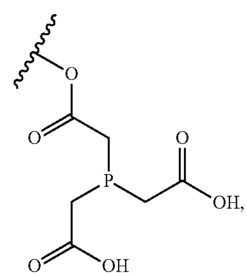
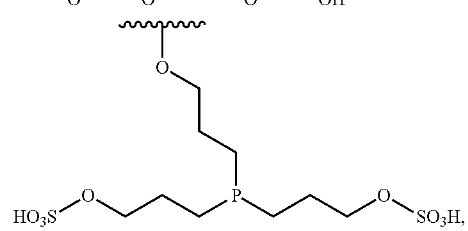
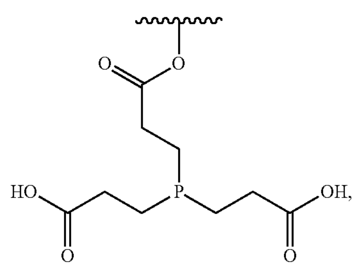

-continued
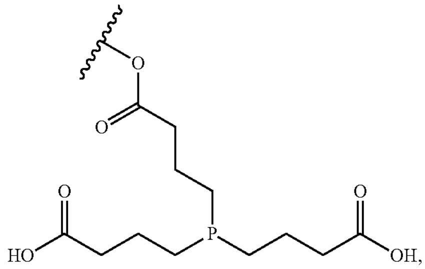
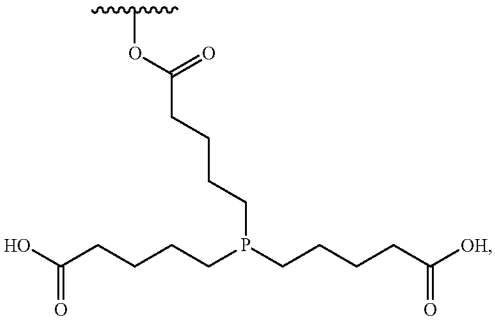
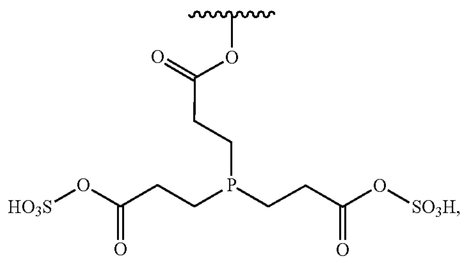
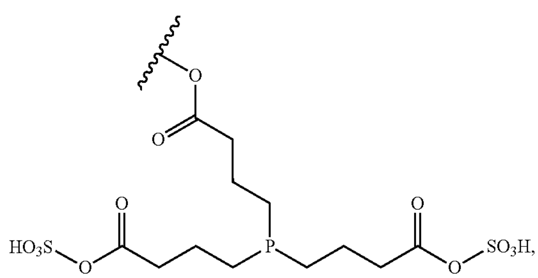
or
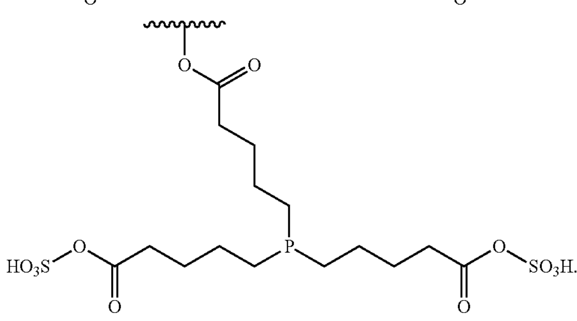
In embodiments, $R^{600}$ is halogen or has the formula:
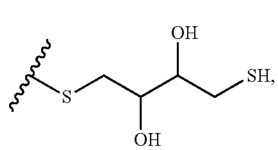
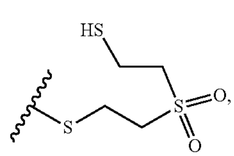
-continued
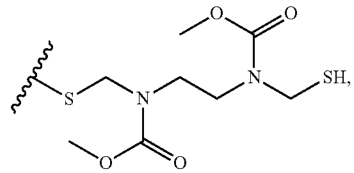
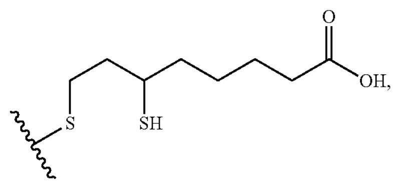
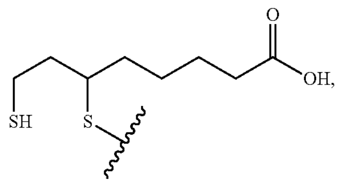
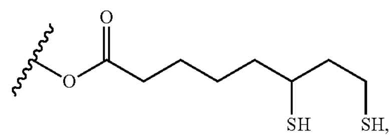
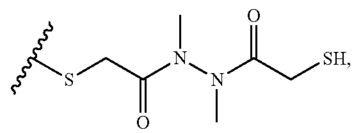
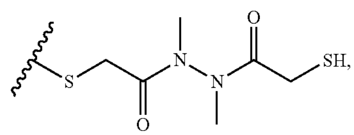
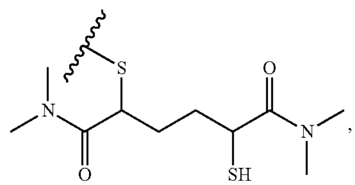
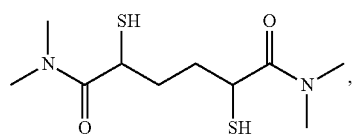
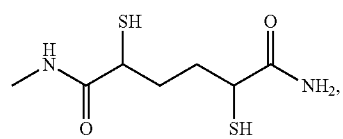
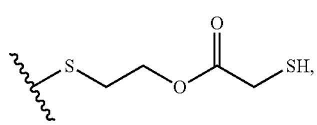
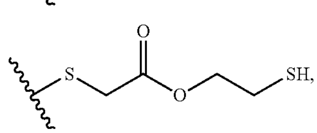

-continued

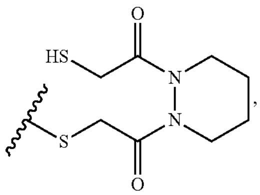
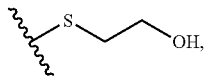
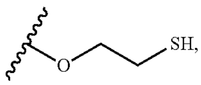
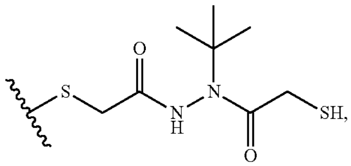
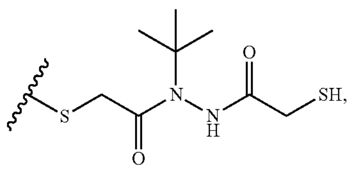
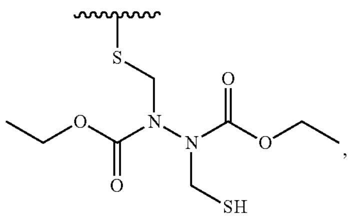
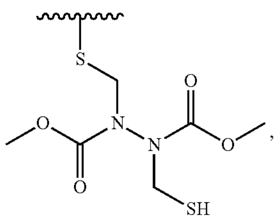
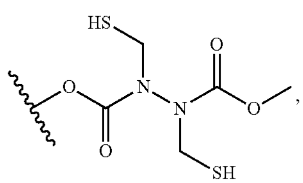
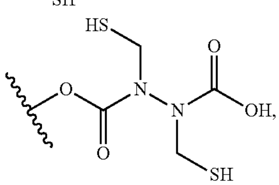

or

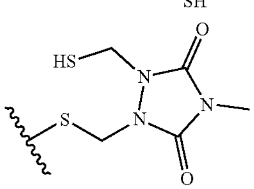

In embodiments, $R^{600}$ has the formula:

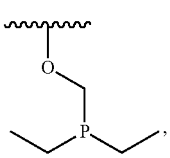
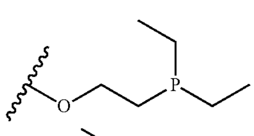
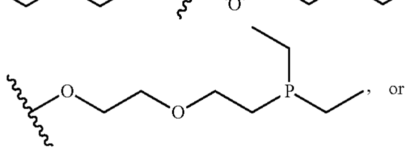

or

-continued

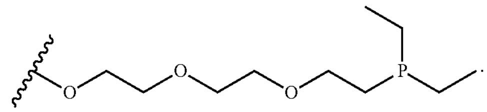

In embodiments, z1 is an integer from 1 to 10. In embodiments, z1 is an integer from 1 to 20. In embodiments, z1 is an integer from 1 to 30. In embodiments, z1 is an integer from 1 to 40. In embodiments, z1 is an integer from 1 to 50. In embodiments, z1 is an integer from 1 to 60. In embodiments, z1 is an integer from 1 to 70. In embodiments, z1 is an integer from 1 to 80. In embodiments, z1 is an integer from 1 to 90. In embodiments, z1 is an integer from 1 to 100.

In embodiments, the polymerized reducing agent includes polymerized subunits having the formula

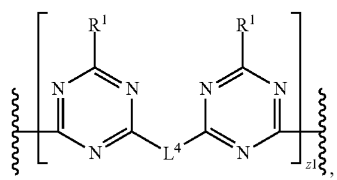

wherein $R^1$ is as described herein, $L^4$ is a covalent linker, and z1 is an integer from 1 to 100. In embodiments, z1 is 10. The "⌇" symbol represents attachment points to the remainder of the reducing agent or a terminating agent (e.g., hydrogen or $R^3$). In embodiments, the polymerized reducing agent includes polymerized subunits having the formula

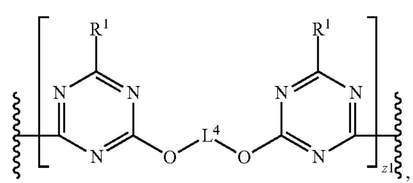

wherein $L^4$, $R^1$, and z1 are as described herein.

In embodiments, the polymerized reducing agent includes polymerized subunits having the formula

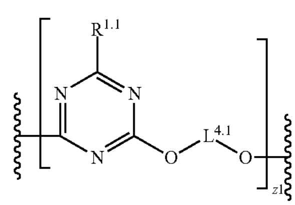

wherein $L^{4.1}$ is a covalent linker and $R^{1.1}$ is as described herein. In embodiments, the polymerized reducing agent includes polymerized substituents having the formula

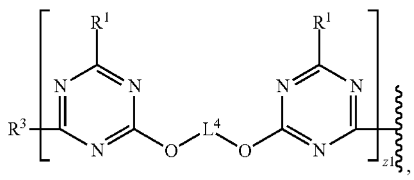

wherein $R^3$, $L^4$, $R^1$, and z1 are as described herein. In embodiments, the polymerized reducing agent is

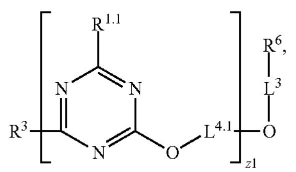

wherein $R^3$, $L^{4.1}$, $L^3$, $R^6$, $R^{1.1}$, and z1 are as described herein. In embodiments, $-L^3-R^6$ is

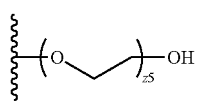

or

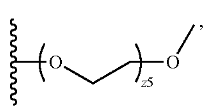

wherein z5 is an integer from 1 to 12.

In embodiments, the polymerized reducing agent includes

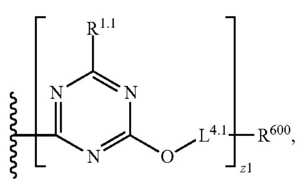

wherein $L^{4.1}$, $R^{1.1}$, $R^{600}$, and z1 are as described herein.

In embodiments, the polymerized reducing agent, alternatively referred to herein as a reducing polymer, is attached to a solid support (e.g., a particle). In embodiments, the solid support is surrounded by a reducing polymer. The solid support may be "surrounded" by the reducing polymer in the sense that the reducing polymer completely covers the solid support. The reducing polymer layer may enclose (e.g., surround, encapsulate, envelope) a particle. In embodiments, each particle surrounded by the reducing polymer forms a discrete particle, the outer surface of which is defined by the reducing polymer. Solid support particles may be composed of any appropriate material. In embodiments, the support particle is an amorphous solid. In embodiments, the support particle is a crystalline solid. For example, solid support particles may include appropriate metals and metal oxides thereof (a metal particle core), carbon (an organic particle core) silica and oxides thereof (a silica particle core) or boron and oxides thereof (a boron particle core). For example, the core/shell layers may be formed around a supporting bead (alternatively referred to as a support particle), for example, a silica, magnetic, or paramagnetic bead. The term "support particle" as used herein may refer to any particle or substance having a diameter in the micrometer range, such as a "microparticle," which typically has a diameter of approximately 1 μm and higher, or a "nanoparticle," which typically has a diameter of 1 nm to 1 μm. The core, optionally including a solid silica support particle, may be referred to herein as a nanoparticle core wherein the longest diameter is less than 1000 nanometers. Lengths and sizes of particles as described herein may be measured using Transmission Electron Microscopy (TEM).

In embodiments, $L^4$ is substituted or unsubstituted alkylene (e.g., $C_1$-$C_{20}$, $C_{10}$-$C_{20}$, $C_1$-$C_8$, $C_1$-$C_6$, or $C_1$-$C_4$), substituted or unsubstituted heteroalkylene (e.g., 2 to 20, 8 to 20, 2 to 10, 2 to 8, 2 to 6, or 2 to 4 membered), substituted or unsubstituted cycloalkylene (e.g., $C_3$-$C_8$, $C_3$-$C_6$, or $C_5$-$C_6$), substituted or unsubstituted heterocycloalkylene (e.g., 3 to 8, 3 to 6, or 5 to 6 membered), substituted or unsubstituted arylene (e.g., $C_6$-$C_{10}$, $C_{10}$, or phenylene), or substituted or unsubstituted heteroarylene (e.g., 5 to 10, 5 to 9, or 5 to 6 membered).

In embodiments, $L^4$ is $R^{40}$-substituted or unsubstituted alkylene (e.g., $C_1$-$C_{20}$, $C_{10}$-$C_{20}$, $C_1$-$C_8$, $C_1$-$C_6$, or $C_1$-$C_4$), or $R^{40}$-substituted or unsubstituted heteroalkylene (e.g., 2 to 20, 8 to 20, 2 to 10, 2 to 8, 2 to 6, or 2 to 4 membered). In embodiments, $L^4$ is substituted or unsubstituted alkylene (e.g., $C_1$-$C_{20}$, $C_{10}$-$C_{20}$, $C_1$-$C_8$, $C_1$-$C_6$, or $C_1$-$C_4$), or substituted or unsubstituted heteroalkylene (e.g., 2 to 20, 8 to 20, 2 to 10, 2 to 8, 2 to 6, or 2 to 4 membered).

In embodiments, $L^4$ is unsubstituted $C_1$-$C_6$ or $C_1$-$C_4$ alkylene. In embodiments, $L^4$ is unsubstituted $C_1$-$C_4$ alkylene. In embodiments, $L^4$ is unsubstituted $C_1$-$C_6$ alkylene. In embodiments, $L^4$ is unsubstituted methylene. In embodiments, $L^4$ is unsubstituted $C_2$ alkylene. In embodiments, $L^4$ is unsubstituted $C_3$ alkylene. In embodiments, $L^4$ is unsubstituted $C_4$ alkylene. In embodiments, $L^4$ is unsubstituted $C_5$ alkylene. In embodiments, $L^4$ is unsubstituted $C_6$ alkylene. In embodiments, $L^4$ is $R^{40}$-substituted $C_1$-$C_6$ or $C_1$-$C_4$ alkylene. In embodiments, $L^4$ is $R^{40}$-substituted $C_1$-$C_4$ alkylene. In embodiments, $L^4$ is $R^{40}$-substituted $C_1$-$C_6$ alkylene. In embodiments, $L^4$ is $R^{40}$-substituted methylene. In embodiments, $L^4$ is $R^{40}$-substituted $C_2$ alkylene. In embodiments, $L^4$ is $R^{40}$-substituted $C_3$ alkylene. In embodiments, $L^4$ is $R^{40}$-substituted $C_4$ alkylene. In embodiments, $L^4$ is $R^{40}$-substituted $C_5$ alkylene. In embodiments, $L^4$ is $R^{40}$-substituted $C_6$ alkylene. In embodiments, $L^4$ is $R^{40}$-substituted 2 to 10 membered heteroalkylene. In embodiments, $L^4$ is $R^{40}$-substituted 2 to 8 membered heteroalkylene. In embodiments, $L^4$ is $R^{40}$-substituted 2 to 6 membered heteroalkylene. In embodiments, $L^4$ is $R^{40}$-substituted 2 to 4 membered heteroalkylene. In embodiments, $L^4$ is an unsubstituted 2 to 10 membered heteroalkylene. In embodiments, $L^4$ is an unsubstituted 2 to 8 membered heteroalkylene. In embodiments, $L^4$ is an unsubstituted 2 to 6 membered heteroalkylene. In embodiments, $L^4$ is an unsubstituted 2 to 4 membered heteroalkylene.

$R^{40}$ is independently oxo, halogen, $-CCl_3$, $-CBr_3$, $-CF_3$, $-CI_3$, $-CHCl_2$, $-CHBr_2$, $-CHF_2$, $-CH_2Cl$, $-CH_2Br$, $-CH_2I$, —CN, —OH, $-NH_2$, —COOH, $-CONH_2$, $-NO_2$, —SH, $-SO_3H$, $-SO_4H$, $-SO_2NH_2$, $-NHNH_2$, $-ONH_2$, $-NHC(O)NHNH_2$, $-NHC(O)NH_2$, $-NHSO_2H$, —NHC(O)H, —NHC(O)OH, —NHOH, $-OCCl_3$, $-OCBr_3$, $-OCI_3$, $-OCHCl_2$, $-OCHBr_2$, $-OCHI_2$, $-OCHF_2$, $-OCH_2Cl$, $-OCH_2Br$, $-OCH_2I$, $-OCH_2F$, $-N_3$, $-SF_5$, $-NH_3^+$, $-SO_3^-$, $-OPO_3H^-$, —SCN, $-ONO_2$, unsubstituted alkyl (e.g., $C_1$-$C_{20}$, $C_{10}$-$C_{20}$, $C_1$-$C_8$, $C_1$-$C_6$, or $C_1$-$C_4$), unsubstituted heteroalkyl (e.g., 2 to 20, 8 to 20, 2 to 10, 2 to 8, 2 to 6, or 2 to 4 membered), unsubstituted cycloalkyl (e.g., $C_3$-$C_8$, $C_3$-$C_6$, or $C_5$-$C_6$), unsubstituted heterocycloalkyl (e.g., 3 to 8, 3 to 6, or 5 to 6 membered), unsubstituted aryl (e.g., $C_6$-$C_{10}$, $C_{10}$, or phenyl), or unsubstituted heteroaryl (e.g., 5 to 10, 5 to 9, or 5 to 6 membered).

In embodiments, $L^4$ is $R^{40}$-substituted or unsubstituted alkylene, $R^{40}$-substituted or unsubstituted heteroalkylene, $R^{40}$-substituted or unsubstituted cycloalkylene, $R^{40}$-substituted or unsubstituted heterocycloalkylene, $R^{40}$-substituted or unsubstituted arylene, or $R^{40}$-substituted or unsubstituted heteroarylene. In embodiments, $L^4$ is $R^{40}$-substituted or unsubstituted alkylene, or $R^{40}$-substituted or unsubstituted heteroalkylene. In embodiments, $L^4$ is unsubstituted alkylene, or unsubstituted heteroalkylene. In embodiments, $L^4$ is unsubstituted PEG. In embodiments, $L^4$ is

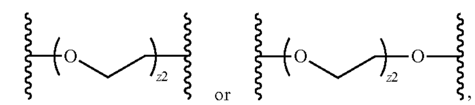

wherein z2 is an integer from 1 to 20.

In embodiments, $L^{4.1}$ is substituted or unsubstituted alkylene (e.g., $C_1$-$C_{20}$, $C_{10}$-$C_{20}$, $C_1$-$C_8$, $C_1$-$C_6$, or $C_1$-$C_4$), substituted or unsubstituted heteroalkylene (e.g., 2 to 20, 8 to 20, 2 to 10, 2 to 8, 2 to 6, or 2 to 4 membered), substituted or unsubstituted cycloalkylene (e.g., $C_3$-$C_8$, $C_3$-$C_6$, or $C_5$-$C_6$), substituted or unsubstituted heterocycloalkylene (e.g., 3 to 8, 3 to 6, or 5 to 6 membered), substituted or unsubstituted arylene (e.g., $C_6$-$C_{10}$, $C_{10}$, or phenylene), or substituted or unsubstituted heteroarylene (e.g., 5 to 10, 5 to 9, or 5 to 6 membered).

In embodiments, $L^{4.1}$ is $R^{41}$-substituted or unsubstituted alkylene (e.g., $C_1$-$C_{20}$, $C_{10}$-$C_{20}$, $C_1$-$C_8$, $C_1$-$C_6$, or $C_1$-$C_4$), or $R^{41}$-substituted or unsubstituted heteroalkylene (e.g., 2 to 20, 8 to 20, 2 to 10, 2 to 8, 2 to 6, or 2 to 4 membered). In embodiments, $L^{4.1}$ is substituted or unsubstituted alkylene (e.g., $C_1$-$C_{20}$, $C_{10}$-$C_{20}$, $C_1$-$C_8$, $C_1$-$C_6$, or $C_1$-$C_4$), or substituted or unsubstituted heteroalkylene (e.g., 2 to 20, 8 to 20, 2 to 10, 2 to 8, 2 to 6, or 2 to 4 membered).

In embodiments, $L^{4.1}$ is unsubstituted $C_1$-$C_6$ or $C_1$-$C_4$ alkylene. In embodiments, $L^{4.1}$ is unsubstituted $C_1$-$C_4$ alkylene. In embodiments, $L^{4.1}$ is unsubstituted $C_1$-$C_6$ alkylene. In embodiments, $L^{4.1}$ is unsubstituted methylene. In embodiments, $L^{4.1}$ is unsubstituted $C_2$ alkylene. In embodiments, $L^{4.1}$ is unsubstituted $C_3$ alkylene. In embodiments, $L^{4.1}$ is unsubstituted $C_4$ alkylene. In embodiments, $L^{4.1}$ is unsubstituted $C_5$ alkylene. In embodiments, $L^{4.1}$ is unsubstituted $C_6$ alkylene. In embodiments, $L^{4.1}$ is $R^{41}$-substituted $C_1$-$C_6$ or $C_1$-$C_4$ alkylene. In embodiments, $L^{4.1}$ is $R^{41}$-substituted $C_1$-$C_4$ alkylene. In embodiments, $L^{4.1}$ is $R^{41}$-substituted $C_1$-$C_6$ alkylene. In embodiments, $L^{4.1}$ is $R^{41}$-substituted methylene. In embodiments, $L^{4.1}$ is $R^{41}$-substituted $C_2$ alkylene. In embodiments, $L^{4.1}$ is $R^{41}$-substituted $C_3$ alkylene. In embodiments, $L^{4.1}$ is $R^{41}$-substituted $C_4$ alkylene. In embodiments, $L^{4.1}$ is $R^{41}$-substituted $C_5$ alkylene. In embodiments, $L^{4.1}$ is $R^{41}$-substituted $C_6$ alkylene. In embodiments, $L^{4.1}$ is $R^{41}$-substituted 2 to 10 membered heteroalkylene. In embodiments, $L^{4.1}$ is $R^{41}$-substituted 2 to 8 membered heteroalkylene. In embodiments, $L^{4.1}$ is $R^{41}$-substituted 2 to 6 membered heteroalkylene. In embodiments, $L^{4.1}$ is $R^{41}$-substituted 2 to 4 membered heteroalkylene. In embodiments, $L^{4.1}$ is an unsubstituted 2 to 10 membered heteroalkylene. In embodiments, $L^{4.1}$ is an unsubstituted 2 to 8 membered heteroalkylene. In embodiments, $L^{4.1}$ is an unsubstituted 2 to 6 membered heteroalkylene. In embodiments, $L^{4.1}$ is an unsubstituted 2 to 4 membered heteroalkylene.

$R^{41}$ is independently oxo, halogen, $-CCl_3$, $-CBr_3$, $-CF_3$, $-CI_3$, $-CHCl_2$, $-CHBr_2$, $-CHF_2$, $-CHI_2$, $-CH_2Cl$, $-CH_2Br$, $-CH_2F$, $-CH_2I$, $-CN$, $-OH$, $-NH_2$, $-COOH$, $-CONH_2$, $-NO_2$, $-SH$, $-SO_3H$, $-SO_4H$, $-SO_2NH_2$, $-NHNH_2$, $-ONH_2$, $-NHC(O)NHNH_2$, $-NHC(O)NH_2$, $-NHSO_2H$, $-NHC(O)H$, $-NHC(O)OH$, $-NHOH$, $-OCCl_3$, $-OCF_3$, $-OCBr_3$, $-OCI_3$, $-OCHCl_2$, $-OCHBr_2$, $-OCHI_2$, $-OCHF_2$, $-OCH_2Cl$, $-OCH_2Br$, $-OCH_2I$, $-OCH_2F$, $-N_3$, $-SF_5$, $-NH_3^+$, $-SO_3^-$, $-OPO_3H^-$, $-SCN$, $-ONO_2$, unsubstituted alkyl (e.g., $C_1$-$C_{20}$, $C_{10}$-$C_{20}$, $C_1$-$C_8$, $C_1$-$C_6$, or $C_1$-$C_4$), unsubstituted heteroalkyl (e.g., 2 to 20, 8 to 20, 2 to 10, 2 to 8, 2 to 6, or 2 to 4 membered), unsubstituted cycloalkyl (e.g., $C_3$-$C_8$, $C_3$-$C_6$, or $C_5$-$C_6$), unsubstituted heterocycloalkyl (e.g., 3 to 8, 3 to 6, or 5 to 6 membered), unsubstituted aryl (e.g., $C_6$-$C_{10}$, $C_{10}$, or phenyl), or unsubstituted heteroaryl (e.g., 5 to 10, 5 to 9, or 5 to 6 membered).

In embodiments, $L^{4.1}$ is $R^{41}$-substituted or unsubstituted alkylene, $R^{41}$-substituted or unsubstituted heteroalkylene, $R^{41}$-substituted or unsubstituted cycloalkylene, $R^{41}$-substituted or unsubstituted heterocycloalkylene, $R^{41}$-substituted or unsubstituted arylene, or $R^{41}$-substituted or unsubstituted heteroarylene. In embodiments, $L^{4.1}$ is $R^{41}$-substituted or unsubstituted alkylene, or $R^{41}$-substituted or unsubstituted heteroalkylene. In embodiments, $L^{4.1}$ is unsubstituted alkylene, or unsubstituted heteroalkylene. In embodiments, $L^{4.1}$ is unsubstituted PEG. In embodiments, $L^{4.1}$ is

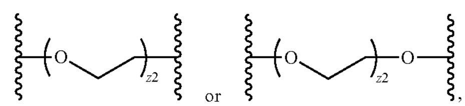

wherein z2 is an integer from 1 to 20.

In embodiments, the polymerized reducing agent includes polymerized subunits having the formula

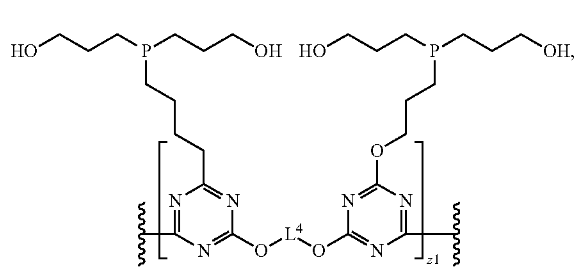

wherein $L^4$ and z1 are as described herein. In embodiments, the polymerized reducing agent includes polymerized subunits having the formula

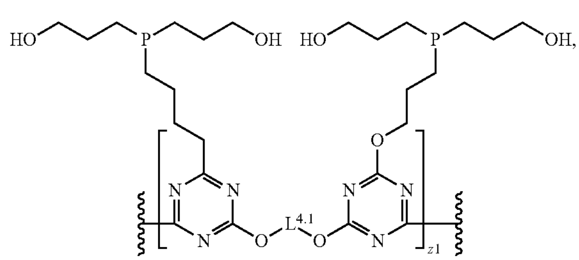

wherein $L^{4.1}$ and z1 are as described herein.

In embodiments, the sequencing solution includes a buffer solution. Typically, the buffered solutions contemplated herein are made from a weak acid and its conjugate base or a weak base and its conjugate acid. For example, sodium acetate and acetic acid are buffer agents that can be used to form an acetate buffer. Other examples of buffer agents that can be used to make buffered solutions include, but are not limited to, Tris, Tricine, HEPES, TES, MOPS, MOPSO and PIPES. Additionally, other buffer agents that can be used in enzyme reactions, hybridization reactions, and detection reactions are well known in the art. In embodiments, the buffered solution can include Tris. With respect to the embodiments described herein, the pH of the buffered solution can be modulated to permit any of the described reactions. In some embodiments, the buffered solution can have a pH greater than pH 7.0, greater than pH 7.5, greater than pH 8.0, greater than pH 8.5, greater than pH 9.0, greater than pH 9.5, greater than pH 10, greater than pH 10.5, greater than pH 11.0, or greater than pH 11.5. In other embodiments, the buffered solution can have a pH ranging, for example, from about pH 6 to about pH 9, from about pH 8 to about pH 10, or from about pH 7 to about pH 9. In embodiments, the buffered solution can comprise one or more divalent cations. Examples of divalent cations can include, but are not limited to, $Mg^{2+}$, $Mn^{2+}$, $Zn^{2+}$, and $Ca^{2+}$. In embodiments, the buffered solution can contain one or more divalent cations at a concentration sufficient to permit hybridization of a nucleic acid. In some embodiments, a concentration can be more than about 1 μM, more than about 2 μM, more than about 5 μM, more than about 10 μM, more than about 25 μM, more than about 50 μM, more than about 75 μM, more than about 100 μM, more than about 200 μM, more than about 300 μM, more than about 400 μM, more than about 500 μM, more than about 750 μM, more than about 1 mM, more than about 2 mM, more than about 5 mM, more than about 10 mM, more than about 20 mM, more than about 30 mM, more than about 40 mM, more than about 50 mM, more than about 60 mM, more than about 70 mM, more than about 80 mM, more than about 90 mM, more than about 100 mM, more than about 150 mM, more than about 200 mM, more than about 250 mM, more than about 300 mM, more than about 350 mM, more than about 400 mM, more than about 450 mM, more than about 500 mM, more than about 550 mM, more than about 600 mM, more than about 650 mM, more than about 700 mM, more than about 750 mM, more than about 800 mM, more than about 850 mM, more than about 900 mM, more than about 950 mM or more than about 1 M.

In embodiments, the compound is

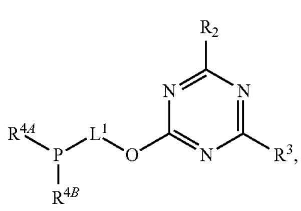

wherein $L^1$, $R^{4A}$, $R^{4B}$, $R^2$, and $R^3$ are as described herein. In embodiments, the compound is wherein $L^1$, $R^{4A}$, and $R^{4B}$ are as described herein. In embodiments, the compound is

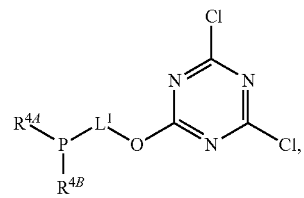

wherein $L^1$, $R^{4A}$, and $R^{4B}$ are as described herein. In embodiments, the compound is

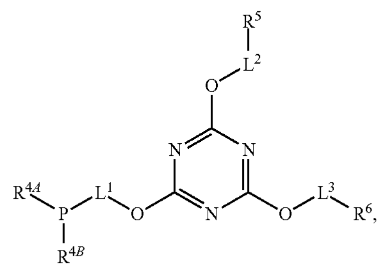

wherein $L^1$, $L^2$, $L^3$, $R^5$, $R^6$, $R^{4A}$, and $R^{4B}$ are as described herein. In embodiments, the compound is

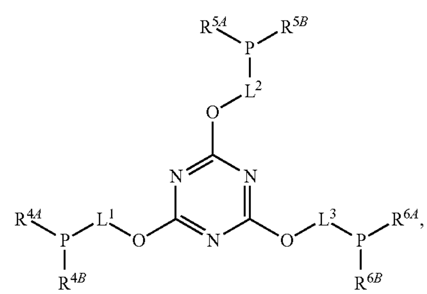

wherein $L^1$, $L^2$, $L^3$, $R^{5A}$, $R^{5B}$, $R^{6A}$, $R^{6B}$, $R^{4A}$, and $R^{4B}$ are as described herein.

In an aspect is a composition comprising a plurality of a first type of reducing agents (e.g., 1CYNA-2cyst) and a second type of reducing agent (e.g., 2CYNA-cyst) as described herein. For example 1CYNA-2cyst has the formula:

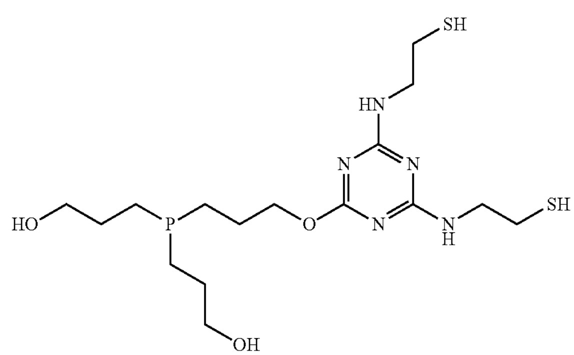 [SMILES: OCCCP(CCCO)CCCOc1nc(NCCS)nc(NCCS)n1]

and 2CYNA-cyst has the formula:
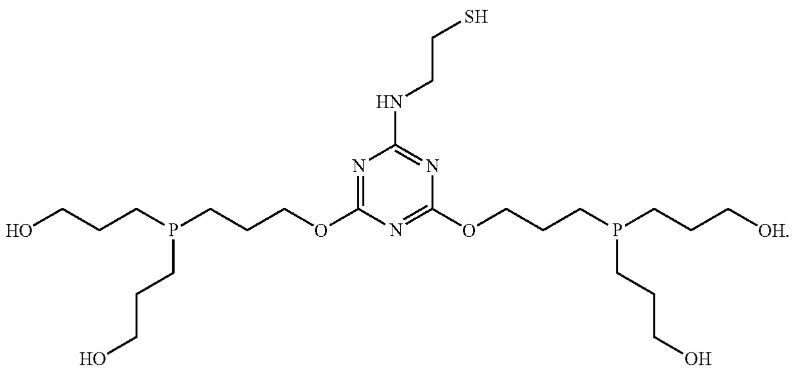 [SMILES: OCCCP(CCCO)CCCOc1nc(NCCS)nc(OCCCP(CCCO)CCCO)n1]
In embodiments, the compound is
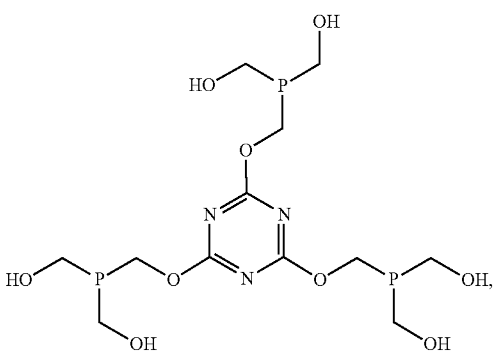
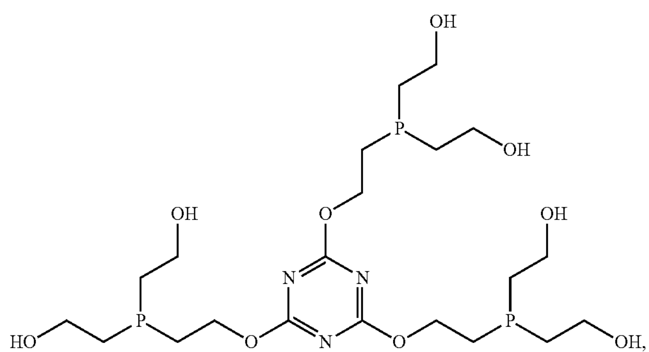
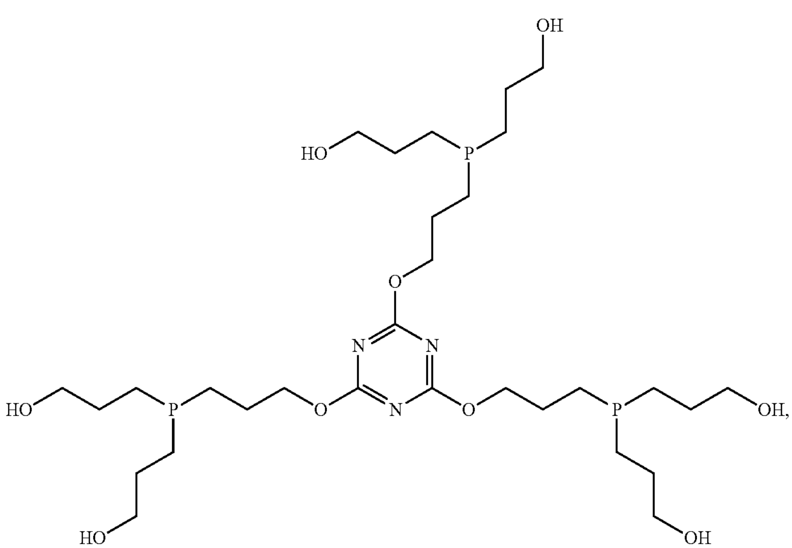

-continued
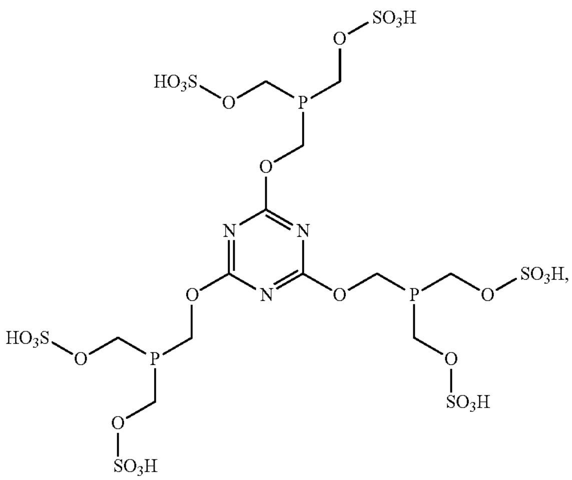
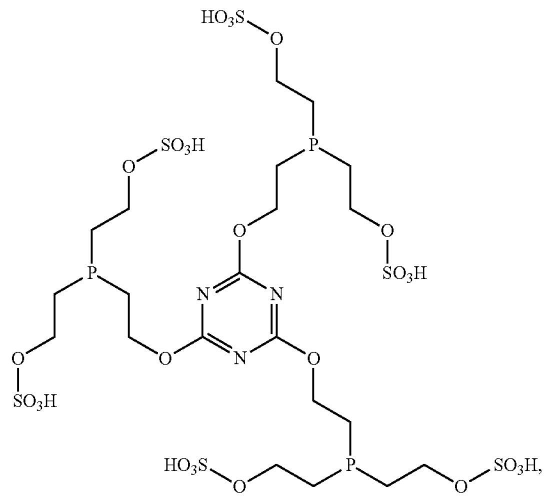
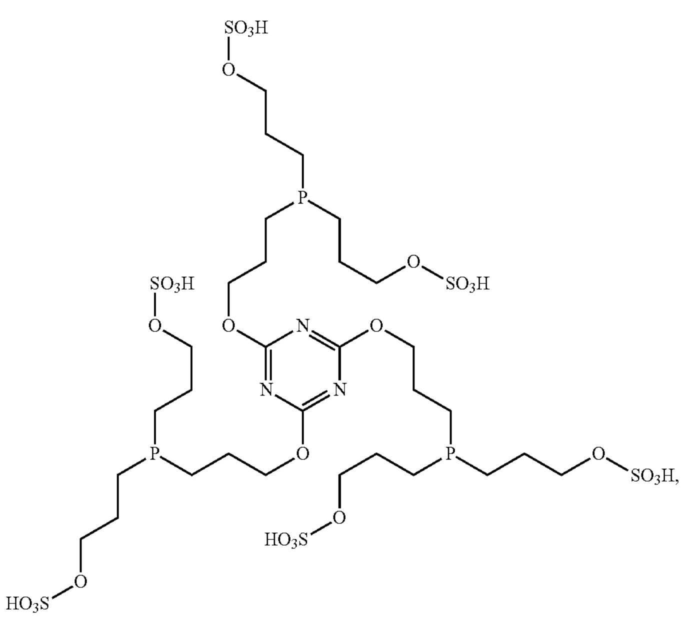

-continued
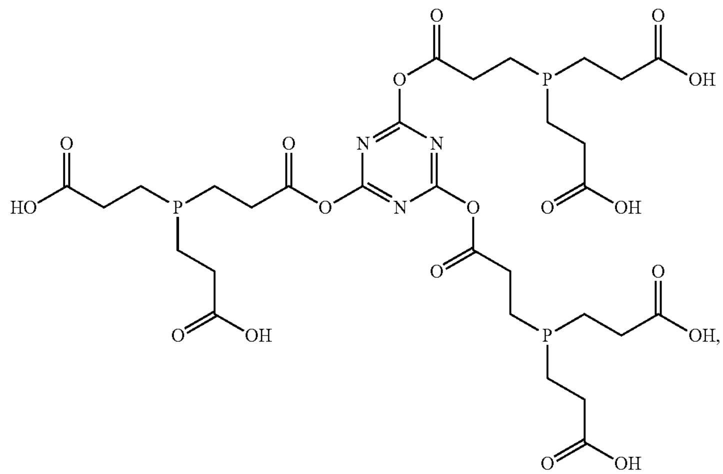
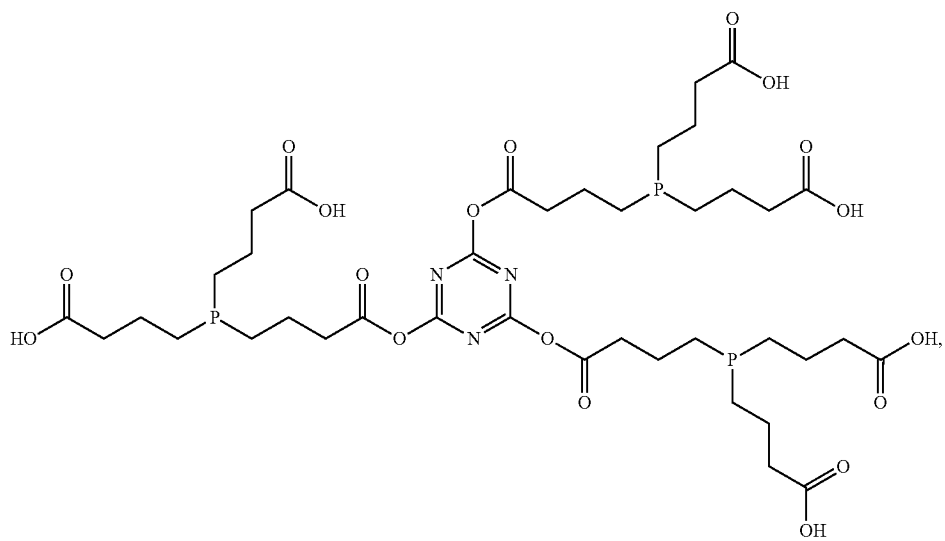
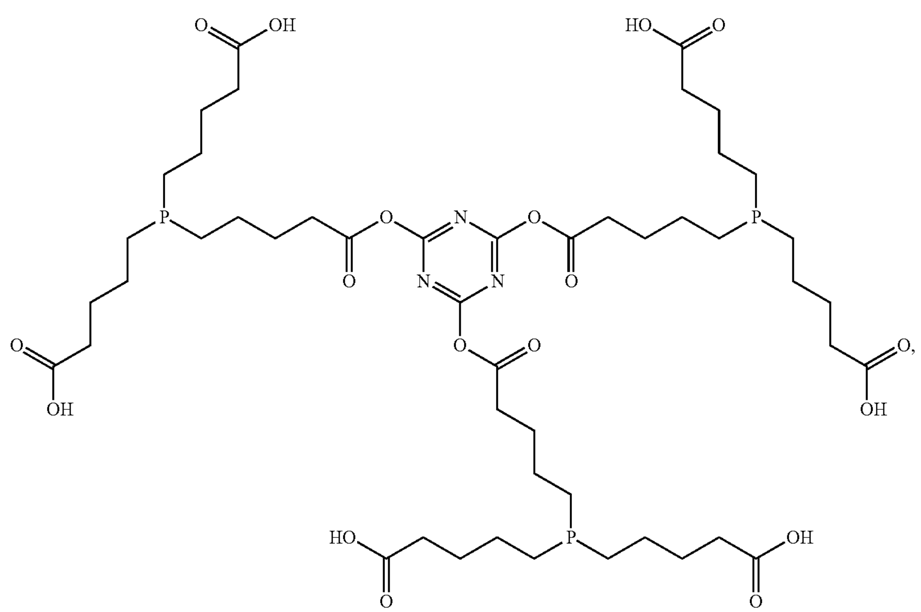

-continued
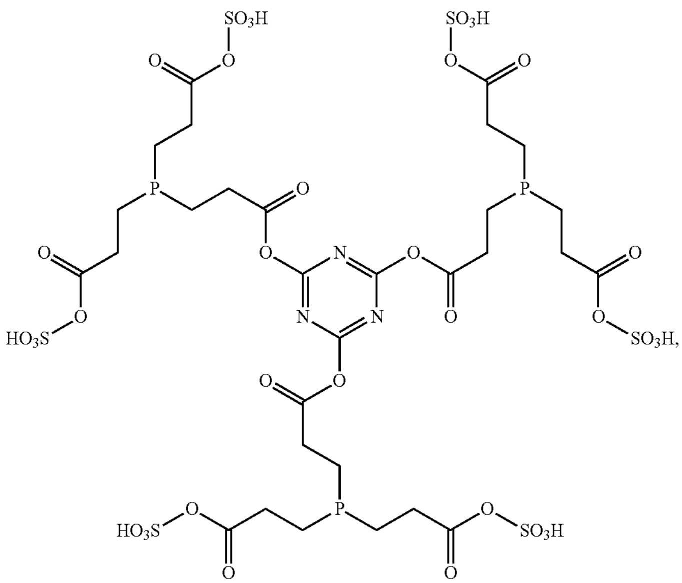
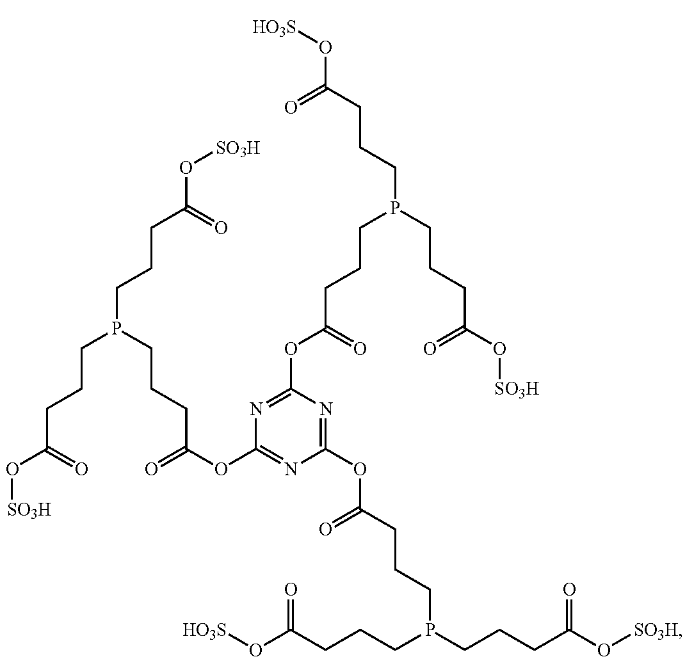

-continued
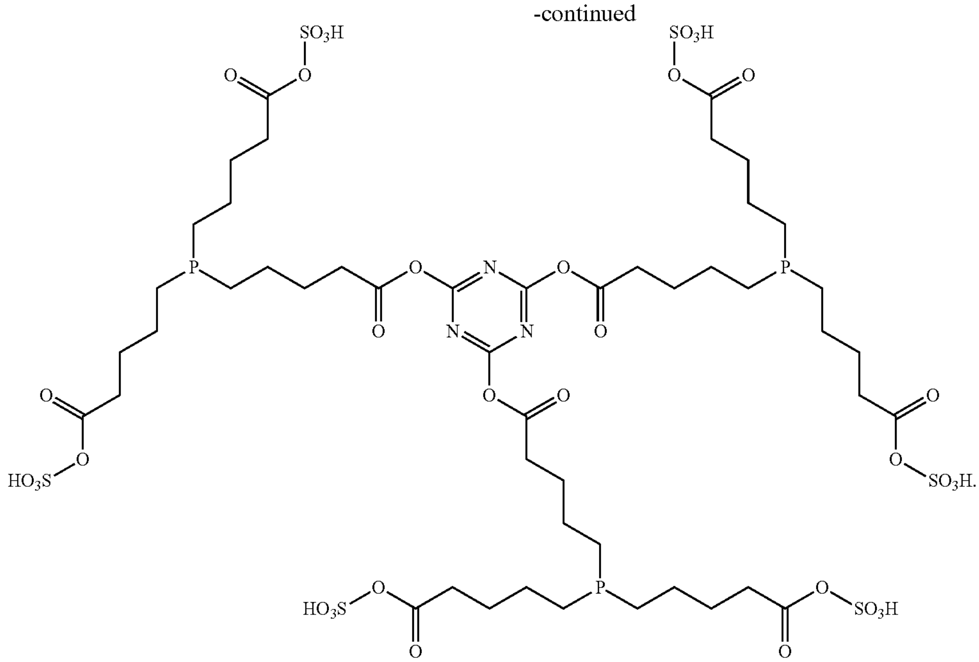
In embodiments, the compound is
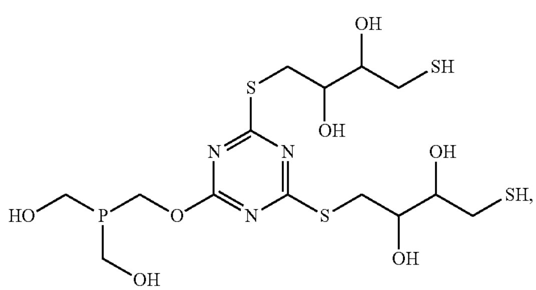
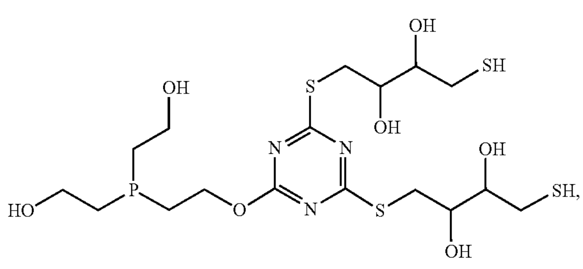
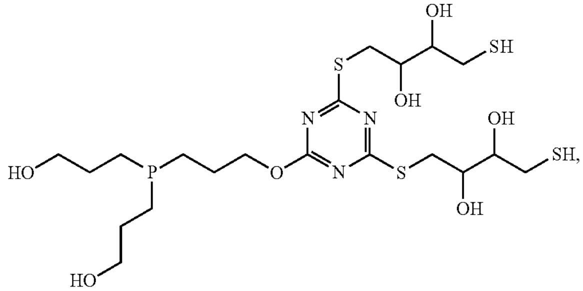
-continued
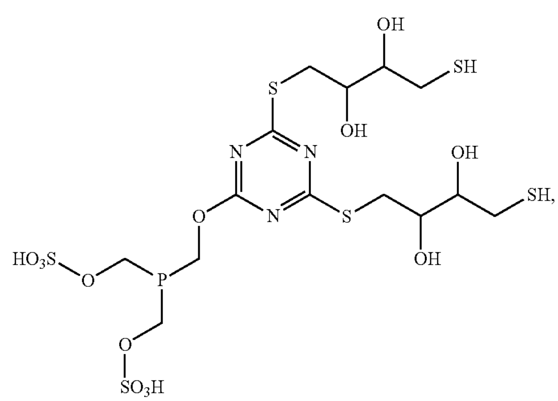
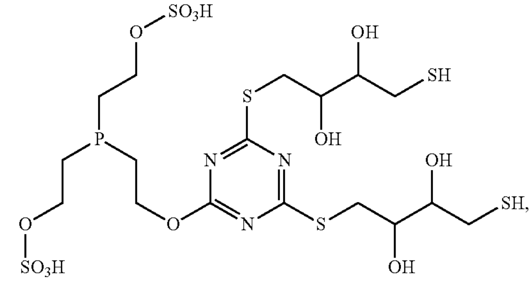

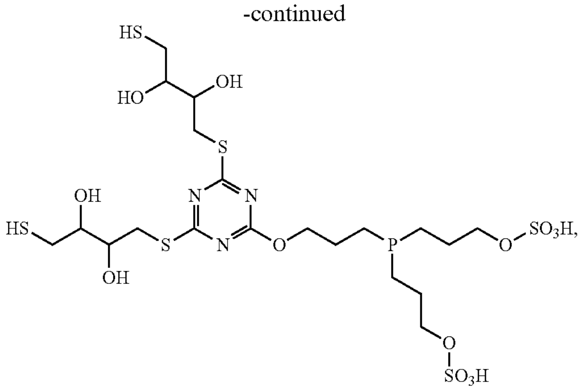
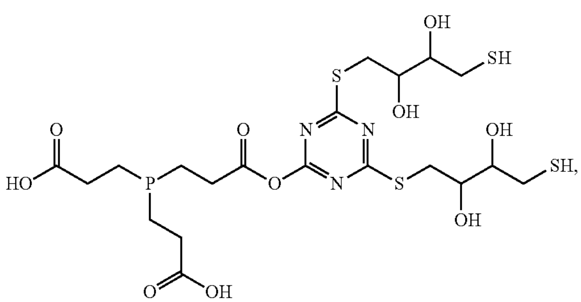
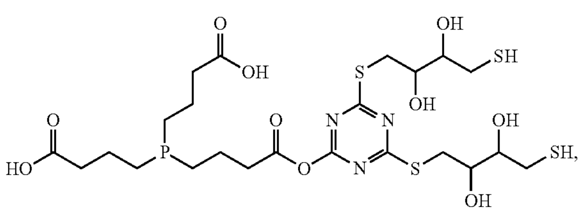
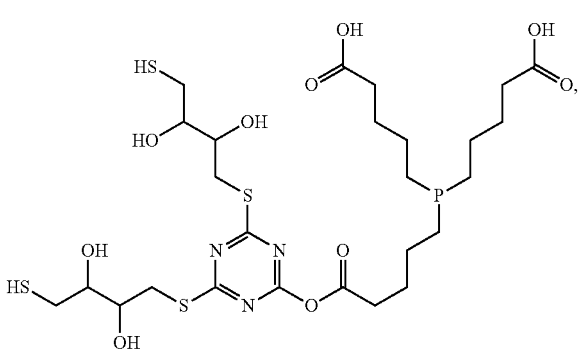
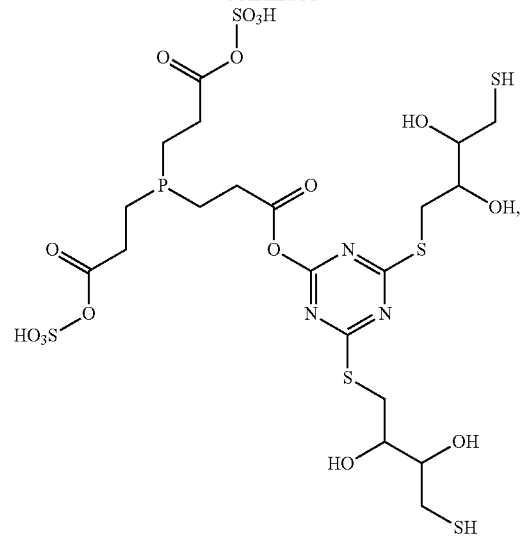
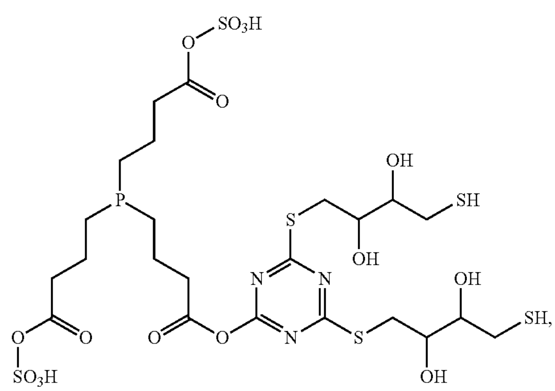
or
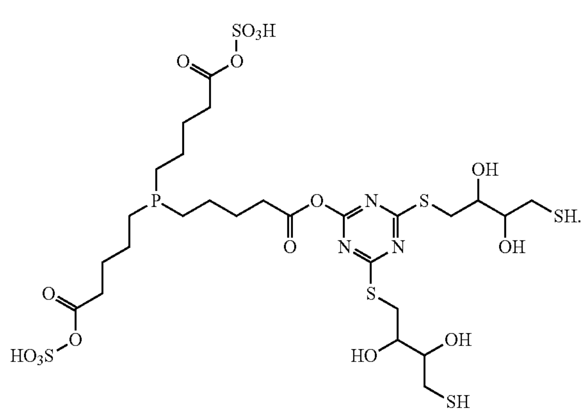

In embodiments, the compound is
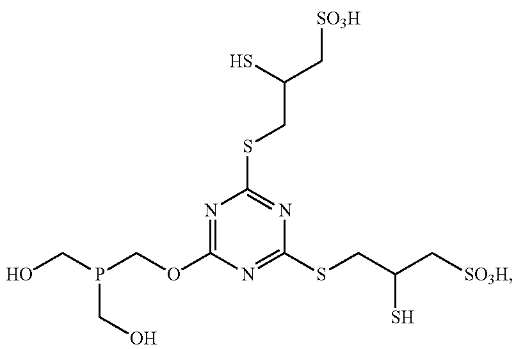
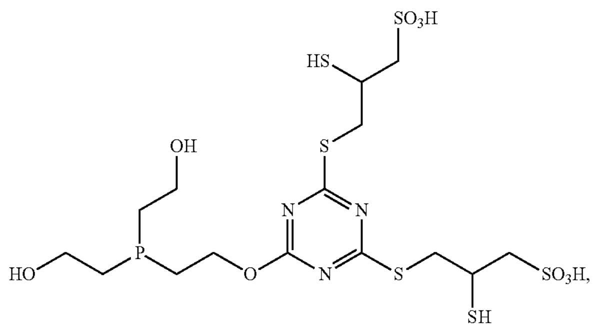
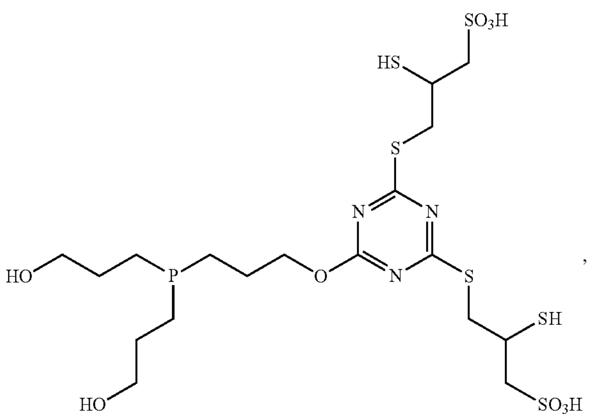
,
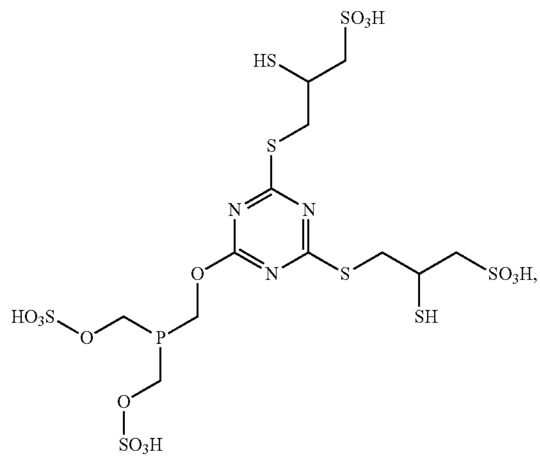
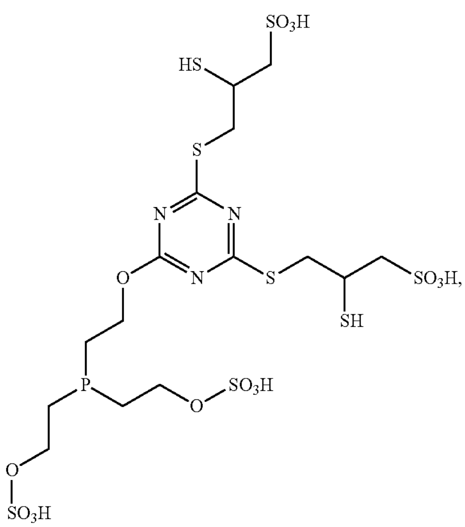
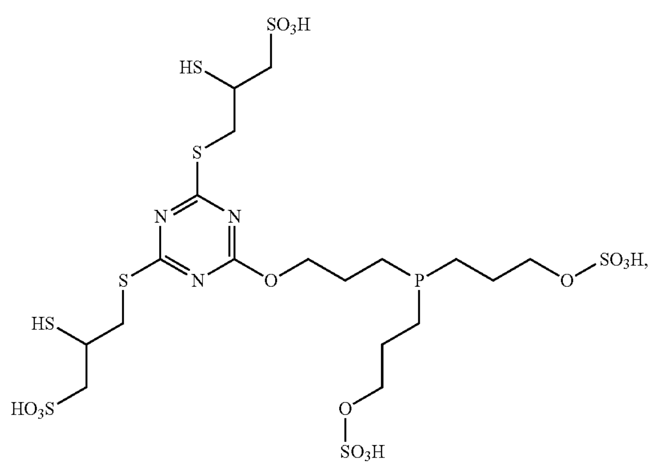

-continued
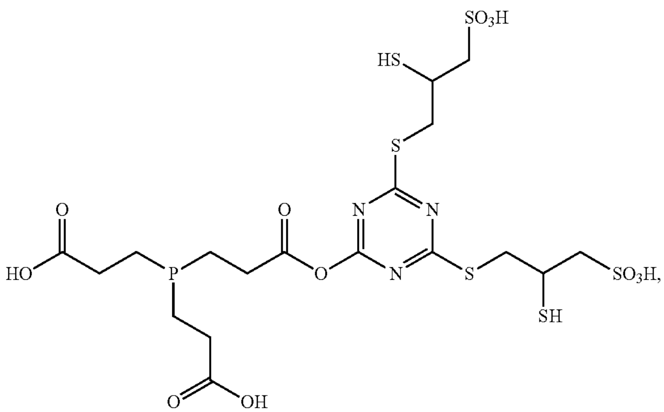
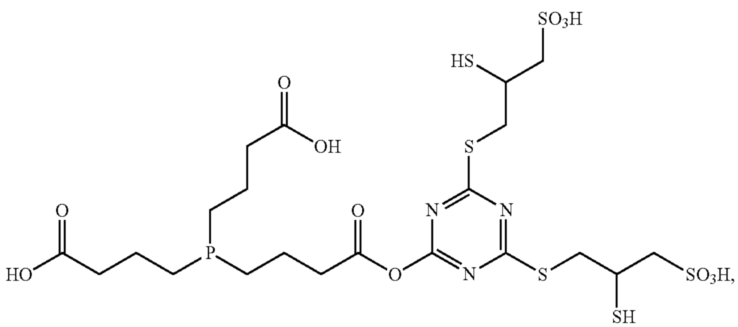
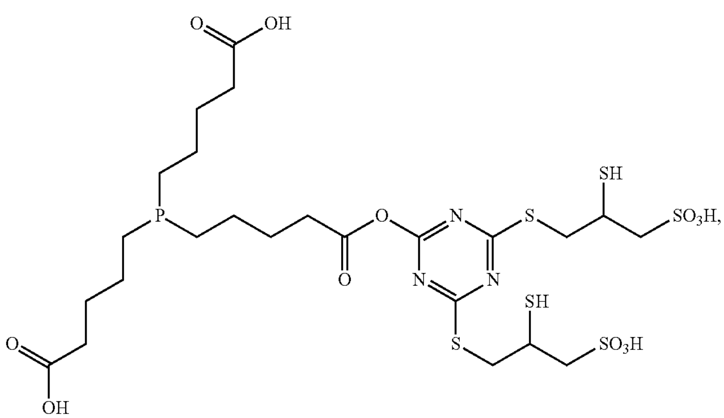
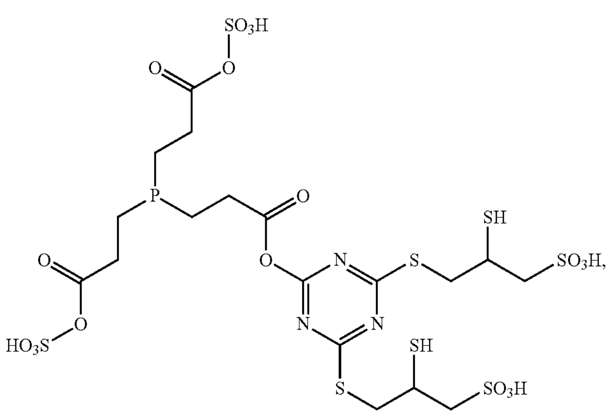

-continued
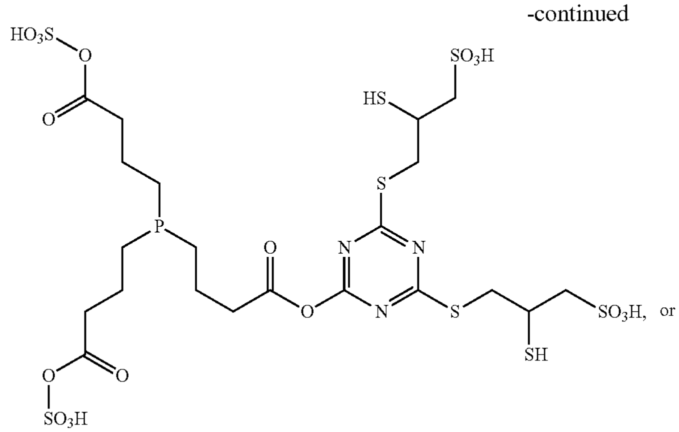
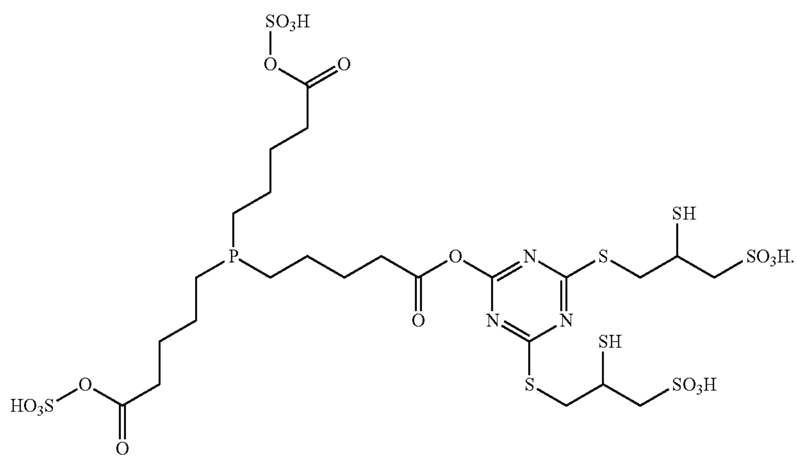
In embodiments, the compound is
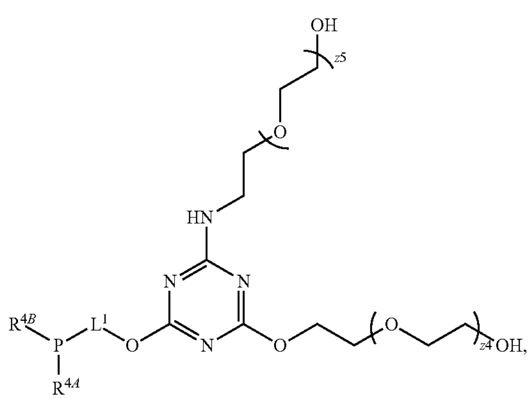
wherein z4, z5, $L^1$, $R^{4A}$, and $R^{4B}$ are as described herein. In embodiments, the compound is
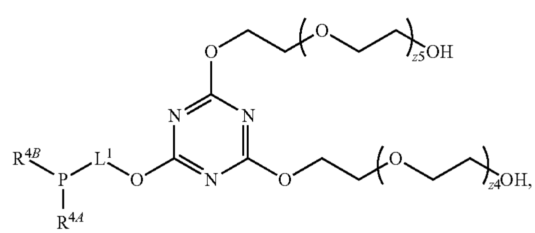
wherein z4, z5, $L^1$, $R^{4A}$, and $R^{4B}$ are as described herein.
In embodiments, the compound is
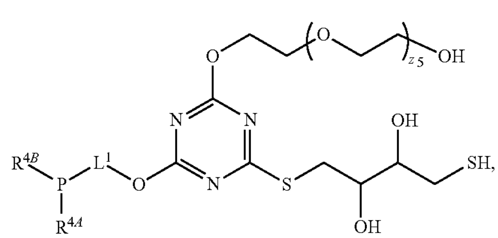

-continued
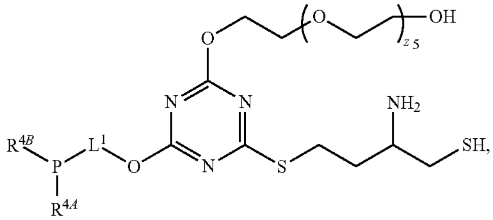
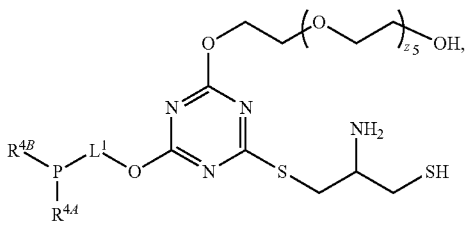
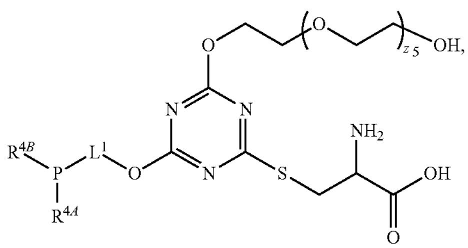
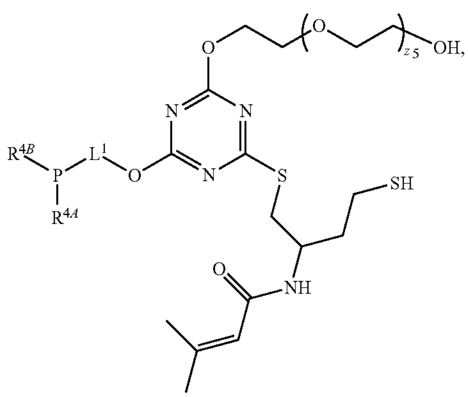
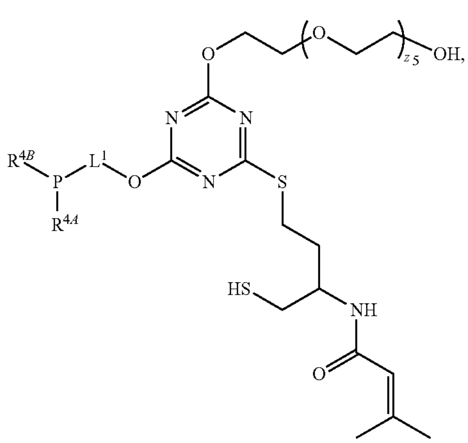
-continued
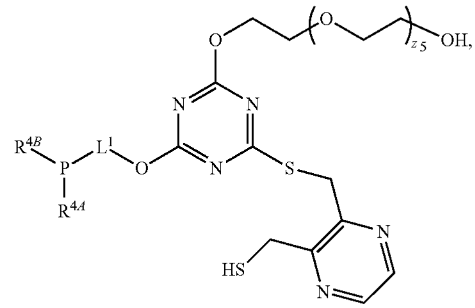
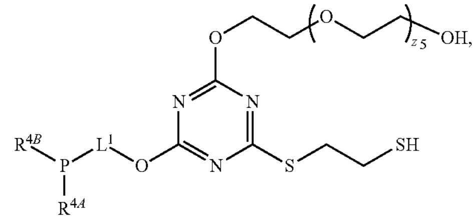
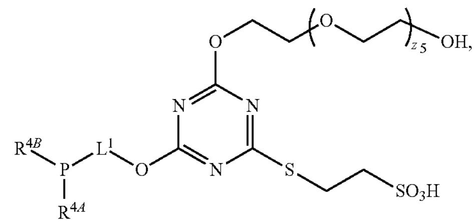
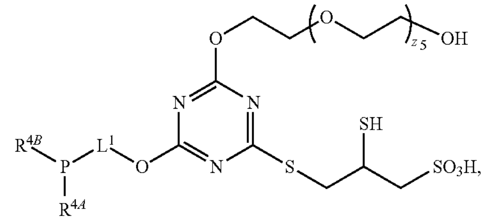
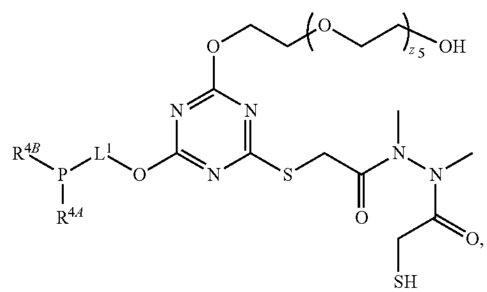
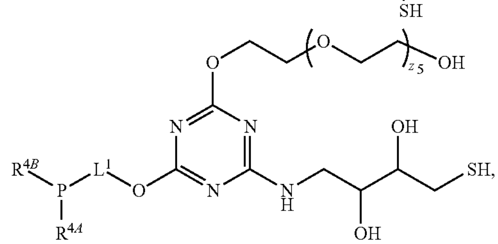
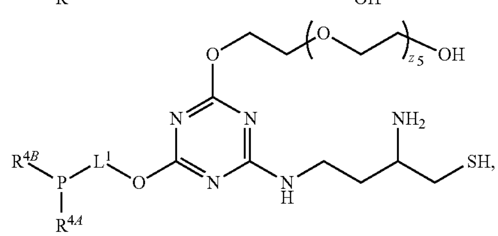

-continued
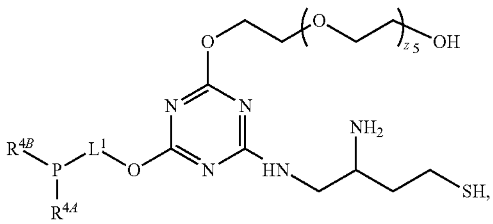
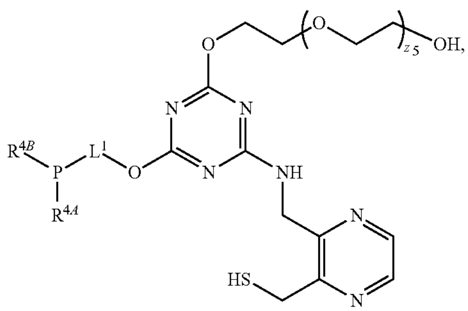
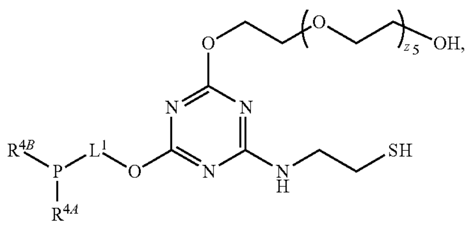
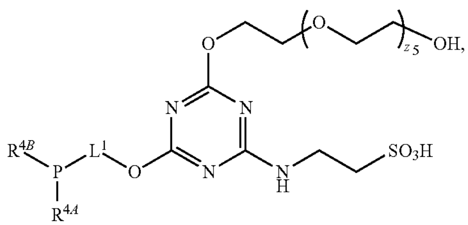
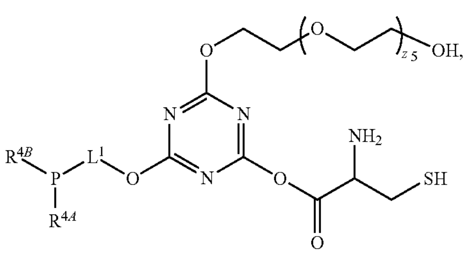
or
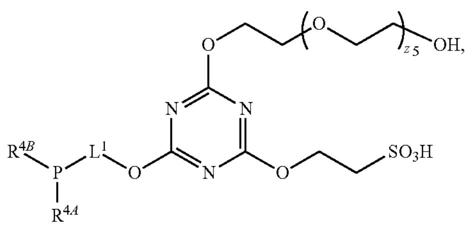
wherein z5, $L^1$, $R^{4A}$, and $R^{4B}$ are as described herein.
In embodiments, the compound is
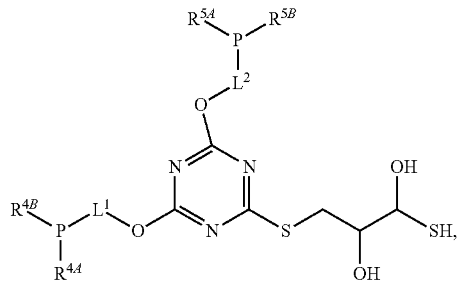
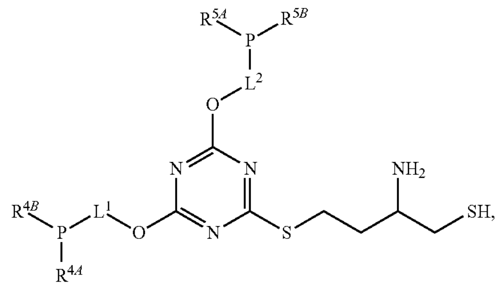
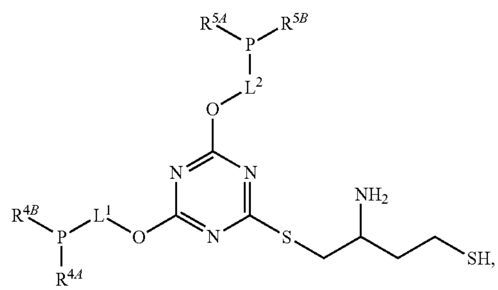
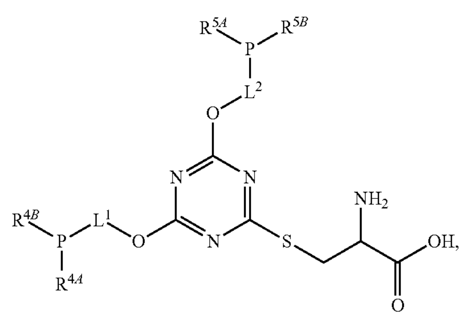
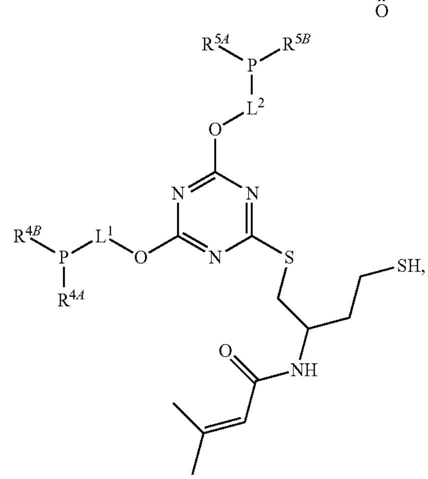

-continued
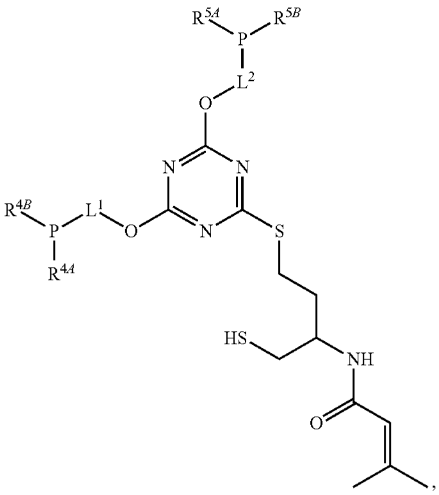
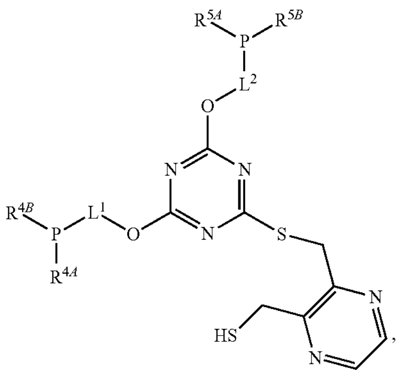
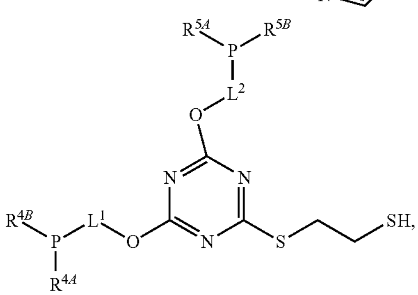
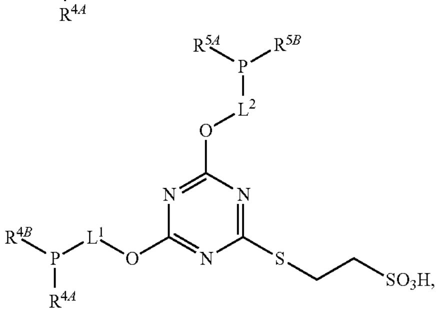
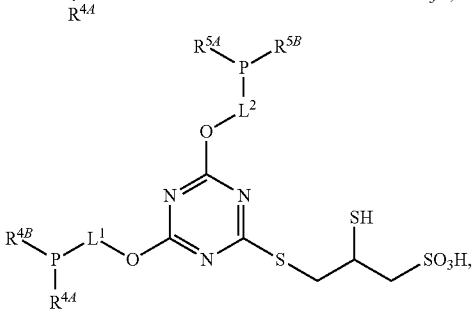
-continued
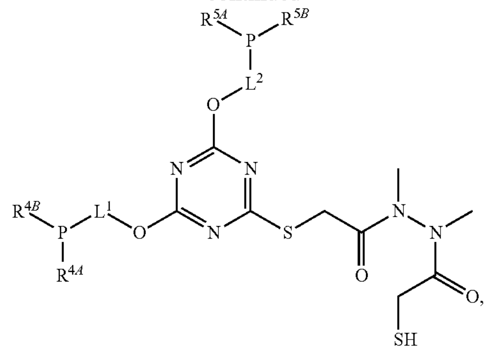
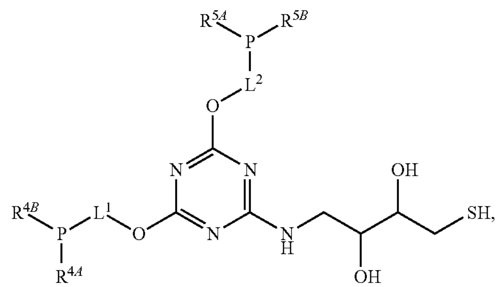
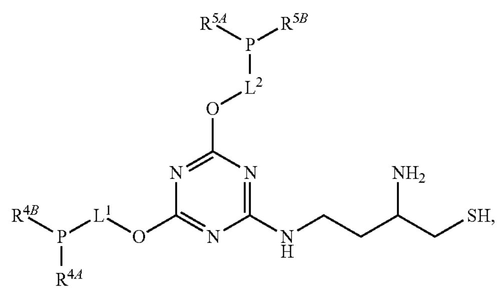
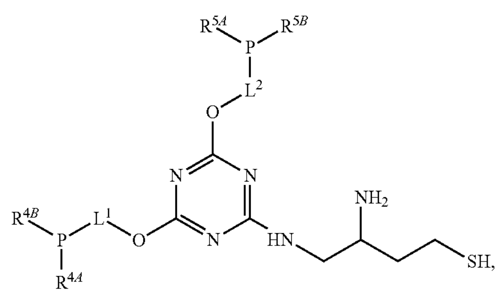
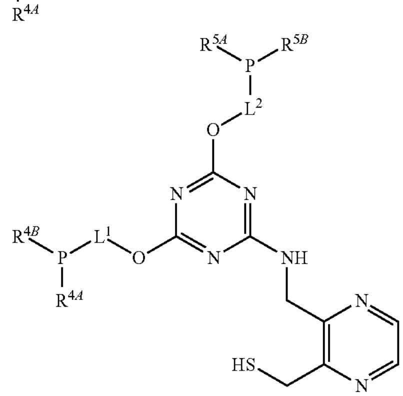

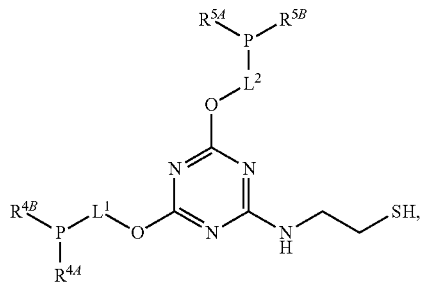
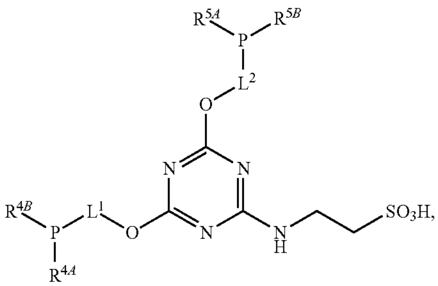
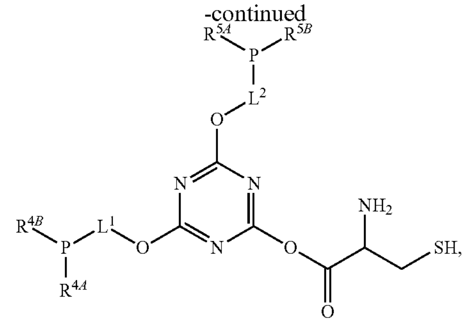
or
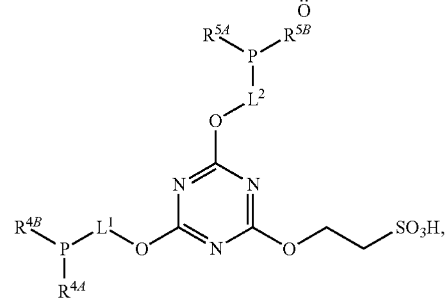
wherein $L^1$, $L^2$, $R^{4A}$, $R^{4B}$, $R^{5A}$, and $R^{5B}$ are as described herein.
In embodiments, the compound is
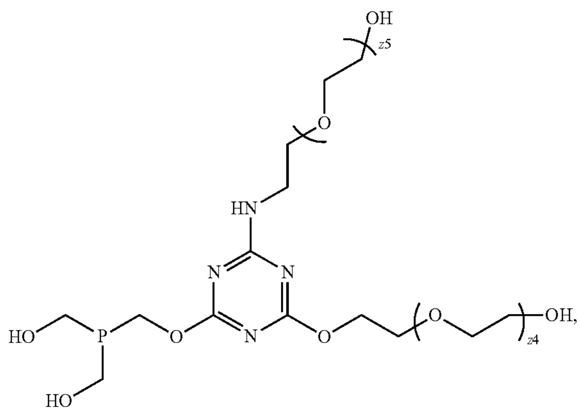
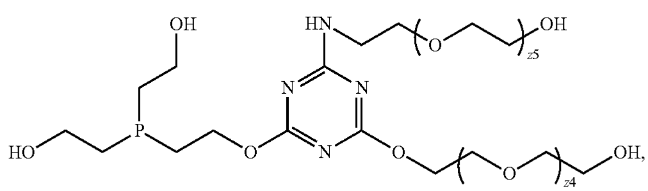
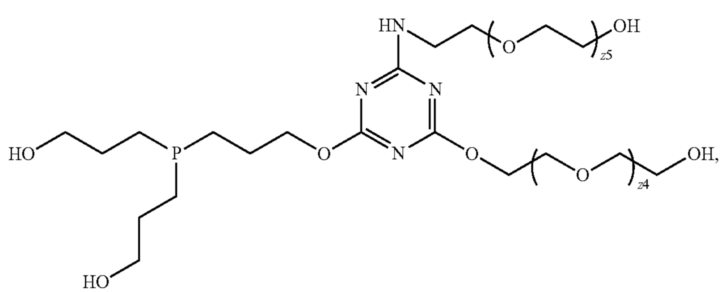

-continued
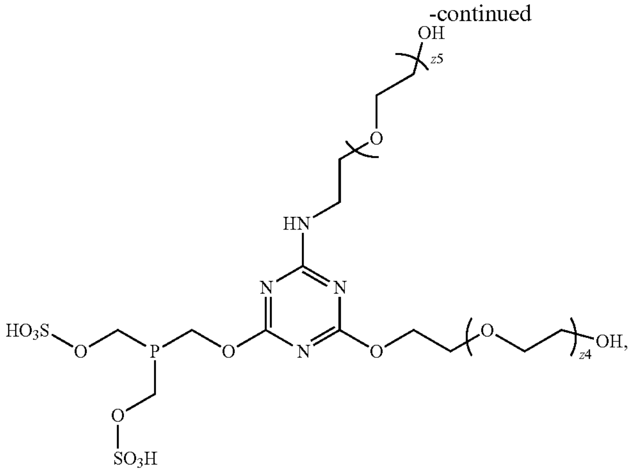
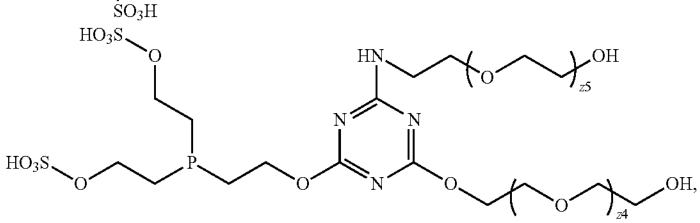
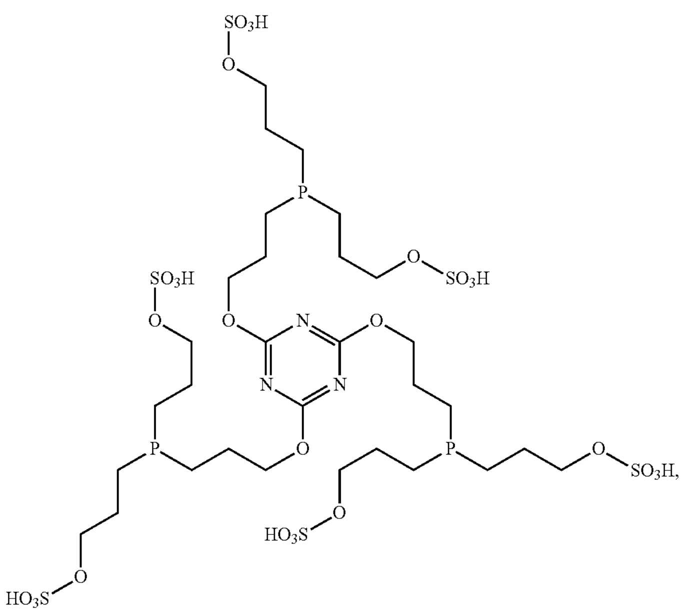
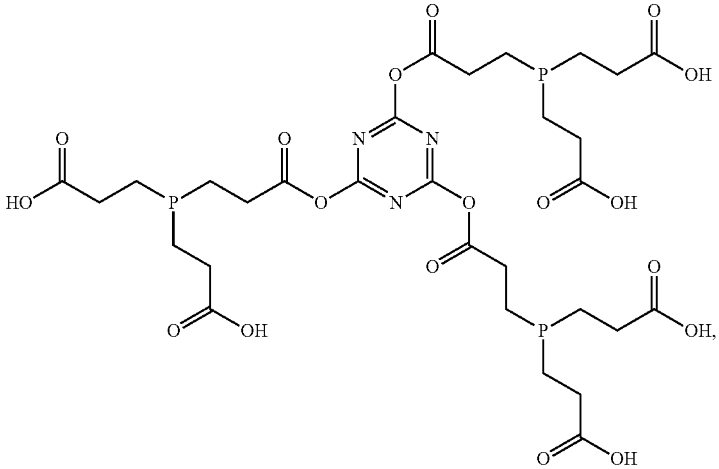

-continued
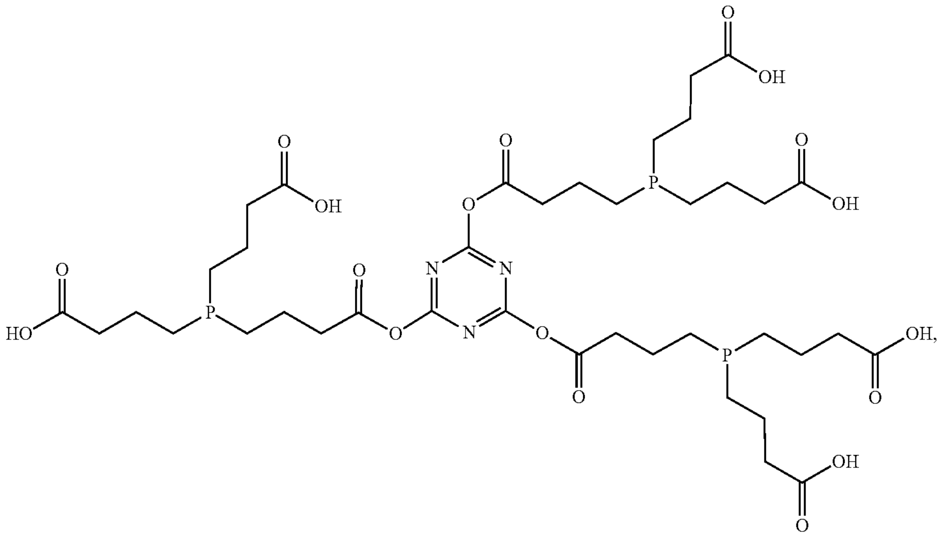
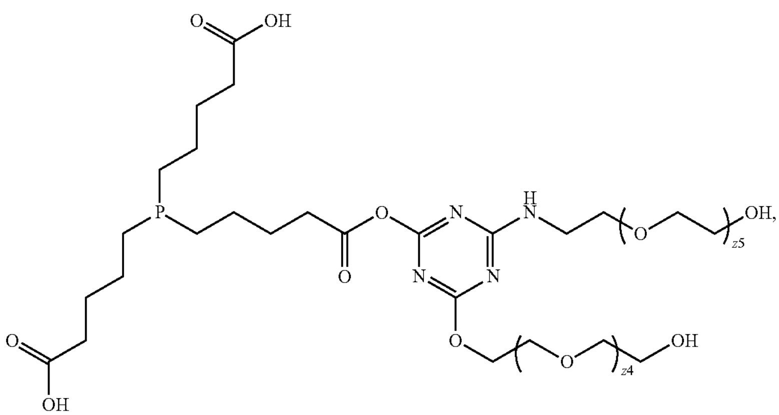
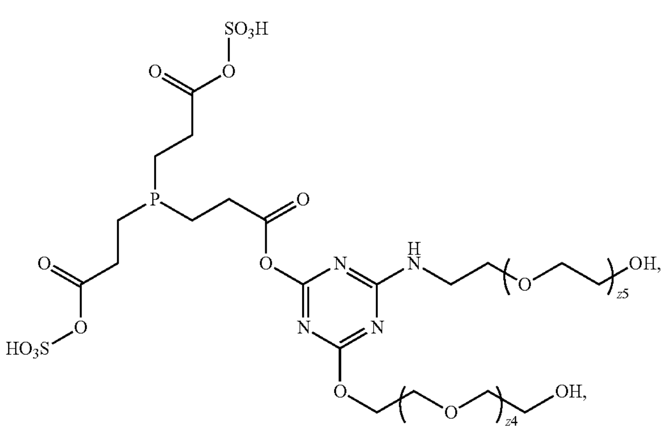

-continued

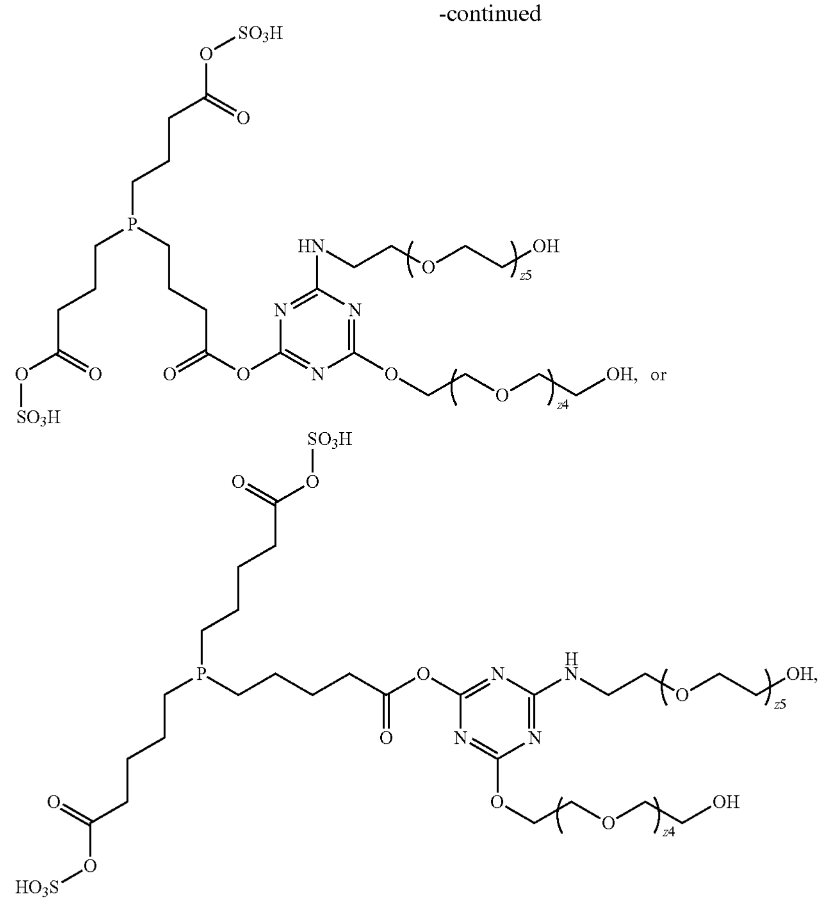

wherein z4 and z5 are as described herein. In embodiments, z4 is 1, 2, 3, 4, 5, 6, 7, or 8. In embodiments, z5 is 1, 2, 3, 4, 5, 6, 7, or 8.

In an aspect is provided a kit, wherein the kit includes a compound as described herein. In embodiments, the kit includes one or more vessels including a compound as described herein. In embodiments, the kit includes a plurality of nucleotides. In embodiments, the kit includes an enzyme (e.g., a DNA polymerase, a terminal deoxynucleotidyl transferase, or a reverse transcriptase). In embodiments, the kit includes one or more buffered solutions. In embodiments, the kit includes palladium (e.g., Pd(O) or Pd(II)). In embodiments, the kit includes a palladium salt (e.g., sodium tetrachloropalladate, $Na_2PdCl_4$, or Palladium (II) chloride). Generally, the kit includes one or more containers providing a composition and one or more additional reagents (e.g., a buffer suitable for polynucleotide extension). The kit may also include a template nucleic acid (DNA and/or RNA), one or more primer polynucleotides, nucleoside triphosphates (including, e.g., deoxyribonucleotides, ribonucleotides, particles, labeled nucleotides, and/or modified nucleotides), buffers, salts, and/or labels (e.g., fluorophores). In embodiments, the kit includes an array and/or a flowcell.

In embodiments, the kit includes isocyanoacetate (ICNA) salt, ethyl isocyanoacetate, methyl isocyanoacetate, cysteine or a salt thereof, L-cysteine or a salt thereof, N-acetyl-L-cysteine, potassium ethylxanthogenate, potassium isopropyl xanthate, glutathione, lipoic acid, ethylenediaminetetraacetic acid (EDTA), iminodiacetic acid, nitrilodiacetic acid, trimercapto-S-triazine, dimethyldithiocarbamate, dithiothreitol, mercaptoethanol, allyl alcohol, propargyl alcohol, or combinations thereof. In embodiments, the kit includes a polyphenol compound (e.g., gallic acid, gentisic acid, pryocatechol, pyrogallol, hydroquinone, or resorcinol). In embodiments, the kit includes an antioxidant. In embodiments, the kit includes ascorbic acid, indole-3-propionic acid, cystamine, L-carnitine, or O-acetyl-L-carnitine.

Some embodiments disclosed herein relate to kits including a labeled nucleotide including a linker between the fluorophore and the nucleotide. In embodiments, the kit includes a plurality of compounds described herein. In embodiments, the kit includes labeled nucleotides including differently labeled nucleotides. In embodiments, the kit further includes instructions for use thereof. In embodiments, kits described herein include a polymerase. In embodiments, the polymerase is a DNA polymerase. In embodiments, the DNA polymerase is a thermophilic nucleic acid polymerase. In embodiments, the DNA polymerase is a modified archaeal DNA polymerase. In embodiments, the kit includes a sequencing solution. In embodiments, the sequencing solution include labeled nucleotides including differently labeled nucleotides, wherein the label (or lack thereof) identifies the type of nucleotide. For example, each adenine nucleotide, or analog thereof; a thymine nucleotide; a cytosine nucleotide, or analog thereof and a guanine nucleotide, or analog thereof may be labeled with a different fluorescent label.

In embodiments, the kits include a plurality, particularly two, or three, or more particularly four, 3' reversibly terminated nucleotides labeled with a dye compound, the different nucleotides may be labeled with different dye compounds, or one may be dark, with no dye compounds. In embodiments, the different nucleotides are labeled with different dye compounds, and the dye compounds are spectrally distinguishable fluorescent dyes. As used herein, the term "spectrally distinguishable fluorescent dyes" refers to fluorescent dyes that emit fluorescent energy at wavelengths that can be distinguished from each other by fluorescent detection equipment.

III. Methods

In an aspect is provided a method of sequencing a nucleic acid, the method including: (i) incorporating in series with a nucleic acid polymerase, within a reaction vessel, one of four different labeled nucleotide analogues into a primer to create an extension strand, wherein the primer is hybridized to the nucleic acid and wherein each of the four different labeled nucleotide analogues include a detectable label linked by a cleavable linker; (ii) detecting the detectable label of each incorporated nucleotide analogue, so as to thereby identify each incorporated nucleotide analogue in the extension strand; and (iii) contacting the incorporated nucleotide analogues with a compound as described herein, including embodiments, to remove the detectable label; thereby sequencing the nucleic acid. In embodiments, each of the four different labeled nucleotide analogues include a unique detectable label linked by a cleavable linker. In embodiments, the nucleotide analogues include a reversible terminator. In embodiments, the compound as described herein (e.g., CRA) cleaves the reversible terminator and the cleavable linker.

In an aspect is provided a method of incorporating a plurality of nucleotide analogues into a primer hybridized to a single stranded polynucleotide, the method including: (i) incorporating with a nucleic acid polymerase a nucleotide analogue into a primer to create an extension strand, wherein the nucleotide analogue includes a reversible terminator; (ii) contacting the nucleotide analogue with a compound as described herein, including embodiments, to remove the reversible terminator; repeating steps (i) and (ii) to incorporate a plurality of nucleotide analogues into a primer hybridized to a single stranded polynucleotide. In embodiments, the nucleotide analogue includes a cleavable linker and a detectable label (i.e., wherein the detectable label is linked to the nucleobase via the cleavable linker). In embodiments, the method includes cleaving the linker. In embodiments, cleaving the linker includes contacting the compound with a reducing agent (e.g., a compound described herein). In embodiments, the method includes removing (e.g., cleaving) the reversible terminator moiety. In embodiments, the method includes removing (e.g., cleaving) the 3'-O-reversible terminator from the nucleotide to generate a 3'—OH.

In embodiments, nucleotide analogues are four different compounds, each including a different nucleobase and a different label (e.g., fluorescent dye moiety). In embodiments, the four different labeled nucleotide analogues are four different compounds each including a different nucleobase. In embodiments, the four different labeled nucleotide analogues are four different compounds each including a different label (e.g., fluorescent dye moiety). In embodiments, the nucleotide analogue includes at least one of the following: cytosine or a derivative thereof, guanine or a derivative thereof, adenine or a derivative thereof, thymine or a derivative thereof, uracil or a derivative thereof, hypoxanthine or a derivative thereof, xanthine or a derivative thereof, 7-methylguanine or a derivative thereof, 5,6-dihydrouracil or a derivative thereof, 5-methylcytosine or a derivative thereof, and 5-hydroxymethylcytosine or a derivative thereof. In embodiments, the compound includes at least one of the following: cytosine or a derivative thereof, guanine or a derivative thereof, adenine or a derivative thereof, thymine or a derivative thereof, and uracil or a derivative thereof. In embodiments, the compound includes at least one of the following: cytosine or a derivative thereof, guanine or a derivative thereof, adenine or a derivative thereof, and thymine or a derivative thereof. In embodiments, the compound includes at least one of the following: cytosine or a derivative thereof, guanine or a derivative thereof, adenine or a derivative thereof, and uracil or a derivative thereof.

In an aspect is provided a method of making the compound:

(A)

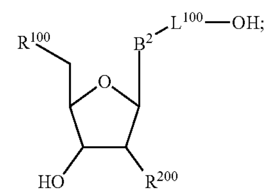

the method including mixing compound of Formula (B) and compound of Formula (C) together in a reaction vessel. The compound of Formula (B) has the formula:

(B)

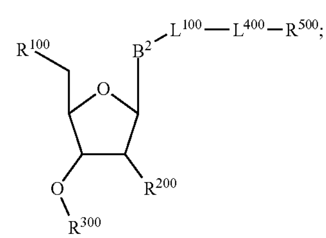

and compound of Formula (C) is a compound as described herein, including embodiments. $B^2$ is a divalent nucleobase. $L^{100}$ is a covalent linker. $R^{100}$ is —OH, a 5'-O-nucleoside protecting group, monophosphate moiety, polyphosphate moiety, or nucleic acid moiety. $R^{200}$ is —OH or hydrogen. $R^{300}$ is a reversible terminator. $L^{400}$ is a bioconjugate linker, a cleavable linker, a self-immolative linker, a linker capable of dendritic amplification of signal, a trivalent linker, or a self-immolative dendrimer linker. In embodiments, $L^{400}$ is a cleavable linker. $R^{500}$ is a detectable moiety.

In an aspect is provided a method of making the compound:

(A-1)

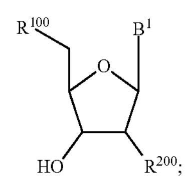

the method including mixing compound of Formula (B-1) and compound of Formula (C) together in a reaction vessel. The compound of Formula (B-1) has the formula:

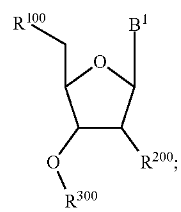

(B-1)

and compound of Formula (C) is a compound as described herein, including embodiments. B' is a monovalent nucleobase. $R^{100}$ is —OH, a 5'-O-nucleoside protecting group, monophosphate moiety, polyphosphate moiety, or nucleic acid moiety. $R^{200}$ is —OH or hydrogen. $R^{300}$ is a reversible terminator.

In embodiments, $R^{200}$ is hydrogen. In embodiments, $R^{100}$ is a polyphosphate. In embodiments, $R^{100}$ is

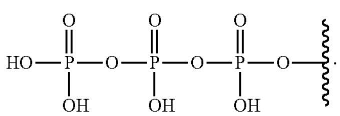 [SMILES: *OP(=O)(O)OP(=O)(O)OP(=O)(O)O]

In embodiments, $B^2$ is

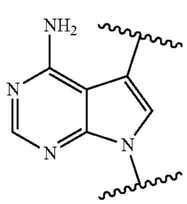

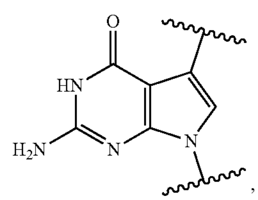

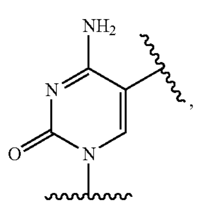

or

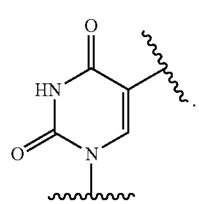

In embodiments, $B^2$ is

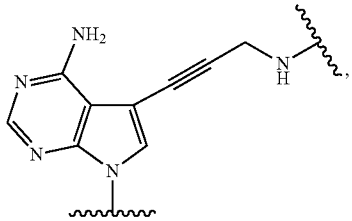

-continued

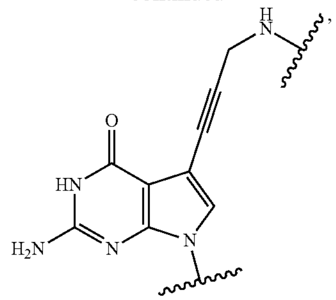

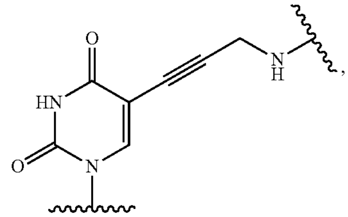

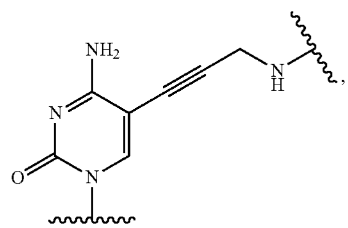

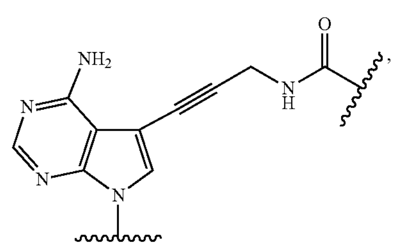

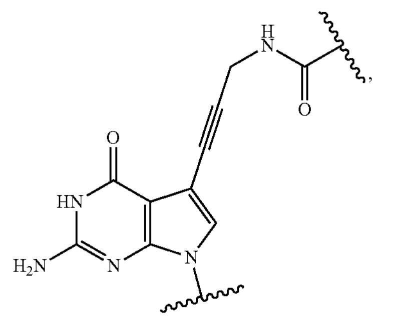

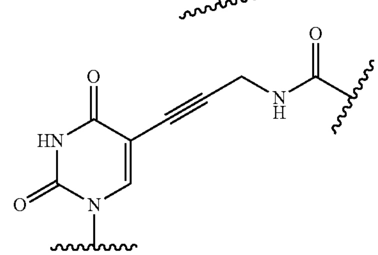

or

-continued

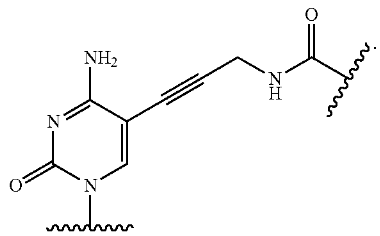

In embodiments, $R^{100}$ is

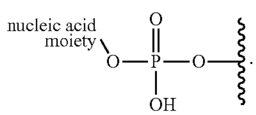

In embodiments, $B^1$ is a cytosine or a derivative thereof, guanine or a derivative thereof, adenine or a derivative thereof, thymine or a derivative thereof, uracil or a derivative thereof, hypoxanthine or a derivative thereof, xanthine or a derivative thereof, 7-methylguanine or a derivative thereof, 5,6-dihydrouracil or a derivative thereof, 5-methylcytosine or a derivative thereof, or 5-hydroxymethylcytosine or a derivative thereof. In embodiments, $B^1$ is

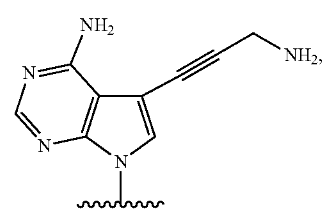

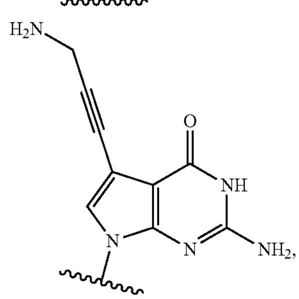

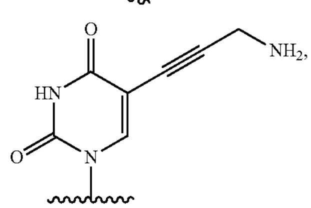

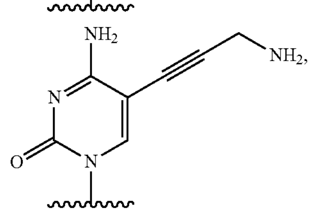

-continued

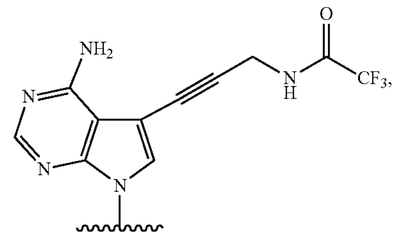

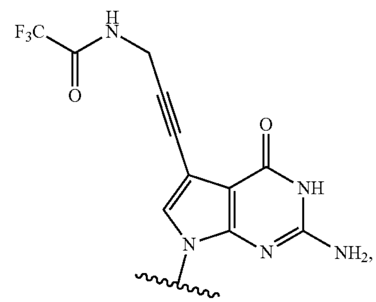

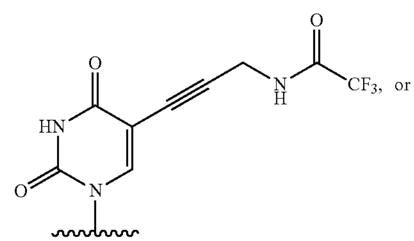

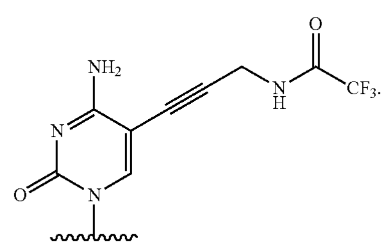

In embodiments, $B^1$ is

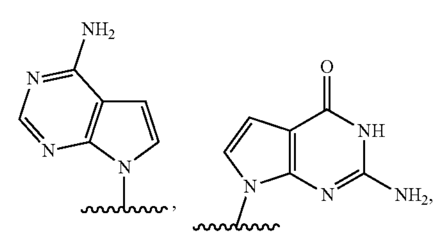

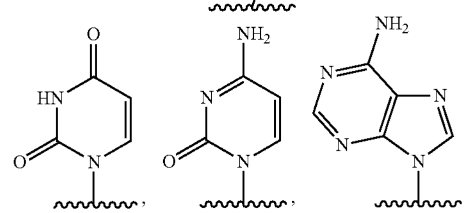

-continued

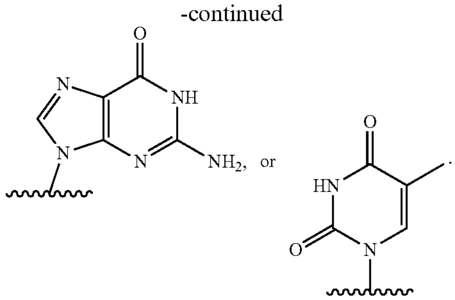

In embodiments, $B^1$ is a monovalent nucleobase, or a derivative thereof. In embodiments, $B^1$ is a monovalent cytosine or a derivative thereof, monovalent guanine or a derivative thereof, monovalent adenine or a derivative thereof, monovalent thymine or a derivative thereof, monovalent uracil or a derivative thereof, monovalent hypoxanthine or a derivative thereof, monovalent xanthine or a derivative thereof, monovalent 7-methylguanine or a derivative thereof, monovalent 5,6-dihydrouracil or a derivative thereof, monovalent 5-methylcytosine or a derivative thereof, or monovalent 5-hydroxymethylcytosine or a derivative thereof. In embodiments, $B^1$ is a monovalent cytosine or a derivative thereof. In embodiments, $B^1$ is a monovalent guanine or a derivative thereof. In embodiments, $B^1$ is a monovalent adenine or a derivative thereof. In embodiments, $B^1$ is a monovalent thymine or a derivative thereof. In embodiments, $B^1$ is a monovalent uracil or a derivative thereof. In embodiments, $B^1$ is a monovalent hypoxanthine or a derivative thereof. In embodiments, $B^1$ is a monovalent xanthine or a derivative thereof. In embodiments, $B^1$ is a monovalent 7-methylguanine or a derivative thereof. In embodiments, $B^1$ is a monovalent 5,6-dihydrouracil or a derivative thereof. In embodiments, $B^1$ is a monovalent 5-methylcytosine or a derivative thereof. In embodiments, $B^1$ is a monovalent 5-hydroxymethylcytosine or a derivative thereof. In embodiments, $B^1$ is a monovalent cytosine. In embodiments, $B^1$ is a monovalent guanine. In embodiments, $B^1$ is a monovalent adenine. In embodiments, $B^1$ is a monovalent thymine. In embodiments, $B^1$ is a monovalent uracil. In embodiments, $B^1$ is a monovalent hypoxanthine. In embodiments, $B^1$ is a monovalent xanthine. In embodiments, $B^1$ is a monovalent 7-methylguanine. In embodiments, $B^1$ is a monovalent 5,6-dihydrouracil. In embodiments, $B^1$ is a monovalent 5-methylcytosine. In embodiments, $B^1$ is a monovalent 5-hydroxymethylcytosine.

In embodiments, $B^1$ is

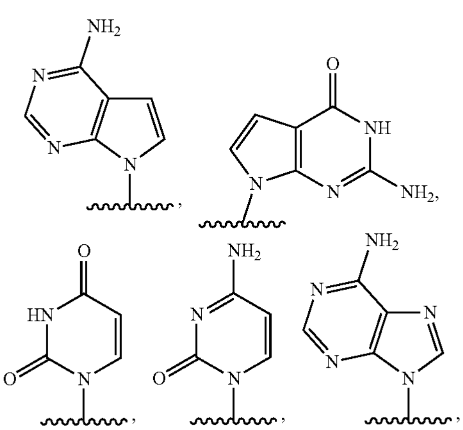

-continued

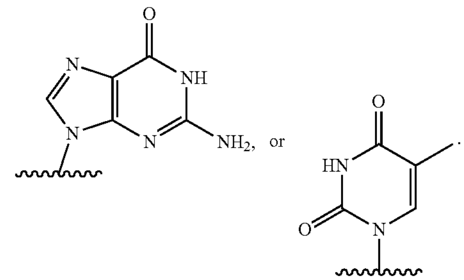

In embodiments, $B^1$ is

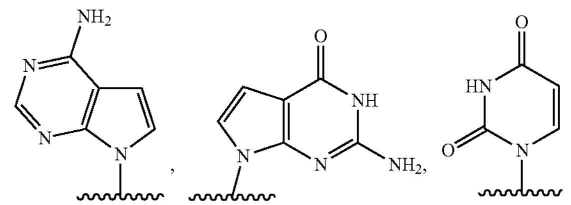

or

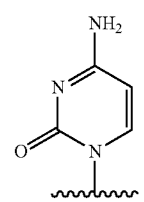

In embodiments, $B^1$ is

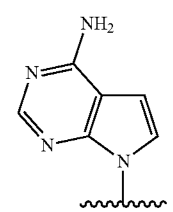

In embodiments, $B^1$ is

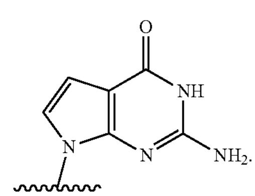 [SMILES: *n1ccc2c(=O)[nH]c(N)nc21]

In embodiments, $B^1$ is
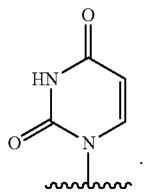
In embodiments, $B^1$ is
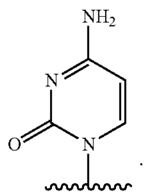
In embodiments, $B^1$ is
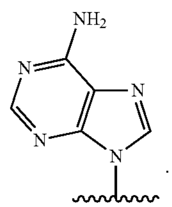 [SMILES: *n1cnc2c(N)ncnc21]
In embodiments, $B^1$ is
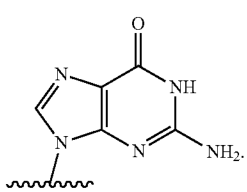 [SMILES: *n1cnc2c(=O)[nH]c(N)nc21]
In embodiments, $B^1$ is
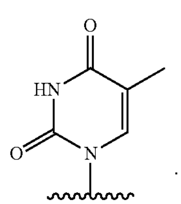 [SMILES: *n1cc(C)c(=O)[nH]c1=O]
In embodiments, $B^1$ is
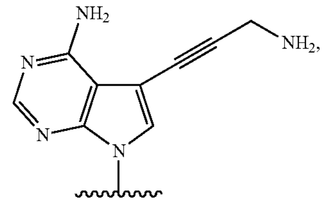 [SMILES: *n1cc(C#CCN)c2c(N)ncnc21]
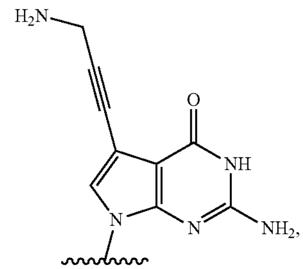
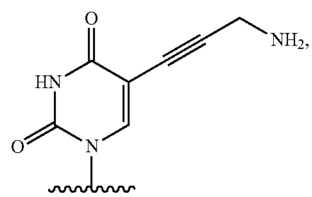
or
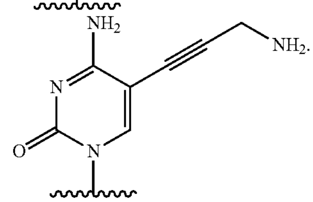
In embodiments, $B^1$ is
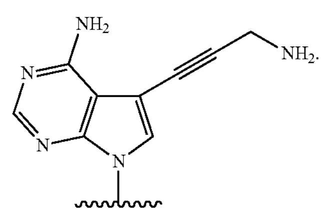
In embodiments, $B^1$ is
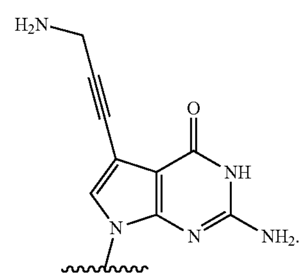 [SMILES: *n1cc(C#CCN)c2c(=O)[nH]c(N)nc21]

In embodiments, $B^1$ is
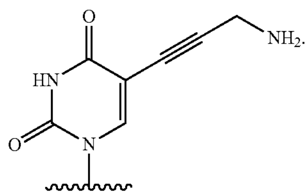 [SMILES: *n1cc(C#CCN)c(=O)[nH]c1=O]
embodiments, $B^1$ is
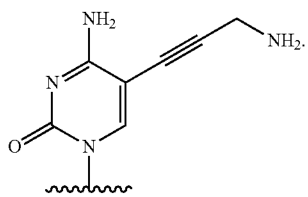 [SMILES: *n1cc(C#CCN)c(N)nc1=O]
In embodiments, $B^1$ is
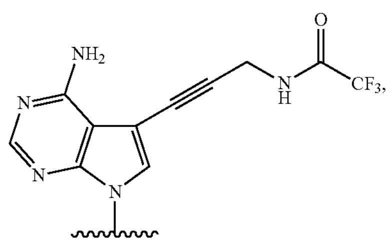
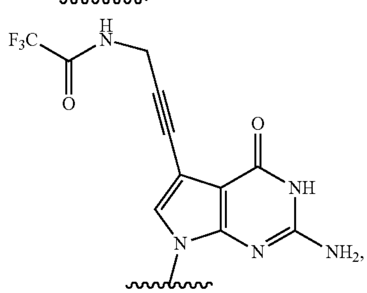
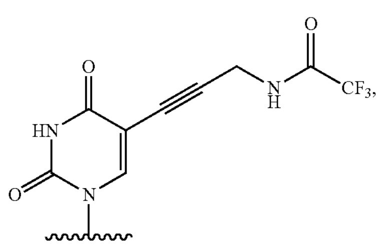
or
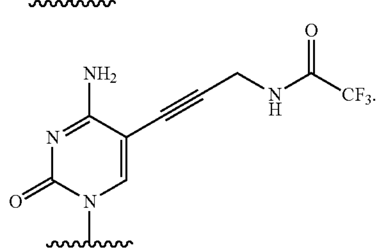
In embodiments, $B^1$ is
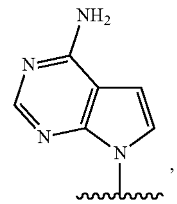
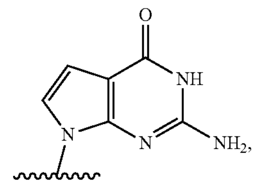
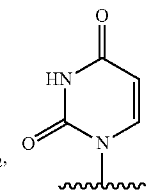
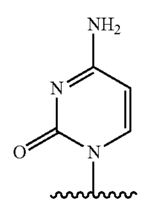
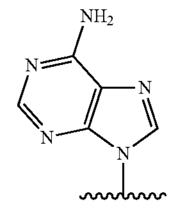
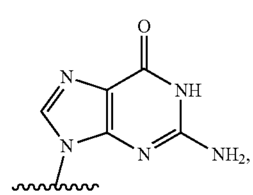
or
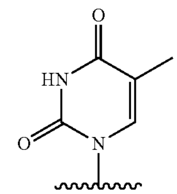
In embodiments, $B^1$ is
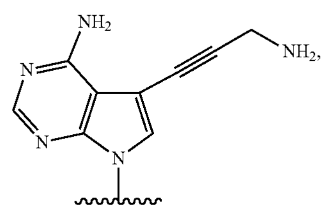
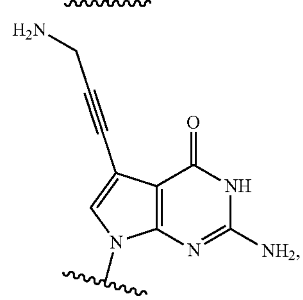
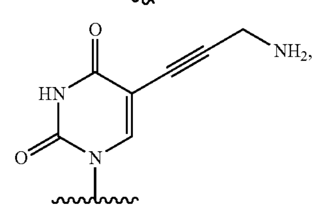
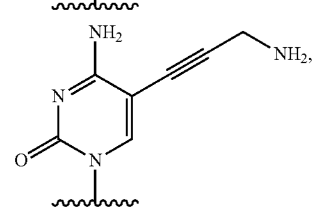

-continued
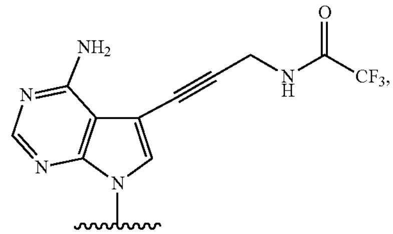
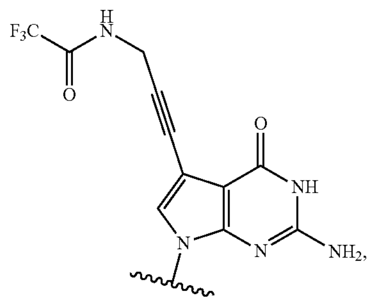
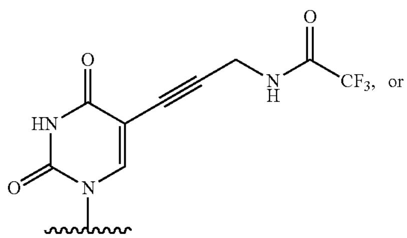
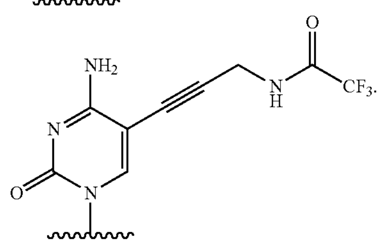
Reversible terminators are known in the art, and may be, for instance, a 3'-$ONH_2$ reversible terminator, a 3'-O-allyl reversible terminator, or a 3'-O-azidomethyl reversible terminator. In embodiments, the reversible terminator moiety is
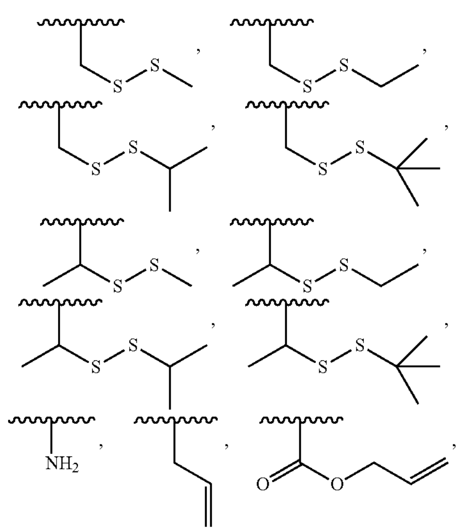
-continued
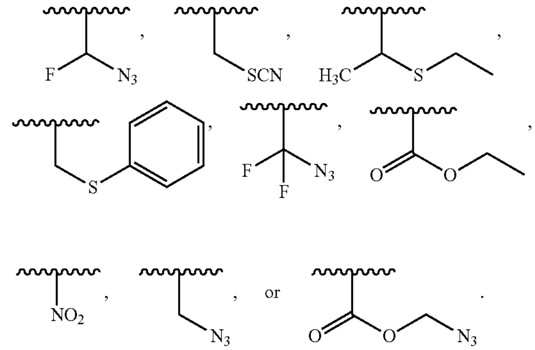
In embodiments, $R^{300}$ is
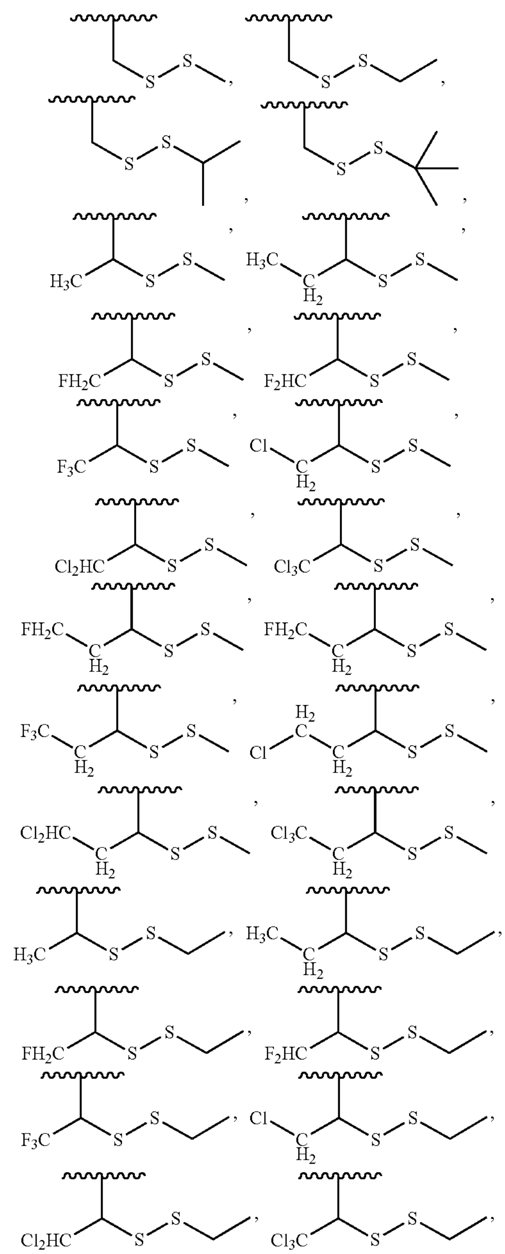

-continued
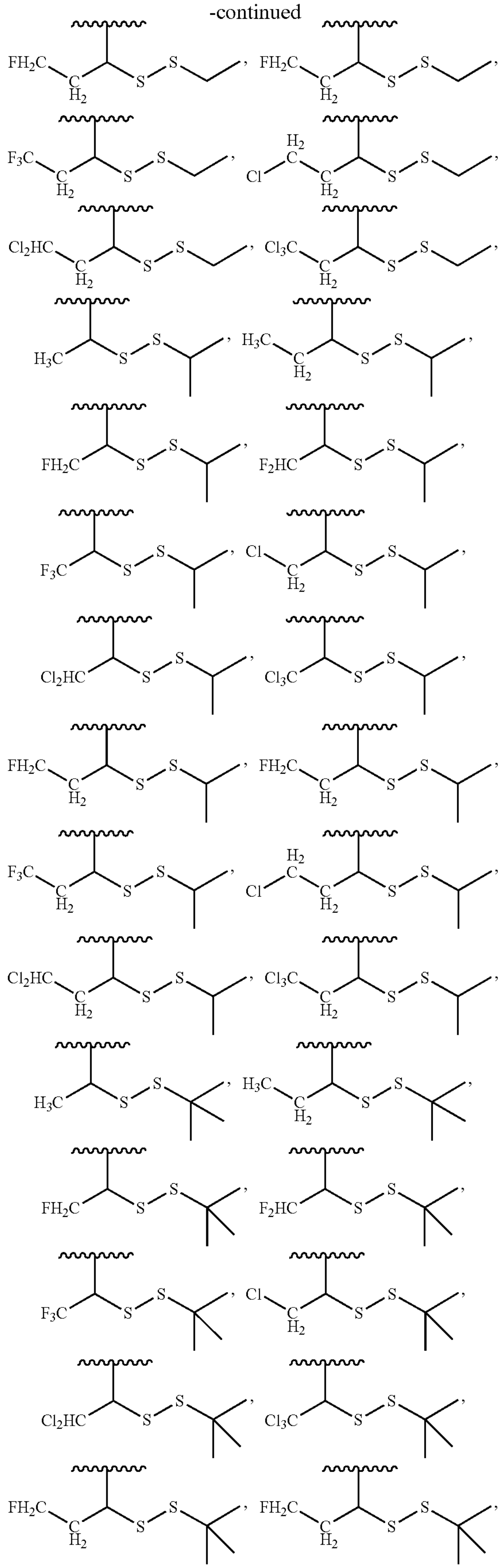
-continued
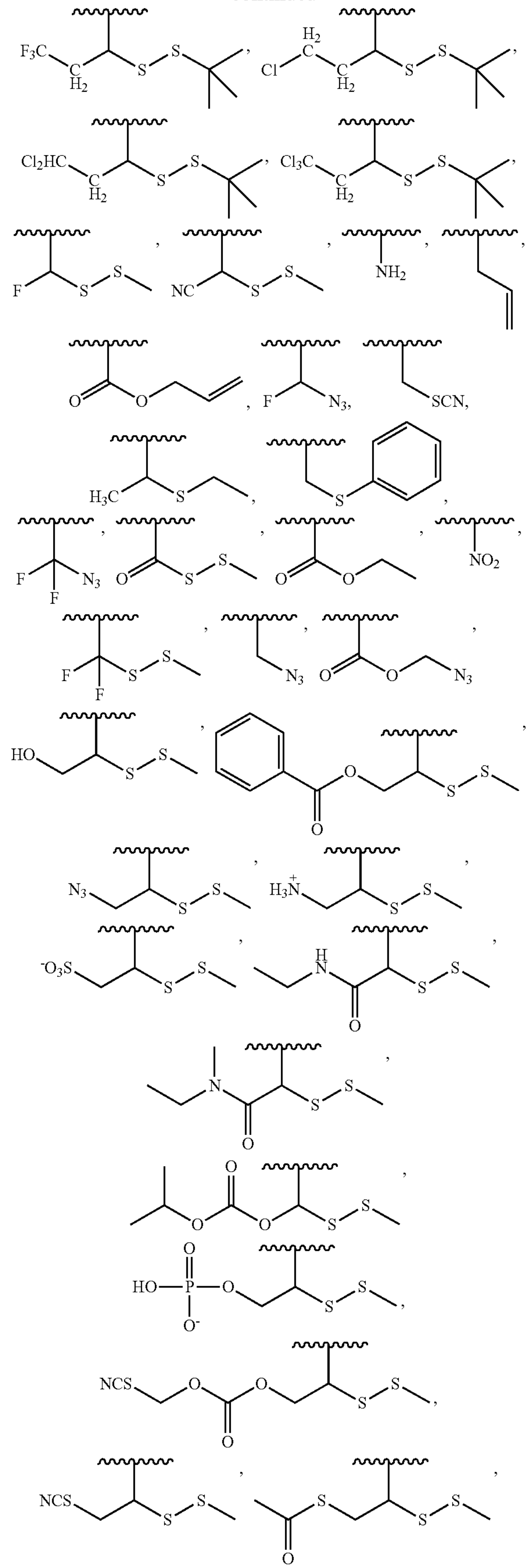

-continued

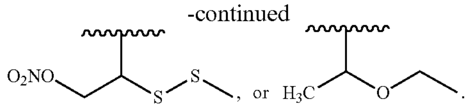

In embodiments, $R^{300}$ is:

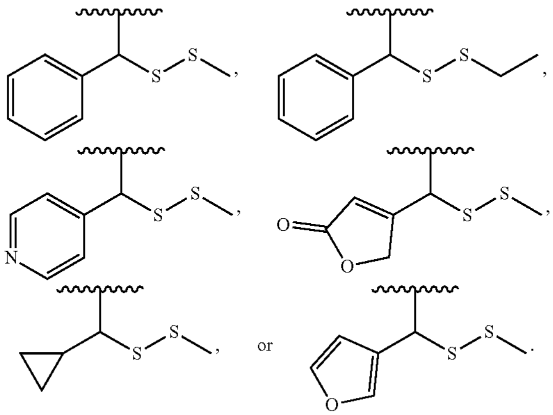

In embodiments, $R^{300}$ is:

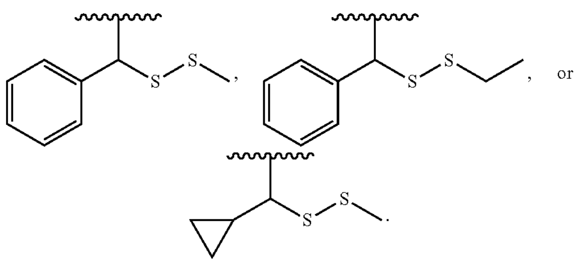

In embodiments, the reversible terminator moiety is

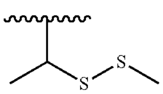 [SMILES: *C(C)SSC]

as described in U.S. Pat. No. 10,738,072, which is incorporated herein by reference for all purposes. In embodiments, the reversible terminator moiety (i.e., $R^{300}$) is

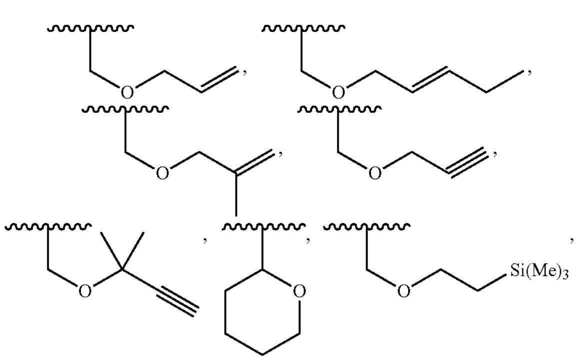

-continued

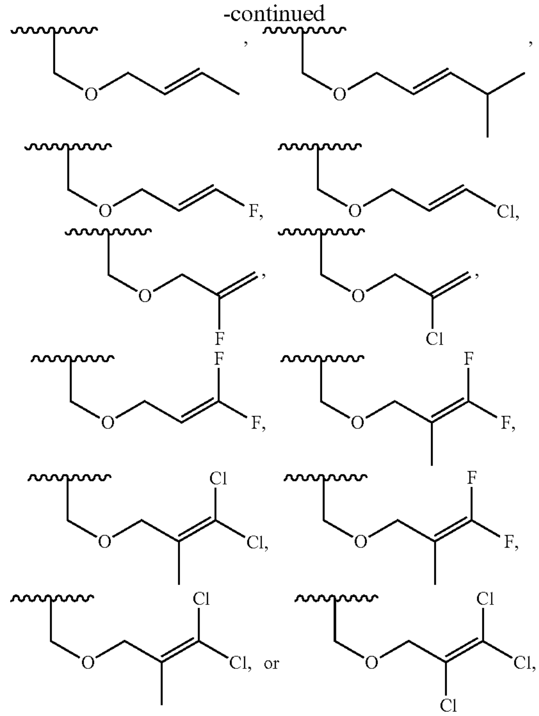

In embodiments, the reversible terminator moiety is

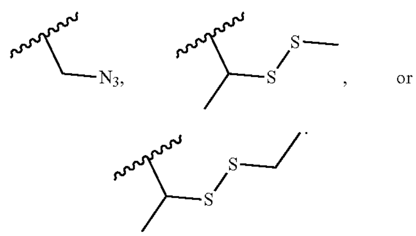

In embodiments, the cleavage of the reversible terminator moiety includes a palladium reagent (e.g., Pd(O)) to cleave the reversible terminator. Methods of generating the palladium reagent include contacting a Pd(II) salt with a compound as described herein. For example, the palladium reagent Pd(O), may be generated from reduction of a Pd(II) complex by a compound described herein. Suitable palladium (II) sources include $Pd(CH_3CN)_2Cl_2$, $[PdCl(Allyl)]_2$, [Pd(Allyl)(THP)]Cl, $[Pd(Allyl)(THP)_2]Cl$, $Pd(OAc)_2$, $Pd(PPh_3)_4$, $Pd(dba)_2$, $Pd(Acac)_2$, $PdCl_2(COD)$, and $Pd(TFA)_2$.

In embodiments, $L^{400}$ is a bioconjugate linker, a cleavable linker, a self-immolative linker, a linker capable of dendritic amplification of signal (e.g., capable of increasing fluorescence by releasing fluorophores from the remainder of the linker, optionally wherein the fluorescence is increased following release), a trivalent linker, or a self-immolative dendrimer linker (e.g., capable of increasing fluorescence by releasing fluorophores from the remainder of the linker). In embodiments, $L^{400}$ is a bioconjugate linker. In embodiments, $L^{400}$ is a cleavable linker. In embodiments, $L^{400}$ is a self-immolative linker. In embodiments, $L^{400}$ is a linker capable of dendritic amplification of signal (e.g., capable of increasing fluorescence by releasing fluorophores). In embodiments, $L^{400}$ is a trivalent linker. In embodiments, $L^{400}$ is a self-immolative dendrimer linker (e.g., capable of increasing fluorescence by releasing fluorophores).
In embodiments, $-L^{100}-L^{400}-$ is
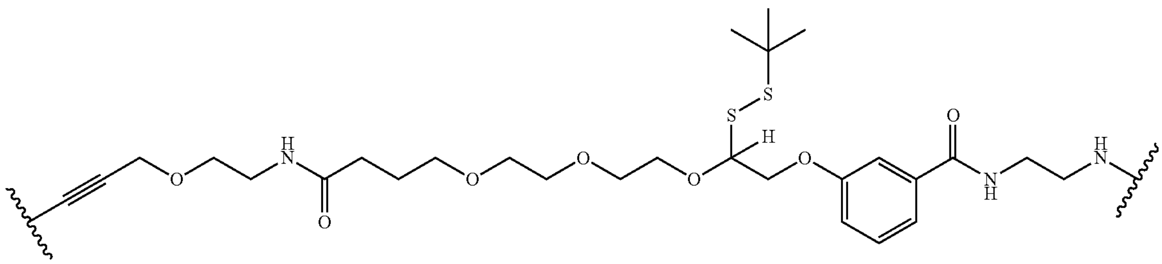
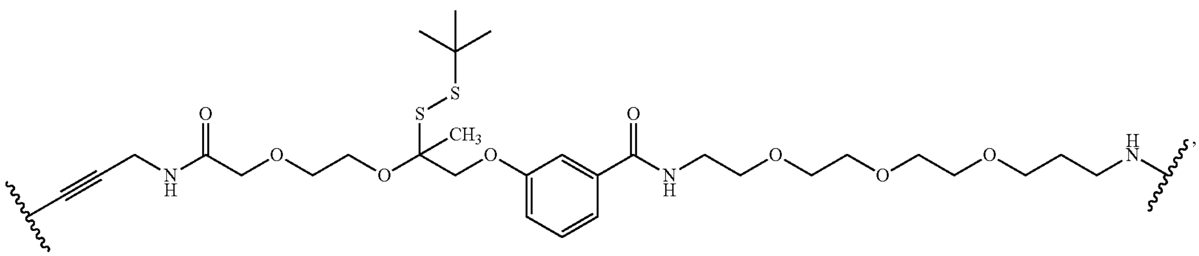
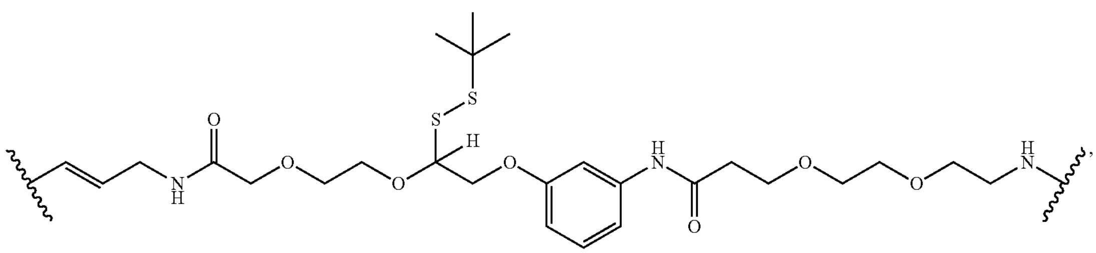
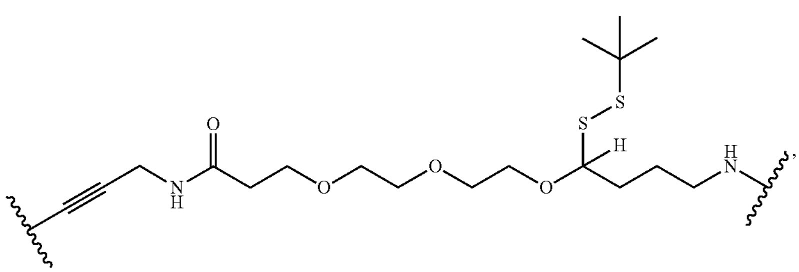
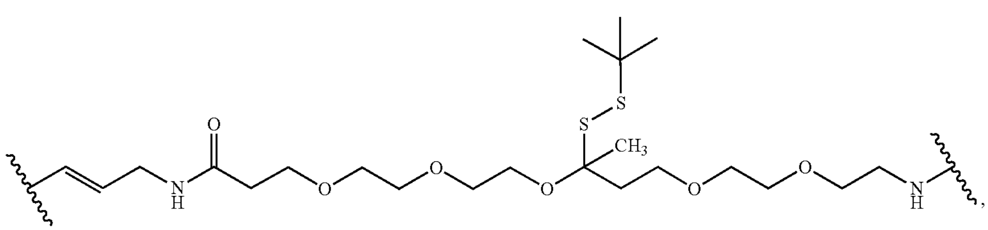
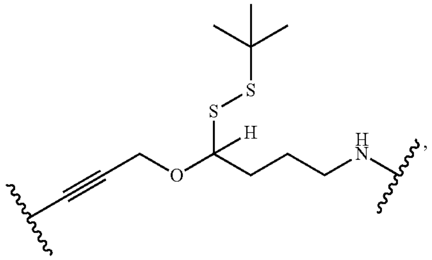

-continued
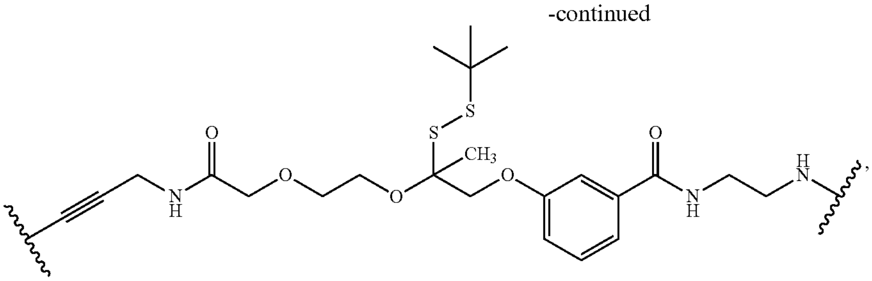
, or
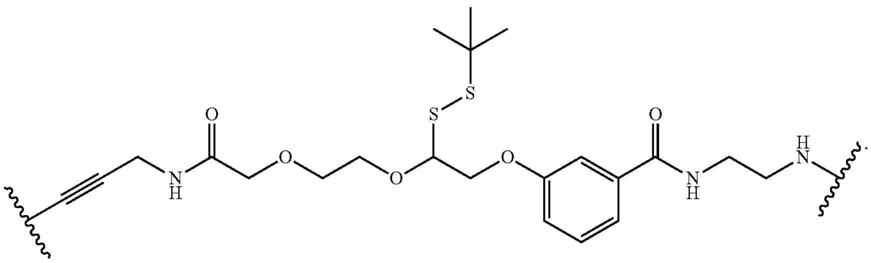
.
In embodiments, $-L^{100}-L^{400}-$ is
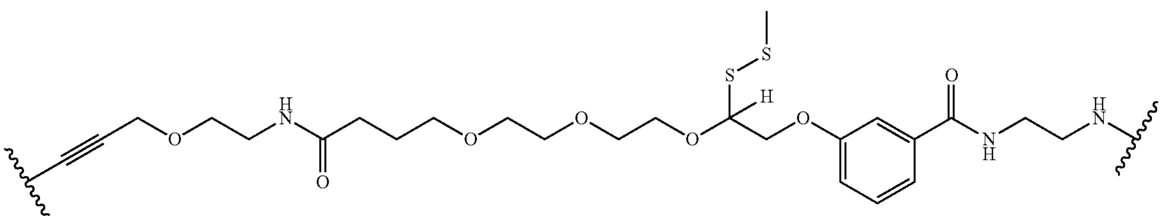
,
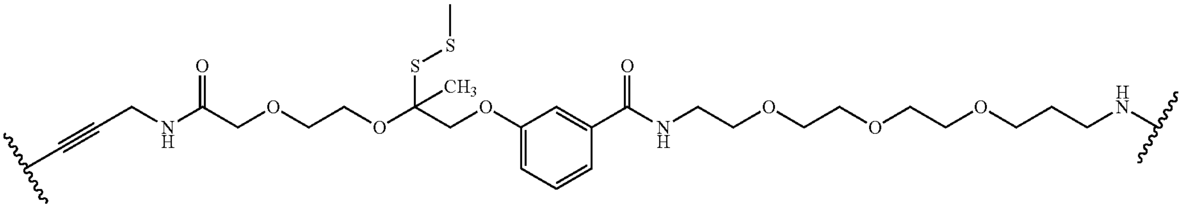
,
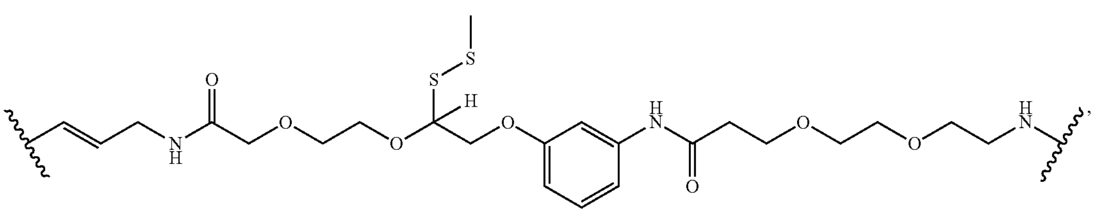
,
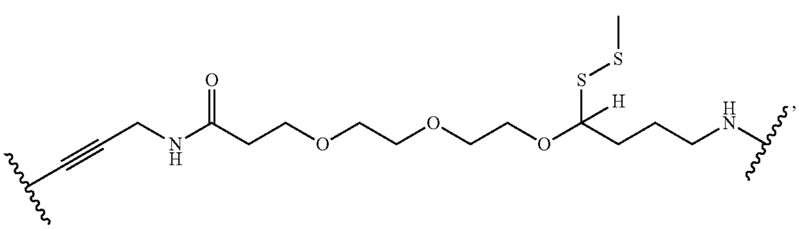
,
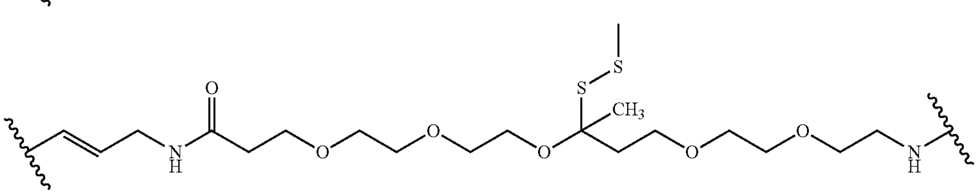
, -continued
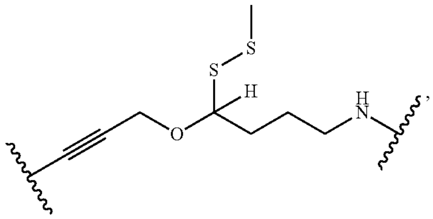
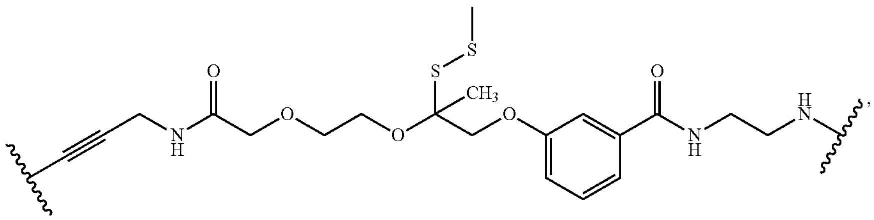
or
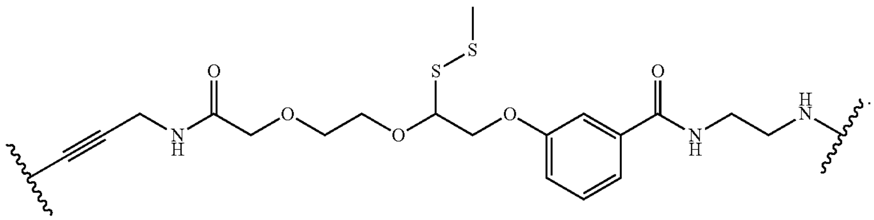
In embodiments, $-L^{100}-L^{400}-$ is
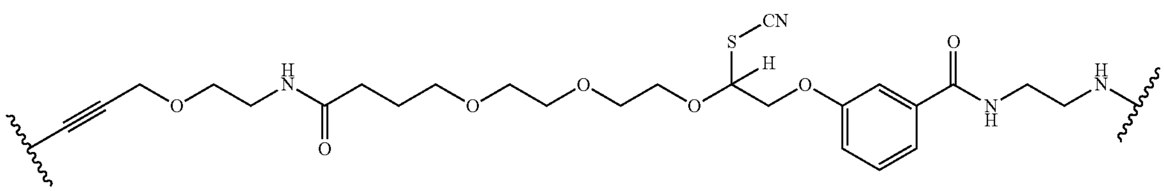
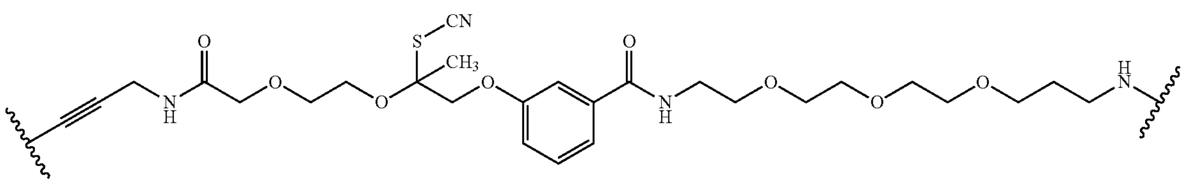
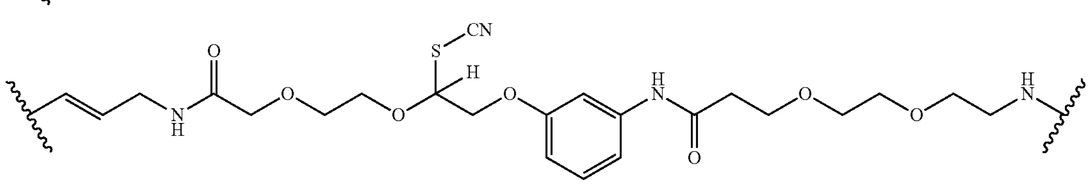
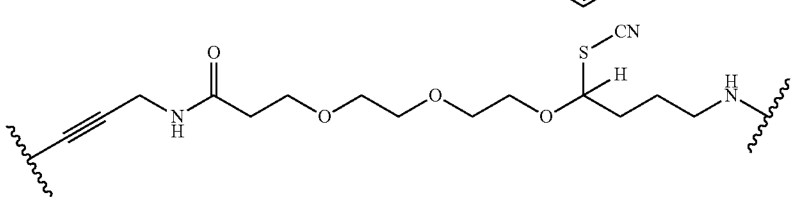
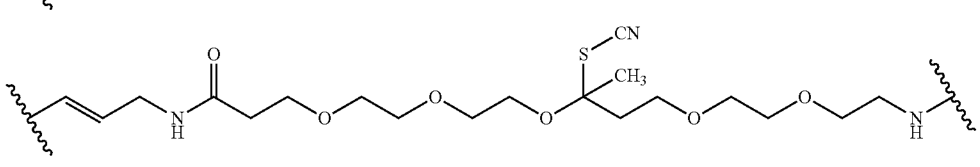

-continued
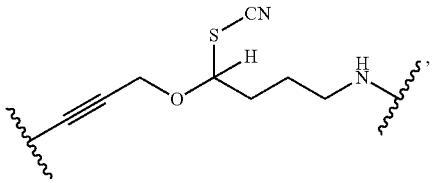
,
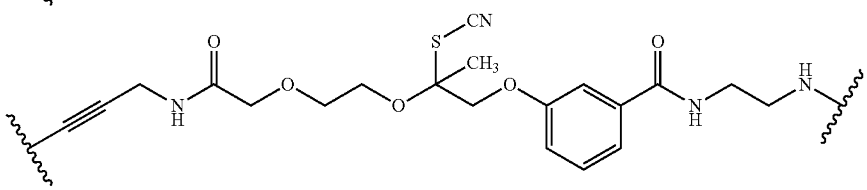
, or
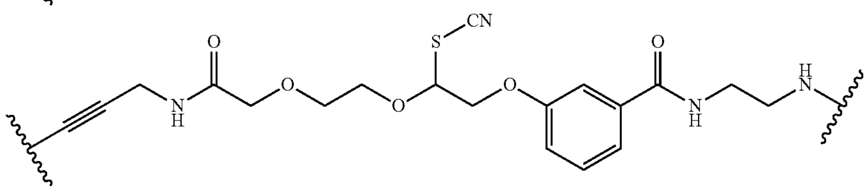
.
In embodiments, $-L^{100}-L^{400}-$ is
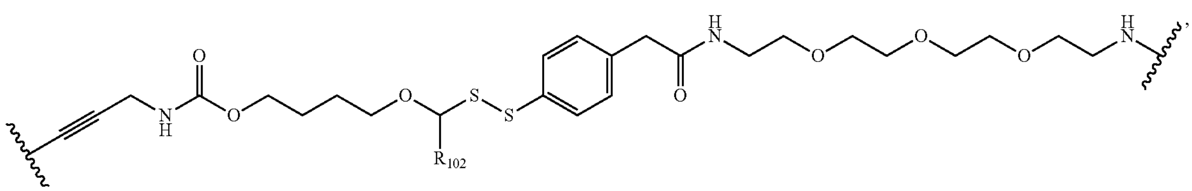
,
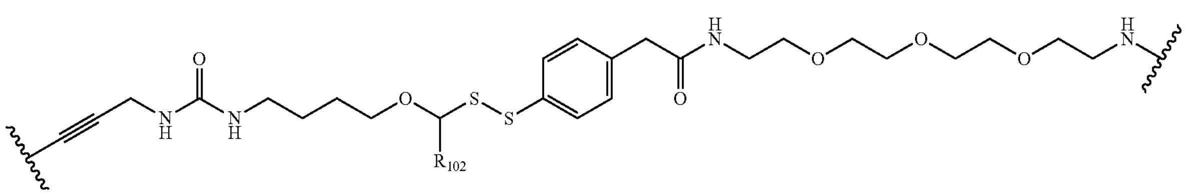
,
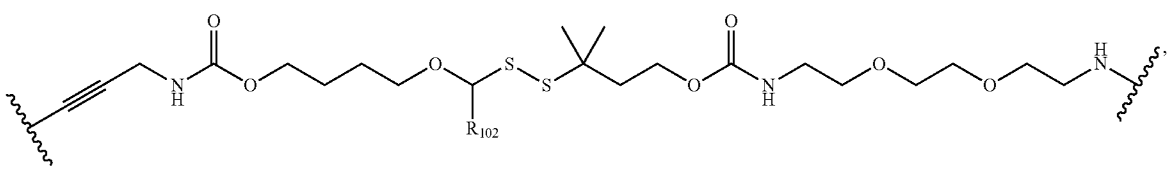
,
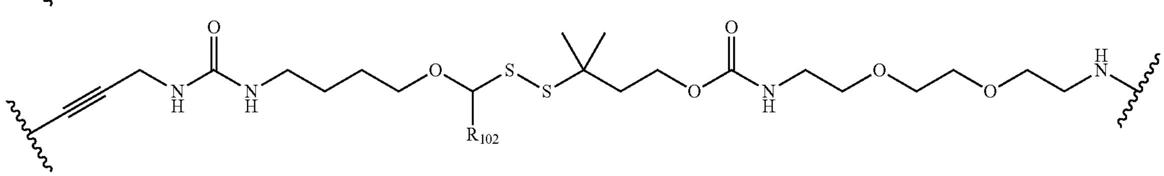
,
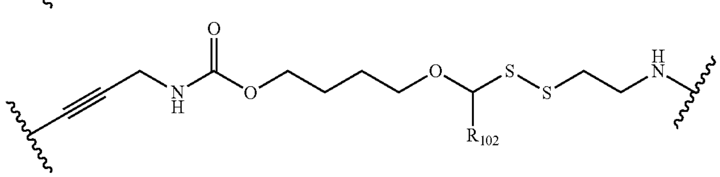
,
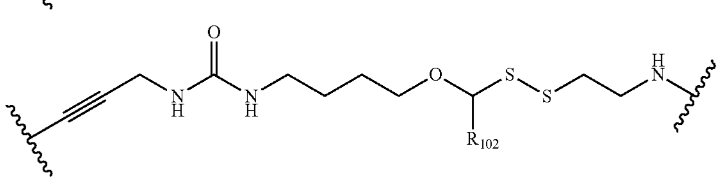
, or -continued

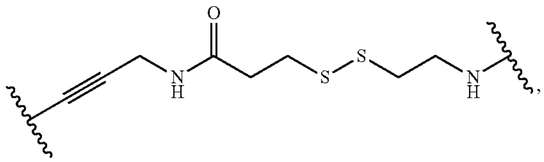

wherein $R^{102}$ is substituted or unsubstituted $C_1$-$C_6$ alkyl.

In embodiments, a substituted $R^{102}$ (e.g., substituted $C_1$-$C_6$ alkyl) is substituted with at least one substituent group, size-limited substituent group, or lower substituent group; wherein if the substituted $R^{102}$ is substituted with a plurality of groups selected from substituent groups, size-limited substituent groups, and lower substituent groups; each substituent group, size-limited substituent group, and/or lower substituent group may optionally be different. In embodiments, when $R^{102}$ is substituted, it is substituted with at least one substituent group. In embodiments, when $R^{102}$ is substituted, it is substituted with at least one size-limited substituent group. In embodiments, when $R^{102}$ is substituted, it is substituted with at least one lower substituent group.

In embodiments, $R^{102}$ is unsubstituted methyl. In embodiments, $R^{102}$ is unsubstituted ethyl. In embodiments, $R^{102}$ is unsubstituted propyl. In embodiments, $R^{102}$ is unsubstituted n-propyl. In embodiments, $R^{102}$ is unsubstituted isopropyl. In embodiments, $R^{102}$ is unsubstituted butyl. In embodiments, $R^{102}$ is unsubstituted n-butyl. In embodiments, $R^{102}$ is unsubstituted isobutyl. In embodiments, $R^{102}$ is unsubstituted tert-butyl.

In embodiments, $-L^{100}-L^{400}-$ is

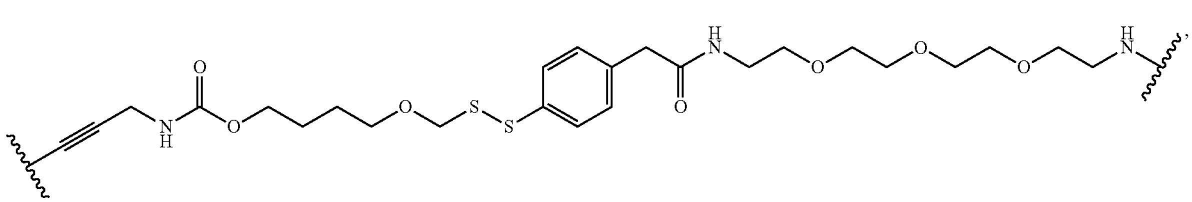

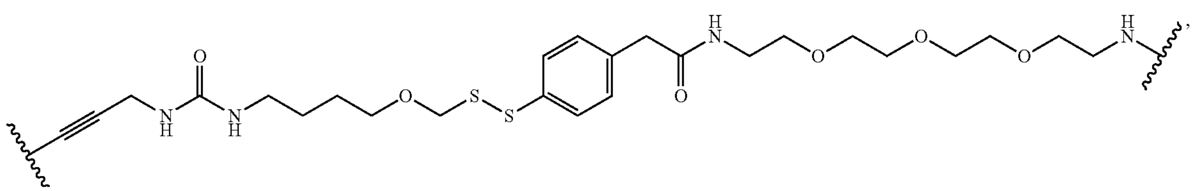

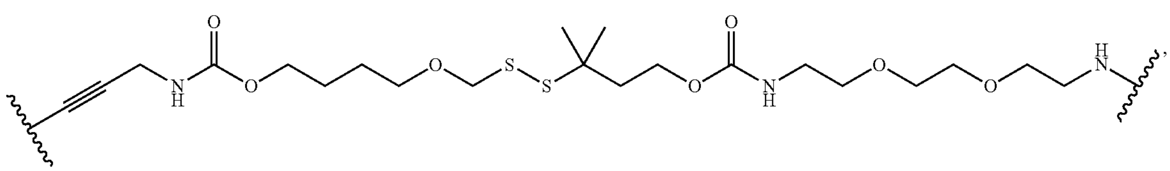

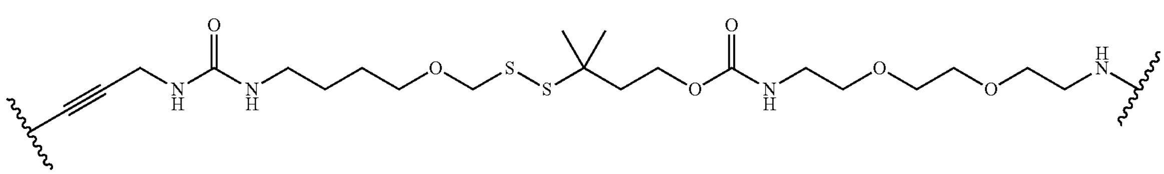

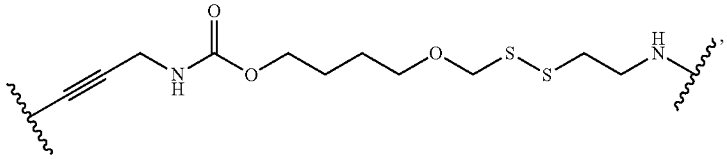

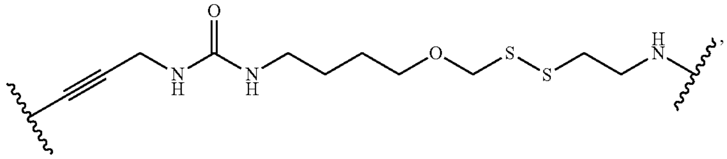

or

-continued
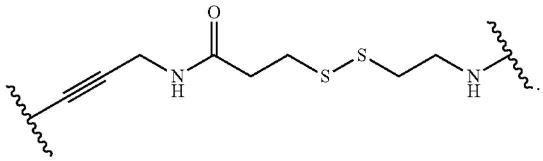
In embodiments, $-L^{100}-L^{400}-$ is
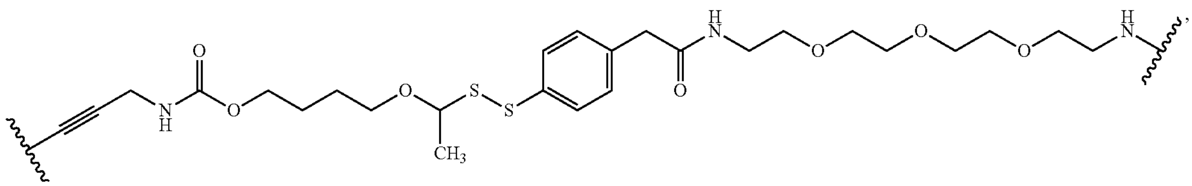
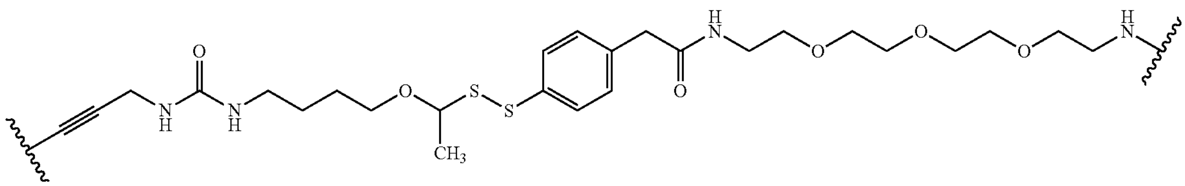
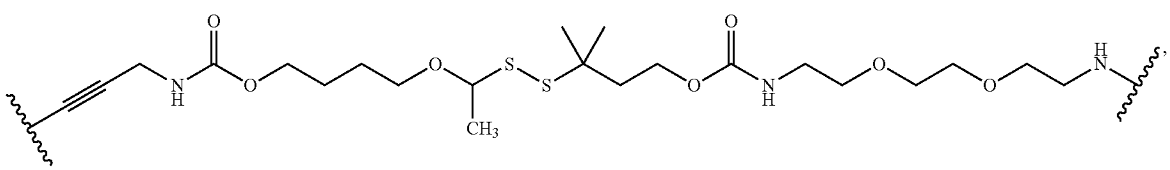
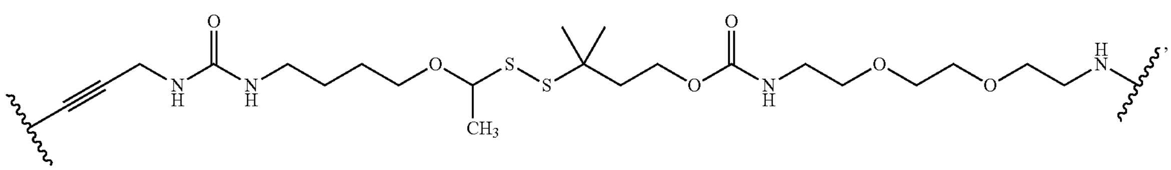
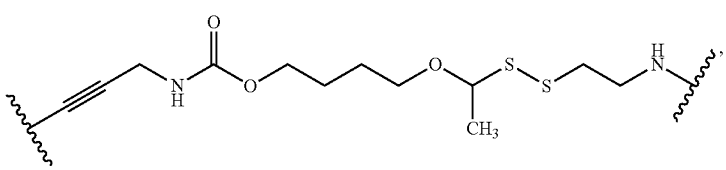
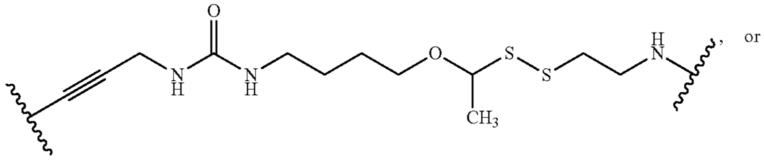
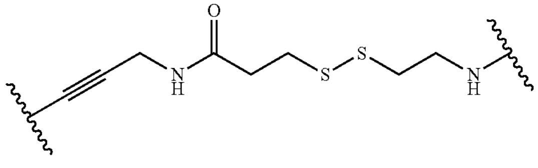

In embodiments, $L^{400}$ is
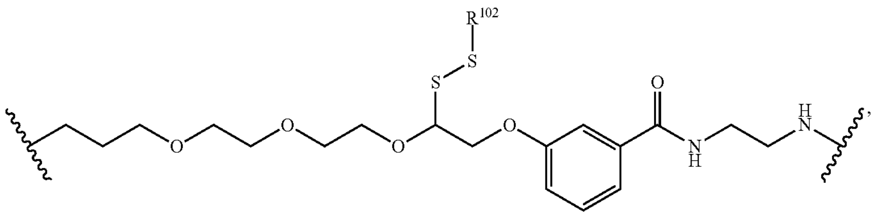
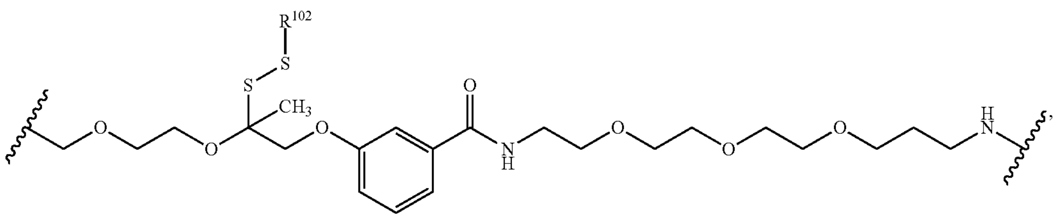
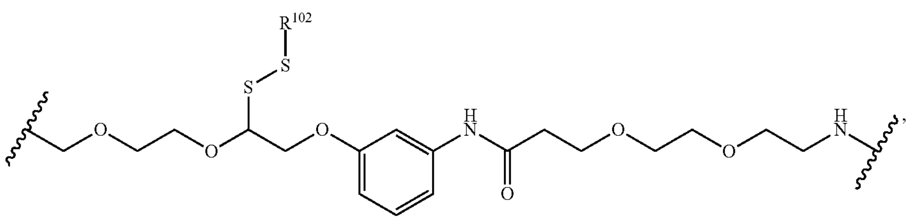
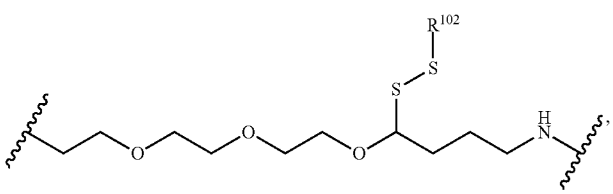
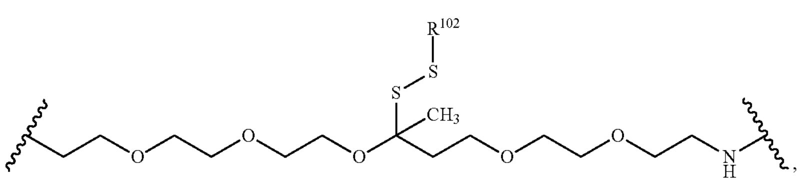
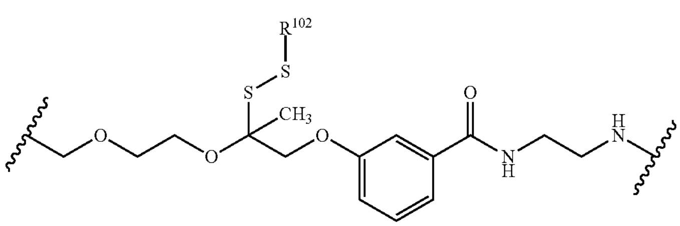
or
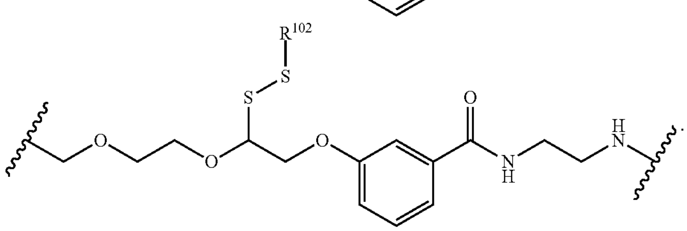

$R^{102}$ is as described herein, including in embodiments.
In embodiments, $L^{400}$ is
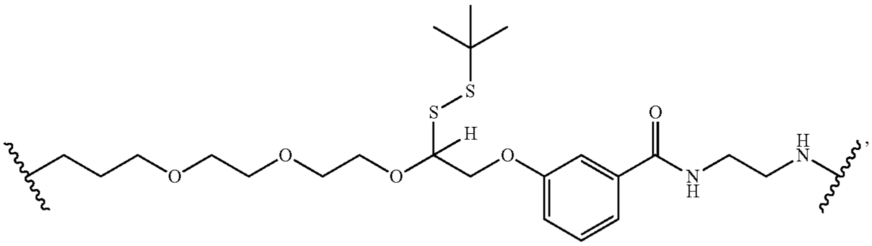
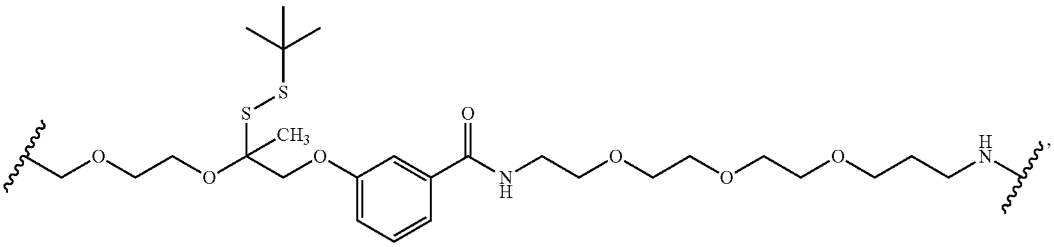
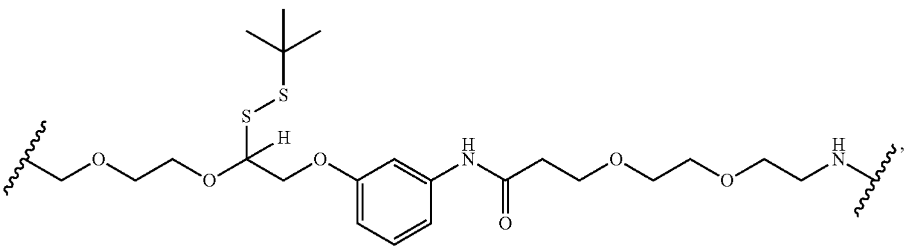
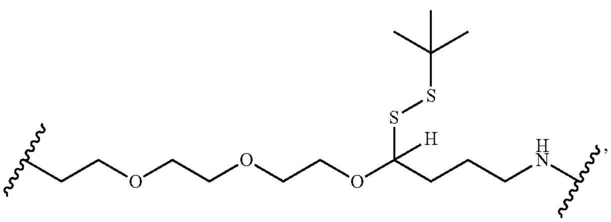
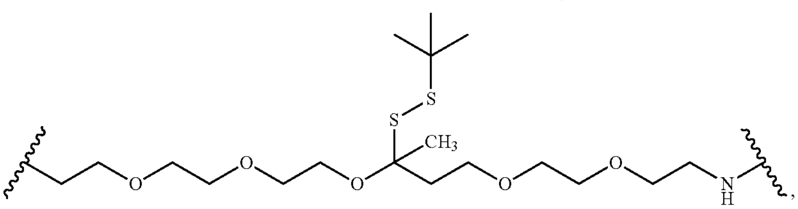
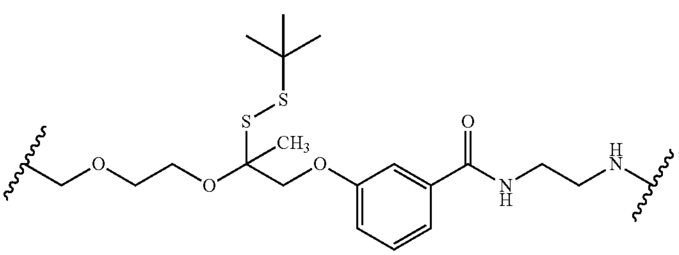
or
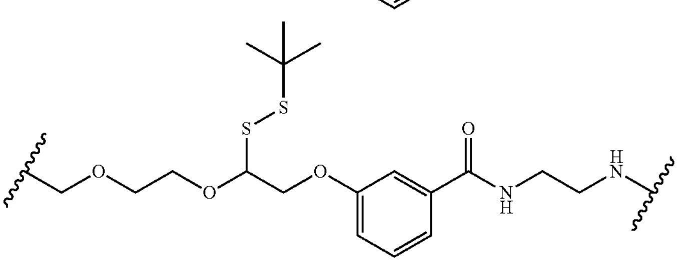

In embodiments, $L^{400}$ is
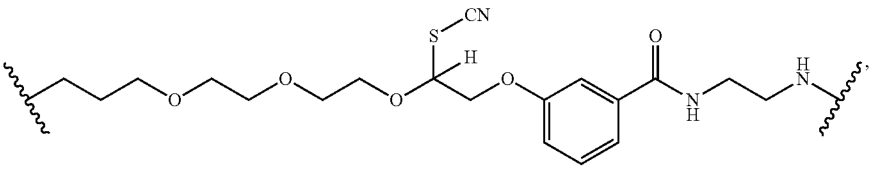
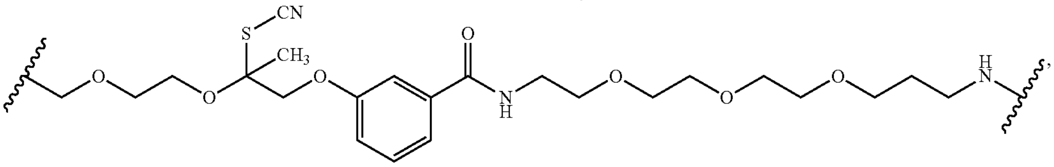
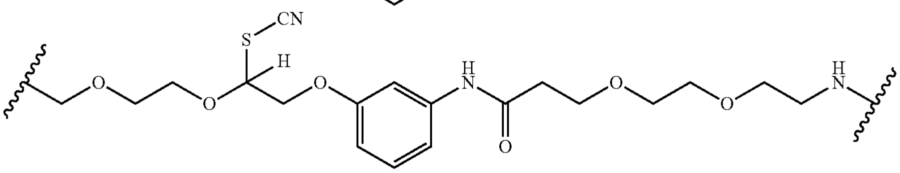
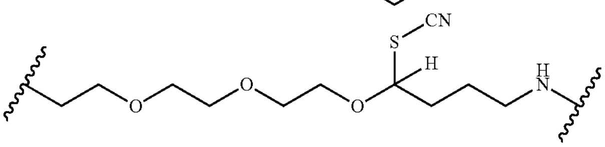
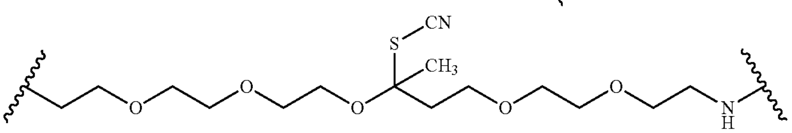
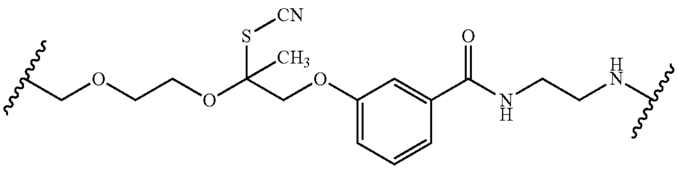
or
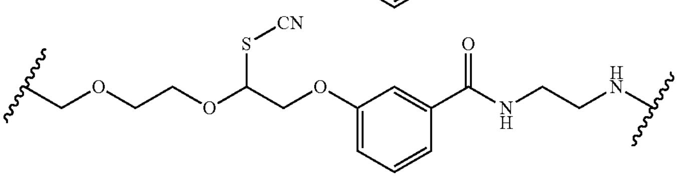
In embodiments, $L^{400}$ is
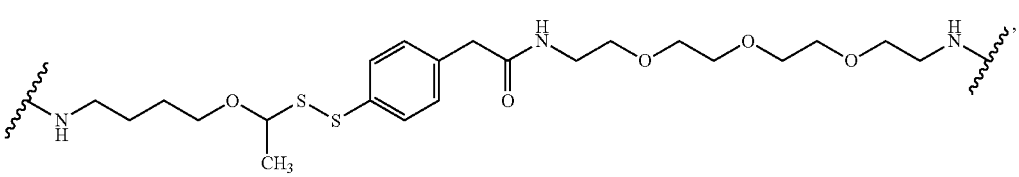
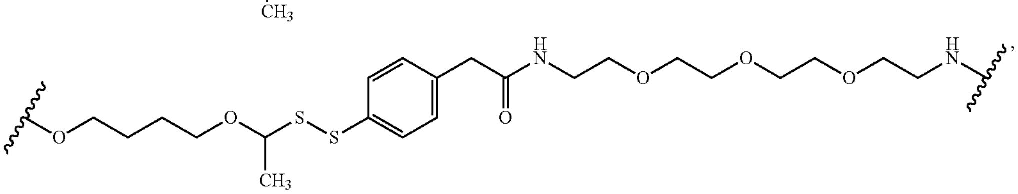
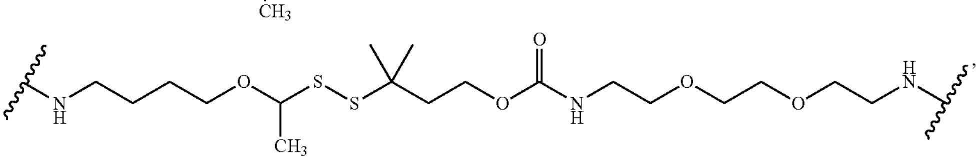

-continued
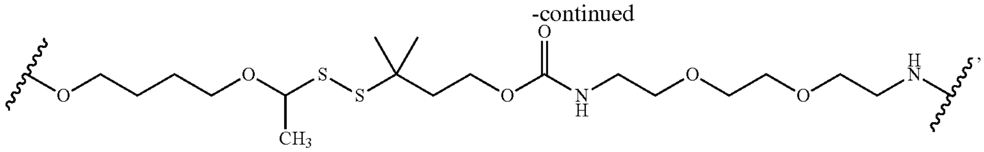
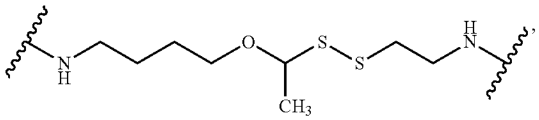
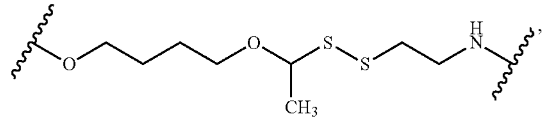
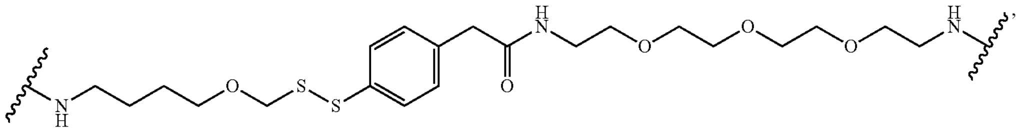
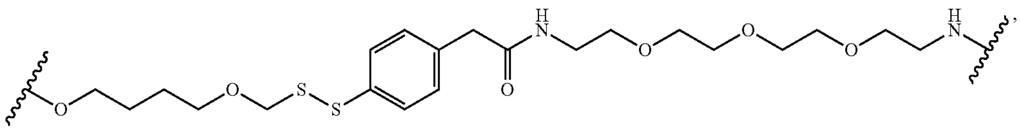
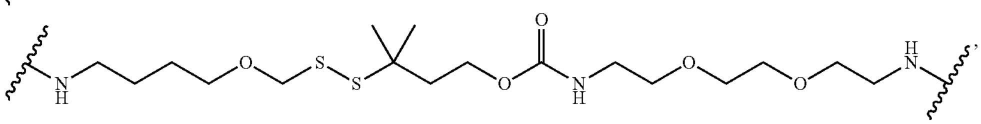
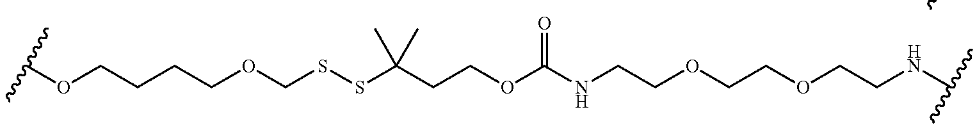
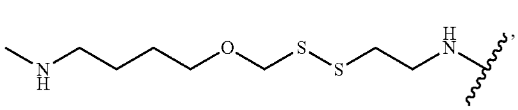
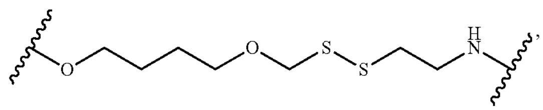
or
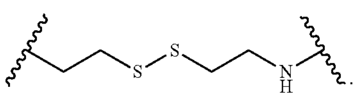
In embodiments, $-L^{100}-L^{400}-$ is
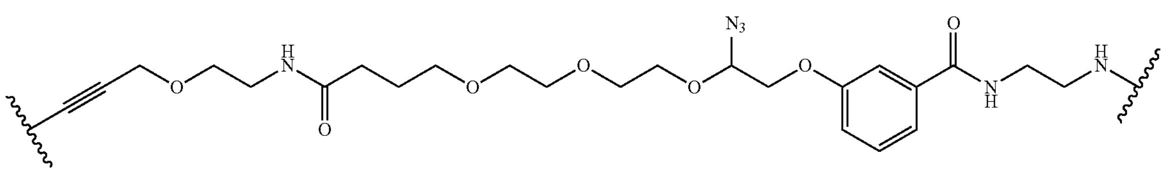
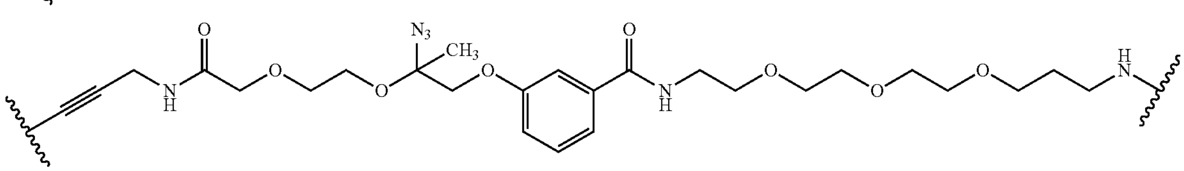
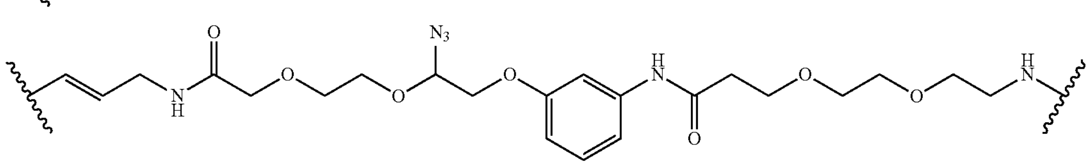
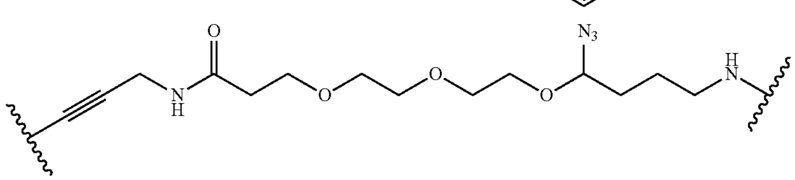

-continued

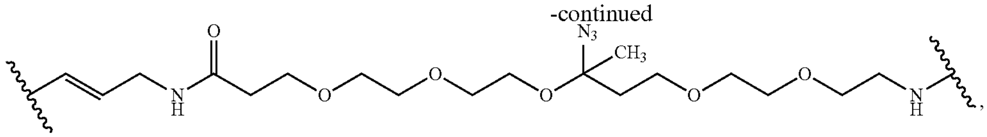

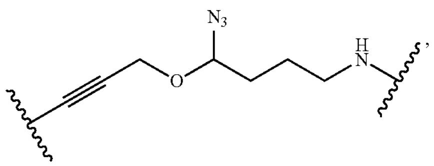

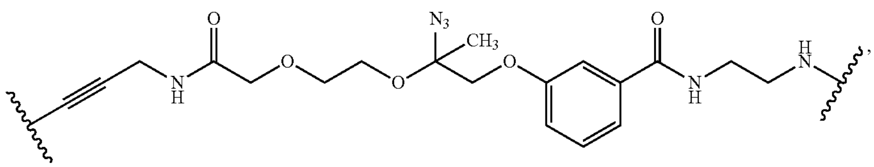

or

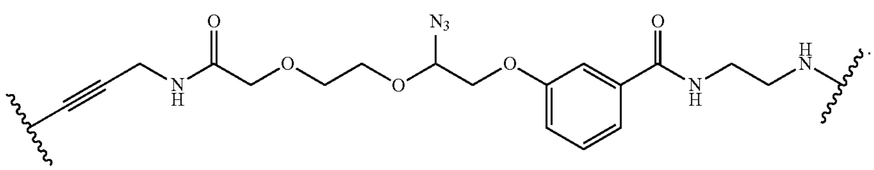

In embodiments, $R^{500}$ is a detectable moiety. In embodiments, $R^{500}$ is a fluorescent dye moiety. In embodiments, $R^{500}$ is a detectable moiety described herein (e.g., Table 1). In embodiments, $R^{500}$ is a detectable moiety described in Table 1.

TABLE 1

Detectable moieties to be used in selected embodiments.

| Nucleoside/ nucleotide abbreviation | Dye name | λmax (nm) |
|---|---|---|
| dC | Atto 532 | 532 |
| dC | Atto Rho 6G | 535 |
| dC | R6G | 534 |
| dC | Tet | 521 |
| dT | Atto Rho 11 | 572 |
| dT | Atto 565 | 564 |
| dT | Alexa Fluor 568 | 578 |
| dT | dTamra | 578 |
| dA | Alexa Fluor 647 | 650 |
| dA | Atto 647N | 644 |
| dA | Janelia Fluor 646 | 646 |
| dG | Alexa Fluor 680 | 682 |
| dG | Alexa Fluor 700 | 696 |
| dG | CF680R | 680 |

In embodiments, $R^{500}$ is

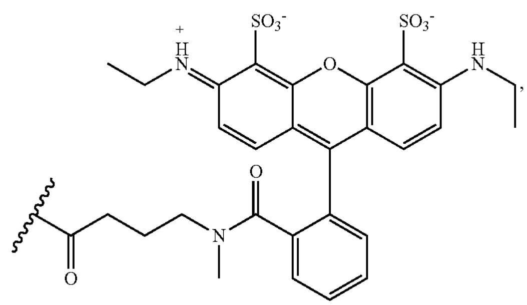

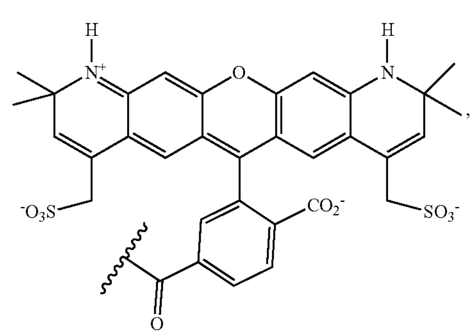

-continued

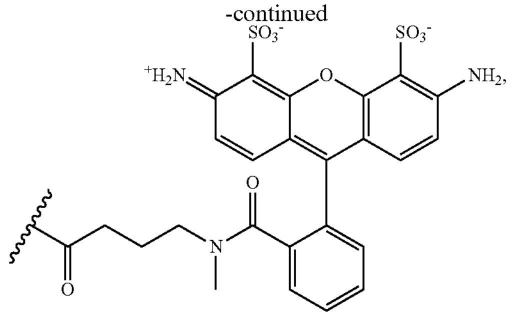

or

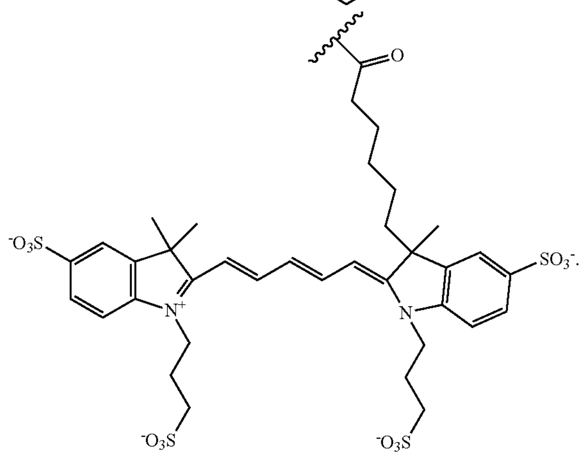

In embodiments, the nucleic acid to be sequenced is DNA or RNA, or a hybrid molecule comprised of deoxynucleotides and ribonucleotides. In embodiments, the nucleic acid to be sequenced is attached to a solid substrate via any suitable linkage method known in the art, e.g., using covalent linkage. In embodiments, the nucleic acid is attached directly to a solid substrate. In embodiments, the surface of the solid support includes a polymer that provides the attachment points for the nucleic acid.

In embodiments, the nucleic acid is within a cluster. The terms “cluster” and “colony” are used interchangeably throughout this application and refer to a discrete site on a solid support comprised of a plurality of immobilized nucleic acid strands. The term “clustered array” refers to an array formed from such clusters or colonies. In this context, the term “array” is not to be understood as requiring an ordered arrangement of clusters. The term “array” is used in accordance with its ordinary meaning in the art, and refers to a population of different molecules that are attached to one or more solid-phase substrates such that the different molecules can be differentiated from each other according to their relative location. An array can include different molecules that are each located at different addressable features on a solid-phase substrate. The molecules of the array can be nucleic acid primers, nucleic acid probes, nucleic acid templates or nucleic acid enzymes such as polymerases or ligases. Arrays useful in the invention can have densities that ranges from about 2 different features to many millions, billions or higher. The density of an array can be from 2 to as many as a billion or more different features per square cm. For example an array can have at least about 100 features/$cm^2$, at least about 1,000 features/$cm^2$, at least about 10,000 features/$cm^2$, at least about 100,000 features/$cm^2$, at least about 10,000,000 features/$cm^2$, at least about 100,000,000 features/$cm^2$, at least about 1,000,000,000 features/$cm^2$, at least about 2,000,000,000 features/$cm^2$ or higher. In embodiments, the arrays have features at any of a variety of densities including, for example, at least about 10 features/$cm^2$, 100 features/$cm^2$, 500 features/$cm^2$, 1,000 features/$cm^2$, 5,000 features/$cm^2$, 10,000 features/$cm^2$, 50,000 features/$cm^2$, 100,000 features/$cm^2$, 1,000,000 features/$cm^2$, 5,000,000 features/$cm^2$, or higher.

In an aspect is provided a method of incorporating a compound into a primer, the method including combining a polymerase, a primer hybridized to nucleic acid template and the compound within a reaction vessel and allowing the polymerase to incorporate the compound into the primer thereby forming an extended primer, wherein the compound is a compound as described herein, including embodiments. In embodiments, incorporating a compound into a primer refers to the 5' phosphate joining in phosphodiester linkage to the 3'—OH group of a second (modified or unmodified) nucleotide, which may itself form part of a longer polynucleotide chain.

In embodiments, the nucleic acid polymerase is a Taq polymerase, Therminator γ, 9° N polymerase (exo-), Therminator II, Therminator III, or Therminator IX. In embodiments, the nucleic acid polymerase is Therminator γ. In embodiments, the nucleic acid polymerase is 9° N polymerase (exo-). In embodiments, the nucleic acid polymerase is Therminator II. In embodiments, the nucleic acid polymerase is Therminator III. In embodiments, the nucleic acid polymerase is Therminator IX. In embodiments, the nucleic acid polymerase is a Taq polymerase. In embodiments, the nucleic acid polymerase is a nucleic acid polymerase. In embodiments, the nucleic acid polymerase is 9° N and mutants thereof. In embodiments, the nucleic acid polymerase is Phi29 and mutants thereof. In embodiments, the DNA polymerase is a modified archaeal DNA polymerase. In embodiments, the polymerase is a reverse transcriptase. In embodiments, the polymerase is a mutant *P. abyssi* polymerase (e.g., such as a mutant *P. abyssi* polymerase described in WO 2018/148723 or WO 2020/056044, both of which are incorporated by reference herein). In embodiments, the polymerase is DNA polymerase, a terminal deoxynucleotidyl transferase, or a reverse transcriptase. In embodiments, the enzyme is a DNA polymerase, such as DNA polymerase 812 (Pol 812) or DNA polymerase 1901 (Pol 1901), e.g., a polymerase described in US 2020/0131484, and US 2020/0181587, both of which are incorporated by reference herein.

In embodiments, the method includes simultaneously sequencing a plurality of different nucleic acids, including: a) extending a plurality of primer DNA strands hybridized to template DNAs, each of which includes one of the primer DNA strands, by incorporating a labeled nucleotide in the presence of an enzyme; removing the label from the nucleotide by contacting the labeled nucleotide with a compound described herein and b) identifying each labeled nucleotide, so as to simultaneously sequence the plurality of different nucleic acids. In embodiments, the labeled nucleotide further includes a reversible terminator.

In an aspect is provided a method of determining the sequence of a target single-stranded polynucleotide. In embodiments, the method includes incorporating a compound as described herein into an oligonucleotide strand complementary to at least a portion of the target polynucleotide strand; and detecting the identity of the compound incorporated into the oligonucleotide strand. In embodiments, the compound includes a 3'-O-polymerase-compatible cleavable moiety as described herein and a detectable label. In embodiments, the method further includes chemically removing the detectable label and the 3'-O-polymerase-compatible cleavable moiety from the compound incorporated into the oligonucleotide strand. In embodiments, the 3'-O-polymerase-compatible cleavable moiety and the detectable label of the incorporated compound are removed prior to introducing the next complementary compound. In embodiments, the 3'-O-polymerase-compatible cleavable moiety and the detectable label are removed in a single step of chemical reaction. In embodiments, the sequential incorporation described herein is performed at least 50 times, at least 100 times, at least 150 times, at least 200 times, at least 250 times, or at least 300 times.

In embodiments, the method further including, after the incorporating, cleaving the linker (e.g., $L^{400}$) with a cleaving reagent (e.g., a compound described herein). In embodiments, the cleaving reagent includes a palladium reagent (e.g., Pd(O)). Methods of generating the palladium reagent include contacting a Pd(II) salt with a compound as described herein. For example, the palladium reagent Pd(O), may be generated from reduction of a Pd(II) complex by a compound described herein. Suitable palladium (II) sources include $Pd(CH_3CN)_2Cl_2$, $[PdCl(Allyl)]_2$, [Pd(Allyl)(THP)]Cl, $[Pd(Allyl)(THP)_2]Cl$, $Pd(OAc)_2$, $Pd(PPh_3)_4$, $Pd(dba)_2$, $Pd(Acac)_2$, $PdCl_2(COD)$, and $Pd(TFA)_2$. In embodiments, the cleaving reagent is in a buffer. In embodiments, the buffer includes an acetate buffer, 3-(N-morpholino)propanesulfonic acid (MOPS) buffer, N-(2-Acetamido)-2-aminoethanesulfonic acid (ACES) buffer, phosphate-buffered saline (PBS) buffer, 4-(2-hydroxyethyl)-1-piperazineethanesulfonic acid (HEPES) buffer, N-(1,1-Dimethyl-2-hydroxyethyl)-3-amino-2-hydroxypropanesulfonic acid (AMPSO) buffer, borate buffer (e.g., borate buffered saline, sodium borate buffer, boric acid buffer), 2-Amino-2-methyl-1,3-propanediol (AMPD) buffer, N-cyclohexyl-2-hydroxyl-3-aminopropanesulfonic acid (CAPSO) buffer, 2-Amino-2-methyl-1-propanol (AMP) buffer, 4-(Cyclohexylamino)-1-butanesulfonic acid (CABS) buffer, glycine-NaOH buffer, N-Cyclohexyl-2-aminoethanesulfonic acid (CHES) buffer, tris(hydroxymethyl)aminomethane (Tris) buffer, or a N-cyclohexyl-3-aminopropanesulfonic acid (CAPS) buffer. In embodiments, the buffer is a borate buffer. In embodiments, the buffer is a CHES buffer.

In embodiments, the method further including, after the incorporating, cleaving the linker (e.g., $L^{400}$) with a cleaving reagent (e.g., a compound described herein). In embodiments, the method includes contacting the nucleotide (e.g., a modified nucleotide bearing a reversible terminator and a cleavable linked label) with a reducing agent. In embodiments, the method further including, after the incorporating, cleaving the linker at about 55° C. In embodiments, the method further including, after the incorporating, cleaving the linker at about 45° C. to about 60° C. In embodiments, the method further including, after the incorporating, cleaving the linker at about 55° C. to about 80° C. In embodiments, the method further including, after the incorporating, cleaving the linker at about 60° C. to about 70° C. In embodiments, the method further including, after the incorporating, cleaving the linker at about 65° C. to about 75° C. In embodiments, the method further including, after the incorporating, cleaving the linker at about 65° C. In embodiments, the method further including, after the incorporating, cleaving the linker at about 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., or about 80° C. In embodiments, the method further including, after the incorporating, cleaving the linker at a pH at about 8.0 to 11.0. In embodiments, the pH is 9.0 to 11.0. In embodiments, the pH is 9.5. In embodiments, the pH is 10.0. In embodiments, the pH is 8.0, 8.5, 9.0, 9.5, 10.0, 10.5, or 11.0. In embodiments, the pH is from 9.0 to 11.0, and the temperature is about 60° C. to about 70° C. In embodiments, the pH is from 9.0 to 11.0, and the temperature is about 50° C. to about 60° C.

In embodiments, the cleaving reagent (e.g., a compound described herein) cleaves both the cleavable linker (e.g., $L^{400}$ of Formula B) and the reversible terminator (e.g., $R^{300}$ of Formula B) simultaneously. In embodiments, the cleaving reagent (e.g., a compound described herein) cleaves the reversible terminator (e.g., $R^{300}$ of Formula B).

EXAMPLES

Example 1. Efficient Removal of Reducing Agents from Sequencing Reaction Vessels In the context of nucleic acid sequencing, the use of nucleotides bearing a 3' reversible terminator (RT) (also referred to herein as a polymerase-compatible cleavable moiety) allows successive nucleotides to be incorporated into a polynucleotide chain in a controlled manner. The DNA template for a sequencing reaction will typically comprise a double-stranded region having a free 3' hydroxyl group which serves as a primer or initiation point for the addition of further nucleotides in the sequencing reaction. The region of the DNA template to be sequenced will overhang this free 3' hydroxyl group on the complementary strand. The primer bearing the free 3' hydroxyl group may be added as a separate component (e.g., a short oligonucleotide) which hybridizes to a region of the template to be sequenced. Following the addition of a single nucleotide to the DNA template, the presence of the 3' reversible terminator prevents incorporation of a further nucleotide into the polynucleotide chain. While the addition of subsequent nucleotides is prevented, the identity of the incorporated nucleotide is detected (e.g., exciting a unique detectable label that is linked to the incorporated nucleotide). The reversible terminator is then removed (and optionally the cleavable linker is removed simultaneously), leaving a free 3' hydroxyl group for addition of the next nucleotide. The sequencing cycle can then continue with the incorporation of the next blocked, labeled nucleotide.

The reversible terminators and cleavable linkers typically include a moiety (e.g., an azido or disulfide moiety) that cleaves in the presence of a reducing agent, such as dithiothreitol (DTT) or triphenylphosphine, cysteamine, tris(hydroxymethyl)phosphine (THP), tris(hydroxypropyl)phosphine (THPP), or tris-(2-carboxyethyl)phosphine (TCEP). Given their small size (e.g., hydrodynamic radius is less than 1 nm), such reducing agents can remain in the reaction vessel even after post-cleavage washing, as they can fit within cavities on the reaction vessel wall and interact with other elements present on the substrate (e.g., residual polymerase). Retention of even a small amount of these reducing agents can lead to premature cleavage of the reversible terminator and/or label from additional nucleotides in subsequent sequencing cycles. Without a reversible terminator present on the nucleotide, an additional nucleotide is capable of being incorporated and detected, resulting in dephasing from surrounding amplicons in the cluster. This asynchronization event results in lower quality individual base calls and less accurate sequencing reads.

Methods for the removal of reducing agents have included various forms of chromatography or filtration (e.g., dialysis, immobilized resin, or column chromatography), the addition of quenchers (e.g., the addition of 4-azidobenzoic acid to quench excess TCEP through a Staudinger reaction; see, Henkel M et al. Bioconjugate Chem. 2016, 27:2400-06), or the use of azide-modified polyethylene glycols as water-soluble reagents for the quenching of TCEP and THPP in situ (see, Kantner T et al. ACS Omega 2017, 2:5785-91). The use of scavenger compounds as part of a reducing reagent mixture has also been reported, such compounds including indole-3-propionic acid, L-carnitine, and O-acetyl-L-carnitine (U.S. Pat. No. 10,036,011, herein incorporated by reference). While these approaches have the reported functionality of either removing or quenching specific reducing agents, they are far from ideal, given the need for additional equipment, reagents, and labor, including the inclusion of one or more wash steps.

Figure 2A:
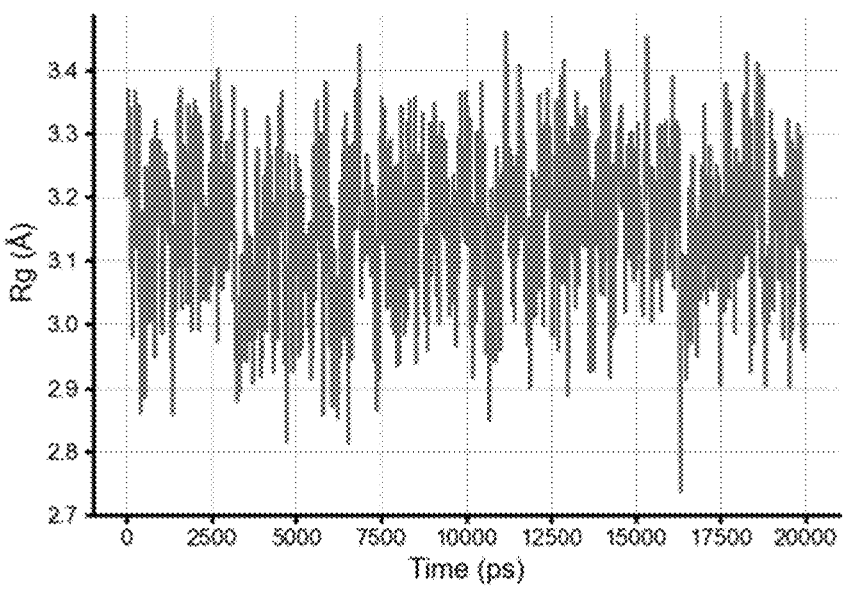
FIGS. 2A-2B depict the calculation of the radius of gyration (Rg) for THPP (FIG. 2A) and 3CYNA (FIG. 2B). Each molecule was solvated with waters and 7 M of KCl and simulated for a total of 20 ns.
Figure 2B:
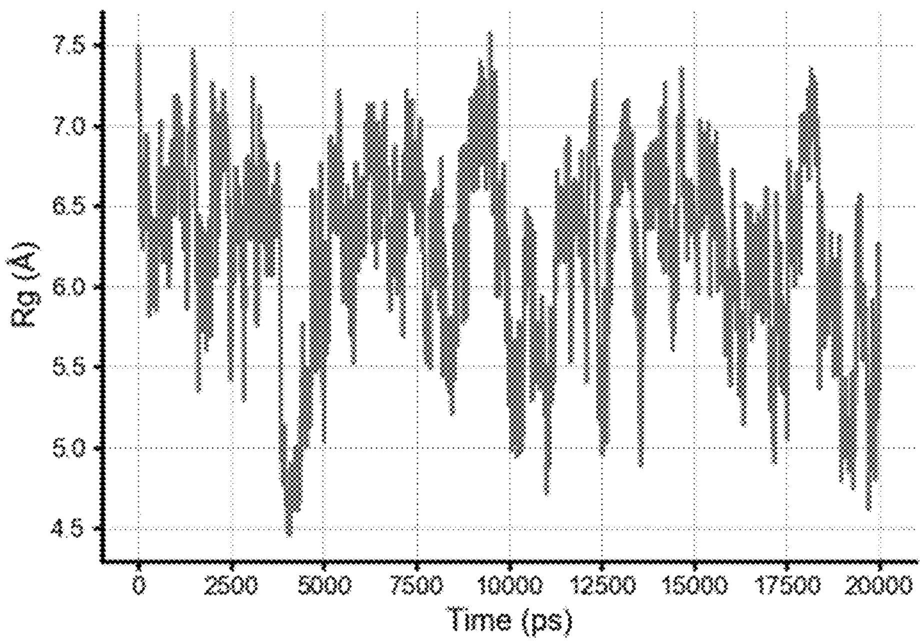

Described herein are solutions to these problems, based on novel reducing agents derived from a central ring-molecule (e.g., cyanuric acid), referred to as cyclic-reducing agents (CRAs). In embodiments, CRAs have, for example, three-times the reducing capacity of traditional THPP (i.e., one-third the amount of CRAs are required to remove a reversible terminator and/or a detectable label from a nucleotide due to having three reducing pendant arms). The hydrodynamic radius provides an estimate of the size of the solvated molecule and is proportional to the number of atoms in the molecule. The CRA compounds as described herein have a larger hydrodynamic radius than DTT or THPP. The large size of the compounds described herein, in comparison to a THPP molecule or DTT molecule, improves the solubility and lowers the amount of residual agent left in the reaction vessel. For example, one molecule described herein may contain three THPP molecules (see FIG. 1), referred to as 3CYNA, increasing the hydrodynamic radius of the molecule by at least twice compared to a single THPP molecule. The increased hydrodynamic radius reduces the ability of the molecule to occupy a similar sized environment relative to a molecule with a smaller hydrodynamic radius (e.g., a THPP molecule). The radius of gyration is another useful metric to quantify the size of molecules, defined as the root-mean-square average of the distance of all atoms from the center of mass of the molecule. Simulations of solvated THPP and solvated 3CYNA revealed the average radius of gyration is 3.6 Å and 6.2 Å, respectively, see FIGS. 2A-2B.

In the context of a reaction vessel, for example, a flow cell, following cleavage of the detectable label and/or reversible terminator, a large amount of wash buffer and time are required to remove most of a solution including a monomeric reducing agent such as THPP. In contrast, when a large reducing agent molecule (e.g., a CRA) is applied to a flow cell, the landscape of potential occupancy sites is reduced, and its ability to interact with and be removed by the wash buffer is increased. This phenomenon is similar to how large macromolecular complexes travel faster through a size-exclusion chromatography column compared to individual subunits, as they are excluded from the volumes that the smaller molecule is able to occupy and therefore proceed through the column with less resistance.

In some embodiments, the reducing agents may be PEGylated (i.e., the central ring molecule will have 1-2 THPP moieties and one PEG moiety) to further increase size and solubility. Further modifications may be performed to directly control the exclusion of the reducing agent from the reaction vessel at the end of each sequencing cycle. For example, moieties may be added that can then be used to enhance the removal of the reducing agent during the wash step (e.g., a bioconjugate reactive moiety such as biotin added to the reducing agent may facilitate remove with an avidin-containing mixture). The properties of the reducing agents as described herein may be further modified to facilitate complete removal from the reaction vessel prior to the addition of terminated and/or labeled nucleotides.

The increased size, solubility, and reducing ability of the reducing agents as described herein presents numerous advantages with regards to sequencing applications. These novel reducing agents will significantly lower the amount of wash buffer that will be required following each sequencing cycle, saving both user time and reagents. Furthermore, in contrast to monomeric reducing agents, the increased size and resulting solubility of the molecules enables sequencing reactions that do not require the use of quenchers or scavengers as described supra in order to effectively remove the reducing agent. These properties result in faster SBS cycle times, lower out-of-phase values, and permit longer sequencing read lengths.

Example 2. Materials and Methods for Synthesis Using Nucleophilic Aromatic Substitution (NAS)

Attaching one, two, or three unique molecules to a central ring molecule involves precise control of the reaction conditions. Nucleophilic aromatic substitution (NAS) is a substitution reaction in chemistry in which the nucleophile displaces a good leaving group, such as a halide, on an aromatic ring. NAS reactions are well known in the art and can be applied to synthesize reducing agents as described herein. As an example, triazine may be used as the central ring. Although triazines are aromatic compounds, their resonance energy is much lower than in benzene, enabling easier nucleophilic aromatic substitution. 2,4,6-Trichloro-1,3,5-triazine is easily hydrolyzed to cyanuric acid by heating with water.

To generate a di-PEGylated CRA, a solution comprising cyanuric acid, PEG4-OH was added at a reaction temperature of 0-15° C. The reaction was stopped and the product was confirmed via LC-MS to have an exact mass of 340.07. To this PEGylated molecule, PEG8-OH was added above room temperature, resulting in a di-PEGylated derivative. A solution comprising THPP is then added to generate a di-PEGylated CRA, as depicted in Scheme 1.

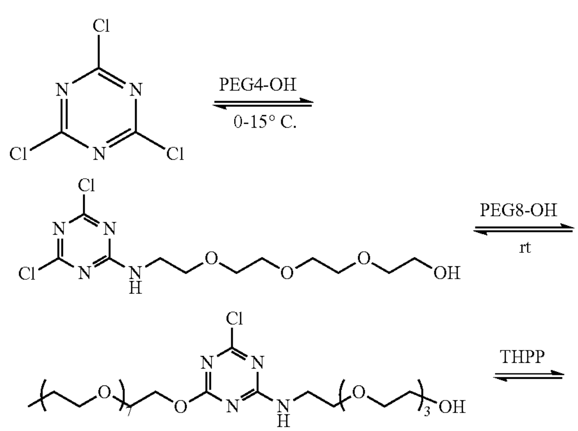

-continued

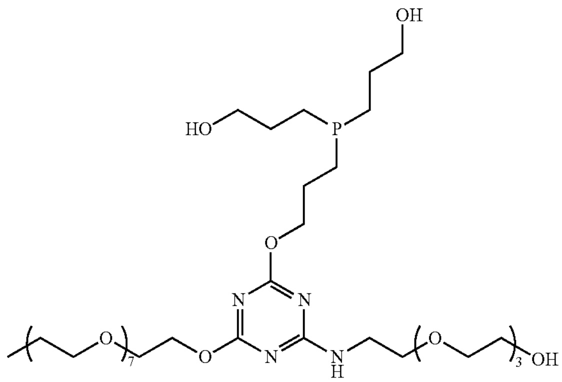

Scheme 1. A synthetic schematic describing the generation of a reducing agent described herein.

Alternatively, PEG and THPP can be combined in a single reaction, as depicted in Scheme 2. LCMS confirmed the presence of cyanuric acid (exact mass 182.92); PEG-THPP-cyanuric derivative (exact mass 529.18), and a PEGylated cyanuric acid (exact mass 357.03).

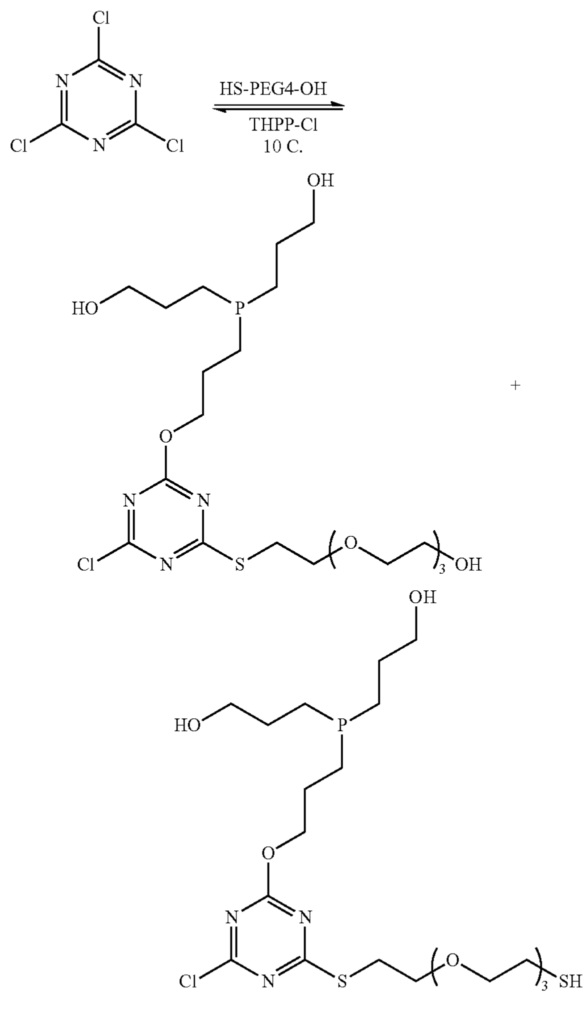

Scheme 2. Synthetic protocol to generate a mixture of reducing agents. When using a thiolated PEG, both the hydroxyl and the thiol are capable of binding to the cyanuric acid.

An additional example includes mixing cyanuric acid with NH2-PEG4-OH slightly above 0° C., followed by addition of THPP-HCl at 25-30° C. in DMF. Alternatively, the same reactants were mixed together in ACN; acetonitrile results in a higher yield. The compound 1CYNA-PEG was produced, and confirmed via LC-MS having an exact mass 512.22. The 1CYNA-PEG compound has the formula:

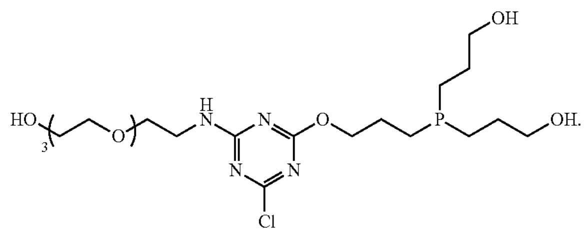

Compounds of the instant invention can alternatively be synthesized by mixing cyanuric acid with PEG and then combining the PEGylated cyanuric acid with a protected phosphine agent (e.g., borane modified version of tris(hydroxypropyl)phosphine (THP)). Generally, the phosphorous atom is more nucleophilic than the hydroxyl groups. In embodiments, the phosphorous atom is protected before adding it to cyanuric chloride. One method is for protecting the phosphorous is to use the phosphor containing agent as a salt (e.g., THP as its HCl salt). After the hydroxyl group reacts with the cyanuric chloride then the phosphorous atom can be deprotected by adding base. Alternatively, phosphine protecting groups are known, see for example Demchuk et al. *Pure and Applied Chemistry*, vol. 90, no. 1, 2018, pp. 49-62; Guy C. Lloyd-Jones and Nicholas P. Taylor, Chem. Eur. J. 2015, vol. 21, p 5423-5428; Joseph A. Buonomo, et al. Chem. Eur. J. 2017, vol. 23, p 14434-14438; and Musina et al. Organophosphorus Chemistry: Volume 48, 2019, pp. 1-63; each of which is incorporated herein by reference for all purposes. To synthesize a molecule as described herein, as illustrated in Scheme 3, THP was treated with a borane tetrahydrofuran solution to form the borane modified THP complex. Rather than the borane modified THP, a protected $PO((CH_2)_3OH)_3$ may alternatively be utilized instead as illustrated in Scheme 4. The di-substituted cyanuric acid was mixed with $NH_2$-$PEG_2$-OH in acetonitrile then deprotected to give the final compound,

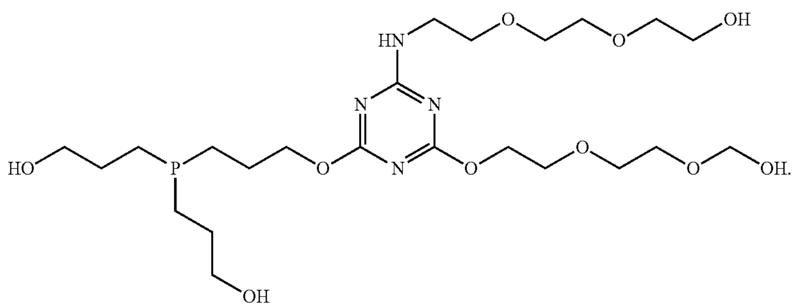 [SMILES: OCCCP(CCCO)CCCOc1nc(NCCOCCOCCO)nc(OCCOCCOCO)n1]
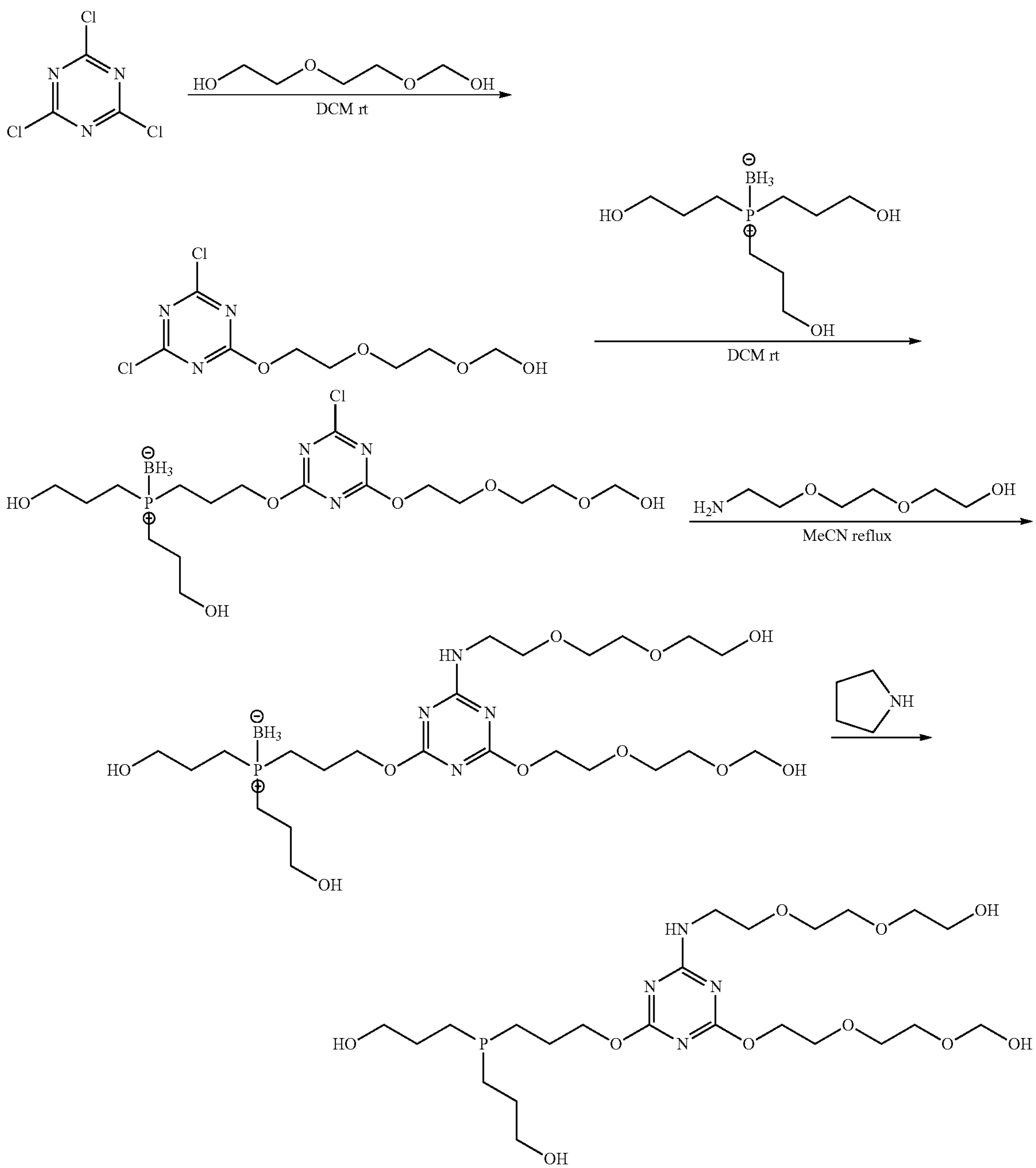
DCM rt
DCM rt
MeCN reflux

Scheme 3. A synthetic schematic describing the generation of a reducing agent described herein.

Additionally cyanuric acid was combined with PEG to generate a di-PEGylated cyanuric acid derivative. $NH_2$-$PEG_2$-OH was added to yield a tri-PEGylated cyanuric acid derivative as shown in Scheme 4. The terminal hydroxyl group on the PEG arms was protected then reacted with a phosphine compound to yield compounds of the instant invention.

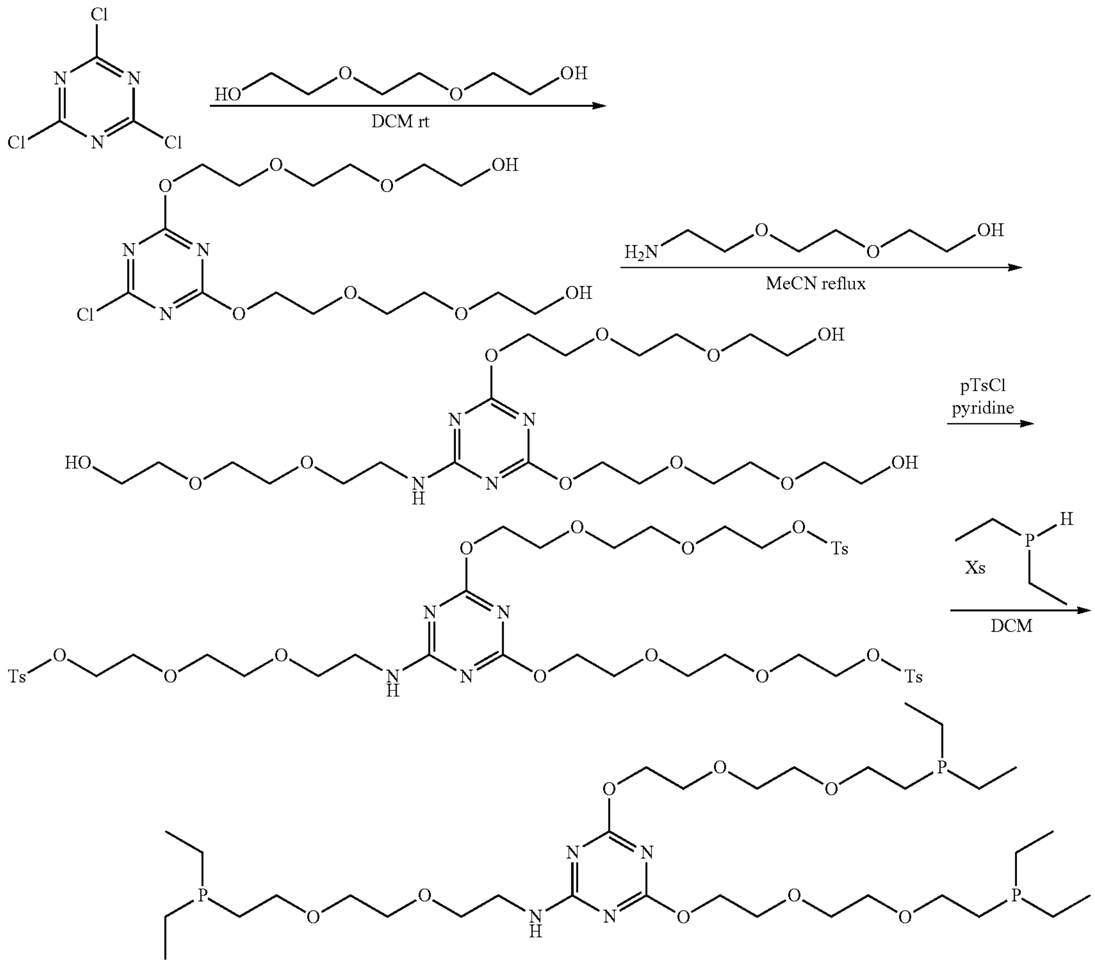

Scheme 4. A synthetic schematic describing the generation of a reducing agent described herein.

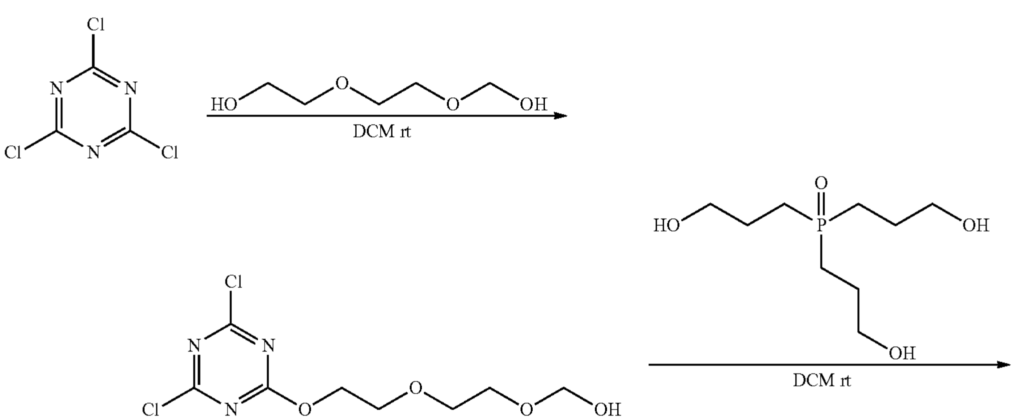

-continued

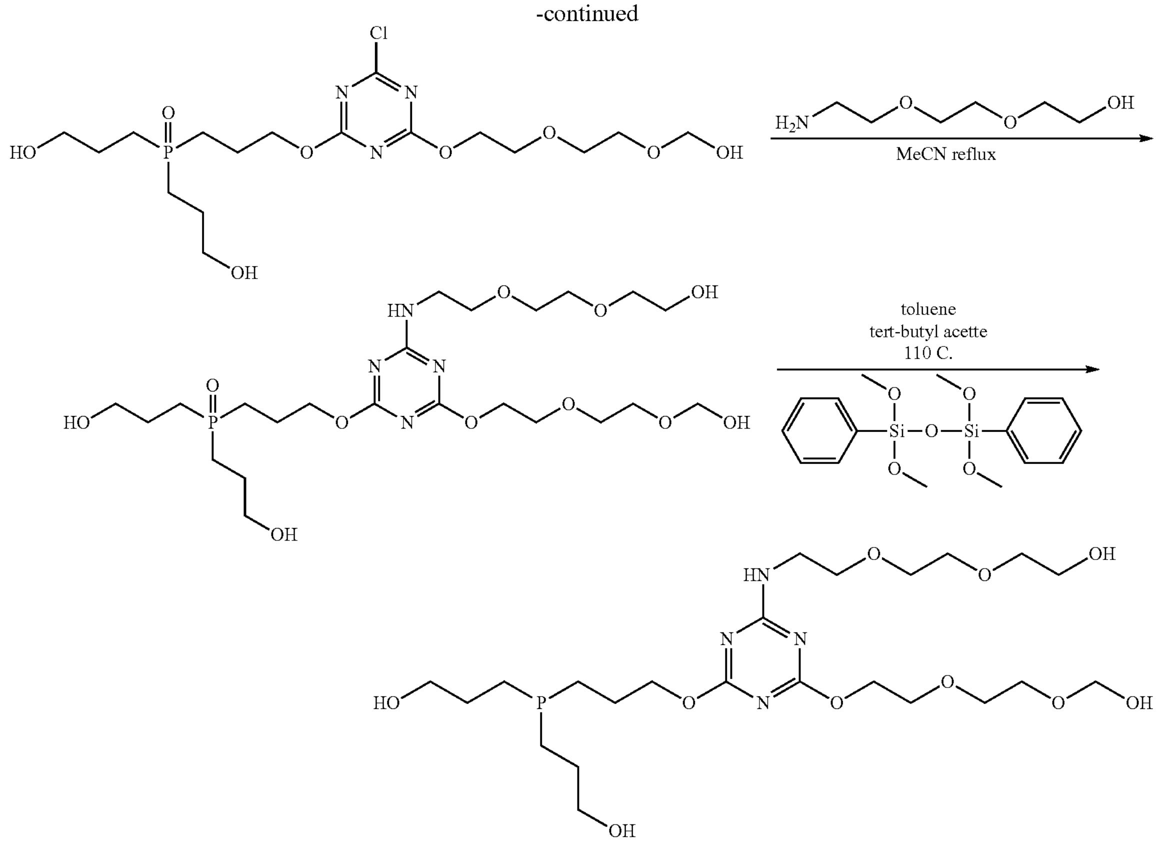

Scheme 5. A synthetic schematic describing the generation of a reducing agent described herein.

Embodiments

The present disclosure provides the following additional illustrative embodiments.

Embodiment 1. A compound having the formula:

(III)

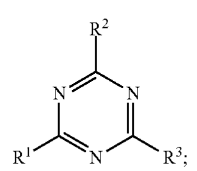

wherein $R^1$ is —$W^1$-$L^1$-$R^4$; $R^2$ is halogen or —$W^2$-$L^2$-$R^5$; $R^3$ is halogen or —$W^3$-$L^3$-$R^6$; $W^1$, $W^2$, and $W^3$ are independently bond, —O—, —S—, or —NH—; $L^1$, $L^2$, and $L^3$ are independently a bond, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene; $R^4$ is

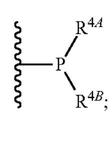

$R^5$ is hydrogen, —OH, $NH_2$, —COOH, —$CONH_2$, —SH, —$SO_3H$, —$SO_4H$, —$SO_2NH_2$, or

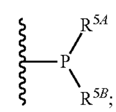

$R^6$ is hydrogen, —OH, $NH_2$, —COOH, —$CONH_2$, —SH, —$SO_3H$, —$SO_4H$, —$SO_2NH_2$, or

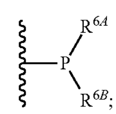

and wherein $R^{4A}$, $R^{4B}$, $R^{5A}$, $R^{5B}$, $R^{6A}$, and $R^{6B}$ are each independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl.

Embodiment 2. The compound of embodiment 1, wherein $W^1$, $W^2$, and $W^3$ are —O—.

Embodiment 3. The compound of embodiment 1, wherein $W^1$, $W^2$, and $W^3$ are —S—.

Embodiment 4. The compound of embodiment 1, wherein $W^1$, $W^2$, and $W^3$ are —NH—.

Embodiment 5. The compound of one of embodiments 1 to 4, wherein $L^1$, $L^2$, and $L^3$ are independently a bond, substituted or unsubstituted alkylene, or substituted or unsubstituted heteroalkylene.

Embodiment 6. The compound of one of embodiments 1 to 4, wherein $L^1$, $L^2$, and $L^3$ are independently unsubstituted alkylene.

Embodiment 7. The compound of one of embodiments 1 to 4, wherein $L^1$, $L^2$, and $L^3$ are independently unsubstituted $C_1$ to $C_8$ alkylene.

Embodiment 8. The compound of one of embodiments 1 to 4, wherein $L^1$, $L^2$, and $L^3$ are independently unsubstituted $C_1$ to $C_4$ alkylene.

Embodiment 9. The compound of one of embodiments 1 to 8, wherein $R^4$ is

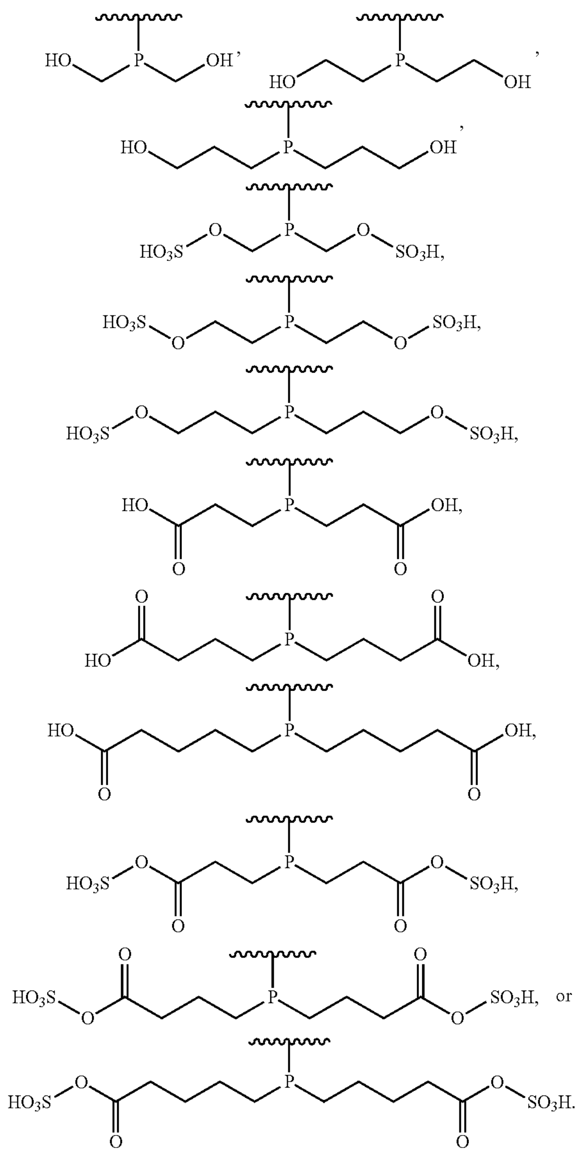

Embodiment 10. The compound of one of embodiments 1 to 9, wherein $R^5$ is hydrogen, —OH, —$NH_2$, —COOH, —$CONH_2$, —SH, —$SO_3H$, —$SO_4H$, —$SO_2NH_2$,

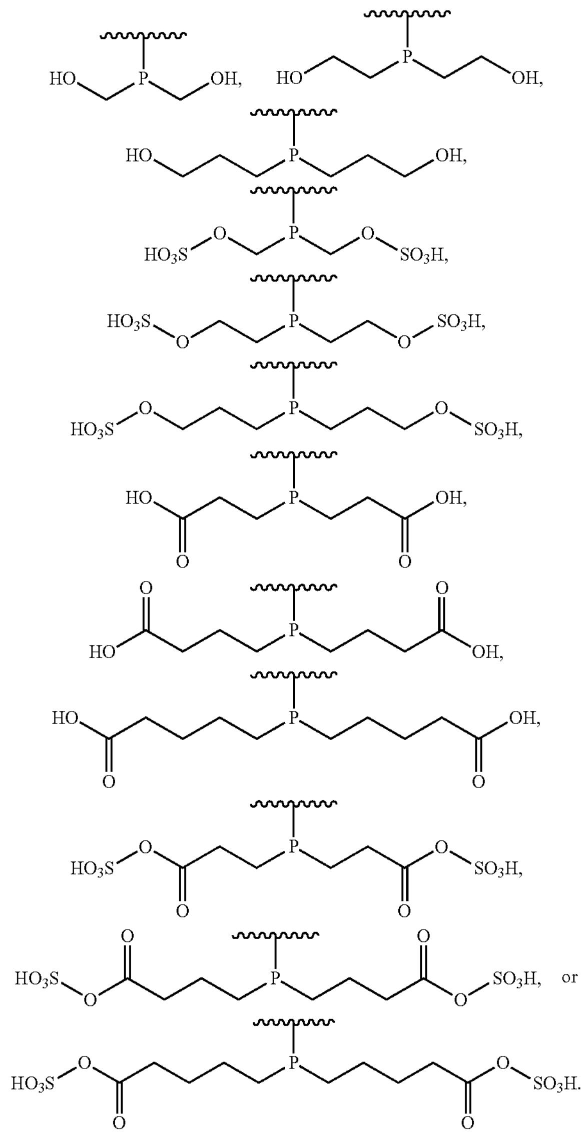

Embodiment 11. The compound of one of embodiments 1 to 9, wherein $R^5$ is hydrogen, —OH, —COOH, —SH, —$SO_3H$, —$SO_4H$,

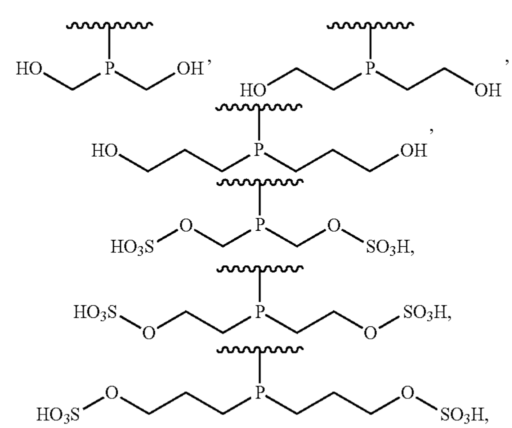

-continued
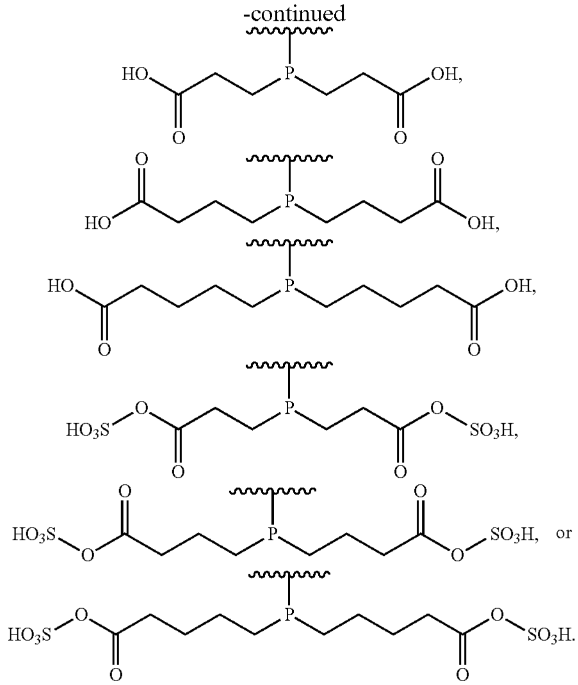
Embodiment 12. The compound of one of embodiments 1 to 11, wherein $R^6$ is hydrogen, —OH, —$NH_2$, —COOH, —$CONH_2$, —SH, —$SO_3H$, —$SO_4H$, —$SO_2NH_2$,
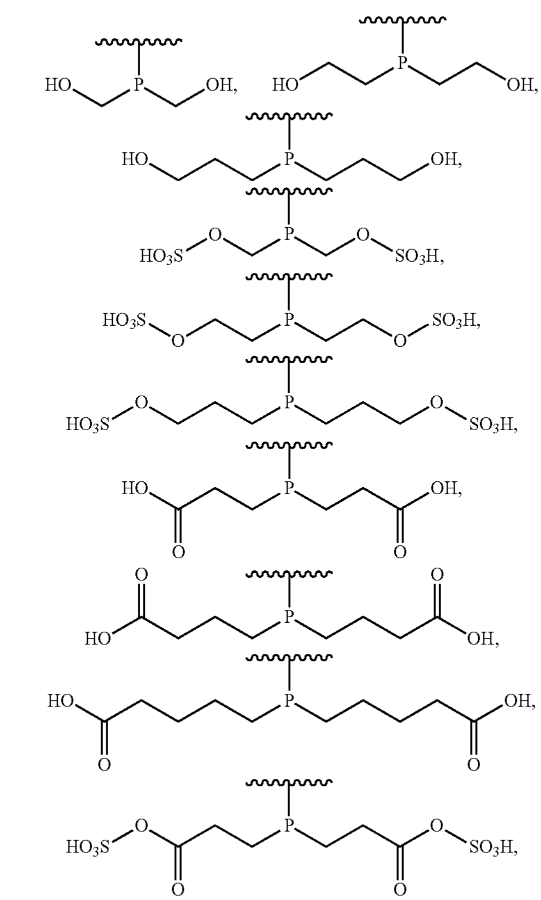
-continued
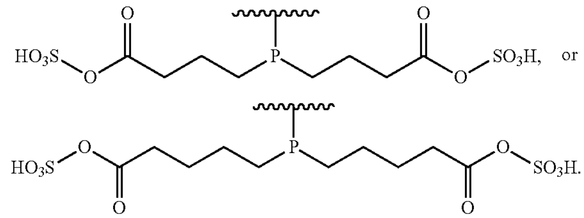
Embodiment 13. The compound of one of embodiments 1 to 11, wherein $R^6$ is hydrogen, —OH, —COOH, —SH, —$SO_3H$, —$SO_4H$,
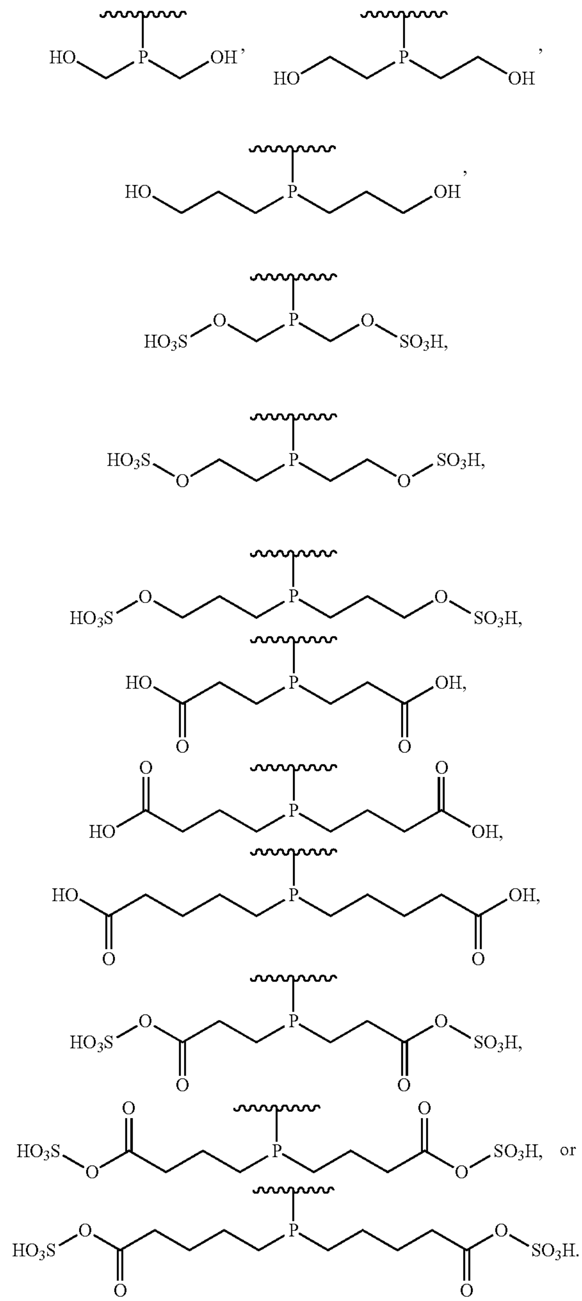

Embodiment 14. The compound of one of embodiments 1 to 13, wherein $R^1$ has the formula:
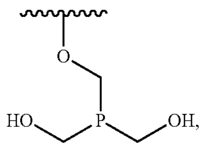
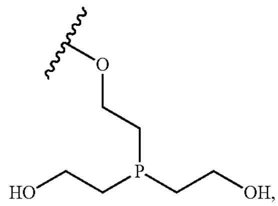
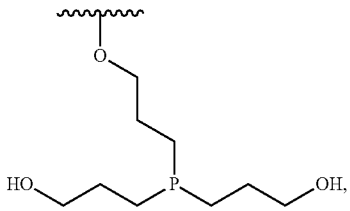
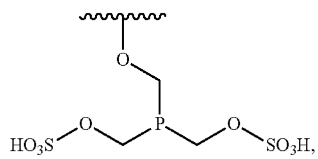
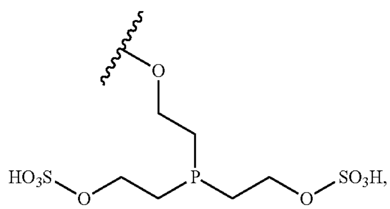
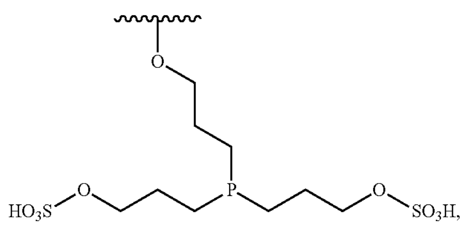
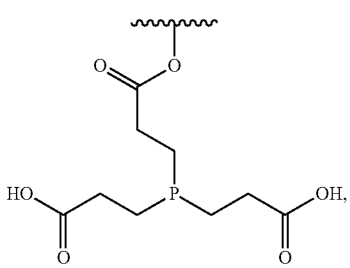
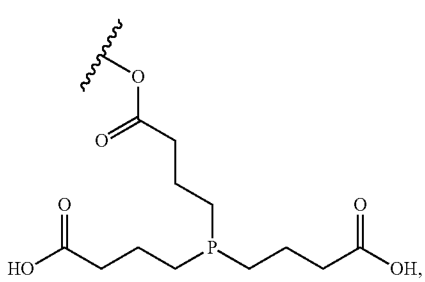
-continued
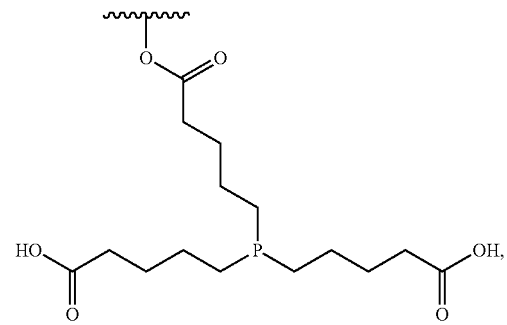
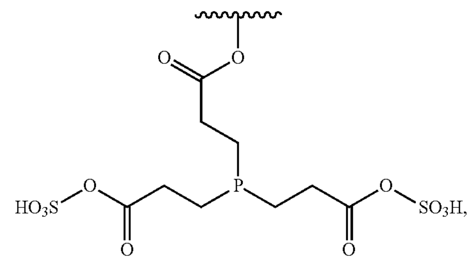
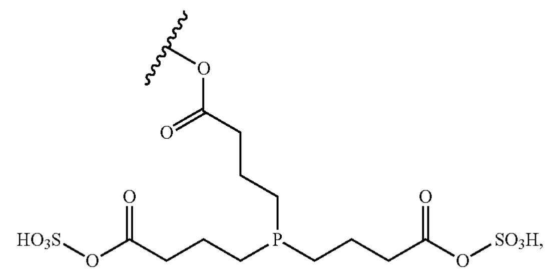
or
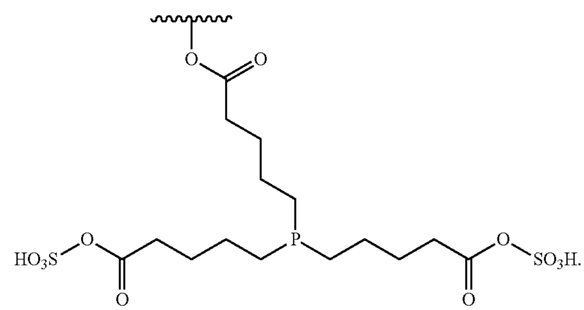
Embodiment 15. The compound of one of embodiments 1 to 14, wherein $R^2$ is halogen or has the formula:
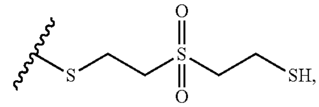
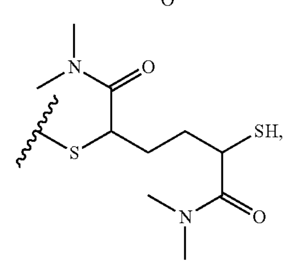

-continued
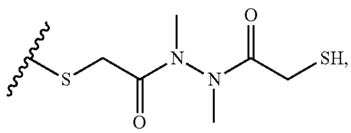
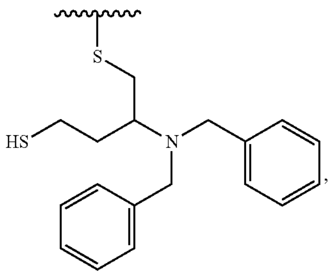
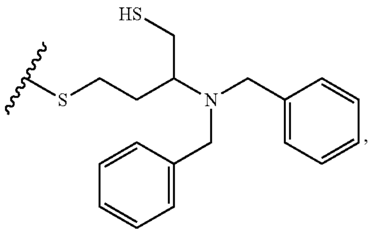
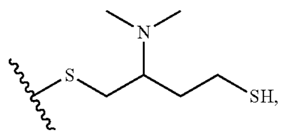
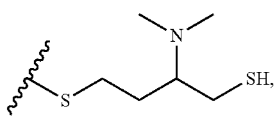
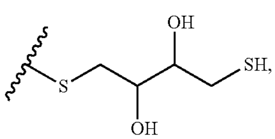
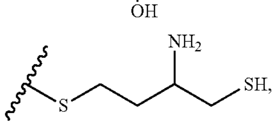
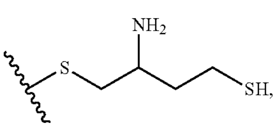
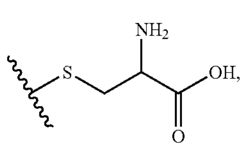
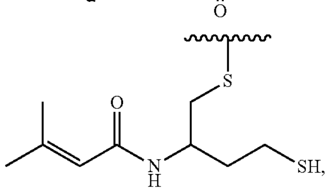
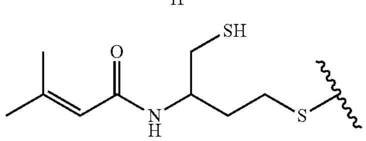
-continued
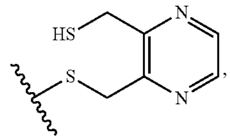
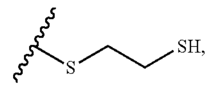
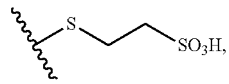
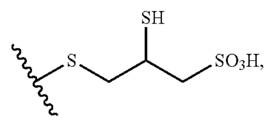
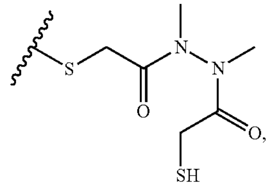
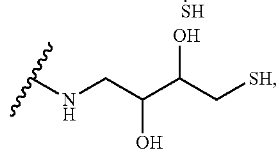
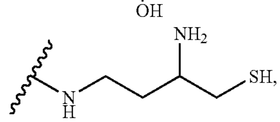
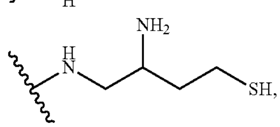
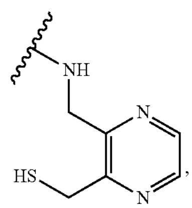
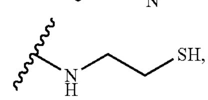
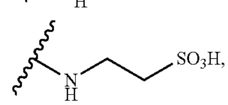
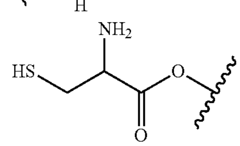
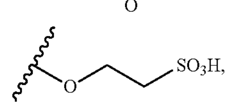
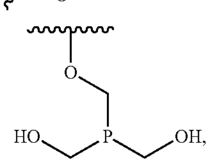

-continued
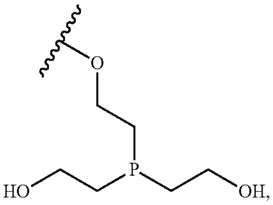
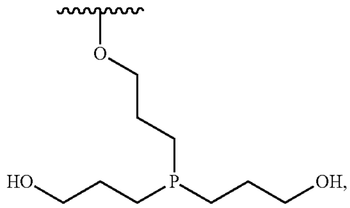
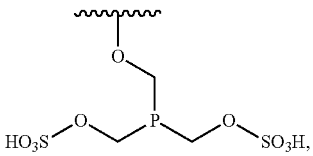
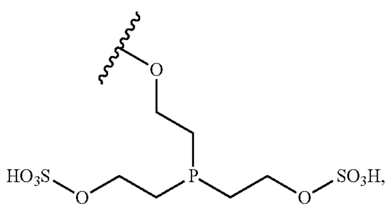
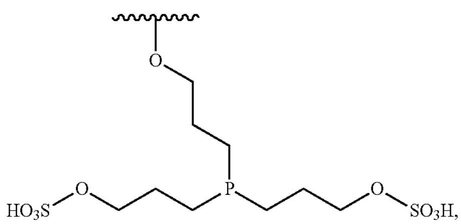
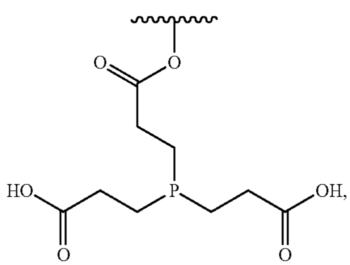
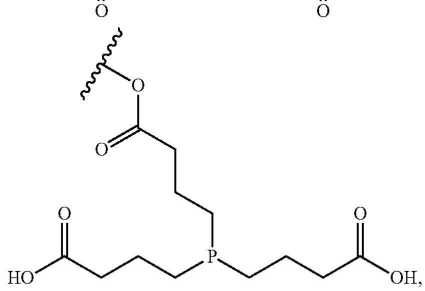
-continued
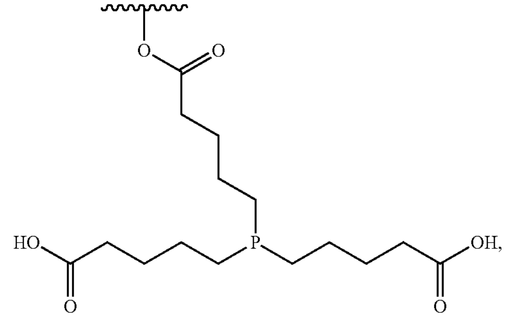
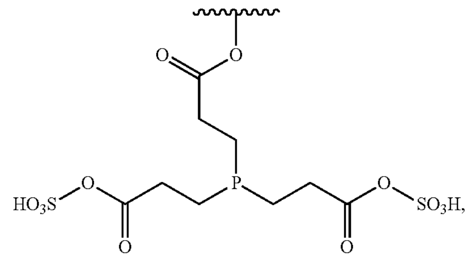
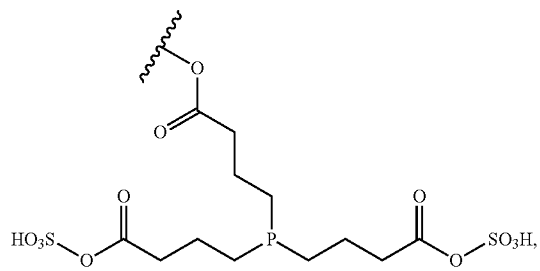
or
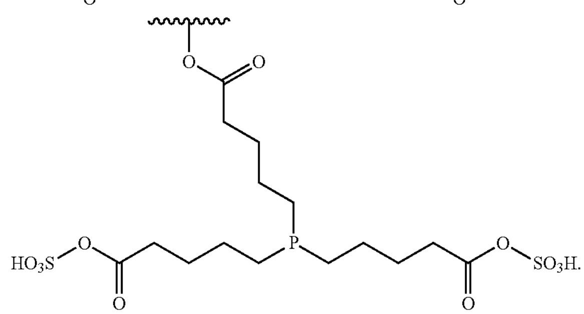
Embodiment 16. The compound of one of embodiments 1 to 14, wherein $R^2$ has the formula:
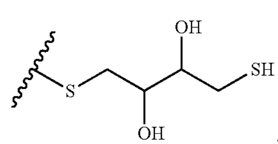
,
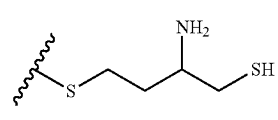
,
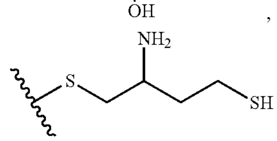
,
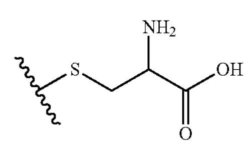
,
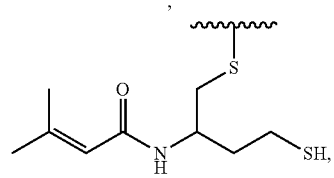

-continued
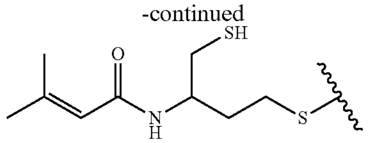
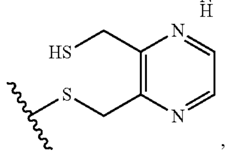
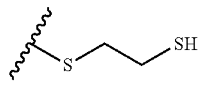
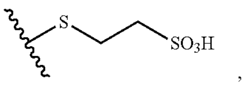
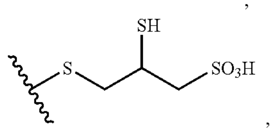
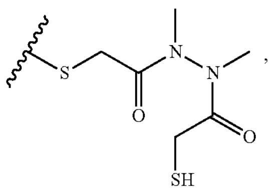
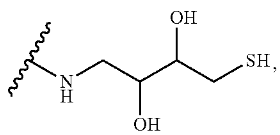
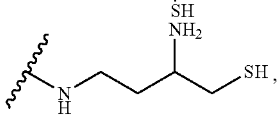
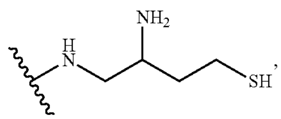
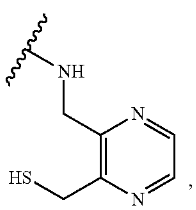
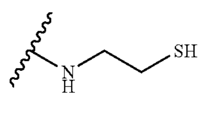
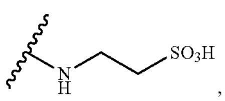
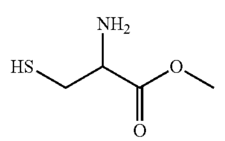
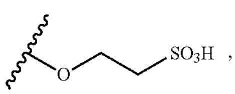
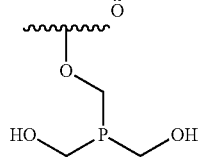
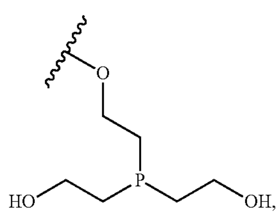
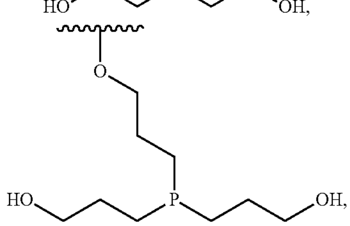
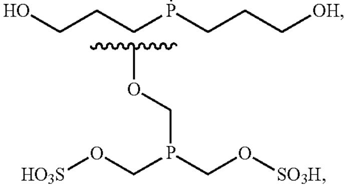
-continued
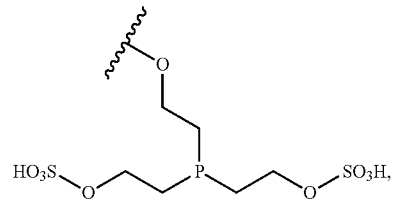
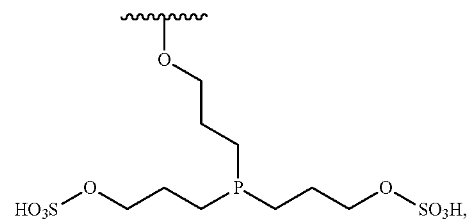
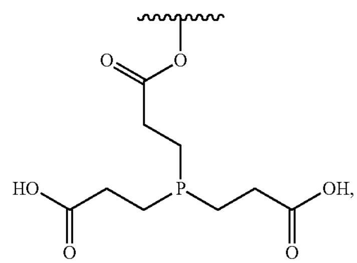
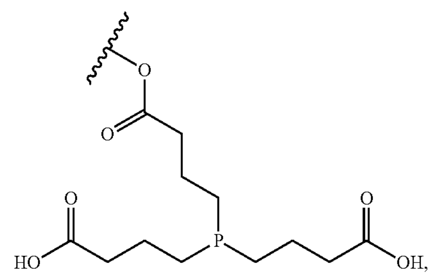
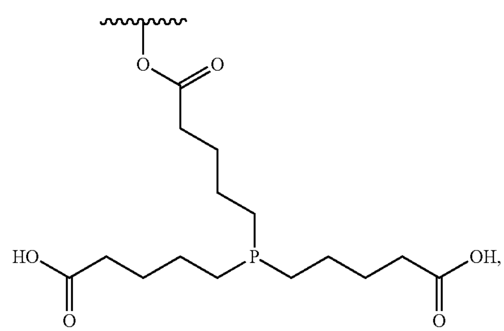
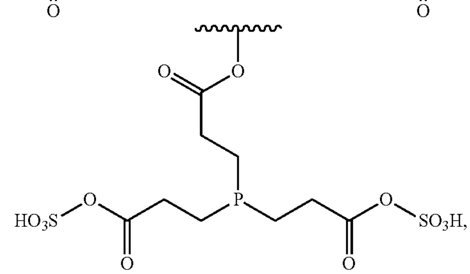

-continued
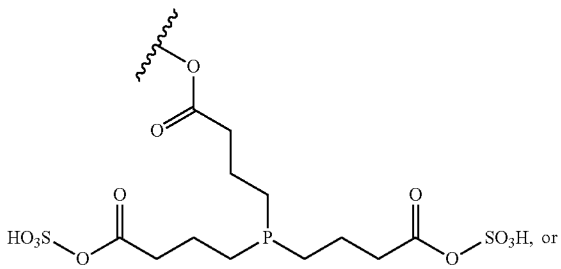
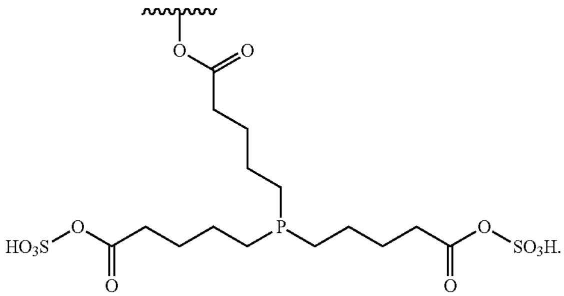
Embodiment 17. The compound of one of embodiments 1 to 16, wherein $R^3$ is halogen or has the formula:
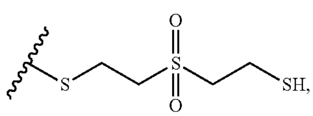
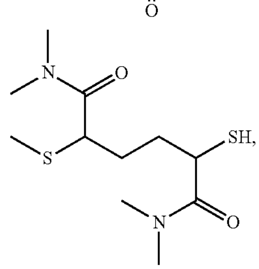
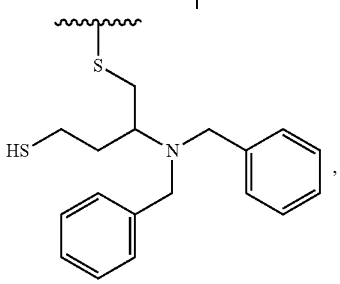
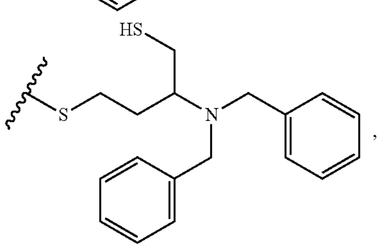
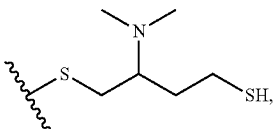
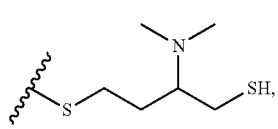
-continued
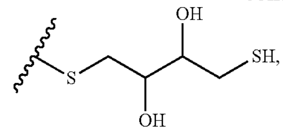
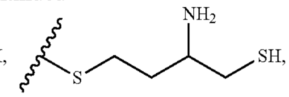
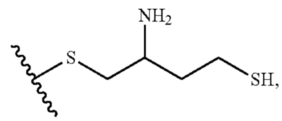
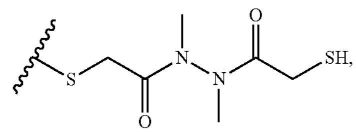
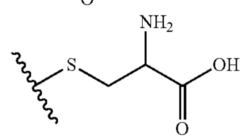
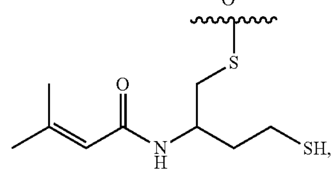
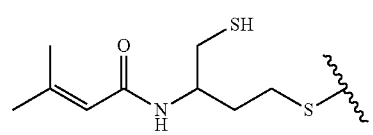
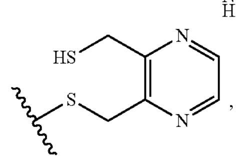
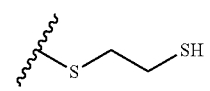
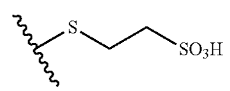
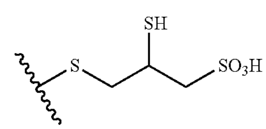
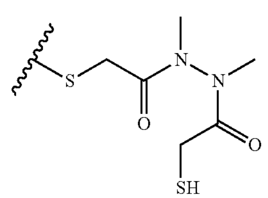
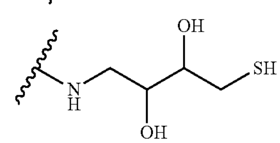
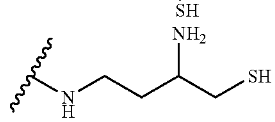
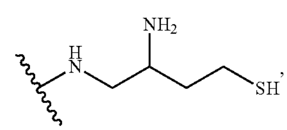
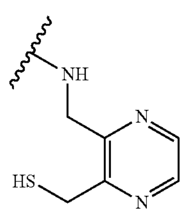
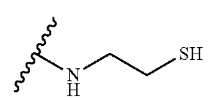
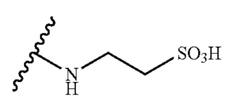
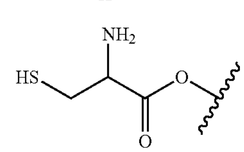

-continued
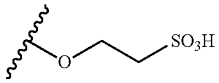
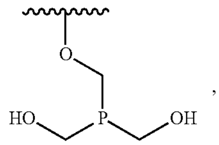
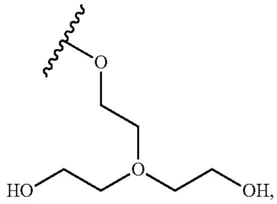
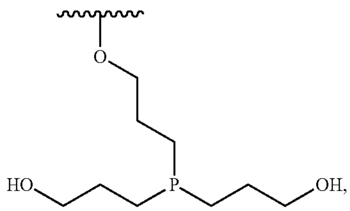
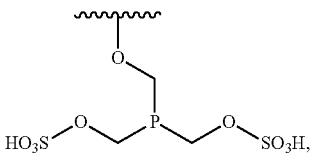
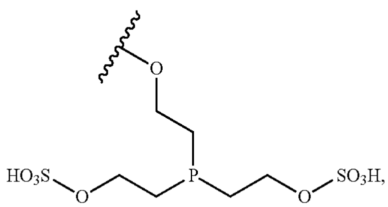
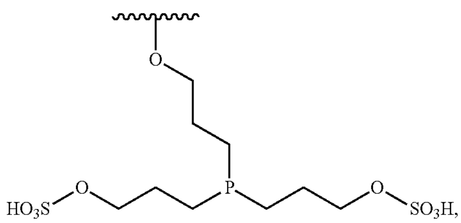
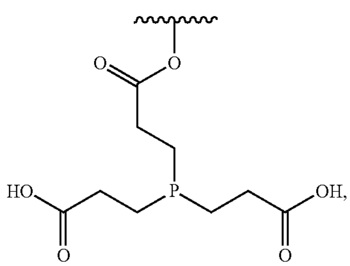
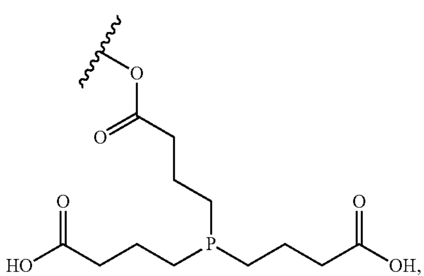
-continued
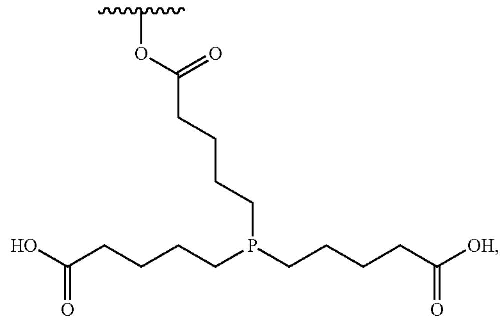
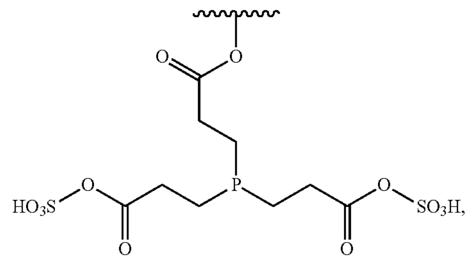
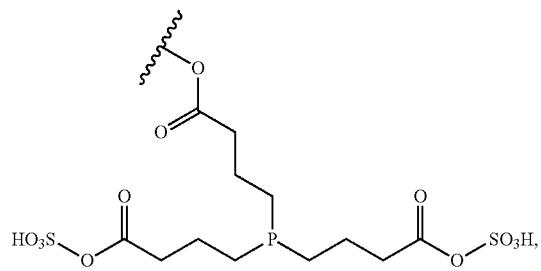
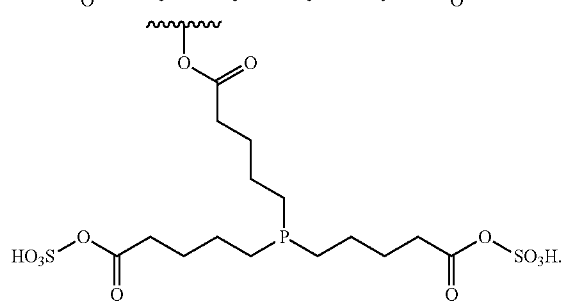
Embodiment 18. The compound of one of embodiments 1 to 17, wherein $R^3$ has the formula:
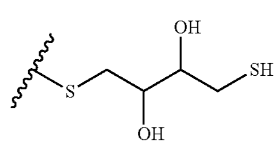
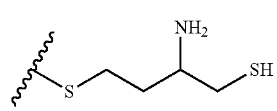
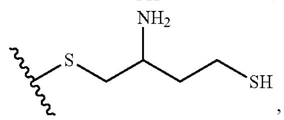
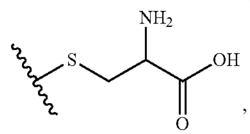
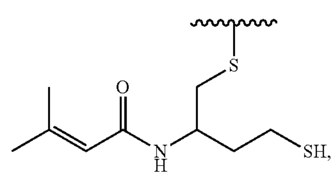

-continued
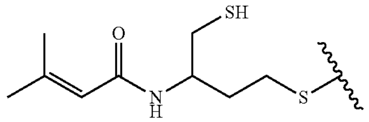
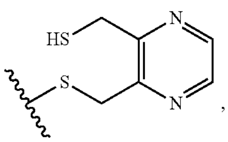
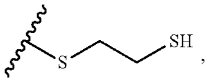
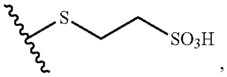
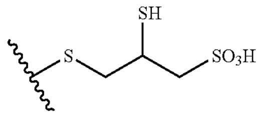
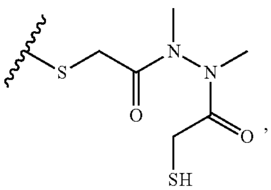
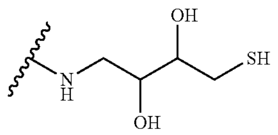
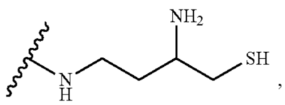
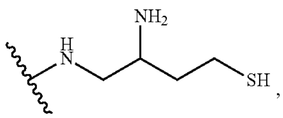
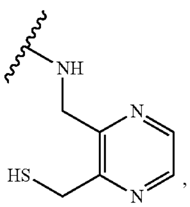
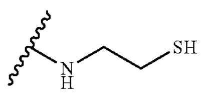
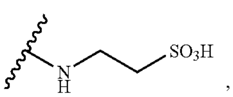
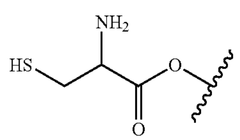
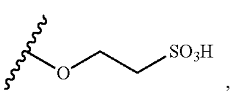
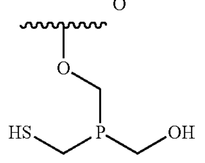
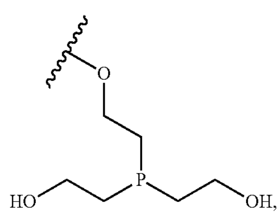
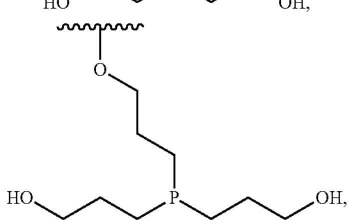
-continued
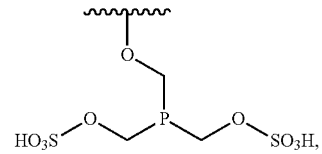
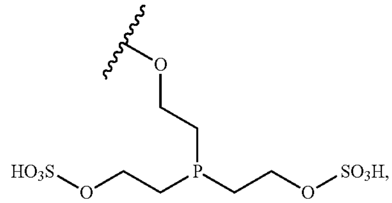
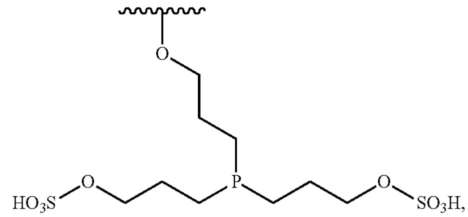
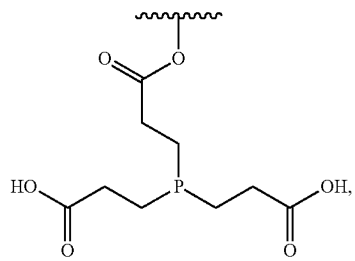
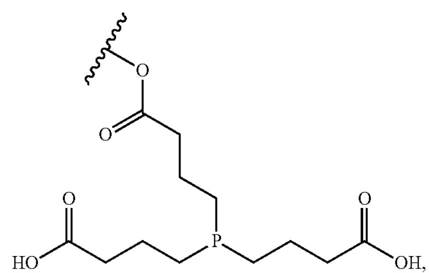
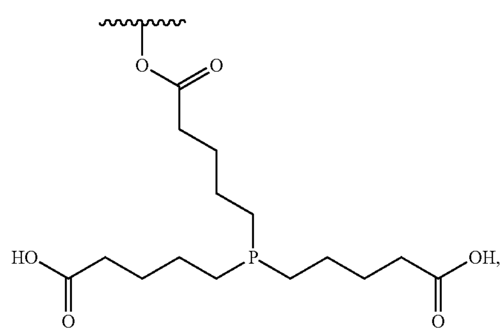
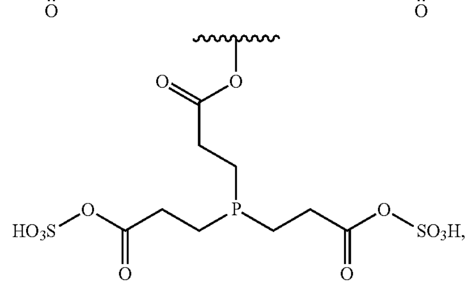

-continued

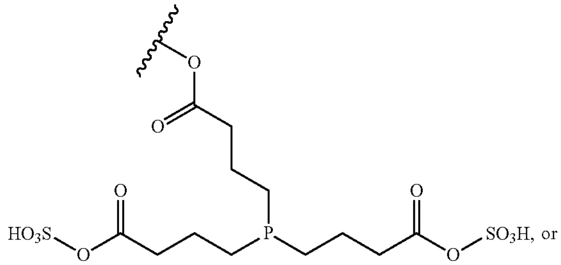

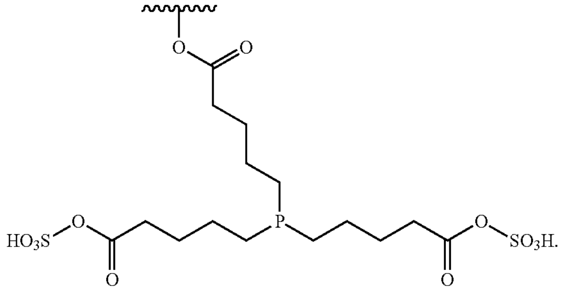

Embodiment 19. The compound of embodiment 1, wherein $R^2$ and $R^3$ are halogen, and $R^1$ is

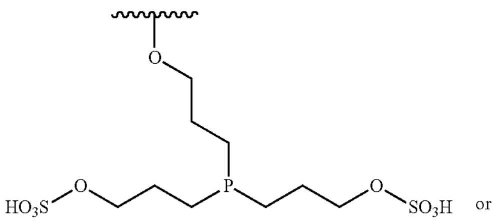

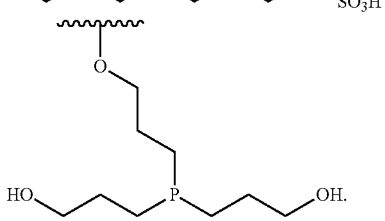

Embodiment 20. The compound of embodiment 1, wherein $R^1$, $R^2$, and $R^3$ are each

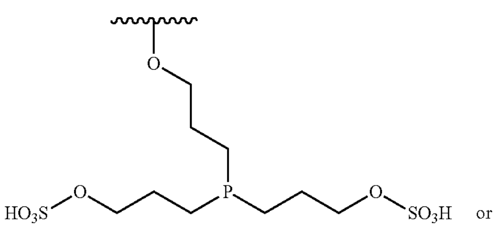

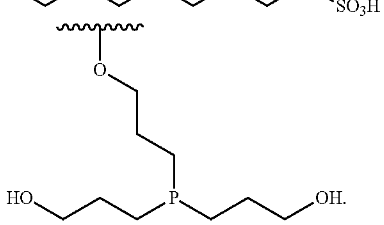

Embodiment 21. The compound of embodiment 1, wherein $R^2$ and $R^3$ are each

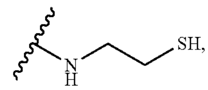 [SMILES: *NCCS]

and $R^1$ is

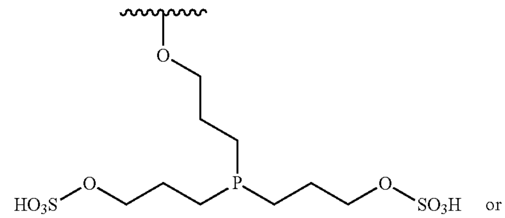

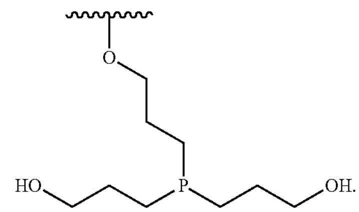

Embodiment 22. A method of sequencing a nucleic acid, comprising: (i) incorporating in series with a nucleic acid polymerase, within a reaction vessel, one of four different labeled nucleotide analogues into a primer to create an extension strand, wherein the primer is hybridized to the nucleic acid and wherein each of the labeled nucleoside analogues comprise a unique detectable label linked by a cleavable linker; (ii) detecting the unique detectable label of each incorporated nucleotide analogue, so as to thereby identify each incorporated nucleotide analogue in the extension strand; and (iii) contacting the incorporated nucleotide analogues with a compound of one of embodiments 1 to 21 to remove the detectable label; thereby sequencing the nucleic acid.

Embodiment 23. A method of incorporating a plurality of nucleotide analogues into a primer hybridized to a single stranded polynucleotide, the method comprising: incorporating with a nucleic acid polymerase a nucleotide analogue into a primer to create an extension strand, wherein the nucleotide analogue comprises a reversible terminator; contacting the nucleotide analogue with a compound of one of embodiments 1 to 21 to remove the reversible terminator; repeating steps (i) and (ii) to incorporate a plurality of nucleotide analogues into a primer hybridized to a single stranded polynucleotide.

Embodiment 24. A method of making a compound of formula (A), wherein the compound of formula (A) has the formula:

(A)

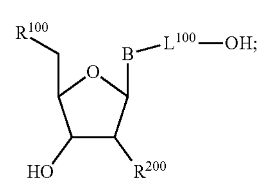

the method comprising mixing a compound of Formula (B) and a compound of Formula (C) together in a reaction vessel; wherein the compound of Formula (B) has the formula:

(B)

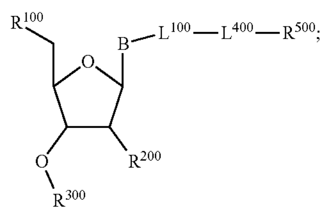

and the compound of Formula (C) is a compound of one of embodiments 1 to 21; wherein B is a nucleobase; $L^{100}$ is a covalent linker; $R^{100}$ is —OH, a 5'-O— nucleoside protecting group, monophosphate moiety, polyphosphate moiety, or nucleic acid moiety; $R^{200}$ is —OH or hydrogen; $R^{300}$ is a reversible terminator; $L^{400}$ is a cleavable linker; and $R^{500}$ is a detectable moiety.

What is claimed is:

1. A compound having the formula:

(III)

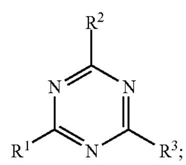

wherein, $R^1$ is $—W^1\text{-}L^1\text{-}R^4$;

$R^2$ is halogen or $—W^2\text{-}L^2\text{-}R^5$;

$R^3$ is halogen or $—W^3\text{-}L^3\text{-}R^6$;

$W^1$, $W^2$, and $W^3$ are independently —O—, —S—, or —NH—;

$L^1$, $L^2$, and $L^3$ are independently substituted or unsubstituted $C_1$ to $C_8$ alkylene;

$R^4$ is

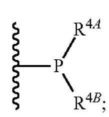

$R^5$ is hydrogen, —OH, $NH_2$, —COOH, —$CONH_2$, —SH, —$SO_3H$, —$SO_4H$, —$SO_2NH_2$, or

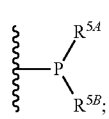

$R^6$ is hydrogen, —OH, $NH_2$, —COOH, —$CONH_2$, —SH, —$SO_3H$, —$SO_4H$, —$SO_2NH_2$, or

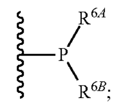

and wherein $R^{4A}$, $R^{4B}$, $R^{5A}$, $R^{5B}$, $R^{6A}$, and $R^{6B}$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl.

2. The compound of claim 1, wherein $W^1$, $W^2$, and $W^3$ are each —O—.

3. The compound of claim 1, wherein $W^1$, $W^2$, and $W^3$ are each —S— or —NH—.

4. The compound of claim 1, wherein $L^1$, $L^2$, and $L^3$ are independently unsubstituted $C_1$ to $C_4$ alkylene.

5. The compound of claim 1, wherein $R^4$ is

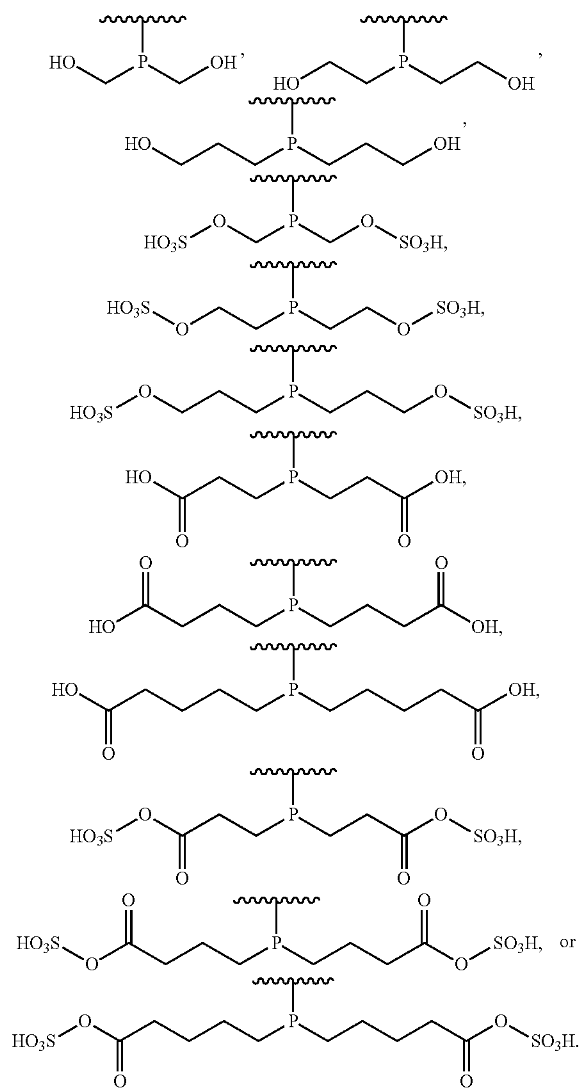

6. The compound of claim 1, wherein $R^5$ is hydrogen, —OH, —$NH_2$, —COOH, —$CONH_2$, —SH, —$SO_3H$, —$SO_4H$, —$SO_2NH_2$,
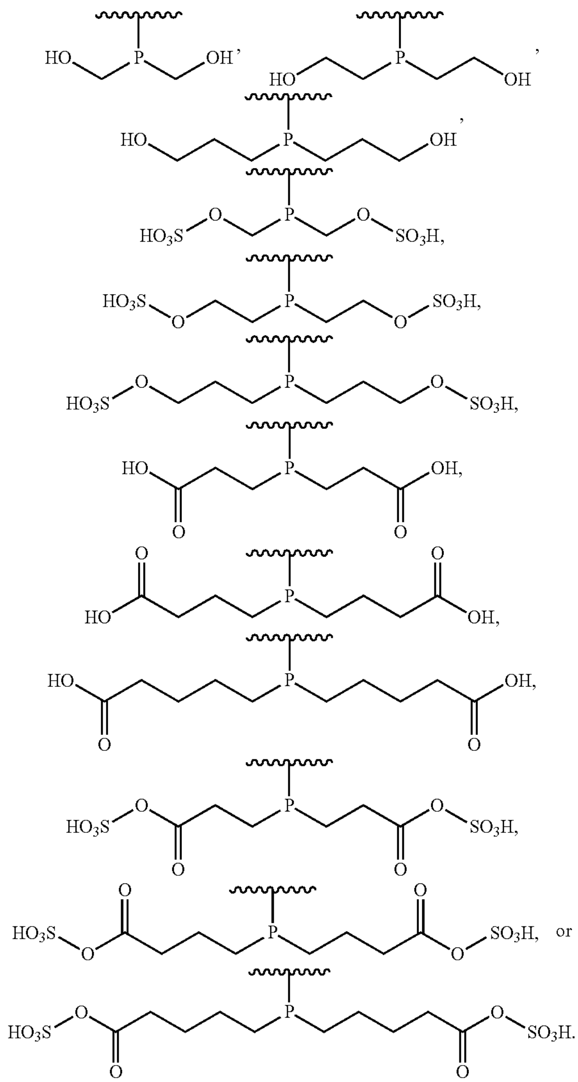
7. The compound of claim 1, wherein $R^6$ is hydrogen, —OH, —$NH_2$, —COOH, —$CONH_2$, —SH, —$SO_3H$, —$SO_4H$, —$SO_2NH_2$,
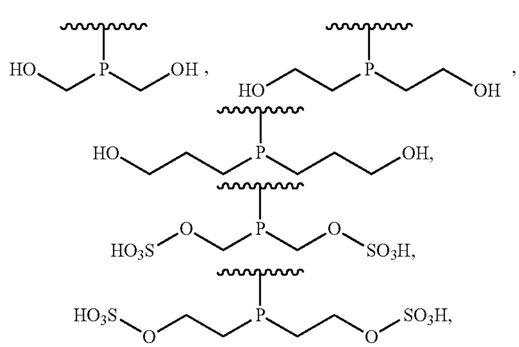
-continued
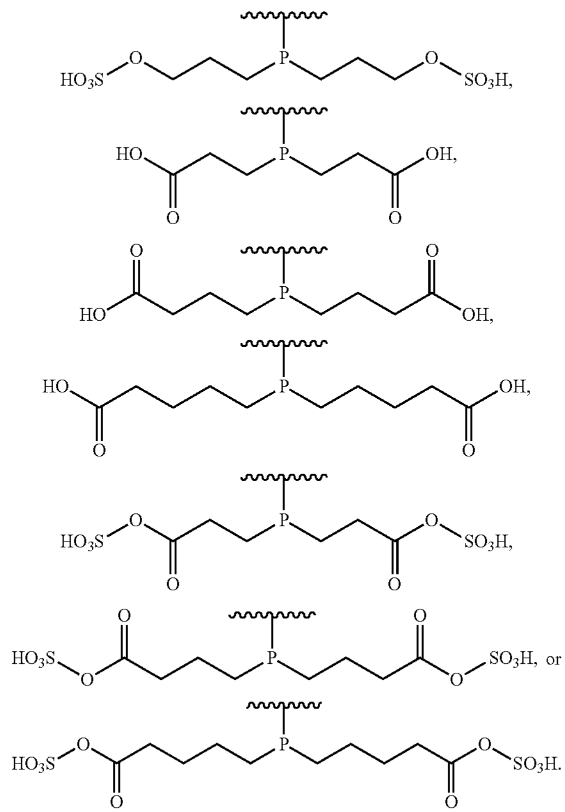
8. The compound of claim 1, wherein $R^1$ has the formula:
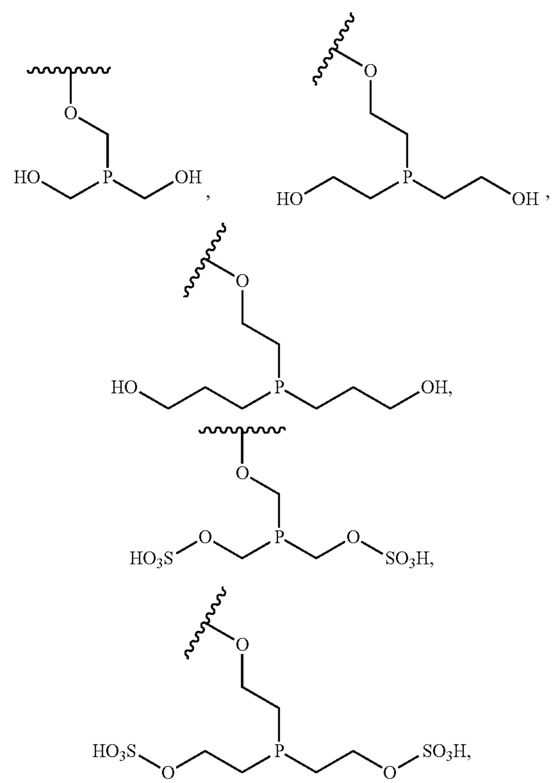

-continued
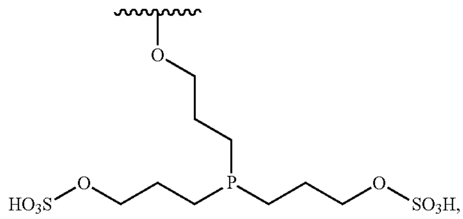
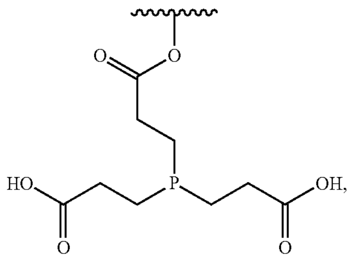
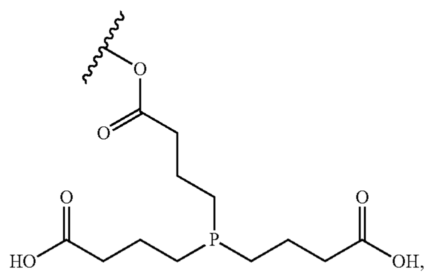
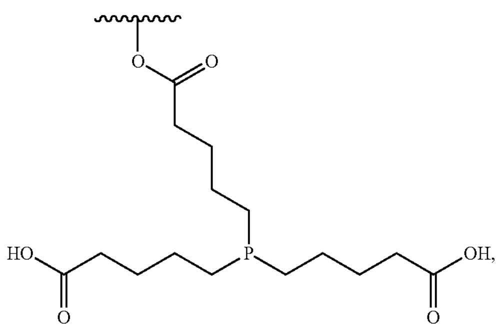
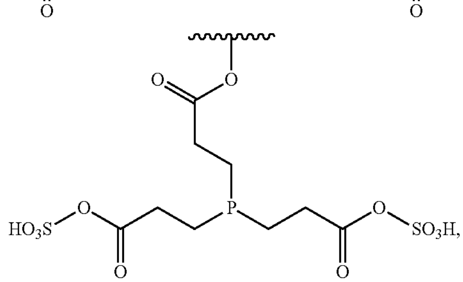
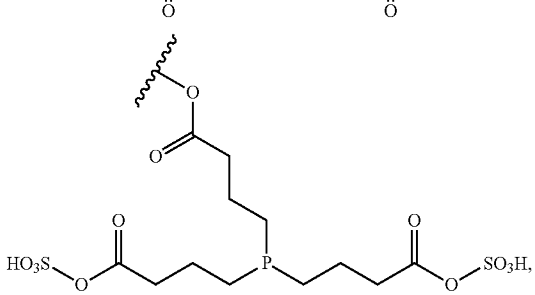
or
-continued
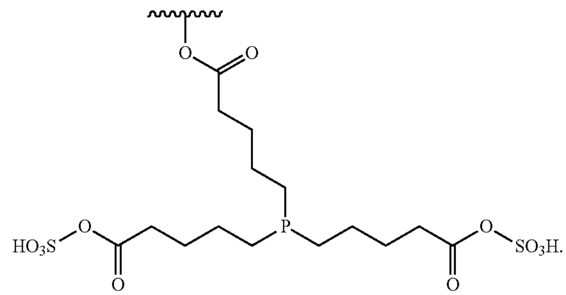 [SMILES: *OC(=O)CCCCP(CCCCC(=O)OS(=O)(=O)O)CCCCC(=O)OS(=O)(=O)O]
9. The compound of claim 1, wherein $R^2$ is halogen or has the formula:
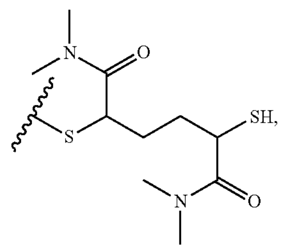
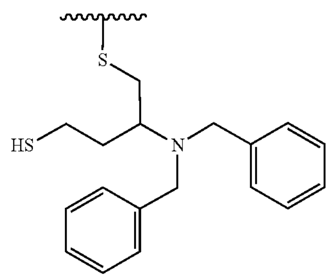
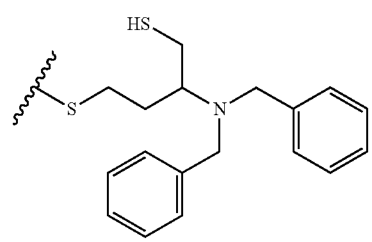
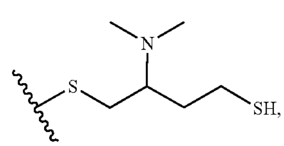
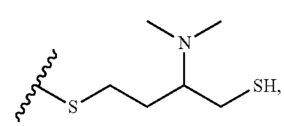
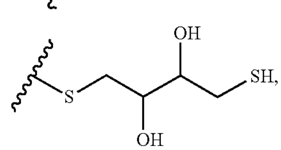
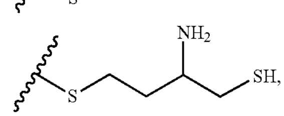
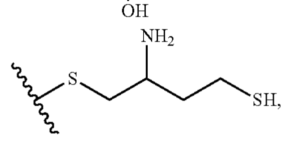
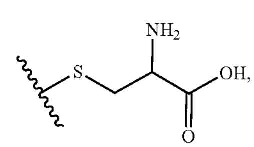

-continued
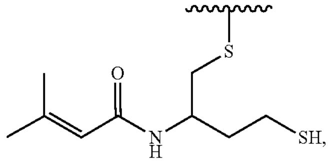
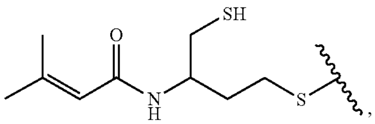
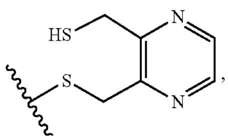
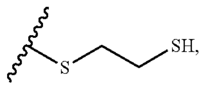
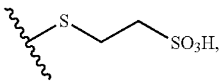
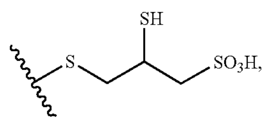
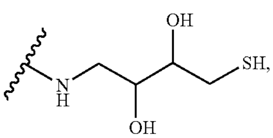
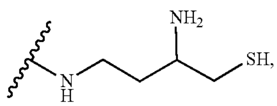
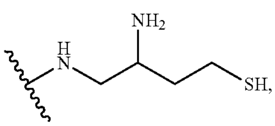
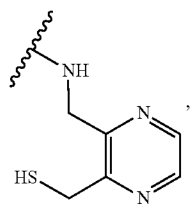
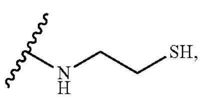
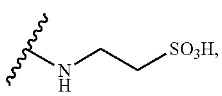
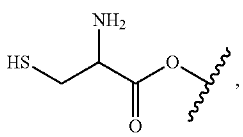
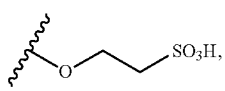
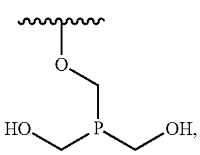
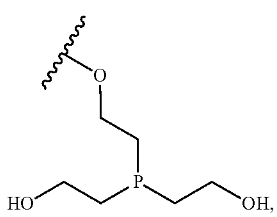
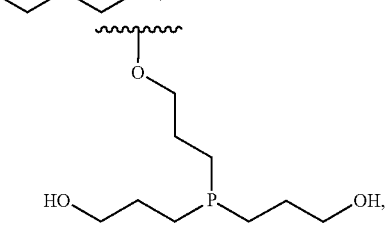
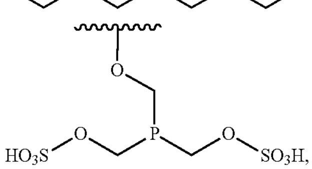
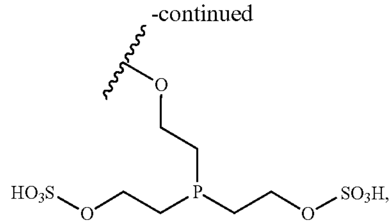
-continued
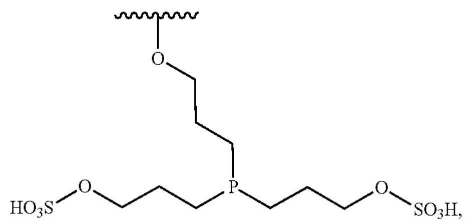
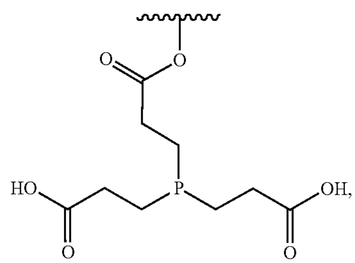
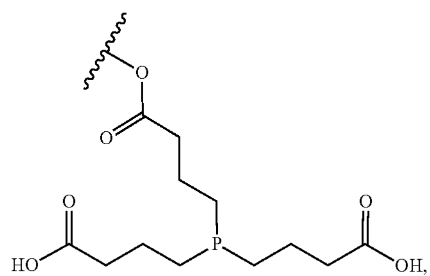
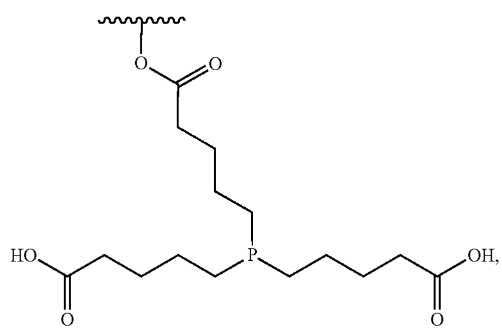
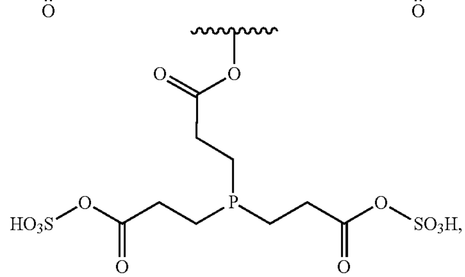

-continued
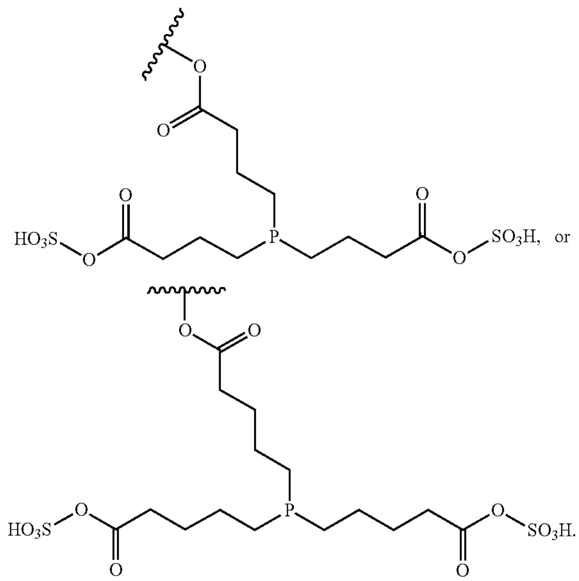
10. The compound of claim 1, wherein $R^2$ has the formula
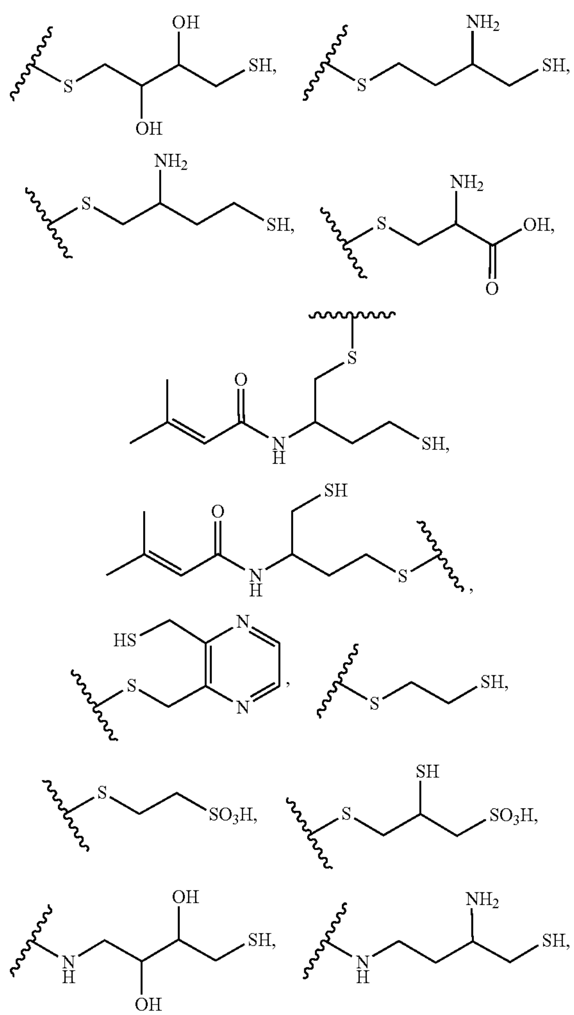
-continued
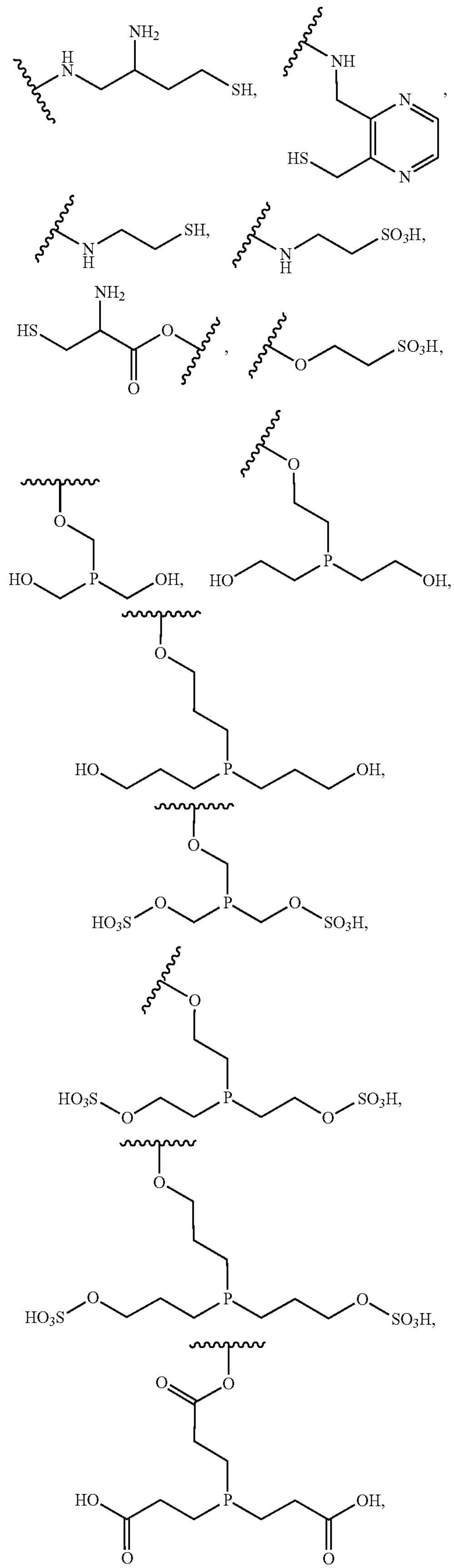

-continued
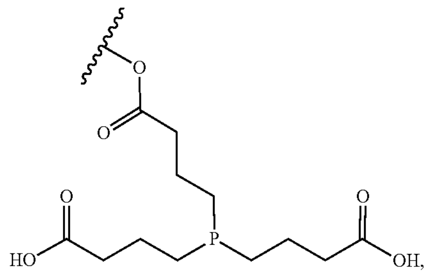
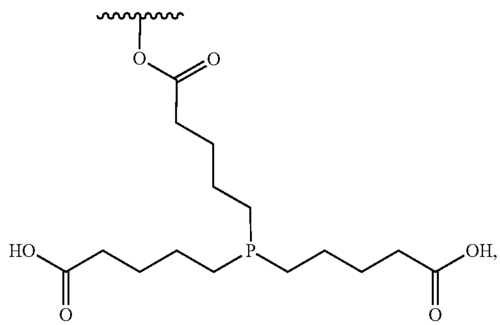
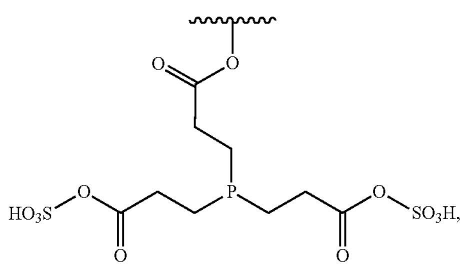
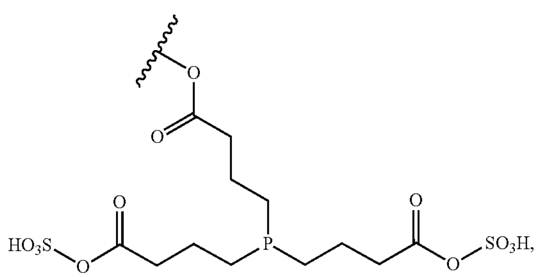
or
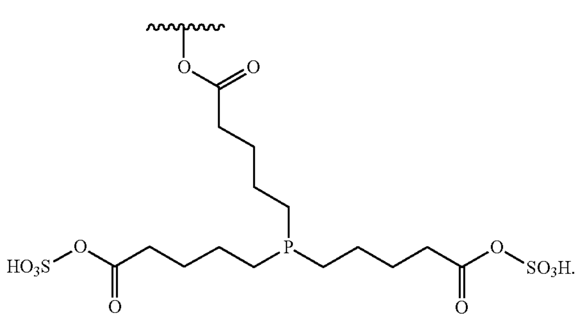 [SMILES: *OC(=O)CCCCP(CCCCC(=O)OS(=O)(=O)O)CCCCC(=O)OS(=O)(=O)O]
11. The compound of claim 1, wherein $R^3$ is halogen or has the formula:
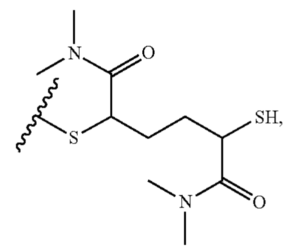
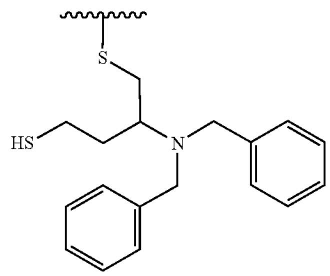
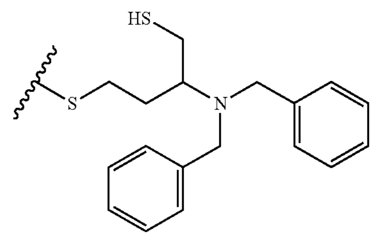
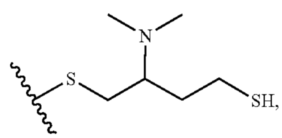
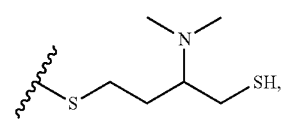
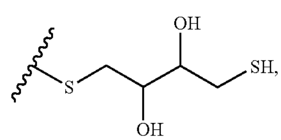
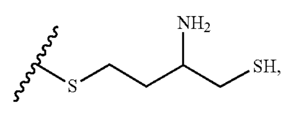
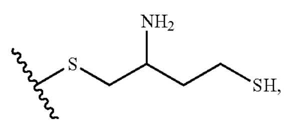
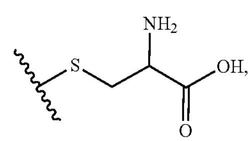
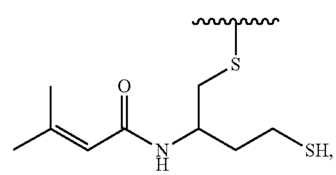
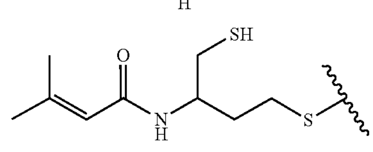
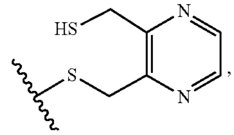
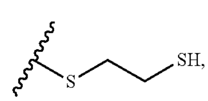

-continued
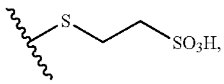
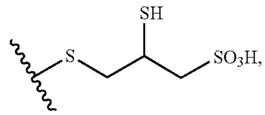
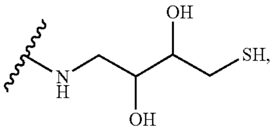
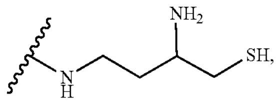
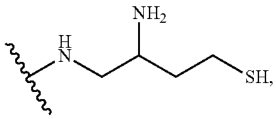
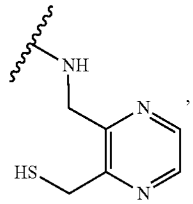
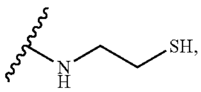
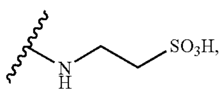
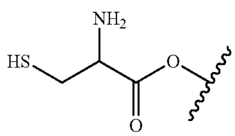
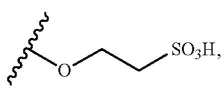
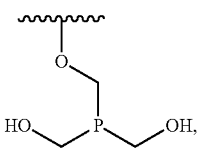
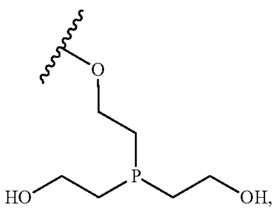
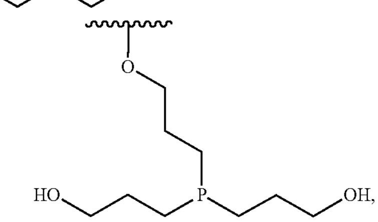
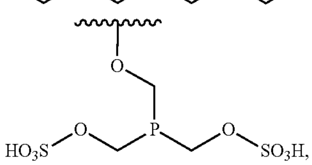
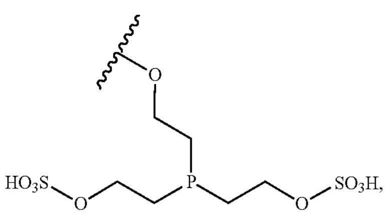
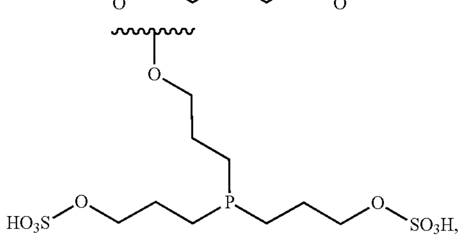
-continued
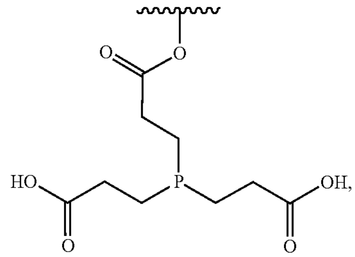
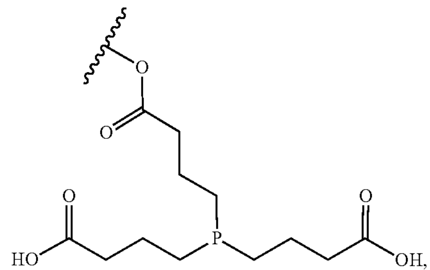
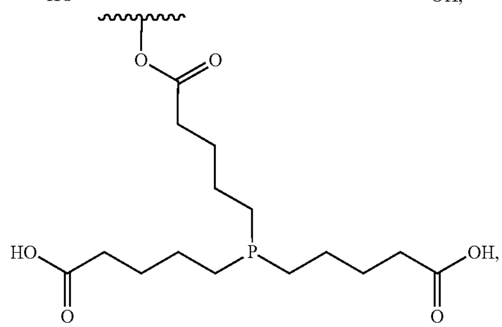
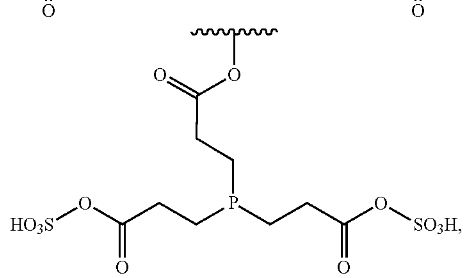
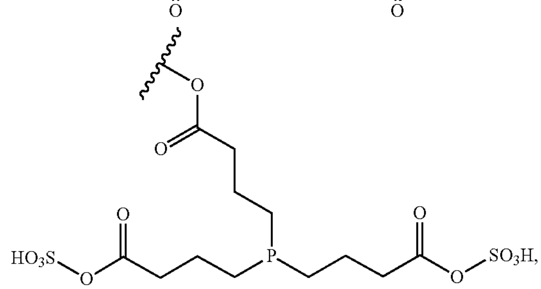
or
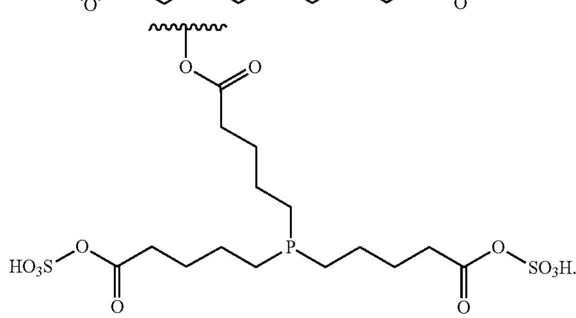

12. The compound of claim 1, wherein $R^3$ has the formula:
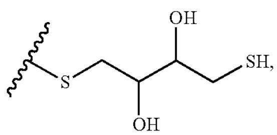
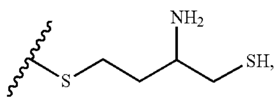
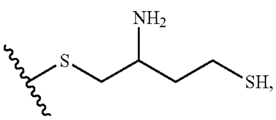
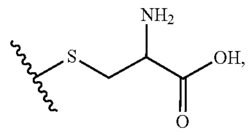
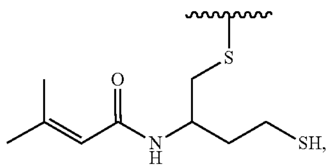
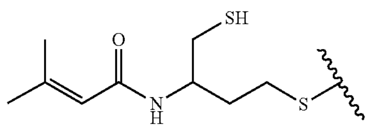
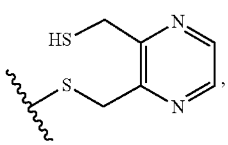
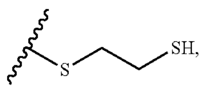
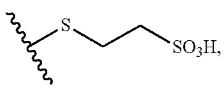
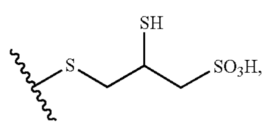
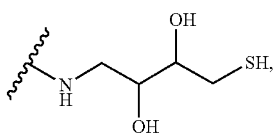
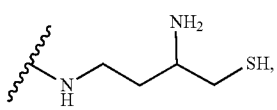
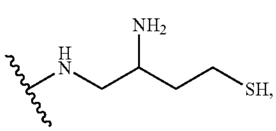
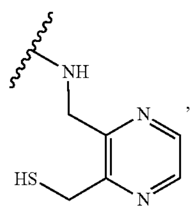
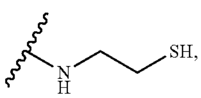
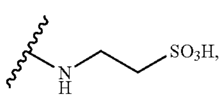
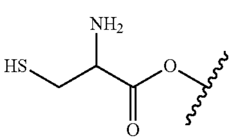
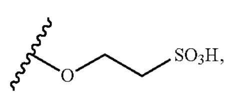
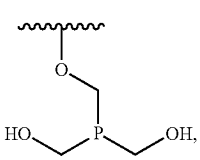
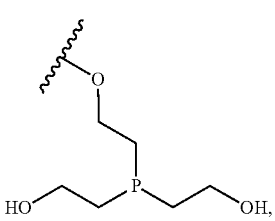
-continued
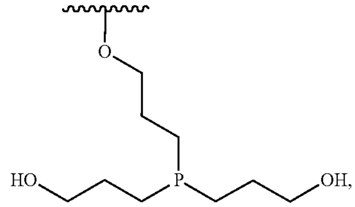
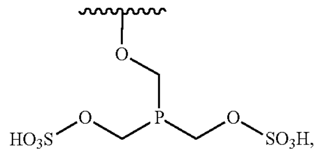
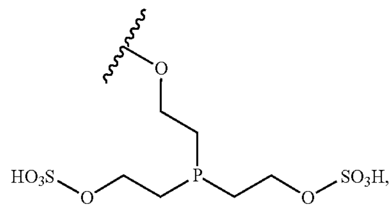
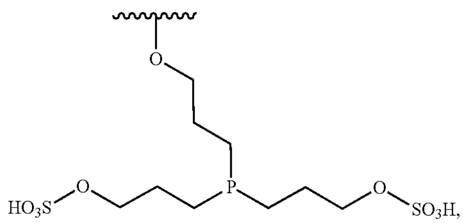
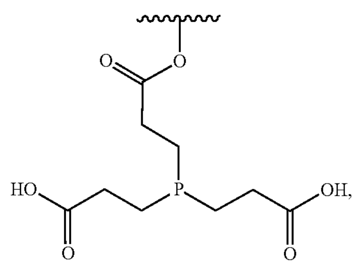
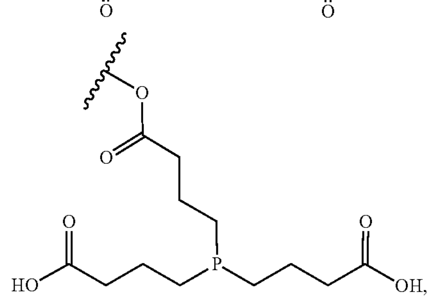
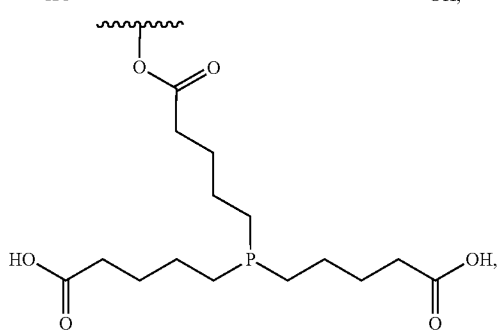

-continued
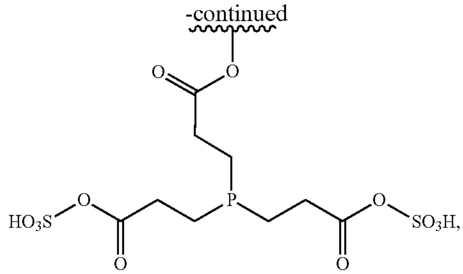
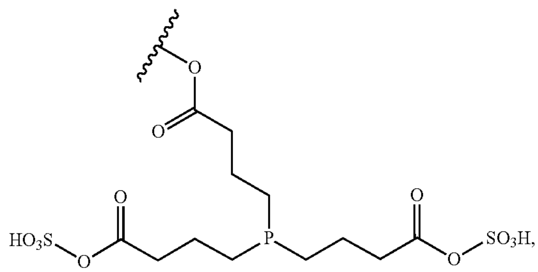
or
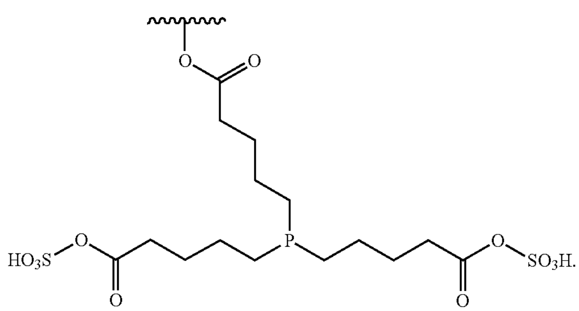 [SMILES: *OC(=O)CCCCP(CCCCC(=O)OS(=O)(=O)O)CCCCC(=O)OS(=O)(=O)O]
13. The compound of claim 1, wherein $R^2$ and $R^3$ are halogen, and $R^1$ is
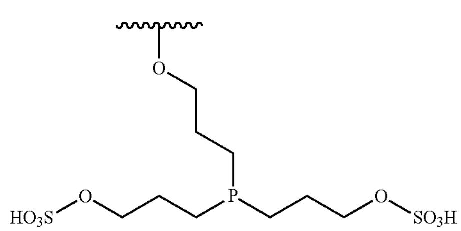
or
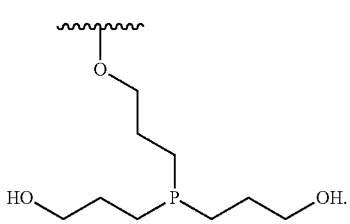
14. The compound of claim 1, wherein $R^1$, $R^2$, and $R^3$ are each
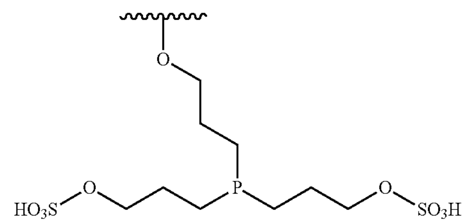
or
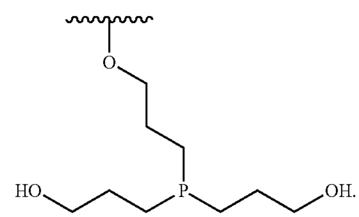
15. The compound of claim 1, wherein $R^2$ and $R^3$ are each
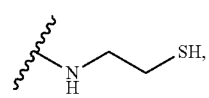 [SMILES: *NCCS]
and $R^1$ is
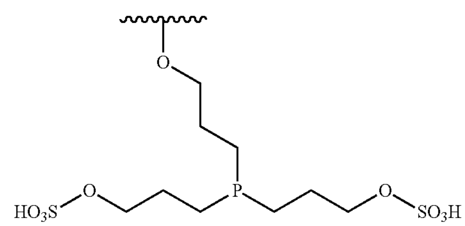
or
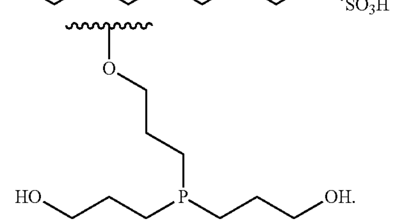
16. The compound of claim 1, wherein $R^4$ is
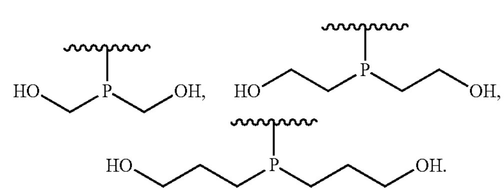

17. The compound of claim 1, having the formula:
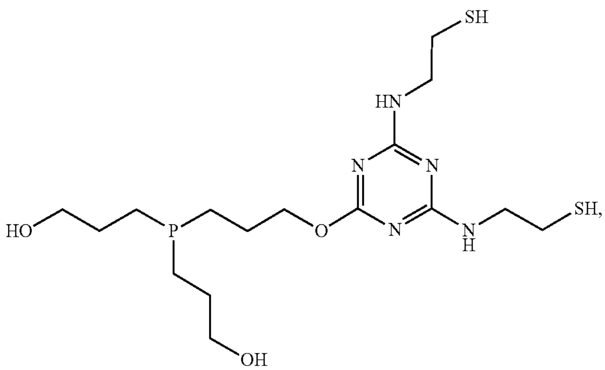
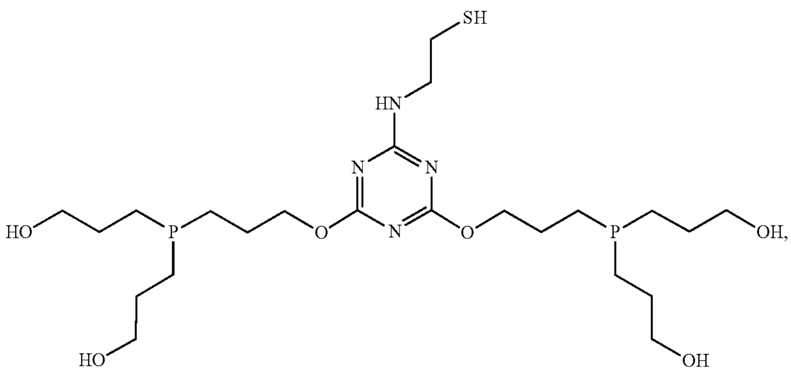
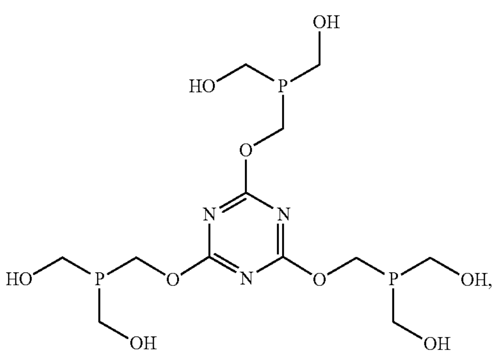
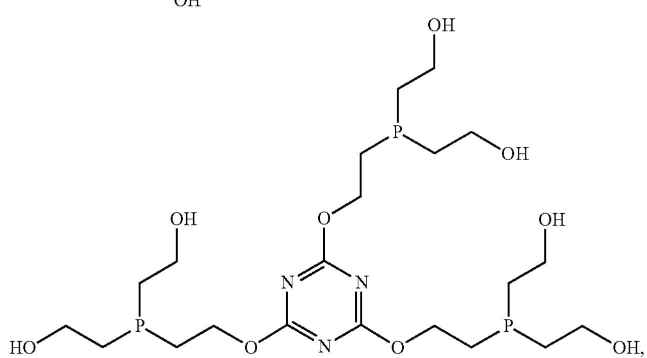
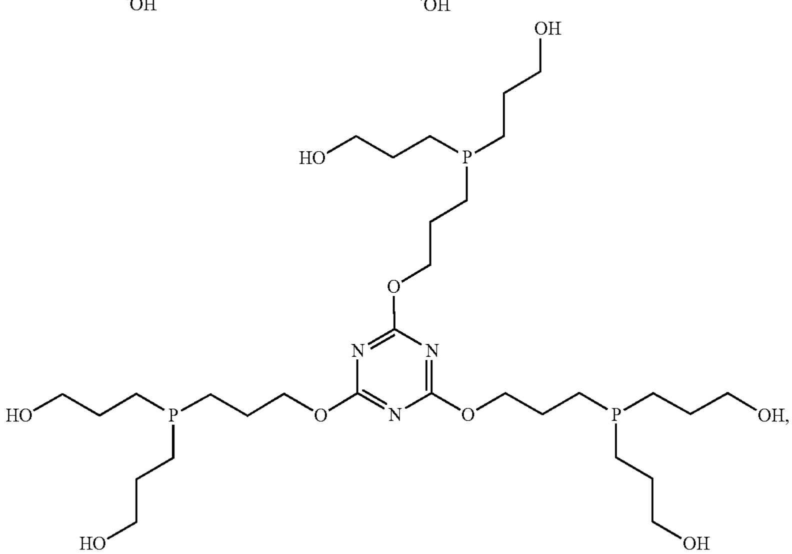

-continued

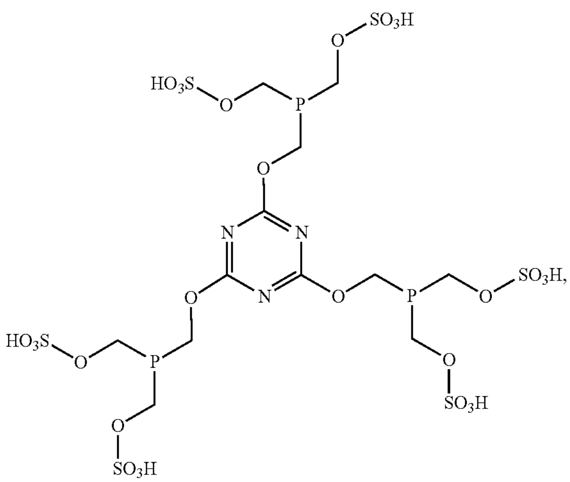

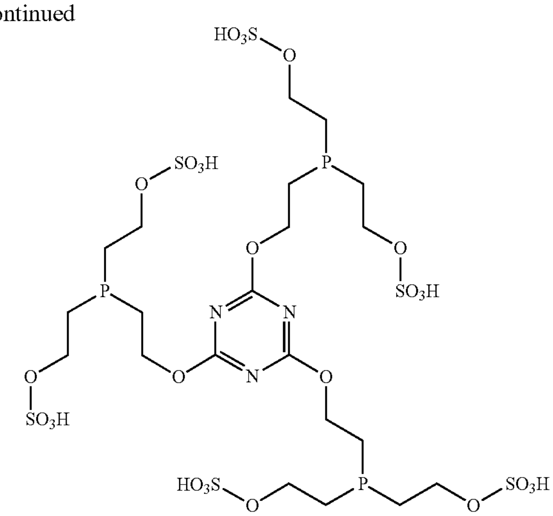

, or

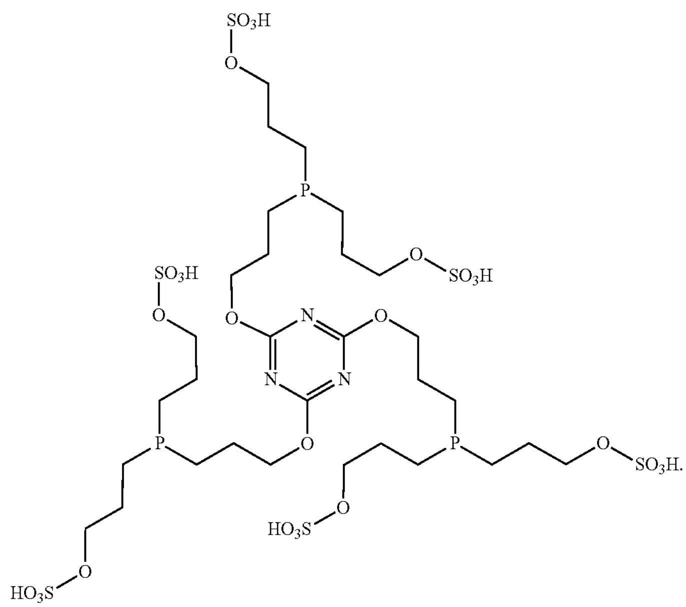

18. A compound having the formula:

(III)

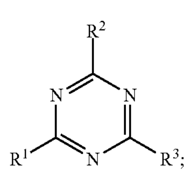

wherein, $R^1$ is —$W^1$-$L^1$-$R^4$;

$R^2$ is halogen or —$W^2$-$L^2$-$R^5$;

$R^3$ is halogen or —$W^3$-$L^3$-$R^6$;

$W^1$, $W^2$, and $W^3$ are independently —O—, —S—, or —NH—;

$L^1$, $L^2$, and $L^3$ are independently a substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene;

$R^4$ is

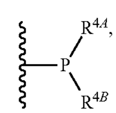

wherein

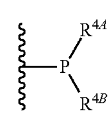

is

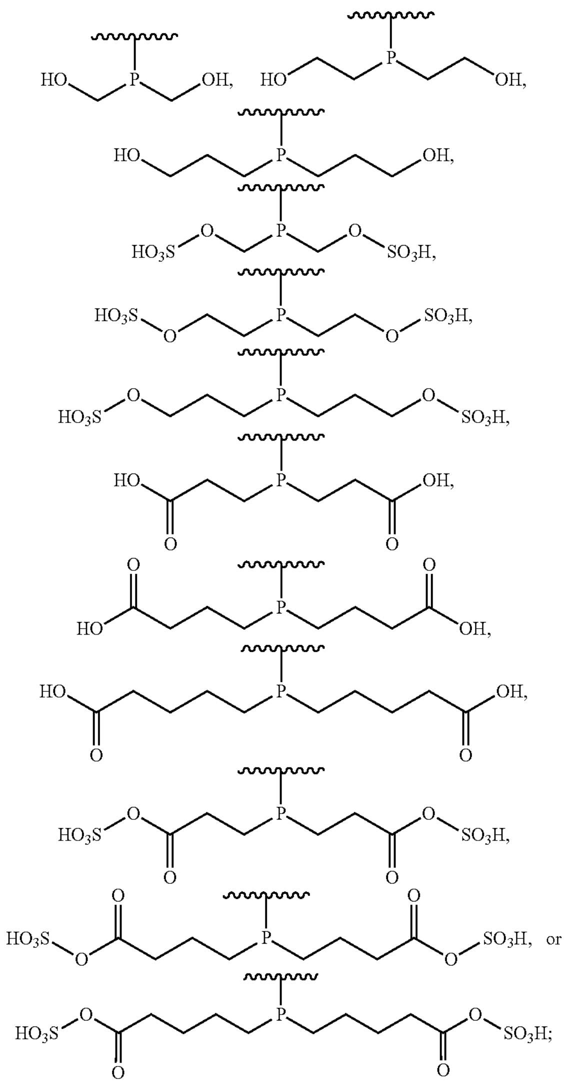

$R^5$ is hydrogen, —OH, $NH_2$, —COOH, —$CONH_2$, —SH, —$SO_3H$, —$SO_4H$, —$SO_2NH_2$, or

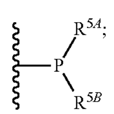

$R^6$ is hydrogen, —OH, $NH_2$, —COOH, —$CONH_2$, —SH, —$SO_3H$, —$SO_4H$, —$SO_2NH_2$, or

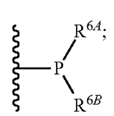

and wherein $R^{4A}$, $R^{4B}$, $R^{5A}$, $R^{5B}$, $R^{6A}$, and $R^{6B}$ are independently substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl.

19. The compound of claim 18, having formula:

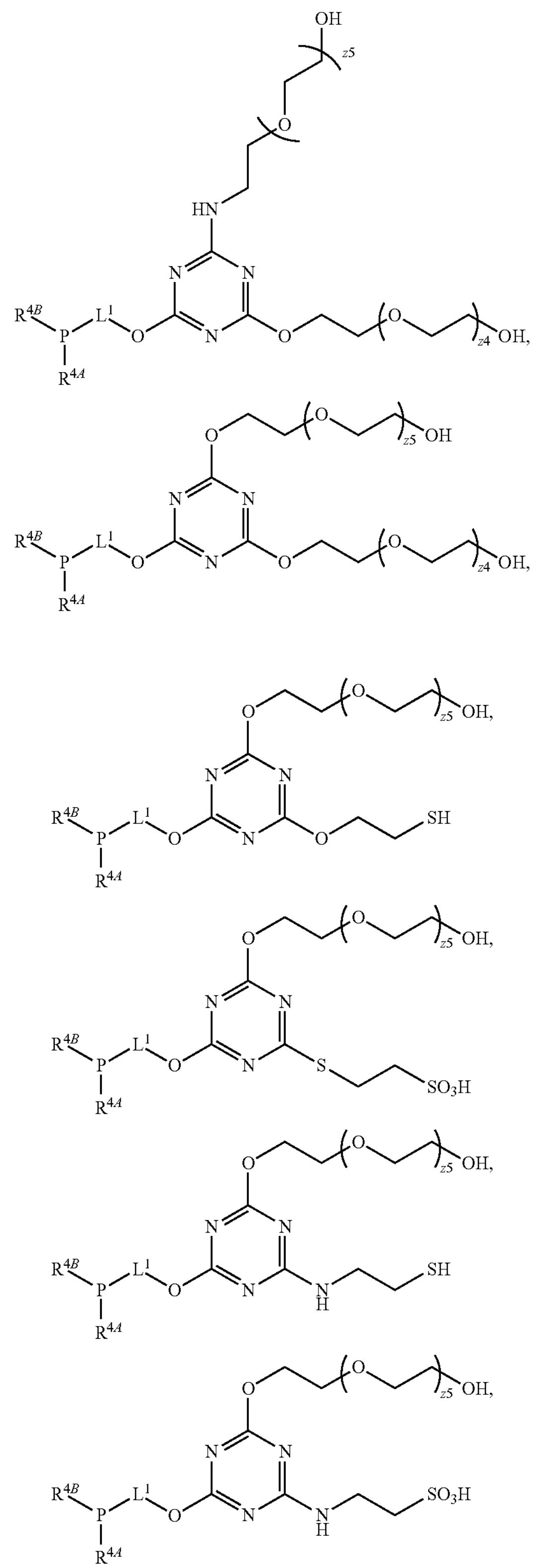

-continued
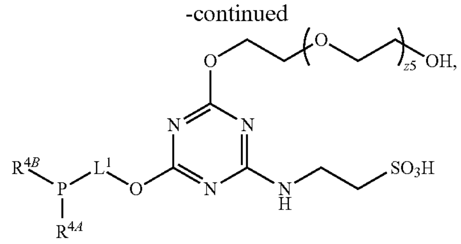
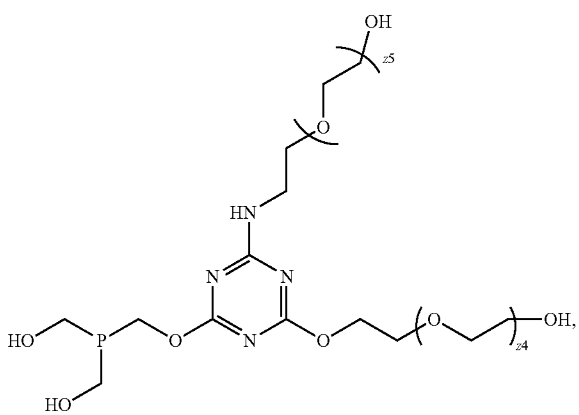
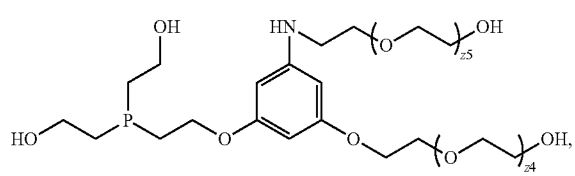
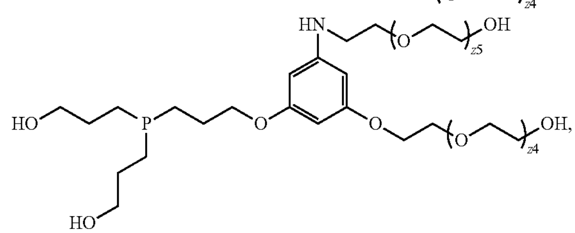
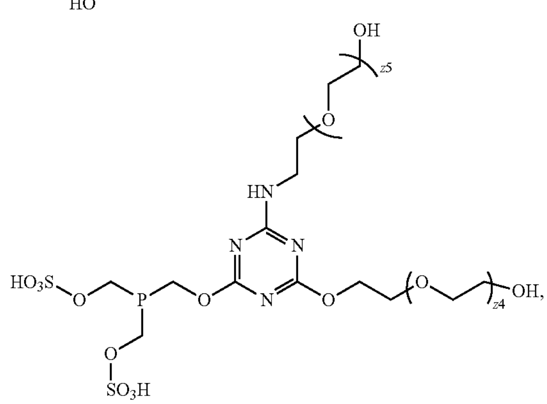
or
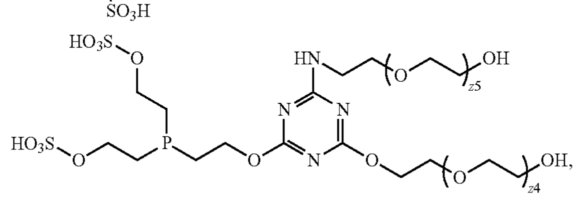
wherein z4 and z5 are independently an integer from 1 to 20.
20. The compound of claim 1, wherein $R^1$ has the formula:
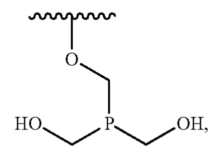
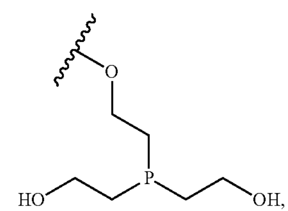
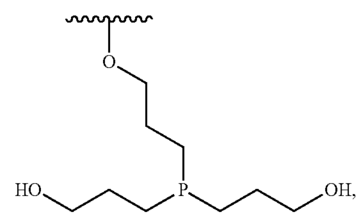
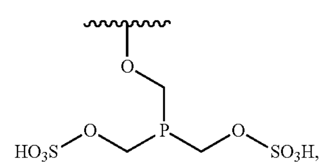
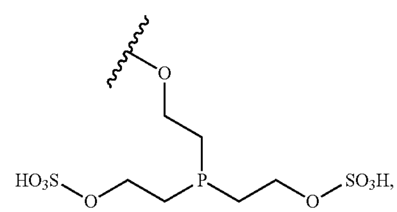
or
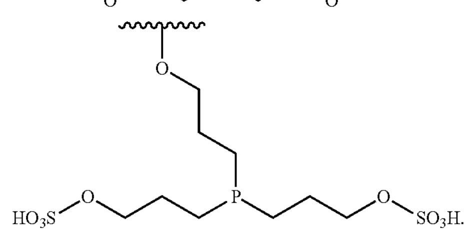
21. The compound of claim 1, wherein $R^2$ has the formula:
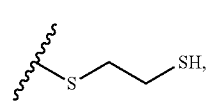
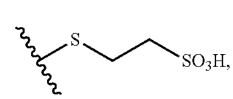
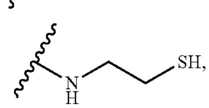
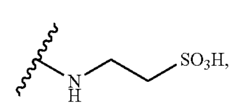
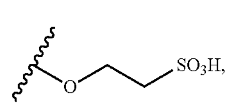
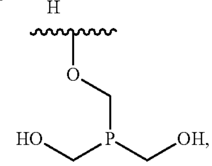

-continued
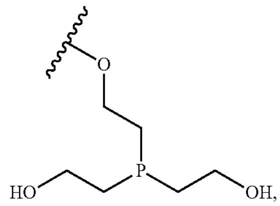
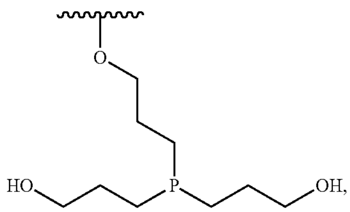
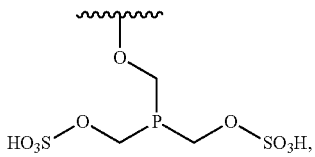
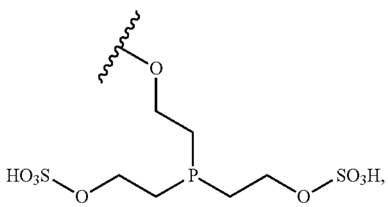
or
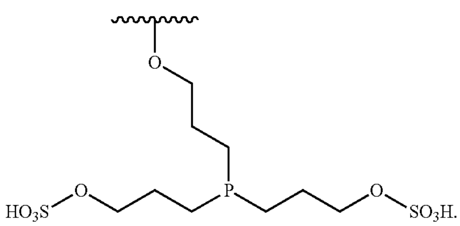
22. The compound of claim 1, wherein $R^3$ has the formula:
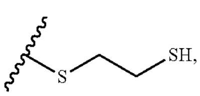
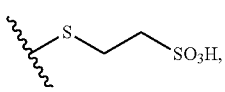
-continued
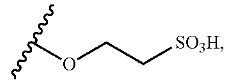
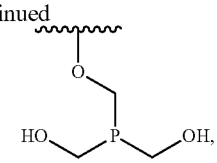
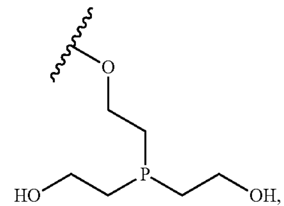
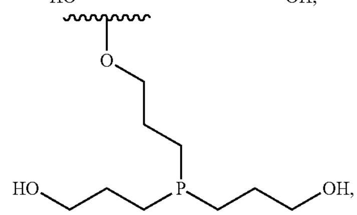
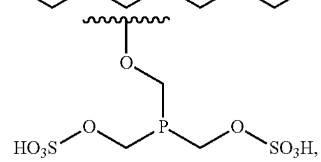
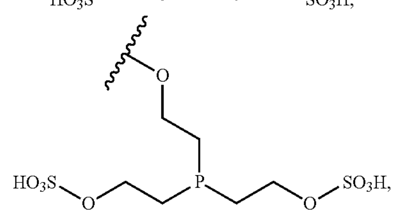
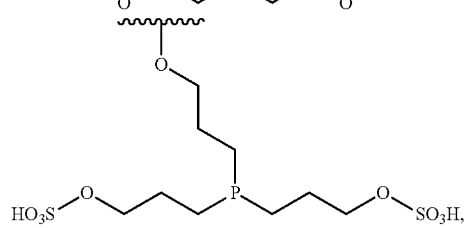
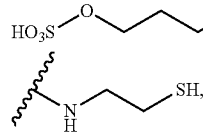
or
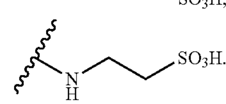
* * * * *